US012465564B2

(12) United States Patent
Wargacki et al.

(10) Patent No.: US 12,465,564 B2
(45) Date of Patent: *Nov. 11, 2025

(54) ORAL AND NASAL COMPOSITIONS AND METHODS OF TREATMENT

(71) Applicant: AQUESTIVE THERAPEUTICS, INC.

(72) Inventors: Stephen Paul Wargacki, Pittstown, NJ (US); Alexander Mark Schobel, Vero Beach, FL (US)

(73) Assignee: AQUESTIVE THERAPEUTICS, INC., Warren, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,345

(22) Filed: Oct. 25, 2022

(65) Prior Publication Data

US 2023/0131450 A1 Apr. 27, 2023

Related U.S. Application Data

(60) Provisional application No. 63/271,458, filed on Oct. 25, 2021.

(51) Int. Cl.
| | |
|---|---|
| *A61K 9/00* | (2006.01) |
| *A61K 9/70* | (2006.01) |
| *A61K 31/5513* | (2006.01) |
| *A61P 25/08* | (2006.01) |

(52) U.S. Cl.
CPC .......... *A61K 9/0043* (2013.01); *A61K 9/7007* (2013.01); *A61K 31/5513* (2013.01); *A61P 25/08* (2018.01)

(58) Field of Classification Search
CPC .... A61K 31/5513; A61K 9/0043; A61P 25/08
See application file for complete search history.

(56) References Cited

U.S. PATENT DOCUMENTS

| | | |
|---|---|---|
| 26,401 A | 12/1859 | Brashear et al. |
| 307,537 A | 11/1884 | Foulks |
| 476,085 A | 5/1892 | Smith |
| 492,417 A | 2/1893 | McAlister |
| 503,070 A | 8/1893 | Broadwell et al. |
| 596,302 A | 12/1897 | McMahon |
| 688,446 A | 12/1901 | Stempel, Jr. |
| 1,110,546 A | 9/1914 | Hewitt |
| 1,827,354 A | 10/1931 | Cooper |
| 2,142,537 A | 1/1939 | Tiaxa |
| 2,277,038 A | 3/1942 | Curtis |
| 2,352,691 A | 7/1944 | Curtis |
| 2,376,656 A | 5/1945 | Leonia |
| 2,501,544 A | 3/1950 | Shrontz |
| 2,612,165 A | 9/1952 | Szukerski |
| 2,980,554 A | 4/1961 | Gentile et al. |
| 3,007,848 A | 11/1961 | Stroop |
| 3,044,338 A | 7/1962 | Horton et al. |
| 3,131,068 A | 4/1964 | Grief |
| 3,142,217 A | 7/1964 | Busse |
| 3,189,174 A | 6/1965 | Cormack |
| 3,237,596 A | 3/1966 | Grass, Jr. et al. |
| 3,242,959 A | 3/1966 | Glass |
| 3,249,109 A | 5/1966 | Maeth et al. |
| 3,324,754 A | 6/1967 | Peavy |
| 3,370,497 A | 2/1968 | Busse |
| 3,419,137 A | 12/1968 | Walck, III |
| 3,444,858 A | 5/1969 | Russell |
| 3,451,539 A | 6/1969 | Wysocki |
| 3,536,809 A | 10/1970 | Applezwig |
| 3,539,605 A | 11/1970 | Oberhofer |
| 3,551,556 A | 12/1970 | Kliment et al. |
| 3,598,122 A | 8/1971 | Zaffaroni |
| 3,610,248 A | 10/1971 | Davidson |
| 3,625,351 A | 12/1971 | Eisenberg |
| 3,632,740 A | 1/1972 | Robinson et al. |
| 3,640,741 A | 2/1972 | Etes |
| 3,641,237 A | 2/1972 | Gould et al. |
| 3,650,461 A | 3/1972 | Hutcheson |
| 3,677,866 A | 7/1972 | Pickett et al. |
| 3,731,683 A | 5/1973 | Zaffaroni |
| 3,753,732 A | 8/1973 | Boroshok |
| 3,755,558 A | 8/1973 | Scribner |
| 3,768,725 A | 10/1973 | Pilaro |
| 3,795,527 A | 3/1974 | Stone et al. |
| 3,797,494 A | 3/1974 | Zaffroni |
| 3,809,220 A | 5/1974 | Arcudi |
| 3,809,714 A | 5/1974 | Hussain |
| 3,814,095 A | 6/1974 | Lubens |
| 3,825,014 A | 7/1974 | Wroten |
| 3,835,995 A | 9/1974 | Haines |
| 3,840,657 A | 10/1974 | Norfleet |
| 3,892,905 A | 7/1975 | Albert |
| 3,911,099 A | 10/1975 | DeFoney et al. |
| 3,933,245 A | 1/1976 | Mullen |
| 3,972,995 A | 8/1976 | Tsuk et al. |
| 3,979,839 A | 9/1976 | Blanie |
| 3,996,934 A | 12/1976 | Zaffaroni |
| 3,998,215 A | 12/1976 | Anderson et al. |
| 4,015,023 A | 3/1977 | Lamberti et al. |
| 4,022,924 A | 5/1977 | Mitchell et al. |
| 4,029,757 A | 6/1977 | Mlodozeniec et al. |
| 4,029,758 A | 6/1977 | Mlodozeniec et al. |

(Continued)

FOREIGN PATENT DOCUMENTS

| | | |
|---|---|---|
| AU | 741362 B2 | 11/2001 |
| CA | 2274910 A1 | 6/1998 |

(Continued)

OTHER PUBLICATIONS

Remington, The Science and Practice of Pharmacy, Nineteenth Edition—1995, pp. 710-712.*

(Continued)

*Primary Examiner* — Shobha Kantamneni
(74) *Attorney, Agent, or Firm* — Honigman LLP

(57) ABSTRACT

A method of administering diazepam having a food effect is described.

17 Claims, 12 Drawing Sheets

(56) References Cited

U.S. PATENT DOCUMENTS

| | | |
|---|---|---|
| 4,031,200 A | 6/1977 | Reif |
| 4,049,848 A | 9/1977 | Goodale et al. |
| 4,053,046 A | 10/1977 | Roark |
| 4,067,116 A | 1/1978 | Bryner et al. |
| 4,105,116 A | 8/1978 | Jones et al. |
| 4,123,592 A | 10/1978 | Rainer et al. |
| 4,126,503 A | 11/1978 | Gardner |
| 4,128,445 A | 12/1978 | Sturzenegger et al. |
| 4,136,145 A | 1/1979 | Fuchs et al. |
| 4,136,162 A | 1/1979 | Fuchs et al. |
| 4,139,627 A | 2/1979 | Lane et al. |
| 4,145,441 A | 3/1979 | Bodor |
| 4,202,966 A | 5/1980 | Misaki et al. |
| 4,226,848 A | 10/1980 | Nagai et al. |
| 4,249,531 A | 2/1981 | Heller et al. |
| 4,251,400 A | 2/1981 | Columbus |
| 4,251,561 A | 2/1981 | Gajewski |
| 4,284,194 A | 8/1981 | Flatau |
| 4,284,534 A | 8/1981 | Ehrlich |
| 4,292,299 A | 9/1981 | Suzuki et al. |
| 4,294,820 A | 10/1981 | Keith et al. |
| 4,302,465 A | 11/1981 | AF Ekenstam et al. |
| 4,307,075 A | 12/1981 | Martin |
| 4,307,117 A | 12/1981 | Leshik |
| 4,325,855 A | 4/1982 | Dickmann et al. |
| 4,341,563 A | 7/1982 | Kurihara et al. |
| 4,365,423 A | 12/1982 | Arter et al. |
| 4,373,036 A | 2/1983 | Chang et al. |
| 4,390,450 A | 6/1983 | Gibson et al. |
| 4,406,708 A | 9/1983 | Hesselgren |
| 4,432,975 A | 2/1984 | Libby |
| 4,438,258 A | 3/1984 | Graham |
| 4,451,260 A | 5/1984 | Mitra |
| 4,460,532 A | 7/1984 | Cornell |
| 4,460,562 A | 7/1984 | Keith et al. |
| 4,466,973 A | 8/1984 | Rennie |
| 4,478,658 A | 10/1984 | Wittwer |
| 4,483,846 A | 11/1984 | Koide et al. |
| 4,503,070 A | 3/1985 | Eby, III |
| 4,511,592 A | 4/1985 | Percel et al. |
| 4,515,162 A | 5/1985 | Yamamoto et al. |
| 4,517,173 A | 5/1985 | Kizawa et al. |
| 4,529,301 A | 7/1985 | Rountree |
| 4,529,601 A | 7/1985 | Broberg et al. |
| 4,529,748 A | 7/1985 | Wienecke |
| 4,562,020 A | 12/1985 | Hijiya et al. |
| 4,568,535 A | 2/1986 | Loesche |
| 4,569,837 A | 2/1986 | Suzuki et al. |
| 4,572,832 A | 2/1986 | Kigasawa et al. |
| 4,582,835 A | 4/1986 | Lewis et al. |
| 4,585,452 A | 4/1986 | Sablotsky |
| 4,588,592 A | 5/1986 | Elias |
| 4,593,053 A | 6/1986 | Jevne et al. |
| 4,598,089 A | 7/1986 | Hadvary et al. |
| 4,608,249 A | 8/1986 | Otsuka et al. |
| 4,613,497 A | 9/1986 | Chavkin |
| 4,615,697 A | 10/1986 | Robinson |
| 4,619,701 A | 10/1986 | Angrick et al. |
| 4,621,482 A | 11/1986 | Crevasse et al. |
| 4,623,394 A | 11/1986 | Nakamura et al. |
| 4,631,837 A | 12/1986 | Magoon |
| 4,639,367 A | 1/1987 | Mackles |
| 4,648,509 A | 3/1987 | Alves |
| 4,659,714 A | 4/1987 | Watt-Smith |
| 4,661,359 A | 4/1987 | Seaborne et al. |
| 4,675,009 A | 6/1987 | Hymes et al. |
| 4,695,465 A | 9/1987 | Kigasawa et al. |
| 4,704,119 A | 11/1987 | Shaw et al. |
| 4,705,174 A | 11/1987 | Goglio |
| 4,712,460 A | 12/1987 | Allen et al. |
| 4,713,239 A | 12/1987 | Babaian et al. |
| 4,713,243 A | 12/1987 | Schiraldi et al. |
| 4,713,251 A | 12/1987 | Seighman |
| 4,716,802 A | 1/1988 | O'Connor et al. |
| 4,722,761 A | 2/1988 | Cartmell et al. |
| 4,727,064 A | 2/1988 | Pitha |
| 4,740,365 A | 4/1988 | Yukimatsu et al. |
| 4,748,022 A | 5/1988 | Busciglio |
| 4,752,465 A | 6/1988 | Mackles |
| 4,762,230 A | 8/1988 | Croce |
| 4,764,378 A | 8/1988 | Keith et al. |
| 4,765,983 A | 8/1988 | Takayanagi et al. |
| 4,772,470 A | 9/1988 | Inoue et al. |
| 4,777,046 A | 10/1988 | Iwakura et al. |
| 4,780,309 A | 10/1988 | Geria et al. |
| 4,781,294 A | 11/1988 | Croce |
| 4,787,517 A | 11/1988 | Martin |
| 4,789,667 A | 12/1988 | Makino et al. |
| 4,802,924 A | 2/1989 | Woznicki et al. |
| 4,828,841 A | 5/1989 | Porter et al. |
| 4,849,246 A | 7/1989 | Schmidt |
| 4,851,394 A | 7/1989 | Kubodera |
| 4,860,754 A | 8/1989 | Sharik et al. |
| 4,861,632 A | 8/1989 | Caggiano |
| RE33,093 E | 10/1989 | Schiraldi et al. |
| 4,872,270 A | 10/1989 | Fronheiser et al. |
| 4,876,092 A | 10/1989 | Mizobuchi et al. |
| 4,876,970 A | 10/1989 | Bolduc |
| 4,880,416 A | 11/1989 | Horiuchi et al. |
| 4,888,354 A | 12/1989 | Chang et al. |
| 4,894,232 A | 1/1990 | Reul et al. |
| 4,900,552 A | 2/1990 | Sanvordeker et al. |
| 4,900,554 A | 2/1990 | Yangibashi et al. |
| 4,900,556 A | 2/1990 | Wheatley et al. |
| 4,910,247 A | 3/1990 | Haidar et al. |
| 4,915,950 A | 4/1990 | Miranda et al. |
| 4,925,670 A | 5/1990 | Schmidt |
| 4,927,634 A | 5/1990 | Sorrentino et al. |
| 4,927,636 A | 5/1990 | Hijiya et al. |
| 4,929,447 A | 5/1990 | Yang |
| 4,937,078 A | 6/1990 | Mezei et al. |
| 4,940,587 A | 7/1990 | Jenkins et al. |
| 4,948,580 A | 8/1990 | Browning |
| 4,958,580 A | 9/1990 | Asaba et al. |
| 4,978,531 A | 12/1990 | Yamazaki et al. |
| 4,980,169 A | 12/1990 | Oppenheimer et al. |
| 4,981,693 A | 1/1991 | Higashi et al. |
| 4,981,875 A | 1/1991 | Leusner et al. |
| 4,993,586 A | 2/1991 | Taulbee et al. |
| 5,023,082 A | 6/1991 | Friedman et al. |
| 5,023,271 A | 6/1991 | Vigne et al. |
| 5,024,701 A | 6/1991 | Desmarais |
| 5,025,692 A | 6/1991 | Reynolds |
| 5,028,632 A | 7/1991 | Fuisz |
| 5,044,241 A | 9/1991 | Labrecque |
| 5,044,761 A | 9/1991 | Yuhki et al. |
| 5,045,445 A | 9/1991 | Schultz |
| 5,047,244 A | 9/1991 | Sanvordeker et al. |
| 5,049,322 A | 9/1991 | Devissaguet et al. |
| 5,056,584 A | 10/1991 | Seaton |
| 5,064,717 A | 11/1991 | Suzuki et al. |
| 5,072,842 A | 12/1991 | White |
| 5,078,734 A | 1/1992 | Noble |
| 5,089,307 A | 2/1992 | Ninomiya et al. |
| 5,100,591 A | 3/1992 | Leclef et al. |
| 5,107,734 A | 4/1992 | Armbruster |
| 5,116,140 A | 5/1992 | Hirashima |
| 5,118,508 A | 6/1992 | Kikuchi et al. |
| 5,126,160 A | 6/1992 | Giddey et al. |
| 5,137,729 A | 8/1992 | Kuroya et al. |
| 5,158,825 A | 10/1992 | Altwirth |
| 5,166,233 A | 11/1992 | Kuroya et al. |
| 5,176,705 A | 1/1993 | Noble |
| 5,184,771 A | 2/1993 | Jud et al. |
| 5,186,938 A | 2/1993 | Sablotsky et al. |
| 5,188,838 A | 2/1993 | Deleuil et al. |
| 5,196,436 A | 3/1993 | Smith |
| 5,229,164 A | 7/1993 | Pins et al. |
| 5,230,441 A | 7/1993 | Kaufman et al. |
| 5,234,957 A | 8/1993 | Mantelle |
| 5,264,024 A | 11/1993 | Bosvot et al. |
| 5,271,940 A | 12/1993 | Cleary et al. |
| 5,272,191 A | 12/1993 | Ibrahim et al. |
| 5,273,758 A | 12/1993 | Royce |

(56) References Cited

U.S. PATENT DOCUMENTS

| | | |
|---|---|---|
| 5,293,699 A | 3/1994 | Faust et al. |
| 5,316,717 A | 5/1994 | Koepff et al. |
| 5,325,968 A | 7/1994 | Sowden |
| 5,328,942 A | 7/1994 | Akhtar et al. |
| 5,344,676 A | 9/1994 | Kim et al. |
| 5,346,701 A | 9/1994 | Heiber et al. |
| 5,354,551 A | 10/1994 | Schmidt |
| 5,360,629 A | 11/1994 | Milbourn et al. |
| 5,369,131 A | 11/1994 | Poli et al. |
| 5,375,930 A | 12/1994 | Tani |
| 5,380,529 A | 1/1995 | Heusser et al. |
| 5,393,528 A | 2/1995 | Staab |
| 5,405,637 A | 4/1995 | Martinez et al. |
| 5,407,278 A | 4/1995 | Beer |
| 5,411,945 A | 5/1995 | Ozaki et al. |
| 5,413,792 A | 5/1995 | Ninomiya et al. |
| 5,422,127 A | 6/1995 | Dube et al. |
| 5,423,423 A | 6/1995 | Sato et al. |
| 5,433,960 A | 7/1995 | Meyers |
| 5,451,419 A | 9/1995 | Schwab et al. |
| 5,455,043 A | 10/1995 | Fischel-Ghodsian |
| 5,458,884 A | 10/1995 | Britton et al. |
| 5,462,749 A | 10/1995 | Rencher |
| 5,472,704 A | 12/1995 | Santus et al. |
| 5,479,408 A | 12/1995 | Will |
| 5,489,436 A | 2/1996 | Hoy et al. |
| 5,506,046 A | 4/1996 | Andersen et al. |
| 5,506,049 A | 4/1996 | Swei et al. |
| 5,518,902 A | 5/1996 | Ozaki et al. |
| 5,529,782 A | 6/1996 | Staab |
| 5,530,861 A | 6/1996 | Diamant et al. |
| 5,550,178 A | 8/1996 | Desai et al. |
| 5,551,033 A | 8/1996 | Foster et al. |
| 5,552,152 A | 9/1996 | Shen |
| 5,553,835 A | 9/1996 | Dresie et al. |
| 5,560,538 A | 10/1996 | Sato et al. |
| 5,567,237 A | 10/1996 | Kapp-Schwoerer et al. |
| 5,567,431 A | 10/1996 | Vert et al. |
| 5,573,783 A | 11/1996 | Desieno et al. |
| 5,582,342 A | 12/1996 | Jud |
| 5,587,175 A | 12/1996 | Viegas et al. |
| 5,588,009 A | 12/1996 | Will |
| 5,589,357 A | 12/1996 | Martinez et al. |
| 5,593,697 A | 1/1997 | Barr et al. |
| 5,595,980 A | 1/1997 | Brode et al. |
| 5,601,605 A | 2/1997 | Crowe et al. |
| 5,605,696 A | 2/1997 | Eury et al. |
| 5,605,698 A | 2/1997 | Ueno |
| 5,613,779 A | 3/1997 | Niwa |
| 5,614,212 A | 3/1997 | D'Angelo et al. |
| 5,620,757 A | 4/1997 | Ninomiya et al. |
| 5,629,003 A | 5/1997 | Horstmann et al. |
| 5,629,021 A | 5/1997 | Wright |
| 5,633,006 A | 5/1997 | Catania et al. |
| 5,641,093 A | 6/1997 | Dolin et al. |
| 5,641,536 A | 6/1997 | Lech et al. |
| D380,836 S | 7/1997 | Fitzpatrick et al. |
| 5,647,431 A | 7/1997 | Takeshita et al. |
| 5,653,993 A | 8/1997 | Ghanta et al. |
| 5,656,296 A | 8/1997 | Khan et al. |
| 5,656,297 A | 8/1997 | Bernstein et al. |
| 5,670,168 A | 9/1997 | Baichwal et al. |
| 5,679,145 A | 10/1997 | Andersen et al. |
| 5,681,873 A | 10/1997 | Norton et al. |
| 5,689,550 A | 11/1997 | Garson et al. |
| 5,698,181 A | 12/1997 | Luo |
| 5,698,217 A | 12/1997 | Wilking |
| 5,700,478 A | 12/1997 | Biegajski et al. |
| 5,700,479 A | 12/1997 | Lundgren |
| 5,725,648 A | 3/1998 | Brown et al. |
| 5,733,575 A | 3/1998 | Mehra et al. |
| 5,738,211 A | 4/1998 | Ichino et al. |
| 5,742,905 A | 4/1998 | Pepe et al. |
| 5,750,145 A | 5/1998 | Patell |
| 5,750,157 A | 5/1998 | Grosswald et al. |
| 5,750,585 A | 5/1998 | Park et al. |
| 5,759,599 A | 6/1998 | Wampler et al. |
| 5,761,525 A | 6/1998 | Williams |
| 5,764,639 A | 6/1998 | Staples et al. |
| 5,764,899 A | 6/1998 | Eggleston et al. |
| 5,765,004 A | 6/1998 | Foster et al. |
| 5,766,332 A | 6/1998 | Graves et al. |
| 5,766,525 A | 6/1998 | Andersen et al. |
| 5,766,620 A | 6/1998 | Heiber et al. |
| 5,766,839 A | 6/1998 | Johnson et al. |
| 5,771,353 A | 6/1998 | Eggleston et al. |
| 5,785,180 A | 7/1998 | Dressel et al. |
| 5,792,494 A | 8/1998 | Kanca et al. |
| 5,800,832 A | 9/1998 | Tapolsky et al. |
| 5,806,284 A | 9/1998 | Gifford |
| 5,815,398 A | 9/1998 | Dighe et al. |
| 5,822,526 A | 10/1998 | Waskiewicz |
| 5,830,437 A | 11/1998 | Ascione et al. |
| 5,830,884 A | 11/1998 | Kasica et al. |
| 5,846,557 A | 12/1998 | Eisenstadt et al. |
| 5,847,023 A | 12/1998 | Viegas et al. |
| 5,862,915 A | 1/1999 | Plezia et al. |
| 5,864,684 A | 1/1999 | Nielsen |
| 5,879,690 A | 3/1999 | Perricone |
| 5,881,476 A | 3/1999 | Strobush et al. |
| 5,891,461 A | 4/1999 | Jona et al. |
| 5,891,845 A | 4/1999 | Myers |
| 5,894,930 A | 4/1999 | Faughey et al. |
| 5,900,247 A | 5/1999 | Rault et al. |
| 5,906,742 A | 5/1999 | Wang et al. |
| 5,930,914 A | 8/1999 | Johansson et al. |
| 5,937,161 A | 8/1999 | Mulligan et al. |
| 5,941,393 A | 8/1999 | Wilfong, Jr. |
| 5,945,651 A | 8/1999 | Chorosinski et al. |
| 5,948,430 A | 9/1999 | Zerbe et al. |
| 5,955,097 A | 9/1999 | Tapolsky et al. |
| 5,965,154 A | 10/1999 | Haralambopoulos |
| 5,980,554 A | 11/1999 | Lenker et al. |
| 5,992,742 A | 11/1999 | Sullivan et al. |
| 5,995,597 A | 11/1999 | Woltz et al. |
| 6,004,996 A | 12/1999 | Shah et al. |
| 6,024,975 A | 2/2000 | D'Angelo et al. |
| 6,028,066 A | 2/2000 | Unger |
| 6,030,616 A | 2/2000 | Waters et al. |
| 6,031,895 A | 2/2000 | Cohn et al. |
| 6,036,016 A | 3/2000 | Arnold |
| 6,047,484 A | 4/2000 | Bolland et al. |
| 6,051,253 A | 4/2000 | Zettler et al. |
| 6,054,119 A | 4/2000 | Hurme et al. |
| 6,064,990 A | 5/2000 | Goldsmith |
| 6,072,100 A | 6/2000 | Mooney et al. |
| 6,074,097 A | 6/2000 | Hayashi et al. |
| 6,077,558 A | 6/2000 | Euber |
| 6,090,401 A | 7/2000 | Gowan, Jr. et al. |
| 6,099,871 A | 8/2000 | Martinez |
| 6,103,266 A | 8/2000 | Tapolsky et al. |
| 6,106,930 A | 8/2000 | Ludwig |
| 6,143,276 A | 11/2000 | Unger |
| 6,148,708 A | 11/2000 | Pfeiffer |
| 6,152,007 A | 11/2000 | Sato |
| 6,153,210 A | 11/2000 | Roberts et al. |
| 6,153,220 A | 11/2000 | Cumming et al. |
| 6,159,498 A | 12/2000 | Tapolsky et al. |
| 6,161,129 A | 12/2000 | Rochkind |
| 6,177,066 B1 | 1/2001 | Pataut et al. |
| 6,177,092 B1 | 1/2001 | Lentini et al. |
| 6,177,096 B1 | 1/2001 | Zerbe et al. |
| 6,183,808 B1 | 2/2001 | Grillo et al. |
| 6,197,329 B1 | 3/2001 | Hermelin et al. |
| 6,203,566 B1 | 3/2001 | Alanen et al. |
| 6,219,694 B1 | 4/2001 | Lazaridis et al. |
| 6,221,402 B1 | 4/2001 | Itoh et al. |
| 6,227,359 B1 | 5/2001 | Truluck |
| 6,230,894 B1 | 5/2001 | Danville |
| 6,231,957 B1 | 5/2001 | Zerbe et al. |
| 6,238,700 B1 | 5/2001 | Dohner et al. |
| 6,264,981 B1 | 7/2001 | Zhang et al. |
| 6,267,808 B1 | 7/2001 | Grillo et al. |
| 6,268,048 B1 | 7/2001 | Karaev et al. |

(56) References Cited

U.S. PATENT DOCUMENTS

| | | |
|---|---|---|
| 6,284,264 B1 | 9/2001 | Zerbe et al. |
| 6,287,595 B1 | 9/2001 | Loewy et al. |
| 6,294,206 B1 | 9/2001 | Barrett-Reis et al. |
| 6,311,627 B1 | 11/2001 | Draper et al. |
| 6,338,407 B2 | 1/2002 | Danville |
| 6,344,088 B1 | 2/2002 | Kamikihara et al. |
| 6,374,715 B1 | 4/2002 | Takatsuka |
| 6,375,963 B1 | 4/2002 | Repka et al. |
| 6,391,294 B1 | 5/2002 | Dettmar et al. |
| 6,394,306 B1 | 5/2002 | Pawlo et al. |
| 6,395,299 B1 | 5/2002 | Babich et al. |
| 6,413,792 B1 | 7/2002 | Sauer et al. |
| 6,419,903 B1 | 7/2002 | Xu et al. |
| 6,419,906 B1 | 7/2002 | Xu et al. |
| 6,428,825 B2 | 8/2002 | Sharma et al. |
| 6,432,460 B1 | 8/2002 | Zietlow et al. |
| 6,436,464 B1 | 8/2002 | Euber |
| 6,454,788 B1 | 9/2002 | Ashton |
| 6,467,621 B1 | 10/2002 | Ishida |
| 6,468,516 B1 | 10/2002 | Geria et al. |
| 6,472,003 B2 | 10/2002 | Barrett-Reis et al. |
| 6,482,517 B1 | 11/2002 | Anderson |
| 6,488,963 B1 | 12/2002 | McGinity et al. |
| 6,495,599 B2 | 12/2002 | Auestad et al. |
| 6,503,532 B1 | 1/2003 | Murty et al. |
| 6,509,072 B2 | 1/2003 | Bening et al. |
| 6,534,090 B2 | 3/2003 | Puthli et al. |
| 6,534,092 B2 | 3/2003 | Wright |
| 6,552,024 B1 | 4/2003 | Chen et al. |
| 6,562,375 B1 | 5/2003 | Sako et al. |
| 6,575,999 B1 | 6/2003 | Rohrig |
| 6,589,576 B2 | 7/2003 | Borschel et al. |
| 6,592,887 B2 | 7/2003 | Zerbe et al. |
| 6,596,298 B2 | 7/2003 | Leung et al. |
| 6,596,302 B2 | 7/2003 | O'Connor et al. |
| 6,599,542 B1 | 7/2003 | Abdel-Malik et al. |
| 6,610,338 B2 | 8/2003 | Tang |
| 6,620,440 B1 | 9/2003 | Hsia et al. |
| 6,655,112 B1 | 12/2003 | Cremer et al. |
| 6,656,493 B2 | 12/2003 | Dzija et al. |
| 6,660,292 B2 | 12/2003 | Zerbe et al. |
| 6,667,060 B1 | 12/2003 | Vandecruys et al. |
| 6,668,839 B2 | 12/2003 | Williams |
| 6,708,826 B1 | 3/2004 | Ginsberg et al. |
| 6,709,671 B2 | 3/2004 | Zerbe et al. |
| 6,720,006 B2 | 4/2004 | Hanke et al. |
| 6,726,054 B2 | 4/2004 | Fagen et al. |
| 6,730,319 B2 | 5/2004 | Maeder et al. |
| 6,752,824 B2 | 6/2004 | Yancy |
| 6,776,157 B2 | 8/2004 | Williams et al. |
| 6,797,283 B1 | 9/2004 | Edgren et al. |
| 6,800,329 B2 | 10/2004 | Horstmann et al. |
| 6,824,829 B2 | 11/2004 | Berry et al. |
| 6,865,860 B2 | 3/2005 | Arakawa et al. |
| 6,905,016 B2 | 6/2005 | Kanios et al. |
| 6,913,766 B1 | 7/2005 | Krumme et al. |
| 6,929,399 B2 | 8/2005 | Nokura |
| 6,929,400 B2 | 8/2005 | Razeti et al. |
| 7,005,142 B2 | 2/2006 | Leon et al. |
| 7,040,503 B2 | 5/2006 | Leichter et al. |
| 7,067,116 B1 | 6/2006 | Bess et al. |
| 7,093,736 B2 | 8/2006 | Maietta et al. |
| 7,115,507 B2 | 10/2006 | Kawase |
| 7,179,788 B2 | 2/2007 | DeFelippis et al. |
| 7,241,411 B2 | 7/2007 | Berry et al. |
| 7,357,891 B2 | 4/2008 | Yang et al. |
| 7,390,503 B1 | 6/2008 | Ahmed et al. |
| 7,425,292 B2 | 9/2008 | Yang et al. |
| 7,428,859 B2 | 9/2008 | Fujita et al. |
| 7,484,640 B2 | 2/2009 | von Falkenhausen et al. |
| 7,531,191 B2 | 5/2009 | Zion et al. |
| 7,579,019 B2 | 8/2009 | Tapolsky et al. |
| 7,591,801 B2 | 9/2009 | Brauker et al. |
| 7,665,896 B1 | 2/2010 | Higgs |
| 7,666,337 B2 | 2/2010 | Yang et al. |
| 7,694,617 B2 | 4/2010 | Habra et al. |
| 7,766,013 B2 | 8/2010 | Wensley et al. |
| 7,824,588 B2 | 11/2010 | Yang et al. |
| 7,910,031 B2 | 3/2011 | Yang et al. |
| 8,017,150 B2 | 9/2011 | Yang et al. |
| 8,051,983 B2 | 11/2011 | Simon et al. |
| 8,147,866 B2 | 4/2012 | Finn et al. |
| 8,617,589 B2 | 12/2013 | Fuisz et al. |
| 8,840,935 B2 | 9/2014 | Haber |
| 8,936,825 B2 | 1/2015 | Myers et al. |
| 9,125,836 B2 | 9/2015 | Nagaso et al. |
| 10,149,810 B2 | 12/2018 | Perusse et al. |
| 10,806,709 B2 | 10/2020 | Fleming |
| 11,021,437 B2 | 6/2021 | Almoazen |
| 11,191,737 B2 | 12/2021 | Schobel et al. |
| 11,273,131 B2 | 3/2022 | Schobel et al. |
| 2001/0006677 A1 | 7/2001 | McGinity et al. |
| 2001/0022964 A1 | 9/2001 | Leung et al. |
| 2001/0046511 A1 | 11/2001 | Zerbe et al. |
| 2002/0006677 A1 | 1/2002 | Egermeier et al. |
| 2002/0012689 A1 | 1/2002 | Stillman |
| 2002/0045582 A1 | 4/2002 | Margolin et al. |
| 2002/0098198 A1 | 7/2002 | Watts et al. |
| 2002/0104774 A1 | 8/2002 | Hammond |
| 2002/0127254 A1 | 9/2002 | Fotinos et al. |
| 2002/0131990 A1 | 9/2002 | Barkalow et al. |
| 2002/0147201 A1 | 10/2002 | Chen et al. |
| 2002/0170567 A1 | 11/2002 | Rizzotto et al. |
| 2002/0177380 A1 | 11/2002 | Forman et al. |
| 2003/0035841 A1 | 2/2003 | Dzija et al. |
| 2003/0044446 A1 | 3/2003 | Moro et al. |
| 2003/0044511 A1 | 3/2003 | Zerbe et al. |
| 2003/0054039 A1 | 3/2003 | Zyck et al. |
| 2003/0068378 A1 | 4/2003 | Chen et al. |
| 2003/0069263 A1 | 4/2003 | Breder et al. |
| 2003/0072865 A1 | 4/2003 | Bindels et al. |
| 2003/0077315 A1 | 4/2003 | Lee et al. |
| 2003/0107149 A1 | 6/2003 | Yang et al. |
| 2003/0118649 A1 | 6/2003 | Gao et al. |
| 2003/0121932 A1 | 7/2003 | Wajda |
| 2003/0124176 A1 | 7/2003 | Hsu et al. |
| 2003/0140760 A1 | 7/2003 | Bory |
| 2003/0143195 A1 | 7/2003 | Pinsker |
| 2003/0147956 A1 | 8/2003 | Shefer et al. |
| 2003/0161926 A1 | 8/2003 | Kemp et al. |
| 2003/0183643 A1 | 10/2003 | Fagen et al. |
| 2003/0224044 A1 | 12/2003 | Weibel |
| 2004/0013731 A1 | 1/2004 | Chen et al. |
| 2004/0024003 A1 | 2/2004 | Asmussen et al. |
| 2004/0044367 A1 | 3/2004 | Yancy |
| 2004/0058457 A1 | 3/2004 | Huang et al. |
| 2004/0091677 A1 | 5/2004 | Topolkaraev |
| 2004/0096569 A1 | 5/2004 | Barkalow et al. |
| 2004/0102867 A1 | 5/2004 | Palanisamy et al. |
| 2004/0111275 A1 | 6/2004 | Kroll et al. |
| 2004/0120991 A1 | 6/2004 | Gardner et al. |
| 2004/0136924 A1 | 7/2004 | Boyd et al. |
| 2004/0137458 A1 | 7/2004 | Archambault et al. |
| 2004/0156901 A1 | 8/2004 | Thakur et al. |
| 2004/0191302 A1 | 9/2004 | Davidson |
| 2004/0209057 A1 | 10/2004 | Enlow et al. |
| 2004/0219109 A1 | 11/2004 | Hatch |
| 2004/0241242 A1 | 12/2004 | Fuisz et al. |
| 2004/0265353 A1 | 12/2004 | Zhang et al. |
| 2005/0003048 A1 | 1/2005 | Pearce et al. |
| 2005/0011776 A1 | 1/2005 | Nagel |
| 2005/0019588 A1 | 1/2005 | Berry et al. |
| 2005/0035133 A1 | 2/2005 | Gerulski et al. |
| 2005/0037055 A1 | 2/2005 | Yang et al. |
| 2005/0042271 A1 | 2/2005 | Xiong et al. |
| 2005/0048102 A1 | 3/2005 | Tapolsky et al. |
| 2005/0055123 A1 | 3/2005 | Franz |
| 2005/0089548 A1 | 4/2005 | Virgalitto et al. |
| 2005/0095272 A1 | 5/2005 | Augello |
| 2005/0115862 A1 | 6/2005 | Maietta |
| 2005/0118217 A1 | 6/2005 | Barnhart et al. |
| 2005/0118271 A1 | 6/2005 | Schliecker et al. |
| 2005/0136115 A1 | 6/2005 | Kulkarni et al. |
| 2005/0147653 A1 | 7/2005 | Yasuda et al. |

(56) References Cited

U.S. PATENT DOCUMENTS

| | | |
|---|---|---|
| 2005/0147658 A1 | 7/2005 | Tapolsky et al. |
| 2005/0159700 A1 | 7/2005 | Keusch et al. |
| 2005/0163714 A1 | 7/2005 | Sukhishvili et al. |
| 2005/0170138 A1 | 8/2005 | Berry |
| 2005/0191349 A1 | 9/2005 | Boehm et al. |
| 2005/0192309 A1 | 9/2005 | Palermo et al. |
| 2005/0214251 A1 | 9/2005 | Pohl et al. |
| 2005/0222781 A1 | 10/2005 | Yue et al. |
| 2005/0232977 A1 | 10/2005 | Khan et al. |
| 2005/0239845 A1 | 10/2005 | Proehl et al. |
| 2005/0266085 A1 | 12/2005 | Warner |
| 2006/0023976 A1 | 2/2006 | Alvater et al. |
| 2006/0039958 A1 | 2/2006 | Fuisz et al. |
| 2006/0071057 A1 | 4/2006 | Aschenbrenner et al. |
| 2006/0073173 A1 | 4/2006 | Banach et al. |
| 2006/0073190 A1 | 4/2006 | Carroll et al. |
| 2006/0083786 A1 | 4/2006 | Chaudhari et al. |
| 2006/0093679 A1 | 5/2006 | Mayer et al. |
| 2006/0104910 A1 | 5/2006 | Lerner |
| 2006/0134200 A1 | 6/2006 | Vandoni et al. |
| 2006/0147493 A1 | 7/2006 | Yang et al. |
| 2006/0163269 A1 | 7/2006 | Anderson et al. |
| 2006/0180604 A1 | 8/2006 | Ginsberg et al. |
| 2006/0182796 A1 | 8/2006 | Wu et al. |
| 2006/0189772 A1 | 8/2006 | Scheibel et al. |
| 2006/0198790 A1 | 9/2006 | Dugger, III et al. |
| 2006/0198885 A1 | 9/2006 | Dharmadhikari et al. |
| 2006/0210610 A1 | 9/2006 | Davidson et al. |
| 2006/0213348 A1 | 9/2006 | Loibl |
| 2006/0215941 A1 | 9/2006 | Golbert |
| 2006/0246141 A1 | 11/2006 | Liversidge et al. |
| 2006/0264448 A1 | 11/2006 | Pryde |
| 2006/0281775 A1 | 12/2006 | Kelly, II et al. |
| 2006/0286108 A1 | 12/2006 | Bell |
| 2007/0027213 A1 | 2/2007 | Oberegger et al. |
| 2007/0045148 A1 | 3/2007 | Saclier et al. |
| 2007/0069416 A1 | 3/2007 | Yang et al. |
| 2007/0071806 A1 | 3/2007 | McCarty et al. |
| 2007/0087036 A1 | 4/2007 | Durschlag et al. |
| 2007/0098746 A1 | 5/2007 | Nichols et al. |
| 2007/0122455 A1 | 5/2007 | Myers et al. |
| 2007/0138049 A1 | 6/2007 | Bitner |
| 2007/0148097 A1 | 6/2007 | Finn et al. |
| 2007/0170196 A1 | 7/2007 | Libohova et al. |
| 2007/0202163 A1 | 8/2007 | Rawas-Qalaji |
| 2007/0205127 A1 | 9/2007 | Barndt et al. |
| 2007/0231368 A1 | 10/2007 | Wang et al. |
| 2007/0267433 A1 | 11/2007 | Fuisz et al. |
| 2007/0275893 A1 | 11/2007 | Quay |
| 2007/0281003 A1 | 12/2007 | Fuisz et al. |
| 2007/0293581 A1 | 12/2007 | Hill |
| 2007/0293582 A1 | 12/2007 | Hill |
| 2008/0044454 A1 | 2/2008 | Yang et al. |
| 2008/0073235 A1 | 3/2008 | Harada et al. |
| 2008/0075825 A1 | 3/2008 | Fuisz et al. |
| 2008/0081071 A1 | 4/2008 | Sanghvi et al. |
| 2008/0105582 A1 | 5/2008 | Ludwig et al. |
| 2008/0233174 A1 | 9/2008 | Myers et al. |
| 2008/0242558 A1 | 10/2008 | Belcher et al. |
| 2008/0242736 A1 | 10/2008 | Fuisz |
| 2008/0254105 A1 | 10/2008 | Tapolsky et al. |
| 2008/0260805 A1 | 10/2008 | Yang et al. |
| 2008/0260809 A1 | 10/2008 | Yang et al. |
| 2008/0268116 A1 | 10/2008 | Kring |
| 2008/0290106 A1 | 11/2008 | van der Klaauw et al. |
| 2008/0299197 A1 | 12/2008 | Toneguzzo et al. |
| 2008/0300173 A1 | 12/2008 | DeFrees |
| 2008/0308449 A1 | 12/2008 | Intini |
| 2009/0004254 A1 | 1/2009 | Maibach |
| 2009/0009332 A1 | 1/2009 | Nunez et al. |
| 2009/0014491 A1 | 1/2009 | Fuisz et al. |
| 2009/0029074 A1 | 1/2009 | Sasine et al. |
| 2009/0074333 A1 | 3/2009 | Griebel et al. |
| 2009/0104270 A1 | 4/2009 | Myers et al. |
| 2009/0146336 A1 | 6/2009 | Masi |
| 2009/0181075 A1 | 7/2009 | Gordon et al. |
| 2009/0186107 A1 | 7/2009 | Haber et al. |
| 2009/0192075 A1 | 7/2009 | Steiner |
| 2009/0196907 A1 | 8/2009 | Bunick et al. |
| 2009/0280160 A1 | 11/2009 | Monteith et al. |
| 2009/0297614 A1 | 12/2009 | Rademacher et al. |
| 2010/0015128 A1 | 1/2010 | Lee et al. |
| 2010/0087470 A1 | 4/2010 | Oksche et al. |
| 2010/0092545 A1 | 4/2010 | Yang et al. |
| 2010/0150986 A1 | 6/2010 | Nagaso et al. |
| 2010/0178254 A1 | 7/2010 | Hariharan et al. |
| 2010/0221309 A1 | 9/2010 | Myers et al. |
| 2010/0297232 A1 | 11/2010 | Myers et al. |
| 2011/0189259 A1 | 8/2011 | Vasisht et al. |
| 2011/0192863 A1 | 8/2011 | Barrass et al. |
| 2011/0257096 A1 | 10/2011 | Maggio |
| 2011/0262520 A1 | 10/2011 | Dormady et al. |
| 2011/0262522 A1 | 10/2011 | Finn et al. |
| 2012/0009260 A1 | 1/2012 | Schobel et al. |
| 2012/0058158 A1 | 3/2012 | Booles |
| 2013/0085105 A1 | 4/2013 | Deasy et al. |
| 2013/0267585 A1 | 10/2013 | Ljusberg-Wahren |
| 2013/0337022 A1 | 12/2013 | Pillay et al. |
| 2014/0128379 A1* | 5/2014 | Bergenhem .......... A61K 31/551 514/221 |
| 2014/0316333 A1 | 10/2014 | Kwon |
| 2015/0038540 A1 | 2/2015 | Zerbe et al. |
| 2015/0202148 A1 | 7/2015 | Cifter et al. |
| 2016/0051494 A1 | 2/2016 | Gulfo |
| 2017/0087077 A1 | 3/2017 | Perusse et al. |
| 2017/0119660 A1 | 5/2017 | Temtsin-Krayz et al. |
| 2017/0290776 A1 | 10/2017 | Schobel et al. |
| 2019/0022023 A1 | 1/2019 | Schobel et al. |
| 2022/0401456 A1* | 12/2022 | Rabinowicz ....... A61K 31/7016 |

FOREIGN PATENT DOCUMENTS

| | | |
|---|---|---|
| CA | 2317491 A1 | 7/1999 |
| CH | 639619 A5 | 11/1983 |
| CN | 1118254 A | 3/1996 |
| CN | 1777411 A | 5/2006 |
| CN | 101938991 A | 1/2011 |
| CN | 109310647 A | 2/2019 |
| DE | 2432925 A1 | 1/1976 |
| DE | 2449865 A1 | 4/1976 |
| DE | 2746414 A1 | 4/1979 |
| DE | 3630603 A1 | 3/1988 |
| DE | 19646392 A1 | 5/1998 |
| DE | 202004003781 U1 | 5/2004 |
| EP | 0014253 A2 | 8/1980 |
| EP | 0021178 A1 | 1/1981 |
| EP | 0065370 A1 | 11/1982 |
| EP | 0090560 A2 | 10/1983 |
| EP | 0095892 A1 | 12/1983 |
| EP | 0200508 A2 | 11/1986 |
| EP | 0219762 A1 | 4/1987 |
| EP | 0232877 A2 | 8/1987 |
| EP | 0241178 A1 | 10/1987 |
| EP | 0248548 A2 | 12/1987 |
| EP | 0250187 A2 | 12/1987 |
| EP | 0259749 A1 | 3/1988 |
| EP | 0273069 A1 | 7/1988 |
| EP | 0274431 A2 | 7/1988 |
| EP | 0285568 A2 | 10/1988 |
| EP | 0381194 A2 | 8/1990 |
| EP | 0440462 A1 | 8/1991 |
| EP | 0450141 A1 | 10/1991 |
| EP | 0452446 A1 | 10/1991 |
| EP | 0460588 A1 | 12/1991 |
| EP | 0514691 A2 | 11/1992 |
| EP | 0598606 A1 | 5/1994 |
| EP | 0636364 A1 | 2/1995 |
| EP | 0791575 A | 8/1997 |
| EP | 0949925 A2 | 10/1999 |
| EP | 1110546 A1 | 6/2001 |
| EP | 1143940 A2 | 10/2001 |
| EP | 1177788 A2 | 2/2002 |
| EP | 1219291 A1 | 7/2002 |
| EP | 1243523 A1 | 9/2002 |

(56) References Cited

FOREIGN PATENT DOCUMENTS

| | | |
|---|---|---|
| EP | 1267829 A1 | 1/2003 |
| EP | 1504765 A1 | 2/2005 |
| EP | 1591106 A1 | 11/2005 |
| EP | 1674078 A2 | 6/2006 |
| EP | 1852041 A2 | 11/2007 |
| EP | 1897543 A1 | 3/2008 |
| EP | 2105389 A1 | 9/2009 |
| EP | 2253224 A1 | 11/2010 |
| EP | 2305310 A1 | 4/2011 |
| EP | 2457581 A1 | 5/2012 |
| FR | 2716098 A1 | 8/1995 |
| GB | 1061557 A | 3/1967 |
| GB | 1154317 A | 6/1969 |
| GB | 1510999 A | 5/1978 |
| GB | 2166651 A | 5/1986 |
| GB | 2193891 A | 2/1988 |
| GB | 2447016 A | 9/2008 |
| JP | 56100714 | 8/1981 |
| JP | 62126950 | 6/1987 |
| JP | 2265444 | 10/1990 |
| JP | 9105540 A1 | 5/1991 |
| JP | 473268 | 3/1992 |
| JP | 2000159658 A | 6/2000 |
| JP | 2001048196 A | 2/2001 |
| JP | 2001225851 A | 8/2001 |
| JP | 2001279100 A | 10/2001 |
| JP | 2003312688 A | 11/2003 |
| JP | 2004043450 A | 2/2004 |
| JP | 2004-131495 A | 4/2004 |
| JP | 2004222663 A | 8/2004 |
| JP | 2006-507277 A | 3/2006 |
| JP | 2006-509761 A | 3/2006 |
| JP | 2006143335 A | 6/2006 |
| JP | 2006-525370 A | 11/2006 |
| JP | 2008011194 A | 1/2008 |
| JP | 2008501019 A | 1/2008 |
| JP | 2012524771 A | 10/2012 |
| JP | 5147140 B2 | 2/2013 |
| JP | 2009084177 A | 3/2014 |
| JP | 2014532482 A | 12/2014 |
| JP | 2015-521996 A | 8/2015 |
| JP | 2015533155 A | 11/2015 |
| JP | 2013-530193 A | 10/2016 |
| JP | 2019519487 A | 7/2019 |
| JP | 2019519488 A | 7/2019 |
| KR | 2014-0084176 A | 7/2014 |
| WO | 1988007103 A1 | 9/1988 |
| WO | 1992012704 A1 | 8/1992 |
| WO | 9215289 A1 | 9/1992 |
| WO | 9505416 A2 | 2/1995 |
| WO | 9518046 A1 | 7/1995 |
| WO | 1995023596 A1 | 9/1995 |
| WO | 9530601 A1 | 11/1995 |
| WO | 9615903 A1 | 5/1996 |
| WO | 9625150 A1 | 8/1996 |
| WO | 1996025638 A1 | 8/1996 |
| WO | 9731621 A1 | 9/1997 |
| WO | 9732573 A1 | 9/1997 |
| WO | 1997044016 A1 | 11/1997 |
| WO | 9810993 A1 | 3/1998 |
| WO | 9817251 A1 | 4/1998 |
| WO | 1998014179 A1 | 4/1998 |
| WO | 9935051 A1 | 7/1999 |
| WO | 9955312 A2 | 11/1999 |
| WO | 200002536 A1 | 1/2000 |
| WO | 2000002955 A1 | 1/2000 |
| WO | 0018365 A2 | 4/2000 |
| WO | 0024647 A1 | 5/2000 |
| WO | 2000027618 A1 | 5/2000 |
| WO | 0042992 A2 | 7/2000 |
| WO | 2000057858 A1 | 10/2000 |
| WO | 2001003917 A2 | 1/2001 |
| WO | 0130288 A1 | 5/2001 |
| WO | 2001034121 A2 | 5/2001 |
| WO | 0143728 A1 | 6/2001 |
| WO | 0156904 A1 | 8/2001 |
| WO | 0168452 A1 | 9/2001 |
| WO | 0170194 A1 | 9/2001 |
| WO | 0170197 A2 | 9/2001 |
| WO | 0191721 A2 | 12/2001 |
| WO | 0205789 A2 | 1/2002 |
| WO | 0207711 A1 | 1/2002 |
| WO | 2002005820 A1 | 1/2002 |
| WO | 0243657 A2 | 6/2002 |
| WO | 02062315 A1 | 8/2002 |
| WO | 2002064148 A2 | 8/2002 |
| WO | 02074238 A2 | 9/2002 |
| WO | 02091965 A1 | 11/2002 |
| WO | 03011259 A1 | 2/2003 |
| WO | 03015749 A1 | 2/2003 |
| WO | 03030881 A1 | 4/2003 |
| WO | 3030882 | 4/2003 |
| WO | 03030882 A1 | 4/2003 |
| WO | 03030883 A1 | 4/2003 |
| WO | 03043659 A1 | 5/2003 |
| WO | 2003101357 A1 | 12/2003 |
| WO | 2004009445 A2 | 1/2004 |
| WO | 2004026313 A1 | 4/2004 |
| WO | 2004035407 A1 | 4/2004 |
| WO | 2004/037222 A2 | 5/2004 |
| WO | 2004043165 A1 | 5/2004 |
| WO | 2004045305 A2 | 6/2004 |
| WO | 2004045537 A2 | 6/2004 |
| WO | 2004047815 A1 | 6/2004 |
| WO | 2004052335 A1 | 6/2004 |
| WO | 2004060298 A2 | 7/2004 |
| WO | 2004087084 A1 | 10/2004 |
| WO | 2004098567 A2 | 11/2004 |
| WO | 2004113193 A1 | 12/2004 |
| WO | 2005020933 A2 | 3/2005 |
| WO | 2005035776 A2 | 4/2005 |
| WO | 2005039499 A2 | 5/2005 |
| WO | 2005074867 A1 | 8/2005 |
| WO | 2005102287 A2 | 11/2005 |
| WO | 2005102863 A1 | 11/2005 |
| WO | 2005117905 A2 | 12/2005 |
| WO | 2005123074 A1 | 12/2005 |
| WO | 2006004480 A1 | 1/2006 |
| WO | 2006017462 A2 | 2/2006 |
| WO | 2006031209 A1 | 3/2006 |
| WO | 2006037425 A1 | 4/2006 |
| WO | 2006037979 A2 | 4/2006 |
| WO | 2006039264 A1 | 4/2006 |
| WO | 2006085210 A1 | 8/2006 |
| WO | 2006133948 A2 | 12/2006 |
| WO | 2007015105 A2 | 2/2007 |
| WO | 2007067494 A1 | 6/2007 |
| WO | 2007070632 A2 | 6/2007 |
| WO | 2008011194 A2 | 1/2008 |
| WO | 2008025791 A1 | 3/2008 |
| WO | 2008036299 A2 | 3/2008 |
| WO | 2008040534 A2 | 4/2008 |
| WO | 2009027625 A2 | 3/2009 |
| WO | 2009044118 A2 | 4/2009 |
| WO | 2009052421 A1 | 4/2009 |
| WO | 2009105540 A1 | 8/2009 |
| WO | 2008149440 A1 | 8/2010 |
| WO | 2010122355 A1 | 10/2010 |
| WO | 2012/003968 A1 | 1/2012 |
| WO | 2011/010732 A1 | 1/2013 |
| WO | 2013063614 A1 | 5/2013 |
| WO | 2014006202 A1 | 1/2014 |
| WO | 2014057351 A1 | 4/2014 |
| WO | 2015078893 A1 | 6/2015 |
| WO | 2017023977 A1 | 2/2017 |
| WO | 2017192921 A1 | 11/2017 |
| WO | 2017192923 A1 | 11/2017 |
| WO | 2018089570 A1 | 5/2018 |

(56) References Cited

FOREIGN PATENT DOCUMENTS

| | | |
|---|---|---|
| WO | 2019067667 A1 | 4/2019 |
| WO | 2019067670 A1 | 4/2019 |

OTHER PUBLICATIONS

Transaction History for Inter Partes Reexamination Control No. 95/001,753, current as of Aug. 29, 2017.
Transaction History for Inter Partes Reexamination Control No. 95/002, 171, current as of Aug. 29, 2017.
Transaction History for Ex Parte Reexamination Control No. 90/012,097, current as of Aug. 29, 2017.
Transaction History for Ex Parte Reexamination Control No. 90/012,098, current as of.
Mixing in the Process Industries (2nd Ed.) Harby, N. et al. (eds.)), pp. 3, 115 (Butterworth Heinemann 1997).
Nisreen Hassan, Abdul Ahad, Mushir Ali and Javed Ali, "Chemical permeation enhancers for transbuccal drug delivery", Expert Opinion Drug Delivery, 2010, 7(1), 97-112. (Year: 2010).
U.S. Pat. No. 7,357,891, U.S. Appl. No. 90/012,098, Ex Parte Reexamination.
U.S. Pat. No. 7,357,891, IPR2013-00316, Inter Partes Review.
U.S. Pat. No. 7,425,292, U.S. Appl. No. 90/012,097, Ex Parte Reexamination.
U.S. Pat. No. 7,425,292, IPR2013-00315, Inter Partes Review.
U.S. Pat. No. 7,666,337, U.S. Appl. No. 95/002,171, Inter Partes Reexamination.
U.S. Pat. No. 7,824,588, U.S. Appl. No. 95/001,753, Inter Partes Reexamination.
U.S. Pat. No. 7,897,080, U.S. Appl. No. 95/002,170, Inter Partes Reexamination.
U.S. Pat. No. 8,017,150, IPR2016-00282, Inter Partes Review.
U.S. Pat. No. 8,603,514, IPR2016-00281, Inter Partes Review.
U.S. Pat. No. 8,652,378, IPR2014-00794, Inter Partes Review.
U.S. Pat. No. 8,765,167, IPR2015-00165, Inter Partes Review.
U.S. Pat. No. 8,765,167, IPR2015-00167, Inter Partes Review.
U.S. Pat. No. 8,765,167, IPR2015-00168, Inter Partes Review.
U.S. Pat. No. 8,765,167, IPR2015-00169, Inter Partes Review.
U.S. Pat. No. 8,603,514, IPR2016-01111, Inter Partes Review.
U.S. Pat. No. 8,017,150, IPR2016-01112, Inter Partes Review.
U.S. Pat. No. 8,603,514, IPR2017-00200, Inter Partes Review.
U.S. Pat. No. 8,603,514, IPR2017-01557, Inter Partes Review.
U.S. Pat. No. 8,603,514, IPR2017-01582, Inter Partes Review.
Transaction History for Inter Partes Reexamination Control No. 95/002,170, current as of Aug. 29, 2017.
Office action mailed in European Patent Application No. 17723617.3 dated Mar. 3, 2020.
Streubel et al., "Bimodal drug release achieved with multi-layer matrix tablets: transport mechanisms and device design", Journal of Controlled Release, Elsevier, Amsterdam, NL. vol. 69, No. 3, Dec. 3, 2000 (Dec. 3, 2000).
International Search Report and Written Opinion dated Mar. 1, 2021 in International Application No. PCT/US2020/060464.
International Search Report and Written Opinion dated Feb. 9, 2021 in International Application No. PCT/US2020/058357.
International Search Report and Written Opinion dated Jul. 17, 2017 in International Application No. PCT/US2017/031167.
International Search Report and Written Opinion dated Jul. 10, 2017 in International Application No. PCT/US2017/031170.
Restriction Requirement dated Oct. 7, 2019 in U.S. Appl. No. 15/724,234.
Non-Final Rejection dated Mar. 13, 2020 in U.S. Appl. No. 15/724,234.
Final Rejection dated Aug. 17, 2020 in U.S. Appl. No. 15/724,234.
Restriction Requirement dated Jun. 18, 2021 in U.S. Appl. No. 15/724,234.
Office Action dated Jun. 1, 2021 in Brazilian Patent Application No. 112018072467-0.
English Translation of OA issued on Aug. 16, 2022 in BR Application No. BR112020005948-0.
English Translation of OA issued on Aug. 16, 2022 in BR Application No. BR112020005967-6.
English Translation of Official Hearing issued on Jul. 15, 2022 in IN Application No. 202017016904.
Restriction Requirement issued on Sep. 29, 2022 in U.S. Appl. No. 17/086,409.
English Translation of OA issued on Oct. 28, 2022 in JP Application No. 2020-517419.
English Translation of OA issued on Oct. 28, 2022 in JP Application No. 2020-517586.
Non-Final Rejection issued on Oct. 28, 2022 in U.S. Appl. No. 15/791,249.
English Translation of Official Notification issued on Sep. 28, 2022 in IL Application No. 273485.
English Translation of Official Notification issued on Sep. 28, 2022 in IL Application No. 292487.
English Translation of OA issued on Nov. 1, 2022 in JP Application No. 2020-538776.
Final Rejection issued on Nov. 17, 2022 in U.S. Appl. No. 16/143,821.
Final Rejection issued on Nov. 18, 2022 in U.S. Appl. No. 16/143,678.
English Translation of Official Notification issued on Oct. 27, 2022 in IL Application No. 273479.
International Search Report and Written Opinion for PCT/US2018/052927, dated Dec. 19, 2018.
Ho, N.F.H., et al., "(D) Routes of delivery: Case studies," Advanced Drug Delivery Reviews, vol. 8, No. 2-3 (Mar. 1, 1992) pp. 197-236.
Merkle, H.P., et al., "Buccal delivery for peptide drugs," Journal of Controlled Release, vol. 21 No. 1-3 (1992).
Wolany, Gregor, "Zur bukkalen Applikation und Absorption des Oktapeptids Octreotid," (Jan. 1, 1990).
International Search Report and Written Opinion for PCT/US2018/053042, dated Dec. 11, 2018.
International Search Report and Written Opinion for PCT/US2018/053026, dated Dec. 14, 2018.
Hassan et al., "Chemical permeation enhancers for transbuccal drug delivery," Expert Opinion Drug Delivery, 2010, 7(1), 97-112. (Year:2010).
Office Action mailed in European Patent Application No. 17723616.3 dated Mar. 3, 2020.
Office Action mailed in European Patent Application No. 17723617.1 dated Mar. 3, 2020.
Nicolazzo et al. "Modification of buccal drug delivery following pretreatment with skin penetration enhancers," Journal of Pharmaceutical Sciences, vol. 93, Issue 8, 2004, pp. 2054-2063.
Stanczak et al., "Prodrugs and Soft Drugs", Pharmacological Reports, 2006, 58, 599-613.
Nicolazzo et al. "Assessment of the Effect of Sodium Dodecly Sulfate on the Buccal Permeability of Caffeine and Estradiol", Journal of Phamaceutical Sciences, col. 93, No. 2 Feb. 2004, 431-440.
Sudhakar et al. "Buccal bioadhesive drug delivery—A promising option for orally less effecient drugs", Journal of Controlled Release 114 (2006) 15-40.
Van Ginkel, C.G. (1995). "Biodegradability of cationic surfactants." In: Karsa D.R., Porter M.R. (eds) Biodegrability of Surfactants, Springer, Dordrecht; pp. 1-21 (Year: 1995).
Lu et al. (Jan. 12, 2017). "Impact of Endogenous Bile Salts on the Thermodynamics of Supersaturated Active Pharmaceutical Ingredient Solutions." Cryst. Growth Des., 17, pp. 1264-1275 (Year: 2017).
Rogawski et al., "Diazempam buccal film for the treatment of acute seizures". Epilepsy and Behavior, Academic Press, San Diego, Ca, US Vo. 101. Nov. 5, 2019.
Health Syneos: "A Randomized, Open-Label, 2-Sequence, 3 Treatment, Crossover Study to Evaluate the Pharmacokinetics of Single Doses of Diazepam Buccal Film (DBF) (Aquestive Therapeutics) Compated With Diastat Rectal Gel (Valeant Pharmaceuticals North America) in Aduly Male and Femal Subjects on Concomitant Reg", May 25, 2019 (May 24, 2019).
Streubel et al., "Bimodal drug release achieved with multi-layer matrix tablets: transport mechanisms and device design", Journal of Controlled Release, Elsevier, Amsterdam, NL. bol. 69, No. 3, Dec. 3, 2000 (Dec. 3, 2000).

(56) References Cited

OTHER PUBLICATIONS

Menezes, et al. "Hypotensive activity of terpenes found in essential oils." Zeitschrift für Naturforschung. C, Journal of biosciences vol. 65,9-10 (2010): 562-6.
Tsai, Tung-Hu et al. "Vasorelaxing alkaloids and flavonoids from Cassytha filiformis." Journal of natural products vol. 71,2 (2008): 289-91.
Luna-Vázquez, Francisco J et al. "Vasodilator compounds derived from plants and their mechanisms of action." Molecules (Basel, Switzerland) vol. 18,5 5814-57. May 17, 2013.
Park, Soo-Hyun et al. "The analgesic effects and mechanisms of orally administered eugenol." Archives of pharmacal research vol. 34,3 (2011): 501-7.
Chang, Huang-Kuang et al. "Stimulatory effect of cinnamic acid analogues on alpha1A-adrenoceptors in-vitro." The Journal of pharmacy and pharmacology vol. 55,6 (2003): 833-7.
Lahlou, Saad et al. "Cardiovascular effects of eugenol, a phenolic compound present in many plant essential oils, in normotensive rats." Journal of cardiovascular pharmacology vol. 43,2 (2004): 250-7.
Feddersen, C O et al. "Arachidonic acid causes cyclooxygenase-dependent and -independent pulmonary vasodilation." Journal of applied physiology (Bethesda, Md.: 1985) vol. 68,5 (1990): 1799-808.
Aqil, Mohammed et al. "Status of terpenes as skin penetration enhancers." Drug discovery today vol. 12,23-24 (2007): 1061-7.
Alayoubi et al., "Development of a fast dissolving film of epinephrine hydrocholoride as a potential anaphylactic treatment for pediatrics", Journal of Pharmaceutical Development and Technology, vol. 22:8, Jan. 6, 2016, pp. 1012-1016. <https://doi.org/10.3109/10837450.2015.1131715>.
English Translation of Examination Report issued on Dec. 12, 2022 in IL Application No. 273477.
Restriction Requirement issued on Jan. 20, 2023 in U.S. Appl. No. 17/973,345.
English Translation of Office Action issued on Dec. 20, 2022 in CN Application 201880063175.3.
English Translation of Office Action issued on Dec. 22, 2022 in CN Application 201880062678.9.
Office Action dated Mar. 4, 2021 in European Application No. 17723616.3.
First Examination Report dated Jul. 24, 2020 in Indian Application No. 201817045308.
Non-Final Rejection dated Aug. 27, 2018 in U.S. Appl. No. 15/791,249.
Final Rejection dated Jun. 19, 2019 in U.S. Appl. No. 15/791,249.
Advisory Action dated Oct. 21, 2019 in U.S. Appl. No. 15/791,249.
Non-Final Rejection dated Dec. 12, 2019 in U.S. Appl. No. 15/791,249.
Final Rejection dated Jun. 9, 2020 in U.S. Appl. No. 15/791,249.
Advisory Action dated Oct. 9, 2020 in U.S. Appl. No. 15/791,249.
Non-Final Rejection dated Mar. 29, 2021 in U.S. Appl. No. 15/791,249.
Restriction Requirement dated May 1, 2019 in U.S. Appl. No. 16/143,036.
Non-Final Rejection dated Nov. 18, 2019 in U.S. Appl. No. 16/143,036.
Final Rejection dated May 13, 2020 in U.S. Appl. No. 16/143,036.
Advisory Action dated Aug. 27, 2020 in U.S. Appl. No. 16/143,036.
Non-Final Rejection dated Jan. 6, 2021 in U.S. Appl. No. 16/143,036.
Final Rejection dated Jun. 7, 2021 in U.S. Appl. No. 16/143,036.
Non-Final Rejection dated Nov. 4, 2020 in U.S. Appl. No. 16/143,821.
Office Action dated Jun. 1, 2021 in Japanese Application No. 2018-558224.
Final Rejection dated May 4, 2021 in U.S. Appl. No. 16/143,821.
Restriction Requirement dated Feb. 19, 2020 in U.S. Appl. No. 16/143,821.
Office Action dated Jun. 29, 2021 in Japanese Application No. 2018-558225.
English Translation of Office Action dated Aug. 3, 2021 in Chinese Application No. 201780037587.5.
English Translation of Office Action dated Aug. 3, 2021 in Chinese Application No. 201780037588.X.
First Examination Report dated Oct. 13, 2021 in Indian Application No. 202017016896.
Office Action issued on Jul. 21, 2021 in European Application No. 17723617.1.
Restriction Requirement issued on Aug. 5, 2021 in U.S. Appl. No. 16/143,678.
Notice of Allowance issued on Aug. 20, 2021 in U.S. Appl. No. 15/587,364.
Hussain, Anwar et al., "Prodrug Approaches to Enhancement of Physicochemical Properties of Drugs IV: Novel Epinephrine Prodrug," Journal of Pharmaceutical Sciences (1976) vol. 65, No. 10 pp. 1510-1512.
Issue Notification issued on Feb. 24, 2022 in U.S. Appl. No. 15/724,234.
Non-Final Rejection issued on Nov. 5, 2021 in U.S. Appl. No. 15/724,234.
Non-Final Rejection issued on Dec. 21, 2021 in U.S. Appl. No. 16/143,036.
Final Rejection issued on Jun. 9, 2022 in U.S. Appl. No. 16/143,036.
Final Rejection issued on Jan. 13, 2022 in U.S. Appl. No. 15/791,249.
Non-Final Rejection issued on Mar. 1, 2022 in U.S. Appl. No. 16/143,678.
Non-Final Rejection issued on Feb. 4, 2022 in U.S. Appl. No. 16/143,821.
English Translation of Office Action issued on Jan. 6, 2022 in CN Application No. 201780037588.X.
English Translation of Office Action issued on Jan. 6, 2022 in CN Application No. 201780037587.5.
English Translation of Final Rejection issued on Jun. 30, 2022 in CN Application No. 201780037587.5.
English Translation of Office Action issued on Nov. 29, 2021 in KR Application No. 1020187035240.
English Translation of FER issued on Oct. 7, 2021 in IN Application No. 202017016904.
English Translation of OA issued on Jan. 26, 2022 in JP Application No. 2018-558224.
English Translation of FER issued on Oct. 26, 2021 in IN Application No. 202017016905.
English Translation of OA issued on Apr. 6, 2022 in IL Application No. 262751.
English Translation of OA issued on May 31, 2022 in JP Application No. 2018-558225.
Kesharwani, Payal et al. "Biomedical applications of hydrogels in drug delivery system: An update." Journal of Drug Delivery Science and Technology (2021): n. pag.
Tangri, Pranshu et al. "Oral Mucoadhesive Drug Delivery Systems: a Review." (2011).
Debotton, Nir and Arik Dahan. "Applications of Polymers as Pharmaceutical Excipients in Solid Oral Dosage Forms." Medicinal Research Reviews 37 (2017): n. pag.
English Translation of Final Rejection issued on Jul. 20, 2022 in CN Application No. 201780037588.X.
English Translation of Final Rejection issued on Jul. 8, 2022 in CN Application No. 201780037587.5.
English Translation of OA issued on Apr. 22, 2022 in KR Application No. 10-2018-7035236.
English Translation of OA issued on Jul. 26, 2022 in BR Application No. BR112020005875-0.
Cholewinski et al., Pharmaceutica Acta Helvetiae, 71:405-419, 1996.
Croscarmellose sodium http://ww.nbent.com/crosscarmellose.htm (Mar. 29, 2005).
Delsym Product Label (Feb. 13, 2007).
Di Donato et al., J. Biol. Chem, 268(7): 4745-4751, 1993.
Eiamtrakarn et al., "Gastrointestinal Mucoadhesive Path System (GI-MAPS) for oral administration of G-CSF, a model protein", Bipmaterials 23: 145-152 (2002).
Endo and Ueda, Fabad J. Pharm. Sci., 29:27-38, 2004.
Engel, June V PhD, "The Benefits of Eating Fibre" http://www.diabetes.ca/common/PrintVersion.asp?ID=45493 May 11, 2005.
Flick, E., Water-Soluble Resins—An Industrial Guide, 1991 (2nd Ed.) William Andrew Publishing/Noyes, pp. 389-392.

(56) References Cited

OTHER PUBLICATIONS

Goldberg et al., "Biotechnology and Food Ingredients", Springer: 352 (1991).
Hadvary et al., "Inhibition of pancreatic lipase in vitro by the covalent inhibitor tetrahydrolistatin", Biochem J.; 256:357-361 (1988).
Ko et al., "Behavior of etrahydrolipstatin in biological model membranes and emulsions", J. of Lipid Research; 38:1544-1552 (1997).
Kuhtreiber. In Cell Encapsulation and Therapeutics . Copyright 1999.
Lazaridou et al.; Thermophysical properties of chitosan, chitosanstarch and chitosan-pullulan films near the glass transition; Elsevier Science Ltd.; 2002; pp. 179-190.
Leathers, Appl. Microbiol. Biotechnol., 62: 468-473, 2003.
Le Person, S. Le et al., "Near infrared drying of pharmaceutical thin films: experimental analysis of internal mass transport," Chemical Engineering and Processing; (1998) pp. 257-263, 37.
Mahmood et al., "A limited sampling method for the estimation of AUC and Cmax of cabamazepine and carbamazepine epoxide folowing a single and multiple dose of a sustained-release product", Br J Clin Pharmacol; 45:241-246 (1998).
Mix. http://www.askoxford.com/concise_oed/mixx?view=uk. Accessed Dec. 23, 2004.
Nicorete Packaging (Aug. 29, 2006).
Oriski, S.C., "Johnson debuts cutter for new Saran film" Packaging World Oct. 1, 2004, http://www.packworld.com/view-18051.
Peh Kok Khiang et al., "Polymeric Films as Vehicle for Buccal Delivery: Swelling, Mechanical, and Bioadhesive Properties," J Pharm Pharmaceut Sci (1999) pp. 53-61, 2:2.
Polyethylenglykoke, Fachgebit Chemie, Unterthema Makromolekulare Chemie, XP-002298105 (Sep. 20, 2004).
Repka et al., "Bioadhesive properties of hydroxypropylcellulose topical films produced by hot-melt extrusion," Journal of Controlled Release, 70: 341-351 (2001).
Repka et al., "Influence of Vitamin E TPGS on the properties of hydrophilic films produced by hot-melt extrusion," Int. J. Pharmaceutics, 202: 63-70 (2000).
Senel, S., et al., "Chitosan films and hydrogels of chlorhexidine gluconate for oral mucosal delivery", Int. J. Pharmaceutics, 193: pp. 197-203 (2000).
Stella, V., et al., "Gliadin Films. I: Preparation and in vitro evaluation as a carrier for controlled drug release", Int., J. Pharmaceutics, 121: pp. 117-121 (1995).
Sudafed & Sudafed PE, http://www.sudafed.com/products/pe_quickstrips.html (Aug. 17, 2007).
Well—Definition of from The American Heritage College Dictionary, 3rd Ed., p. 1531 (1993).
Bauer, K.H. et al., "Pharmazeutische Technologie", pp. 208-209 (1997).
Pinnamanemi, S. et al., "Formulation approaches for orally administered poorly soluble drugs", Pharmazie 57(5): 291-300 (2002).
Chaumeil, J.C., "Micronization: A Method of Improving the Bioavailability of Poorly Soluble Drugs", Methods and Findings in Experimental and Clinical Pharmacology 20(3): 211-215 (1998).
Voigt, R. et al., "Pharmaseutische Technology fur Studium und Berf", pp. 179-180 (1995).
Nanda, A. et al., "An update on taste masking technologies for oral pharmaceuticals", Indian J Pharma Sci 64(1): 10-17 (2002).
Bornschein, M. et al., "Micro- und Nanopartikeln als Arzneliestofftragersysteme unter besonderer Berucksichtigung der Herstellungsmethoden", Die Pharmazie 44(9): 585-593 (1989).
Cohen E. et al., "Modern Coating and Drying Technology", pp. 268-277 (1992).
"Adsorption at Solid Surfaces," Encyclopedia of Pharmaceutical Technology (Swarbrick (ed.)), pp. 73 (1988).
Photograph of Tetracycline HCL (https://de.wikipedia.org/wiki/Tetracycline#/media/File:Tetracycline-HCL_substance_photo.jpg).
Textbook of Polymer Science (2nd Ed.) pp. 1-22 (Wiley 1971).
Thimmashetty, J. et al., "Preparation and Evaluation of Buccal Dosage Forms of Insulin."
Thimmashetty, J. et al., "Design and In Vivo Evaluation of Carvedilol Buccal Mucoadhesive Patches," Pak. J. Pharm. Sci. 21(3):241-248 (2008).
Elemente des Apparatebause, (Titz, H. (ed.)), pp. 546-669 (Springer-Verlag 1992). (includes partial English translation.).
The United States Pharmacopeia (20th Rev.), pp. 3-4, 12, 16, 955-957, 1023, 1030-1031, 1412, 1451 (USP 1980).
Varanda, F. et al., "Solubility of Antibiotics in Different Solvents. 1. Hydrochloride Forms of Tetracycline, Moxifloxacin, and Ciprofloxacin," Ind. Eng. Chem. Res. 45:6368-6374 (2006).
Phramazeutische Technologie fur Studium und Beruf (Voigt, R. (ed.)), p. 65 (Ullstein Mosby 1995).
Polymer Molecular Weights (Slade, P.E. (ed.), p. 1-8 (Marcel Dekker, Inc. 1975).
Metallic Pigments in Polymers, p. 132 (Rapra Technology Limited 1999).
White, J.G., "In Situ Determination of Delavirdine Mesylate Particle Size in Solid Oral Dosage Forms," Pharmaecutical Research 16(4):545-548 (1999).
Yamamura, K. et al., "Oral Mucosal Adhesive Film Containing Local Anesthetics: In Vitro and Clinical Evaluation," J. Biomed. Mater. Res. (Appl. Biomater.) 43:313-317 (1998).
Pharmazeutische Technologie: Insustrielle Herstellung und Entwicklung von Arzneimitteln (Zimmermann, I. (ed.)), p. 246 (Springer-Verlag 1998).
Modern coating technology systems for paper, film and foil (Shepherd, F. (ed.)), p. 5 (Emap Maclaren Ltd. 1995).
Blank, Z. et al., "Structural studies of organic gels by SEM", J. Material Science 9:1815-1822 (1974).
Razafimamonjison, et al., International Journal of Basic and Applied Sciences, 3:224. (Year: 2014).
Gopalakrishnan, et al., J. Sci. Food Agric., 50:111. (Year: 1990).
Juglal, et al., J. Food Prot., 65:683. (Year: 2002).
Cheng, et al., J. Pharm. Sci., 97:123. (Year: 2008).
Tulu, et al., A Search for Antibacterial Agents: Chapter 6: Dendrimers as Anticbacterial Agents. (Year: 2012).
Pharmazeutische Technologie (4th Ed.), (Bauer, K.H. et al. (eds.)), pp. 94-94, 286-287 (Georg Thieme Verlag Stuttgart1993).
Brittian, H.G., "What Is the 'Correct' Method to Use for Particle-Size Determination?," Pharmaceutical Technology 96-98 (Jul. 2001).
"More Solutions to Sticky Problems: A Guide to Getting More From Your Brookfield Viscometer," Brookfield Engineering Laboratories, Inc. (1985).
DeGrande, G., et al., "Specialized Oral Mucosal Drug Delivery Systems: Patches," Drugs and the Pharmaceutical Sciences (Swarbrick, J. (ed.)), Ch. 12, pp. 285-317 (1995).
Polymer Science and Technology (Ebewele, R.O. (ed.)), pp. 1-23 (2000).
Etzler, F.M. and Sanderson, "Partilce Size Analysis: a Comparative Study of Various Methods," Part. Part. Syst. Charact. 12: 127-224 (1995).
Roddy, R.E., "A Controlled Trial of Nonoxynol 9 Film to Reduce Male-to-Female Transmission of Sexually Transmitted Diseases," New England J. Med. 339(8):504-510 (1998).
Remington's Pharmaceutical Sciences (18th Ed.) (Gennaro, A.R. (ed.)), Ch. 19, pp. 296-298 (1990).
Etzler, F.M., "Particle Size Analysis: a Comparison of Methods," Polymeric Materials: Science & Engineering 87:335-336 (2002).
Patel, V.F. et al., "Advances in oral transmucosal drug delivery," J. Controlled Release 153:106-116 (2011).
"Adsorption," Kirk-Othmer Encyclopedia of Chemical Technology (4th Ed.) pp. 493-494 (Wiley 1991).
"Matrix," Webster's Third New International Dictionary of the English Language Unabridged (Gove, P.B. (ed.)) (G. & C. Merriam Company 1968).
Plastic Films (Osborn, K.R. and Jankins, W.A. (eds.), p. 89 (1992).
Martinez, M.N. and Amidon, G.L., "A Mechanistic Approach to Understanding the Factors Affecting Drug Absorption: A Review of Fundamentals," J. Clin. Pharmacol. 42:620-643 (2002).
Amidon, G.L. et al., "A Theoretical Basis for a Biopharmaceutical Drug Classification: The Correlation of in Vitro Drug Product Dissolution and in Vivo Bioavailability," Pharm. Res. 12(3):413-420 (1995).

(56) References Cited

OTHER PUBLICATIONS

Anders, R. and Merkle, H.P., "Evaluation of laminated mucoadhesive patches for buccal drug delivery," Int. J. Pharmaceutics 49: 231-240 (1989).
Pharmaceutical Dosage Forms and Drug Delivery Systems (7th Ed.) (Ansel, H.C et al. (eds.)), p. 66 (1999).
Apicella, A. et al., "poly(ethylene oxide) (PEO) and different molecular weight PEO blends monolithic devices for drug release," Biomaterials 14(2):83-90 (1993).
Pharmazeutische Technologie (5th Ed.) (Bauer, K.H. et al. (eds.)), pp. 208-209 (Stuttgart Jena Lubeck Ulm 1997).
Bowser, T.J. and Wilhelm, L.R., "Modeling Simultaneous Shrinkage and Heat and Mass Transfer of a Thin. Nonporous Film During Drying," J. Food Sci. 60(4):753-757 (1995).
Theory of pharmaceutical systems: vol. II (Carstensen, J.T. (ed.)), pp. 4-9 (1973).
Cassidy, J. P et al., "Controlled buccal delivery of buprenorphine," J. Controlled Release 25:21-29 (1993).
EUDRAGIT E 100, EUDRAGIT E PO, and EUDRAGIT E 12,5, Technical Information, Evonik Inductries AG, (2012).
EUDRAGIT L 100 and EUDRAGIT S 100, Technical Information, Evonik Inductries AG, (2012).
Europaisches Arzneibuch (3rd Ed.), pp. 142-143 (Deutscher Apotheker Verlag 1997).
European Pharmacopeia (3rd Ed.), p. 134 (1997).
Frankman, O. et al., "clinical Evaluation of C-Film, a Vaginal Contraceptive," J. Int. Med. Res. 3:292-296 (1975).
Friend, D.R., "Polyacrylate resin microcapsules for taste masking of antibiotics," J. Microencapsulation 9(4):469-480 (1992).
Fuller, C.S. et al., "Interactions in poly(ethylene oxide)-hydroxylpropyl methylcellulose blends," Polymer 42:9583-9592 (2001).
Save, T. et al., "Comparative Study of Buccoadhesive Formulations and Sublingual Capsules of Nifedipine," J. Pharm. Pharmacol. 46:192-195 (1994).
Save, T. and Vankitachalam, P., "Studies on Solid Dispersions of Nifedipine," Drug Development and Industrial Pharmacy 18(15):1663-1679 (1992).
Roy, G.M., "Taste Macking in Oral Pharmaceuticals," Pharmaceutical Technology, pp. 84-99 (Apr. 1994).
Guo, J.H. and Cookock, K.M., "Bioadhesive Polymer Buccal Patches for Buprenorphine Controlled Delivery: Solubility Consideration," Drug Development and Industrial Pharmacy 21(7): 2013-2019 (1995).
Mixing in the Process Industries (2nd Ed.) Hamby, N. et al. (eds.)), pp. 3, 115 (Butterworth Heinemann 1997).
Himics, R, and Pineiro, R., "The Importance of Particle Size in Liquid Coatings," Products Finishing 63(2):00329940 (1998).
Handbook of Pharmaceutical Excipients (Rowe, R. et al. (eds.)), pp. 326, 513, 522 (2009).
Ilango, R. et al., "In-Vitro Studies on Buccal strips of Glibenclamide using Chitosan," Indian J. Pharm. Sci. 59 (5):232-235 (1997).
Ishikawa, T. et al., "Preparation and Evaluation of Tablets Rapidly Disintegrating in Saliva Containing Bitter-Taste-Masked Granules by the Compression Method," Chem. Pharm. Bull. 47(10):1451-1454 (1999).
Kaya, S. and Kaya, A., "Microwave drying effects on properties of whey protein isolate edible films," J. Food Engineering, 43: 91-96 (2000).
"Cellulose" Kirk-Othmer Concise Encycloeipda of Chemical Technology; Abridged version of the 24 Volume, NY, Wiley; 227-228 (1978-1984).
"Excipients, Croscarmellose Sodium", Pformulate Excipients, http://www.pformulate.com/croscarmellose.htm (Sep. 29, 2002).
Atridox(R) (Doxycycline Hyclate) Product Label.
Barton, S. et al. "Citric Buffer Calculation", Version 1.1, Nov. 19, 2000.
Birkhauser, "Cell Encapsulation Technology and Therapeutics" (Jan. 5, 2009).

Bodmeier, Roland, "Evaluation of Drug-Containing Polymer Films Prepared from Aqueous Latexes", Pharmaceutical Research, vol. 6, No. 8 (1989).
CAS Presents, "Common Chemistry", http://www.commonchemistry.org.ChemicalDetail.aspx?ref=25322-68-3&terms=polyeth . . . Oct. 28, 2009.
Huus et al., "Thermal Dissociation and Unfolding of Insulin", Biochemistry, 44: 11171-11177 (2005).
Steiner et al., "Organic Derivatives of Alginic Acid", Industrial and Engineering Chemistry; 43(9): 2073-2077 (1951).
Verdampfung, Kristallisation, Trocknung (Gnielinski, V. et al., (Eds.)), pp. 161-181 (Vieweg & Sohn Verlagsgsellschaft mbH 1993). (partial English translation included.).
Giunchedi, P. and Conte, U., "Spray-drying as a preparation method of microparticulate drug delivery systems : an overview," S.T.P. Pharma. Sciences 6(4):276-290 (1995).
Guo, J.H. and Zerbe, H., "Water Soluble Film for Oral Administration," The 24th International Symposium on Controlled Release of Bioactive Materials, pp. 227-229 (Paper No. 5001-5003) (1997).
The Theory and Practice of Industrial Pharmacy (3rd Ed.) (Lachman, L et al. (eds.)), pp. 47-48, 51, 57, 64, 123-127, 346-369, 453-454, 461, 470, 479, 484, 491-492, 654-655 (1986).
Physical Pharmacy (4th Ed.) (Martin, A. et al. (eds.)), pp. 423, 430-434, 453, 461, 484, 557-558, 560, 565-567 (1993).
Bioadhesive Drug Delivery Systems (Lenaerts, V. and Gurny, R. (eds.)), Ch. 6, pp. 106-136 (1990).
Introductory Polymer Chemistry (Misra, G.S. (ed.)), Ch. 6, pp. 98-118 (1993).
Nishaoka, Y. et al., "Laser Diffraction Estimation of Particle Size Distribution of Slightly Water-Soluble Drugs Coexisting with Additives: Application to Solid Dosage Forms," Chem. Pharm. Bull. 40(6): 1563-1568 (1992).
Perumal, V.A. and Govender, T., "Investigating a New Approach to Film Casting for Enhanced Drug Content Uniformity In Polymeric Films," Drug Development and Industrial Pharmacy, 34:1034-1047 (2008).
Remington's Pharmaceutical Sciences (17th Ed.) (Gennaro, A.R. (ed.)), Ch. 37, pp. 713-740 (1985).
Shu, X.Z., et al., "Novel pH-sensitive citrate cross-linked chitosan film drug controlled release," Int. J. Pharmaceutics 212:19-28 (2001).
McNeill, J. Robert, et al., "A systematic review of mechanisms by which natural products of plant origin evoke vasodilatation," Can. J. Physiol. Pharmacol (2006) vol. 84, pp. 803-821.
Senel, S., et al., "Drug permeation enhancement via buccal route: possibilities and limitations," Journal of Controlled Release (2001) vol. 72, pp. 133-144.
Nicolazzo, Joseph A., et al., "Buccal penetration enhancers—How do they really work?," Journal of Controlled Release (2005) vol. 105, pp. 1-15.
Amores, Sonia, et al., "An improved cryopreservation method for porcine buccal mucosa in ex vivo drug permeation studies using Franz diffusion cells," European Journal of Pharmaceutical Science (2014) vol. 60, pp. 49-54.
Sattar, Mohammed, et al., "Oral transmucosal drug delivery-Current status and future prospects," International Journal of Pharmaceutics (2014) vol. 471, pp. 498-506.
Gimeno, Alvaro, et al., "Transbuccal delivery of doxepin: Studies on permeation and histological investigation," International Journal of Pharmaceutics (2014) vol. 471, pp. 650-654.
Ong, Charlene M.Y., et al., "Permeation of quinine across sublingual mucosa, in vitro," International Journal of Pharmaceutics (2009) vol. 366, pp. 58-64.
Al-Ghananeem et al., "Effect of pH on Sublingual Absorption of Oxycodone Hydrochloride", AAPS PharmSciTech; Article 23, 7(1) (2006) (http://www.aapspharmscitec.org).
Bhumkar et al., "Chitosan Reduced Gold Nanoparticles as Novel Carriers for Transmucosal Delivery of Insulin", Pharmaceutical Research; 24(8): 1415-1426 (2007).
Bowen P., "Particle Size Distribution Measurement from Millimeters to Nanometers and from Rods to Platelets", Journal of Dispersion Science and Technology; 23(5): 631-662 (2002).

(56) References Cited

OTHER PUBLICATIONS

Trademark Reg. No. 2,944,841—registered Apr. 26, 2005 to Reynolds Metal Co for "EZ Slide".
Hariharan et al., "Thin Film Technology, Orally Dissolving Film Strips (ODFS): The Final Evolution of Orally Dissolving Dosage Forms," Drug Delivery Technology; 9(2): 24-29 (2009).
Joshi et al., "Gold Nanoparticles as Carrier for Efficient Transmucosal Insulin Delivery", Langmuir; 22: 300-305 (2006).
Ojeda et al., "Preparation of multifunctional glyconanoparticles as a platform for potential carbohydrate-based anticancer vaccines", Carbohydrate Research; 342: 448-459 (2007).
U.S. Department of Health and Human Services Food and Drug Administration Center for Drug Evaluation and Research (CDER) "Guidance for Industry-Incorporation of Physical-Chemical Identifiers into Solid Oral Dosage Form Drug Products for Anticounterfeiting" Silver Spring, MD; 1-8 (Jul. 9, 2009).
Boo, Woong Jae, "Characterization of Thin Film Properties of Melamine Based Dendrimer Nanoparticles", Thesis for Texas A&M University, Dec. 2003.
"Suboxone Subligualtabletten" in: Verlag Rote Liste Service GmbH: "Rote Liste 2008" 2008, Verlag Rote Liste Service GmbH, Frankfurt/Main, XP00264986, p. 39018, the whole document.
Index of Transaction History for Ex Parte Reexamination Control No. 90/012,098, current as of Aug. 29, 2017.
Index of Documents for Inter Partes Review Case No. IPR2013-00316, current as of Aug. 29, 2017.
Index of Transaction History for Ex Parte Reexamination Control No. 90/012,097, current as of Aug. 29, 2017.
Index of Documents for Inter Partes Review Case No. IPR2013-00315, current as of Aug. 29, 2017.
Index of Transaction History for Inter Partes Reexamination Control No. 95/002,171, current as of Aug. 29, 2017.
Index of Transaction History for Inter Partes Reexamination Control No. 95/001,753, current as of Aug. 29, 2017.
Index of Transaction History for Inter Partes Reexamination Control No. 95/002,170, current as of Aug. 29, 2017.
Index of Documents for Inter Partes Review Case No. IPR2014-00794, current as of Aug. 29, 2017.
Index of Documents for Inter Partes Review Case No. IPR2015-00165, current as of Aug. 29, 2017.
Index of Documents for Inter Partes Review Case No. IPR2015-00167, current as of Aug. 29, 2017.
Index of Documents for Inter Partes Review Case No. IPR2015-00168, current as of Aug. 29, 2017.
Index of Documents for Inter Partes Review Case No. IPR2015-00169, current as of Aug. 29, 2017.
Index of Documents for Inter Partes Review Case No. IPR2016-00281, current as of Aug. 29, 2017.
Index of Documents for Inter Partes Review Case No. IPR2016-00282, current as of Aug. 29, 2017.
Index of Documents for Inter Partes Review Case No. IPR2016-01111, current as of Aug. 29, 2017.
Index of Documents for Inter Partes Review Case No. IPR2016-01112, current as of Aug. 29, 2017.
Index of Documents for Inter Partes Review Case No. IPR2017-00200, current as of Aug. 29, 2017.
Index of Documents for Inter Partes Review Case No. IPR2017-01557, current as of Aug. 29, 2017.
Index of Documents for Inter Partes Review Case No. IPR2017-01582, current as of Aug. 29, 2017.
English Translation of Patent Trial Decision issued on Nov. 8, 2024 in KR Application No. 10-2018-7035240.
Examination Report issued on Oct. 28, 2024 in EP Application No. 18150094.3.
Final Rejection issued on Nov. 22, 2024 in U.S. Appl. No. 17/576,923.
Rule 71(3) issed on Nov. 5, 2024 in EP Application No. 20820711.8.
Examination Report issued on Nov. 28, 2024 in EP Application No. 20808609.0.
English translation of Rejection Decision issued on Dec. 4, 2024 in CN Application No. 202080089502.X.
English translation of Office Action issued on Nov. 18, 2024 in JP Application No. 2022-525359.
Examination Report issued on Dec. 10, 2024 in IL Application No. 292487.
Rejection Decision issued on Dec. 11, 2024 in KR Application No. 10-2023-7027814.
English translation of Office Action issued on Dec. 13, 2024 in JP Application No. 2022-528074.
Notification Prior to Acceptance issued on Dec. 24, 2024 in IL Application No. 262751.
Examiner's Report issued on Oct. 9, 2024 in CA Application No. 3076815.
English Translation of the Written Opinion issued on Jan. 31, 2024 in BR Application No. 112018072539-0.
English Translation of Final Rejection issued on Jan. 16, 2024 in CN Application 201880062717.5.
Non-Final Rejection issued on Feb. 14, 2024 in U.S. Appl. No. 17/973,345.
Examiner's Report issued on Jan. 15, 2024 in CA Application 3076815.
Examination Report issued on Feb. 26, 2024 in EP Application 20820711.8.
Examiner's Report issued on Feb. 21, 2024 in CA Application 3159389.
Notification Prior to Examination issued on Feb. 28, 2024 in IL application 311142.
Examiner's Report issued on Feb. 22, 2024 in CA application 3076751.
Examiner's Report issued on Feb. 28, 2024 in CA application 3159382.
Final Rejection issued on Mar. 13, 2024 in U.S. Appl. No. 17/031,207.
Examination Report issued on Mar. 19, 2024 in EP Application 17723616.3.
Office Action issued on Mar. 20, 2024 in CN Application 202080092463.9.
Examination Report issued on Mar. 26, 2024 in EP Application 17723617.1.
Final Rejections issued on Mar. 29, 2024 in U.S. Appl. No. 16/143,678.
Final Office Action issued on Mar. 13, 2024 in JP Application 2020-538776.
Intimation of Grant issued on Apr. 17, 2024 in IN Application 202017016898.
Examiner's Report issued on Apr. 16, 2024 in CA Application 3022840.
Rani, Manjusha et al. "Review: Chitosan based hydrogel polymeric beads—As drug delivery system." BioResources (2010): n. pag.
Non-Final Rejection issued on Apr. 24, 2024 in U.S. Appl. No. 18/413,556.
Notice of Allowance issed on Apr. 29, 2024 in U.S. Appl. No. 17/835,442.
Examiner's Report issued on Jun. 14, 2024 in CA Application 3,022,797.
Notification Prior to Examination issued on Jun. 13, 2024 in IL Application No. 313551.
Rule 161 and 162 issued on Jun. 20, 2024 in EP Application No. 22888070.4.
Rule 161 and 162 issued on Jun. 20, 2024 in EP Application No. 22884536.8.
English Translation of Office Action issued on Jun. 21 in KR Application No. 10-2020-7012033.
English Translation of Office Action issued on Jun. 26 in CN Application No. 201880062678.9.
English Translation of Office Action issued on Jul. 8, 2024 in CN Application No. 202080089502.X.
Final Rejection issued on Jul. 5, 2024 in U.S. Appl. No. 17/098,324.
Office Action issued on Jul. 16, 2024 in JP Application No. 2018-558224.
Non-Final Rejection issued on Jul. 17, 2024 in U.S. Appl. No. 16/143,036.
English Translation of Office Action issued on Jun. 29, 2024 in KR Application No. 10-2020-7012106.

(56) References Cited

OTHER PUBLICATIONS

English Translation of Office Action issued on Jun. 28, 2024 in KR Application No. 10-2020-7011909.
English Translation of Final Rejection issued on Jul. 26, 2024 in CN Application No. 201880063175.3.
Office Action issued on Jul. 26, 2024 in BR Application No. 112018072539-0.
English Translation of Final Rejection issued on Jul. 29. 2024 in CN Application No. 202080092463.9.
Non-Final Rejection issued on Aug. 1, 2024 in U.S. Appl. No. 17/086,409.
Office Action issued on Aug. 14, 2024 in JP Application No. 2023-126682.
Final Rejection issued on Aug. 23, 2024 in U.S. Appl. No. 18/413,556.
Examination Report issued on Aug. 23, 2024 in EP Application No. 18786593.6.
Office Action issued on Sep. 2, 2024 in BR Application No. 112022008294-0.
Restriction Requirement issued on Sep. 11, 2024 in U.S. Appl. No. 17/549,219.
Final Rejection issued on Sep. 11, 2024 in U.S. Appl. No. 17/973,345.
Advisory Action issued on Oct. 18, 2024 in U.S. Appl. No. 17/973,345.
English Translation of Office Action issued on Oct. 1, 2024 in JP Application No. 2022-211123.
Examination Report issued on Mar. 18, 2024 in IL Application 273479.
Examiner's Report issued on Mar. 18, 2024 in CA Application 3076816.
Notice of Allowance issued on Feb. 27, 2023 in KR Application 10-2018-7035236.
Non-Final Rejection issued on Mar. 2, 2023 in U.S. Appl. No. 17/973,345.
Final Rejeciton issued on Jun. 22, 2023 in U.S. Appl. No. 17/973,345.
Advisory Action issued on Aug. 18, 2023 in U.S. Appl. No. 17/973,345.
Office Action issued on Dec. 23, 2022 in EP Application 18786579.5.
Official Notification issued on Dec. 27, 2022 in IL Application 273479.
English Translation of Office Action issued on Mar. 28, 2023 in JP Application 2018-558225.
English Translation of Office Action issued on Jan. 28, 2023 in CN Application 201880062717.5.
English Translation of Office Action issued on Jan. 13, 2023 in KR Application 10-2018-7035240.
English Translation of Rejection issued on Jun. 30, 2023 in KR Application 10-2018-7035240.
Restriction Requirement issued on Feb. 17, 2023 in U.S. Appl. No. 17/098,324.
Examination Report issued on Mar. 24, 2023 in EP Application 18786591.0.
Non-Final Rejection issued on Mar. 2, 2023 in U.S. Appl. No. 16/143,036.
Non-Final Rejection ussed on Mar. 3, 2023 in U.S. Appl. No. 17/835,442.
Examination Report issued on May 24, 2023 in EP Application 20820711.8.
Non-Final Rejection issued on Mar. 21, 2023 in U.S. Appl. No. 17/576,923.
Examiner's Report issued on Jun. 7, 2023 in CA Application 3022797.
English Translation of Office Action issued on Jul. 7, 2023 in KR Application 10-2020-7012106.
English Translation of Office Action issued on Jul. 7, 2023 in KR Application 10-2020-7012033.
English Translation of Office Action issued on Jun. 30, 2023 in KR Application 10-2020-7011909.
Non-Final Rejection issued on Jun. 29, 2023 in U.S. Appl. No. 17/086,409.
Notice of Allowance issued on Jun. 16, 2023 in CA Application 2771089.
English Translation of Office Action issued on Aug. 23, 2023 in CN Application 201880062678.9.
Final Rejection issued on Aug. 1, 2023 in U.S. Appl. No. 15/791,249.
English Translation of Office Action issued on Sep. 11, 2023 in JP Application 2020-538776.
English Translation of Office Action issued on Jul. 26, 2023 in JP Application 2020-517586.
Examiner's Report issued on Jul. 20, 2023 in CA Application 3022840.
English Translation of Office Action issued on Aug. 28, 2023 in IL Application No. 262751.
Non-Final Rejection issued on Sep. 7, 2023 in U.S. Appl. No. 16/143,678.
English Translation of Office Action issued on Aug. 31, 2023 in CN Application 202080092463.9.
Rule 161(1) and 162 issued on Sep. 5, 2023 in EP Application 22703176.2.
Jung et al The Usability of Diazepam Buccal Soluble Film as an Oral Treatment in Adult Patients with Epilepsy.
Non-Final Rejection issued on Oct. 2, 2023 in U.S. Appl. No. 17/098,324.
English Translation of Office Action issued on Oct. 10, 2023 in CN Application 201880063175.3.
Final Rejection issued on Oct. 13, 2023 in U.S. Appl. No. 17/576,923.
Office Action issued on Oct. 25, 2023 in CN Application 202080089502.X.
Hearing Notice issued on Jan. 24, 2024 in IN Application 201817045293.
Hearing Notice issued on Sep. 22, 2023 in IN Application 201817045293.
Non-Final Rejection issued on Jun. 8, 2023 in U.S. Appl. No. 17/031,207.
Notice of Allowance issued on Sep. 29, 2023 in U.S. Appl. No. 17/835,442.
Allowance issued on Dec. 7, 2023 in JP Application 2020-517586.
Hearing Notice issued on Oct. 16, 2023 in IN Application 202017016898.
Notification Prior to Acceptance issued on Nov. 28, 2023 in IL Application 273477.
Examination Report issued on Sep. 29, 2023 in EP Application 20808609.0.
Office Action issued on Dec. 8, 2023 in JP Application 2022-211123.
Hearing Notice issued on Jan. 4, 2024 in IN Application 202017016905.
English Translation of Office Action issued on Oct. 21, 2023 in KR Application 10-2023-7027814.
Final Rejection issued on Nov. 24 in U.S. Appl. No. 16/143,036.
English Translation of Office Action issued on Feb. 6, 2024 in CN Application 201880062678.9.
English Translation of the Written Opinion issued on Jan. 31, 2024 in BR Application No. 112018072467-0.

\* cited by examiner

*Includes 4 patients with weight 112–124.5 kg.
$C_{max}$, maximum observed plasma drug concentration; DBF, diazepam buccal film; DRG, diazepam rectal gel.

ORAL AND NASAL COMPOSITIONS AND METHODS OF TREATMENT

PRIORITY CLAIM

This application claims priority to U.S. Provisional Patent Application No. 63/271,458, filed Oct. 25, 2021, which is incorporated by reference in its entirety.

TECHNICAL FIELD

This invention relates to pharmaceutical compositions and methods of treatment.

BACKGROUND

A seizure is a sudden, uncontrolled electrical disturbance in the brain. It can cause changes in behavior, movements or feelings, and in levels of consciousness. If two or more seizures or a tendency for recurrent seizures occurs, a subject is often diagnosed with epilepsy. Epilepsy is a neurological disorder marked by sudden recurrent episodes of sensory disturbance, loss of consciousness, or convulsions, associated with abnormal electrical activity in the brain. Benzodiazepines are often used to treat medical conditions such as seizures, anxiety, insomnia, alcohol withdrawal, and amnesia. They can be used as a muscle relaxant. They are sometimes provided before an anesthetic, such as before surgery. Some examples of benzodiazepines are alprazolam (Xanax), lorazepam (Ativan), chlordiazepoxide (Librium), and diazepam (Valium). Benzodiazepines can be used to treat CNS (central nervous system) disorders.

SUMMARY

In general, a method of administering diazepam with a multimodal delivery profile can include delivering diazepam from a matrix, and promoting permeation of at least a portion of the diazepam through a mucosal tissue. In certain embodiments, the delivery can result in an unexpected, surprising food effect.

In one aspect, a method of administering a benzodiazepine drug to a subject can include administering an effective dose of a pharmaceutical formulation including a benzodiazepine drug to the subject as a spray, the effective dose of the benzodiazepine drug being at least 5% higher than a non-fed state effective dose for the patient.

In another aspect, a method of administering a benzodiazepine drug to a subject can include administering a first effective dose of a pharmaceutical formulation including a benzodiazepine drug to the subject as a first nasal spray and, within 4 hours or less, administering a second effective dose of the benzodiazepine drug as a second nasal spray.

In another aspect, a method of administering a benzodiazepine drug to a subject can include administering a first dose of a pharmaceutical formulation including a benzodiazepine drug to a nasal cavity of the subject, and evaluating a therapeutic effect in the subject, and, if a therapeutic effect is not experienced by the subject within 4 hours or less of the first dose, administering a second dose of the pharmaceutical formulation including the benzodiazepine drug to the nasal cavity of the subject.

In another aspect, a method of administering a benzodiazepine drug to a subject can include administering an effective dose of a pharmaceutical formulation including a benzodiazepine drug to the subject as a spray, wherein the effective dose of the pharmaceutical formulation includes delivering a first dose and a second dose, if the first dose does not produce a therapeutic effect in the subject, to the subject, at least one of the first dose and the second dose being greater than 0.20 mg/kg.

In certain embodiments, administering a benzodiazepine can include delivering the pharmaceutical formulation to an oral cavity.

In certain embodiments, administering a benzodiazepine drug can include delivering the pharmaceutical formulation to a nasal cavity.

In certain embodiments, the concentration of the administered benzodiazepine drug can be at least 5% higher than a non-fed state effective dose for the patient.

In certain embodiments, the concentration of the administered benzodiazepine drug can be at least 8% higher than a non-fed state effective dose for the patient. In certain embodiments, the concentration of the administered benzodiazepine drug can be at least 10% higher than a non-fed state effective dose for the patient.

In certain embodiments, the concentration of the administered benzodiazepine drug can be at least 20% higher than a non-fed state effective dose for the patient.

In certain embodiments, the concentration of the administered benzodiazepine drug can be at least 25% higher than a non-fed state effective dose for the patient.

In certain embodiments, the concentration of the administered benzodiazepine drug can be at least 50% higher than a non-fed state effective dose for the patient.

In certain embodiments, the concentration of the administered benzodiazepine drug can be at least 60% higher than a non-fed state effective dose for the patient.

In certain embodiments, administering can include spraying a first dose in one or more nostrils of the subject.

In certain embodiments, the pharmaceutical formulation has a therapeutic window of 45 minutes or less. In certain embodiments, the pharmaceutical formulation has a therapeutic window of 30 minutes or less. In certain embodiments, the pharmaceutical formulation has a therapeutic window of 15 minutes or less.

In certain embodiments, the pharmaceutical formulation has a therapeutic window of 10 minutes or less. The pharmaceutical formulation can have a therapeutic window of 5 minutes or less.

In certain embodiments, the pharmaceutical formulation is administered as a first effective dose and a second effective dose, The first dose can be administered as a nasal spray, and the second dose can be administered as a nasal spray.

In certain embodiments, the first dose and the second dose together contain the concentration of the benzodiazepine drug that is higher than a non-fed state effective dose for the subject.

In certain embodiments, the concentration of the benzodiazepine drug is at least 5% higher than the non-fed state effective dose for the subject. In certain embodiments, the first and second dose together contain a concentration of the benzodiazepine drug at least 5% higher that the non-fed state effective dose for the subject. In certain embodiments, the first and second dose together contain a concentration of the benzodiazepine at least 10% higher that the non-fed state effective dose for the subject. The first and second dose together can also contain a concentration of the benzodiazepine at least 15% higher than a non-fed state effective dose for the subject.

In certain embodiments, the first dose can contain a concentration of the benzodiazepine drug that is at least 40% higher than a non-fed state effective dose for the subject.

In certain embodiments, administering can include spraying a second dose in one or more nostrils of the subject. In other words, the effective dose of the pharmaceutical formulation includes delivering a second dose after a first dose.

In certain embodiments, the second dose is administered within 4 hours or less of the first dose. In certain embodiments, the second dose is administered within 2 hours or less of the first dose. In certain embodiments, the second dose is administered within 1 hour or less of the first dose. In certain embodiments, the second dose is administered within 30 minutes of less of the first dose. In certain embodiments, the second dose is administered within 10 minutes or less of the first dose.

In certain embodiments, the first dose or the second dose can be 60% of a minimum therapeutic dose in a fed state, 70% of a minimum therapeutic dose in a fed state, or 80% of a minimum therapeutic dose in a fed state.

In certain embodiments, each of the first dose and the second dose can be 5 mg for a subject 6 to 11 years of age and 10 kg to 18 kg or a subject 12 years of age and older and 14 kg to 27 kg. In certain embodiments, each of the first dose and the second dose can be 10 mg for a subject 6 to 11 years of age and 19 kg to 37 kg or a subject 12 years of age and older and 28 kg to 50 kg. In certain embodiments, each of the first dose and second dose can be 15 mg for a subject 6 to 11 years of age and 38 kg to 55 kg or a subject 12 years of age and older and 51 kg to 75 kg. In certain embodiments, each of the first dose and second dose can be 20 mg for a subject 6 to 11 years of age and 56 kg to 74 kg or a subject 12 years of age and older and 76 kg and up.

In certain embodiments, the first dose and the second dose together can contain the concentration of the benzodiazepine drug that is higher than a recommended effective dose for the subject.

In certain embodiments, administering the first dose and administering the second dose can meet or exceed a recommended effective dose for the subject.

In certain embodiments, administering the benzodiazepine drug can achieve a therapeutic threshold of 45 minutes or less or of 15 minutes or less.

In certain embodiments, both the first dose and the second dose can be greater than 0.30 mg/kg.

In certain embodiments, administering the first dose and the second dose together contain the concentration of the benzodiazepine drug that can be at least 40% higher than a non-fed state effective dose for the subject.

In certain embodiments, the pharmaceutical formulation can include a rheological modifying agent.

In certain embodiments, the pharmaceutical formulation can include a thixotropic agent.

In certain embodiments, benzodiazepine drug can be alprazolam, brotizolam, chlordiazepoxide, clobazam, clonazepam, clorazepam, demoxazepam, diazepam, flumazenil, flurazepam, halazepam, midazolam, nordazepam, medazepam, nitrazepam, oxazepam, lorazepam, prazepam, quazepam, triazolam, temazepam, loprazolam, or any pharmaceutically-acceptable salts thereof, and any combinations thereof.

In certain embodiments, the benzodiazepine drug can be diazepam, or a pharmaceutically-acceptable salt thereof.

In certain embodiments, the diazepam is administered in a fed state.

In certain embodiments, administering a benzodiazepine drug further includes adjusting a dose of diazepam to compensate for a food effect such that a subject will achieve a safe and efficacious dose in a fed state.

In certain embodiments, the diazepam is administered in a fasted state.

In certain embodiments, a single dose can be one dosing in one nostril or two dosings in one nostril or one or more dosings in each nostril.

In certain embodiments, about 1 mg of diazepam can be delivered in a single dose.

In certain embodiments, about 1.25 mg of diazepam can be delivered in a single dose.

In certain embodiments, about 1.5 mg of diazepam can be delivered in a single dose.

In certain embodiments, about 1.75 mg of diazepam can be delivered in a single dose.

In certain embodiments, about 2 mg of diazepam can be delivered in a single dose.

In certain embodiments, about 2.25 mg of diazepam can be delivered in a single dose.

In certain embodiments, about 2.5 mg of diazepam can be delivered in a single dose.

In certain embodiments, about 2.75 mg of diazepam can be delivered in a single dose.

In certain embodiments, about 3 mg of diazepam can be delivered in a single dose.

In certain embodiments, about 3.25 mg of diazepam can be delivered in a single dose.

In certain embodiments, about 3.5 mg of diazepam can be delivered in a single dose.

In certain embodiments, about 3.75 mg of diazepam can be delivered in a single dose.

In certain embodiments, about 4 mg of diazepam can be delivered in a single dose.

In certain embodiments, about 4.25 mg of diazepam can be delivered in a single dose.

In certain embodiments, about 4.5 mg of diazepam can be delivered in a single dose.

In certain embodiments, about 4.75 mg of diazepam can be delivered in a single dose.

In certain embodiments, about 5 mg of diazepam can be delivered in a single dose.

In certain embodiments, about 5.25 mg of diazepam can be delivered in a single dose.

In certain embodiments, about 5.5 mg of diazepam can be delivered in a single dose.

In certain embodiments, about 5.75 mg of diazepam can be delivered in a single dose.

In certain embodiments, about 6 mg of diazepam can be delivered in a single dose.

In certain embodiments, about 6.25 mg of diazepam can be delivered in a single dose.

In certain embodiments, about 6.5 mg of diazepam can be delivered in a single dose.

In certain embodiments, about 6.75 mg of diazepam can be delivered in a single dose.

In certain embodiments, about 7 mg of diazepam can be delivered in a single dose.

In certain embodiments, about 7.25 mg of diazepam can be delivered in a single dose.

In certain embodiments, about 7.5 mg of diazepam can be delivered in a single dose.

In certain embodiments, about 7.75 mg of diazepam can be delivered in a single dose. In certain embodiments, about 8 mg of diazepam is delivered in a single dose.

In certain embodiments, about 9 mg of diazepam can be delivered in a single dose.

In certain embodiments, about 10 mg of diazepam can be delivered in a single dose.

In certain embodiments, about 14 mg of diazepam can be delivered in a single dose.

In certain embodiments, about 18 mg of diazepam can be delivered in a single dose.

In certain embodiments, about 20 mg of diazepam can be delivered in a single dose.

In certain embodiments, about 25 mg of diazepam can be delivered in a single dose.

In certain embodiments, about 28 mg of diazepam is delivered in a single dose.

In certain embodiments, about 30 mg of diazepam can be delivered in a single dose.

In certain embodiments, about 36 mg of diazepam can be delivered in a single dose.

In certain embodiments, about 40 mg of diazepam can be delivered in a single dose.

In certain embodiments, a dose of diazepam can be administered according to a weight-based regimen.

In certain embodiments, diazepam can be administered as a rescue medication.

In certain embodiments, diazepam can be administered to treat a CNS disorder.

In certain embodiments, diazepam can be administered to treat seizures.

In certain embodiments, diazepam can be administered to treat acute repetitive seizures.

In certain embodiments, diazepam can be administered to treat generalized seizures.

In certain embodiments, diazepam can be administered to treat focal seizures.

In certain embodiments, diazepam can be administered to treat focal aware seizures.

In certain embodiments, diazepam can be administered to treat focal aware impaired seizures.

In certain embodiments, diazepam can be administered to treat bilateral tonic seizures.

In certain embodiments, diazepam can be administered to treat absence seizures.

In certain embodiments, diazepam can be administered to treat atypical absence seizures.

In certain embodiments, diazepam can be administered to treat tonic-clonic seizures.

In certain embodiments, diazepam can be administered to treat atonic seizures.

In certain embodiments, diazepam can be is administered to treat clonic seizures.

In certain embodiments, diazepam can be administered to treat tonic seizures.

In certain embodiments, diazepam can be administered to treat myoclonic seizures.

In certain embodiments, diazepam can be administered to treat gelastic and dacrystic seizures.

In certain embodiments, diazepam can be administered to treat febrile seizures.

In certain embodiments, diazepam can be administered to treat non-epileptic seizures.

In certain embodiments, diazepam can be administered to treat refractory seizures.

In certain embodiments, the pharmaceutical formulation can include an alcohol.

In certain embodiments, the pharmaceutical formulation can include ethanol.

In certain embodiments, the pharmaceutical formulation can include benzyl alcohol.

In certain embodiments, the pharmaceutical formulation can include a natural or synthetic tocopherol or tocotrienol.

In certain embodiments, the pharmaceutical formulation can include vitamin E or a salt of Vitamin E.

In certain embodiments, the pharmaceutical formulation can include an alkyl glycoside.

In certain embodiments, the pharmaceutical formulation can include dodecyl maltoside.

In certain embodiments, the treatment can achieve bioavailability that is from about 40 to 150% of that achieved with the same benzodiazepine administered intravenously.

In general, a method of treating a medical condition can include administering a benzodiazepine drug with a delivery profile comprising delivering benzodiazepine drug to achieve an effective linear average AUC and average Cmax up to about 4 hours.

In certain embodiments, the benzodiazepine drug can be delivered via at least a mucosal route.

In certain embodiments, the benzodiazepine drug can be delivered via at least a transmucosal route.

In certain embodiments, benzodiazepine drug can be delivered via at least a gastrointestinal route.

In certain embodiments, the benzodiazepine drug can be delivered via at least a pharyngeal or transpharyngeal route.

In certain embodiments, the benzodiazepine drug can be delivered via at least an esophageal or transesophogeal route.

Other aspects, embodiments, and features will be apparent from the following description, the drawings, and the claims.

DETAILED DESCRIPTION

Figure 1A:
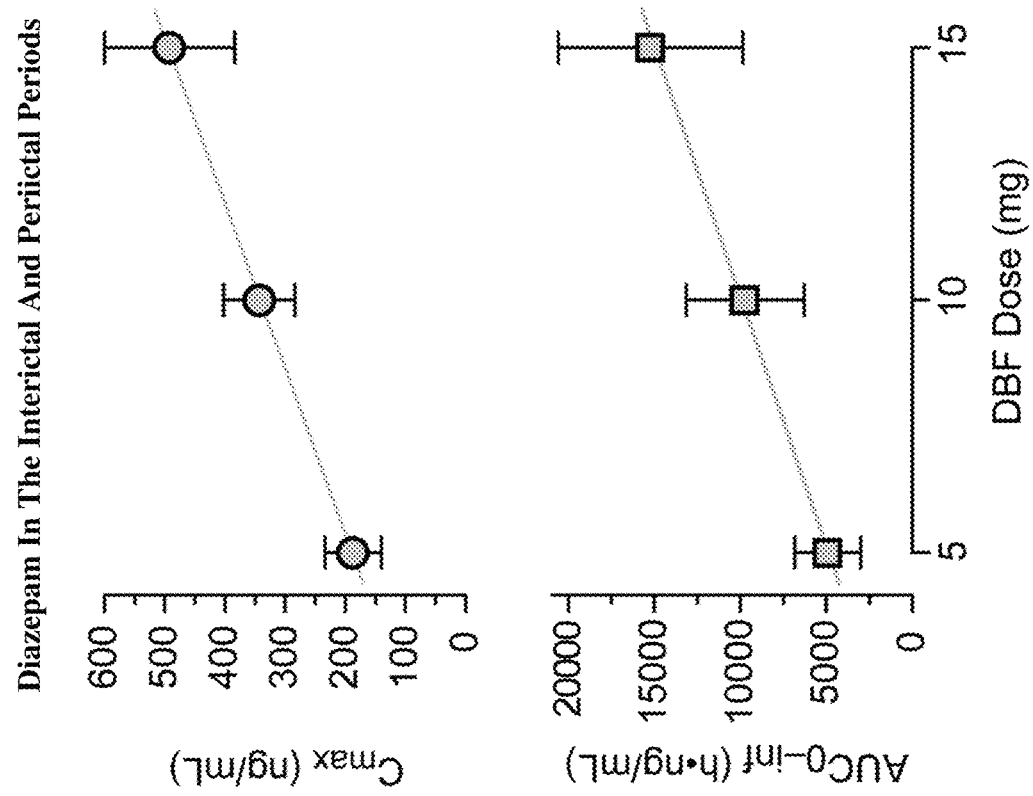
FIG. 1A shows dose-proportional pharmacokinetics of diazepam buccal film (DBF) in healthy adult males in which plasma diazepam concentrations were measured in a single-dose, randomized, open-label, three-period, crossover study of diazepam buccal film (DBF) 5 mg, 10 mg, and 15 mg in 30 healthy adult male volunteers under fasting conditions.

Seizure clusters occur in many patients with epilepsy, despite treatment with antiepilepsy medications. Available treatment options remain limited. Benzodiazepines, including diazepam and midazolam, are the mainstay of treatment for seizure emergencies, including acute repetitive seizures. Non-parenteral dosage forms are used when parenteral (intravenous or intramuscular) dosing is not feasible. Currently available non-parenteral dosage forms have limitations in terms of usability, accuracy of dosing, irritation potential, patient and caregiver acceptance, speed of action, and portability. Benzodiazepines can produce toxic effects and can be intentionally or accidentally taken in overdose. Accordingly, a dosing regimen that allows for improved dosing and control, compliance, speed of action, accountability and usability would supply a critical and yet unmet need.

Conventionally, a gel formulation of diazepam intended for rectal administration (e.g., Diastat® Rectal Gel) is administered for certain patients with epilepsy. The drug is administered to patients who require occasional use of diazepam to control bouts of increased seizure activity. Common side effects of this medication include somnolence, sleepiness or drowsiness. Other side effects include dizziness, headache, pain, abdominal pain, nervousness, vasodilation, diarrhea, ataxia or incoordination, euphoria, asthma, rhinitis (irritation of the nose similar to an allergy or a cold) and rash. Diazepam and other currently available products for the treatment of ARS and acute convulsive seizures have significant limitations. Rectal administration is unwieldy, may be embarrassing for patients and caregivers, and use may be restricted by social and legal constraints, and intranasal administration is often poorly accepted by patients due to inaccurate dosing and nasal irritation, which can negatively impact compliance. Most oral tablet forms of benzodiazepines such as lorazepam, diazepam and clonazepam must be swallowed with water and this is only feasible when the patient is awake and alert. Some sublingual or buccal dosage forms may also require patient cooperation depending on the properties of the pharmaceutical composition. Lorazepam in an orodispersible tablet form (Temesta Expidet®) which has been used sublingually in the treatment of acute seizures in children but it and other available oral dosage forms may not act as rapidly as rectal diazepam.

Patients with epilepsy who have worrisome seizure exacerbations outside of a medical facility would benefit from rapid treatment by a caregiver or bystander, or even from a therapy that is self-administered. Such seizure exacerbations fall on a continuum ranging from single breakthrough seizures (including a more severe or prolonged seizure than is typical for the patient), to acute repetitive seizures (ARS), and, in the most severe form, to status epilepticus.

ARS, also commonly referred to as seizure clusters or seizure flurries, represents a series of seizures grouped consecutively, typically with short (or shorter than usual) interictal periods. More generally, ARS can be considered a change in frequency of seizures for which treatment is desired. Patients experiencing ARS have drug refractory epilepsy and experience spontaneous seizures on a recurrent basis. When ARS is identified, there is heightened concern for seizure-associated risks including post-ictal psychosis; injury from falls and burns; negative social and pharmacoeconomic impact from frequent emergency department visits, hospitalizations, or missed school or work days; and importantly for status epilepticus that may lead to persistent neurological impairment or death. Parenteral (intravenous or intramuscular) dosing is preferred for seizure rescue therapy, particularly in the emergency treatment of status epilepticus. Alternative non-parental dosage forms are used when parenteral therapy is not feasible or when a patient has such frequent episodes that parenteral therapy is not practical. The objective of therapy may be to prevent seizure recurrence, interrupt progression of a sequence of seizures, or terminate an ongoing seizure.

Spray drug delivery is an alternative method of systemic drug delivery that offers several advantages over both injectable, rectal and enteral methods of administration. For some drugs, this results in rapid onset of action via a more comfortable and convenient delivery route than the intravenous route. The spray delivery mode was surprising in that the drug delivery takes place through modes other than the nasal mucosa. Rather than the expected delivery through the nasal mucosa, the delivery occurred exhibits an unexpected food effect. As a result dosing of the active must be altered to achieve appropriate biodelivery. When the multiple delivery modes are not considered, the subject will be under-dosed with active, leading to decreased efficacy.

In certain embodiments, a benzodiazepine drug can be administered to treat a CNS disorder, seizures, acute repetitive seizures, or generalized seizures. In certain embodiments, a pharmaceutical formulation includes a benzodiazepine drug and an alcohol. In certain embodiments, a pharmaceutical formulation includes a benzodiazepine drug and an ethanol, a benzyl alcohol, or a natural or synthetic tocopherol or tocotrienol. In certain embodiments, a pharmaceutical formulation includes a benzodiazepine drug and an alkyl glycoside.

A therapeutic effect means a biological response. For example, a therapeutic effect may be induced by a pharmaceutical composition. A therapeutic effect may be evaluated for its ability to treat a medical condition and/or reduce the symptoms of a medical condition, for example, one or more of a reduction in the severity of the seizure, general relaxation of the muscles, reduction in seizure-induced anxiety experienced by the subject, a impartation of a feeling of well-being to the patient, reduction in the duration of the seizure, and reduction in the probability that the patient will experience a repeat seizure, an increase in the interval between the current seizure and the next seizure. A method of administering a benzodiazepine drug to a subject includes administering a first dose of a pharmaceutical formulation including a benzodiazepine drug to a nasal cavity of the subject and, evaluating a therapeutic effect, such as for example, a lack of recurrent seizures in the subject; and if a therapeutic effect is not experienced by the subject within 4 hours or less of the first dose, administering a second dose of the pharmaceutical formulation including the benzodiazepine drug to the nasal cavity of the subject.

In certain circumstances, a method of administering a benzodiazepine drug to a subject can include administering a first dose of a pharmaceutical formulation including a benzodiazepine drug to a nasal cavity of the subject and, within 4 hours or less of the first dose, administering a second dose of the pharmaceutical formulation including the benzodiazepine drug to the nasal cavity of the subject.

In certain embodiments, at least one of the first dose and the second dose can be greater than 0.20 mg/kg. In certain embodiments, the effective dose is administered in a fed state. In certain embodiments, the effective dose is administered in a fasted state. In certain embodiments, at least one of the first and/or second dose is greater than 0.22 mg/kg. In certain embodiments, at least one of the first and/or second dose is greater than 0.22 mg/kg. In certain embodiments, at least one of the first and/or second dose is greater than 0.24 mg/kg. In certain embodiments, at least one of the first and/or second dose is greater than 0.26 mg/kg. In certain embodiments, at least one of the first and/or second dose is greater than 0.28 mg/kg. In certain embodiments, at least one of the first and/or second dose is greater than 0.30 mg/kg. In certain embodiments, both the first effective dose and the second dose are greater than 0.20 mg/kg.

In certain embodiments, the first dose or the second dose is 60% of a minimum therapeutic dose in a fed state. In certain embodiments, the first dose or the second dose is 70% of a minimum therapeutic dose in a fed state. In certain embodiments, the first dose or the second dose is 80% of a minimum therapeutic dose in a fed state.

In certain embodiments, each of the first dose and the second dose is 5 mg for a subject 6 to 11 years of age and 10 kg to 18 kg or a subject 12 years of age and older and 14 kg to 27 kg. In certain embodiments, each of the first dose and the second dose is 10 mg for a subject 6 to 11 years of age and 19 kg to 37 kg or a subject 12 years of age and older and 28 kg to 50 kg. In certain embodiments, each of the first dose and second dose is 15 mg for a subject 6 to 11 years of age and 38 kg to 55 kg or a subject 12 years of age and older and 51 kg to 75 kg. In certain embodiments, each of the first dose and second dose is 20 mg for a subject 6 to 11 years of age and 56 kg to 74 kg or a subject 12 years of age and older and 76 kg and up.

In certain embodiments, administering the first dose to the nasal cavity of the subject includes spraying the first dose in one or more nostrils of the subject. In certain embodiments, administering the second dose to a nasal cavity includes spraying the second dose in one or more nostrils of the subject.

In certain embodiments, administering the first dose to a nasal cavity includes spraying the first dose in a nostril of the subject and administering the second dose to a nasal cavity includes spraying the second dose in the nostril of the subject.

In certain embodiments, administering the first dose to a nasal cavity includes spraying the first dose in a first nostril of the subject and administering the second dose to a nasal cavity includes spraying the second dose in a second nostril of the subject. In certain embodiments, the first dose and the second dose together contain the concentration of the benzodiazepine drug that is higher than a recommended effective dose for the subject.

In certain embodiments, administering the first dose and administering the second dose meets or exceeds a recommended effective dose for the subject.

In certain embodiments, administering the benzodiazepine drug achieves a therapeutic threshold of 45 minutes or less. In certain embodiments, administering the benzodiazepine drug achieves a therapeutic threshold of 15 minutes or less. In certain embodiments, the second dose is administered within 2 hours or less of the first dose. In certain embodiments, the second dose is administered within 1 hour or less of the first dose. In certain embodiments, the second dose is administered within 30 minutes or less of the first dose. In certain embodiments, the second dose is administered within 10 minutes or less of the first dose.

In certain embodiments, the benzodiazepine drug is diazepam, or a pharmaceutically-acceptable salt thereof. In certain embodiments, a portion of the benzodiazepine drug is delivered via at least an esophageal or pharyngeal route. In certain embodiments, each dose of the benzodiazepine drug is administered according to a weight-based regimen. In certain embodiments, the benzodiazepine drug is administered as a rescue medication. In certain embodiments, the benzodiazepine drug is administered to treat a CNS disorder, seizures, acute repetitive seizures, or generalized seizures. In certain embodiments, the pharmaceutical formulation includes an alcohol. In certain embodiments, wherein the pharmaceutical formulation includes ethanol, benzyl alcohol, or a natural or synthetic tocopherol or tocotrienol. In certain embodiments, the pharmaceutical formulation includes an alkyl glycoside.

In certain embodiments, a method of administering a benzodiazepine drug to a subject includes administering an effective dose of a pharmaceutical formulation including a benzodiazepine drug to the subject as a spray, wherein the effective dose of the pharmaceutical formulation includes delivering a first dose and a second dose, if the first dose does not produce a therapeutic effect in the subject, to the subject, at least one of the first dose and the second dose being greater than 0.20 mg/kg. In certain embodiments, both the first dose and the second dose are greater than 0.30 mg/kg.

The benzodiazepine drug can be delivered via at least a gastrointestinal route. The benzodiazepine drug can also be delivered via at least a pharyngeal route. Such delivery includes the part of the throat behind the mouth and nasal cavity, and above the esophagus and trachea (the tubes going down to the stomach and the lungs). This mode of delivery can result in rapid drug uptake. In certain embodiments, the benzodiazepine drug is delivered via at least a esophageal route. This delivery includes the esophagus, a muscular tube connecting the throat (pharynx) with the stomach. Dosage forms that adhere to the esophageal mucosa and prolong contact have been investigated to improve the efficacy of locally acting agents. These modes of delivery can also result in rapid drug uptake, a large surface area for solute transport, improved drug bioavailability, and noninvasive manner of administering the drug.

For example, the ratio of fed/fasted was 0.4 or greater, resulting in a consistent Cmax reduction and a Tmax extension. For example, the Cmax reduction can be about 10%, 20%, 30%, 40% or 50%. In certain embodiments, the Tmax range can be extended by about 20%, 30%, 40%, 50%, 60%, 80%, 100%, 120%, 140%, or 160%. The absorption of active through composition-mucosal contact may be 100%. In certain embodiments, the absorption through composition-mucosal contact may be less than 100%. For example, in certain embodiments, the absorption through the oral or nasal mucosa can be approximately less than 90%. It can be approximately less than 80%, less than 70%, less than 60%, less than 50%, less than 40%, less than 30%, less than 20% or less than 10%. In certain embodiments, the absorption through the oral or nasal mucosa can be approximately greater than 10%, greater than 20%, greater than 30%, greater than 40%, greater than 50%, greater than 60%, greater than 70%, greater than 80%, or greater than 90%.

As a spray, the composition can include a solvent. The solvent can be amenable to application to a mucosal membrane. The solvent can be an alcohol, for example, ethanol, propyl alcohol, butyl alcohol, pentanol, benzyl alcohol, or any isomers or combinations thereof. The ethanol can be dehydrated enthanol. The composition can include up to 50% (w/v) alcohol, for example, 10% to 24% (w/v).

Diazepam nasal spray (DNS) is a novel formulation that incorporates diazepam in a manner that is compact, portable and designed to be easily administered, with a pharmacokinetic profile comparable to rectally administered diazepam, but with nasal delivery. Nasal delivery refers to the fact that the active ingredient is delivered through nasal routes. An effective dose is defined as the amount of a drug that is sufficient to achieve the desired clinical improvement. The surprising result is that the nasal delivery results in a food effect, resulting in absorption of some drug in areas other than the nasal cavity.

A benzodiazepine drug can be administered with a monomodal delivery profile. In other embodiments, diazepam can also be administered with a multimodal delivery profile. The benzodiazepine drug can be administered with at least a bimodal delivery profile.

A benzodiazepine drug can include alprazolam, brotizolam, chlordiazepoxide, clobazam, clonazepam, clorazepam, demoxazepam, diazepam, flumazenil, flurazepam, halazepam, midazolam, nordazepam, medazepam, nitrazepam, oxazepam, lorazepam, prazepam, quazepam, triazolam, temazepam, loprazolam, or any pharmaceutically-acceptable salts thereof, and any combinations thereof. The composition can include 1 to 40% (w/v) benzodiazepine drug, for example, 5% to 30% (w/v) benzodiazepine drug. The composition can be dispensed as a spray having a volume of 0.025, 0.05, 0.075, 0.1, 0.125, 0.150, 0.2, or 0.25 mL per spray (or puff or spray actuation). The active content per spray (single dose) can be 1 mg, 1.25 mg, 1.5 mg, 1.75 mg, 2 mg, 2.25 mg, 2.75 mg, 3 mg, 3.25 mg, 3.5 mg, 3.75 mg, 4 mg, 4.25 mg, 4.5 mg, 4.75 mg, 5 mg, 5.25 mg, 5.5 mg, 5.75 mg, 6 mg, 6.25 mg, 6.5 mg, 6.75 mg, 7 mg, 7.25 mg, 7.5 mg, 7.75 mg, 8 mg, 9 mg, 10 mg, 12 mg, 14 mg, 16 mg, 18 mg, 20 mg, 22 mg, 24 mg, 25 mg, 26 mg, 28 mg, 30 mg, 32 mg, 34 mg, 36 mg, 38 mg, or 40 mg.

In certain embodiments, administering a benzodiazepine drug includes spraying a first dose of a pharmaceutical formulation including a benzodiazepine drug in one or more nostrils of the subject. The first dose can be a first effective dose. In certain embodiments, a first effective does can be administered in a single nostril. In other embodiments, a pharmaceutical formulation can be separately administered in both nostrils to deliver a first effective dose.

In certain embodiments, a second dose can be a second effective dose. In certain embodiments, administering benzodiazepine drug includes spraying a second dose of a pharmaceutical formulation including a benzodiazepine drug in one or more nostrils of the subject. In certain embodiments, a second effective dose can be administered in a single nostril. In other embodiments, a pharmaceutical formulation can be separately administered in both nostrils to deliver a second effective dose. The second dose can be to a subject in a fed state or an unfed state, or in a level of a fed state. If the subject is no longer in a fed state, the second dose can be efficacious at a dose level different from the first dose.

Further doses can be administered and delivered in a similar manner to the first and second effective dose.

In certain embodiments, the effective dose of the benzodiazepine drug being at least 5% higher than a non-fed state effective dose for the patient.

In certain embodiments, the first dose contains the concentration of the benzodiazepine drug that is at least 5% higher than a non-fed state effective dose for the subject. In certain embodiments, administering the first dose and the second dose together contain the concentration of the benzodiazepine drug that is at least 10% higher than a non-fed state effective dose for the subject.

In certain embodiments, administering the first dose and the second dose together contain the concentration of the benzodiazepine drug that is higher than a non-fed state effective dose for the subject. In certain embodiments, the concentration of the benzodiazepine drug is at least 15% higher than a non-fed state effective dose for the subject.

A treatment cycle is a period of treatment, followed by a period of rest, which can be repeated on a regular basis. In certain embodiments, a first effective dose can be administered in one nostril in the same treatment cycle. In certain embodiments, a first effective dose can be administered in more than one nostril in the same treatment cycle. In certain embodiments, a first effective dose can be administered in each nostril in separate treatment cycles.

The absorption of diazepam through the mucosa can be governed by several factors including the ability of the molecule to permeate and traverse the oral mucosa to reach the systemic or vascular system. Despite significant improvements to the permeation rate, through the incorporation of a penetration enhancer into the formulation, only a portion of the diazepam is delivered transmucosally. The remainder of the diazepam is washed away through salivary flow or swallowed and drains into the other mucosal areas such as the pharyngeal, esophogeal and gastrointestinal tract where it is absorbed into the body, for example, by a transpharyngeal, transesophogeal or transgastrointestinal mechanism. The combination of one or more of these absorption routes allows a composition such as a spray to deliver faster diazepam blood levels than can be achieved orally alone but due to the high oral bioavailability, also ensures a complete dose is delivered upon every application. The swallowed portion of the diazepam however is also exposed to variations in the absorption rate due to a well-known food effect during oral administration.

When delivered by the nasal route, diazepam nasal spray (DNS) is expected to be absorbed quickly and completely via the nasal mucosa. However, when the nasal spray was dosed, it was unexpectedly shown to be absorbed in a way that was significantly affected by food. Therefore, showing a substantial and unexpected food effect.

Onset of absorption can be as rapid as about 15 min or less and Tmax can also be observed in the range of about 1 hr to 1.5 hours for example. However, after a moderate fat meal, onset of absorption can be delayed to approximately 45 min and Tmax is delayed to about 2-3 hours. Along with the delay in absorption comes a reduction in Cmax as absorption is spread out over a longer duration of time. The Cmax is reported to decrease by approximately 28% after a moderate fat meal.

The recommended DBF (diazepam buccal film) or DNS (diazepam nasal spray) dose for each weight class as defined in the DRG label was selected (1) to provide a dose sufficiently high to ensure that the predicted median of the resulting diazepam Cmax following a moderate fat or high fat meal was similar to the median Cmax following the labeled dose of Diastat rectal gel, and (2) to provide a dose for which the predicted median of the resulting diazepam Cmax under fasting conditions would not exceed the median Cmax values observed and demonstrated as safe in studies with DBF or DNS. It was demonstrated that the predicted median diazepam Cmax values with the proposed regimen administered under fasting conditions did not meaningfully exceed the median Cmax values observed in the 104 healthy volunteers (adult men and women) who received DBF 15 mg under fasting conditions in Phase 1 studies conducted by Aquestive. The median Cmax among these 104 healthy subjects (127 DBF administrations) was 467 ng/mL. Under conditions of a moderate fat meal, the proposed DBF dosing regimen produces a Cmax similar to the Cmax expected following the corresponding labeled dose of Diastat rectal gel (DRG). Ultimately, high and low dose formulations were tested in pilot clinical trials against DRG at 5 mg and 20 mg strengths. The results showed excellent agreement between the 5 mg DBF and 5 mg DRG and also supported dose proportionality between the 20 mg DBF and 5 mg DBF. This is in contrast to the lack of proportionality between the 5 mg DRG to the 20 mg DRG as shown in FIG. 1C. The 20 mg DBF was predicated to achieve about 367 ng/ml, but unexpectedly achieved over 600 ng/ml, or over 180% of the Target Cmax.

Unexpectedly, DBF can reach a therapeutic window within 1 hour or less. In certain conditions, DBF can reach a therapeutic window within 45 minutes, within 30 minutes, within 15 minutes, within 10 minutes, or within 5 minutes or less. In certain conditions, DBF can reach a therapeutic window in 5 minutes or more. In certain conditions, DBF can reach a therapeutic window in greater than 10 minutes, greater than 15 minutes, greater than 30 minutes, or greater than 45 minutes. In a therapeutic window for DBF, blood levels of no less than 100 ng/ml, 90 ng/ml, 80 ng/ml, 70 ng/ml, 60 ng/ml, 50 ng/ml, 40 ng/ml, 30 ng/ml. 20 ng/ml, or 10 ng/ml DBF can be observed. In certain embodiments, a therapeutic window for DBF results in blood levels of no more than 10 ng/ml, 20 ng/ml, 30 ng/ml, 40 ng/ml, 50 ng/ml, 60 ng/ml, 70 ng/ml, 80 ng/ml. 90 ng/ml, or 100 ng/ml DBF can be observed.

In addition, 17.5 mg DBF unexpectedly delivers same bioavailability as DRG. Moreover, 17.5 mg DBF was also found unexpectedly deliver the same Cmax under moderate fat conditions, as 20 mg DRG.

DBF differed from DRG in the following respects (1) DBF exhibited higher bioavailability than DRG; (2) The PK behavior of DBF was linear. Specifically, for DBF both Cmax and AUC increased in proportion to the dose. In contrast, the PK behavior of DRG was not linear. Specifically, for DRG, Cmax increased with dose to a degree that was less than dose-proportional, whereas AUC increased in proportion to the dose. (3) DBF exhibited a food effect (~45% reduction on average in Cmax after a high fat meal and ~33% reduction on average after a moderate fat meal with no change in AUC). In contrast, it is assumed that DRG, because of its rectal route of administration, is not affected by food. There can be less intersubject variability with a transmucosal or transbuccal film as compared to a rectally delivered Diastat gel.

Applicants used population PK modeling to select a dosing regimen to compensate for the differences in PK between DBF and DRG as shown in the chart below.

| Body Weight (kg) | DRG Dose (mg) | DBF Dose (mg) |
|---|---|---|
| 14 to 25 | 5 | 7.5 |
| 26 to 37 | 7.5 | 10 |
| 38 to 50 | 10 | 12.5 |
| 51 to 62 | 12.5 | 15 |
| 63 to 75 | 15 | 17.5 |
| 76 to 87 | 17.5 | 20 |
| ≥88 | 20 | 20 |

In brief, the recommended DBF dose corresponding to each weight class as defined in the Diastat rectal gel label was selected (1) to provide a dose sufficiently high to ensure that the predicted median of the resulting diazepam Cmax following a moderate fat meal was similar to the median Cmax following the labeled dose of Diastat rectal gel, and (2) to provide a dose for which the predicted median of the resulting diazepam Cmax under fasting conditions would not exceed the median Cmax values observed and demonstrated as safe in Phase 1 healthy volunteer studies with DBF. Simulations based on population PK modeling demonstrated that under conditions of a moderate fat meal, the proposed DBF dosing regimen produced for each weight class a Cmax similar to the Cmax expected following the labeled dose of Diastat rectal gel.

In another example, the dosing regime can be as indicated in the following charts:

| Weight (Kg) | DRG (mg) | DBF Weight-Adjusted (mg) |
|---|---|---|
| 14 to 25 | 5 | 5 |
| 26 to 38 | 7.5 | 7.5 |
| 38 to 50 | 10 | 10 |
| 51 to 62 | 12.5 | 12.5 |
| 63 to 75 | 15 | 15 |
| 76 to 87 | 17.5 | 15 |
| 88 to 111 | 20 | 17.5 |

| Weight (Kg) | DRG (mg) | DBF Weight-Adjusted (mg) |
|---|---|---|
| 14 to 25 | 5 | 5 |
| 26 to 38 | 7.5 | 7.5 |
| 38 to 50 | 10 | 10 |
| 51 to 62 | 12.5 | 12.5 |
| 63 to 75 | 15 | 15 |
| 76 to 87 | 17.5 | 17.5 |
| 88 to 111 | 20 | 17.5 |

| Weight (Kg) | DRG (mg) | DBF Weight-Adjusted (mg) |
|---|---|---|
| 14 to 25 | 5 | 5 |
| 26 to 38 | 7.5 | 7.5 |
| 38 to 50 | 10 | 10 |
| 51 to 62 | 12.5 | 15 |
| 63 to 75 | 15 | 15 |
| 76 to 87 | 17.5 | 17.5 |
| 88 to 111 | 20 | 17.5 |

| Weight (Kg) | DRG (mg) | DBF Weight-Adjusted (mg) |
|---|---|---|
| 14 to 25 | 5 | 5 |
| 26 to 38 | 7.5 | 10 |
| 38 to 50 | 10 | 10 |
| 51 to 62 | 12.5 | 15 |
| 63 to 75 | 15 | 15 |
| 76 to 87 | 17.5 | 17.5 |
| 88 to 111 | 20 | 17.5 |

| Weight (Kg) | DRG (mg) | DBF Weight-Adjusted (mg) |
|---|---|---|
| 14 to 25 | 5 | 5 |
| 26 to 38 | 7.5 | 10 |
| 38 to 50 | 10 | 12.5 |
| 51 to 62 | 12.5 | 15 |
| 63 to 75 | 15 | 15 |
| 76 to 87 | 17.5 | 17.5 |
| 88 to 111 | 20 | 17.5 |

| Weight (Kg) | DRG (mg) | DBF Weight-Adjusted (mg) |
|---|---|---|
| 14 to 25 | 5 | 5 |
| 26 to 38 | 7.5 | 10 |
| 38 to 50 | 10 | 12.5 |
| 51 to 62 | 12.5 | 15 |
| 63 to 75 | 15 | 17.5 |
| 76 to 87 | 17.5 | 17.5 |
| 88 to 111 | 20 | 20 |

| Weight (Kg) | DRG (mg) | DBF Weight-Adjusted (mg) |
|---|---|---|
| 14 to 25 | 5 | 7.5 |
| 26 to 38 | 7.5 | 10 |
| 38 to 50 | 10 | 12.5 |
| 51 to 62 | 12.5 | 15 |
| 63 to 75 | 15 | 17.5 |
| 76 to 87 | 17.5 | 17.5 |
| 88 to 111 | 20 | 20 |

Population pharmacokinetic modeling was used to model the pharmacokinetic profiles for DBF and Diastat rectal gel under fasted and fed conditions. The modeling can show acceptable profiles under fasting conditions, after a moderate fat meal, or after a high fat meal. The profiles can differ for male subjects and female subjects. Female subjects can have lower plasma concentrations. The method of treating a medical condition includes delivering 0.1-0.4 mg/kg of diazepam, for example, 0.1-0.3 mg/kg of diazepam.

In some embodiments, the dose can be lower than the comparable Diastat® rectal gel dose for a weight class of subject, for example, in the fasted state. In other embodiments, the dose can be higher than the comparable Diastat® rectal gel dose for a weight class of subject, for example, in the fed state.

Figure 1B:
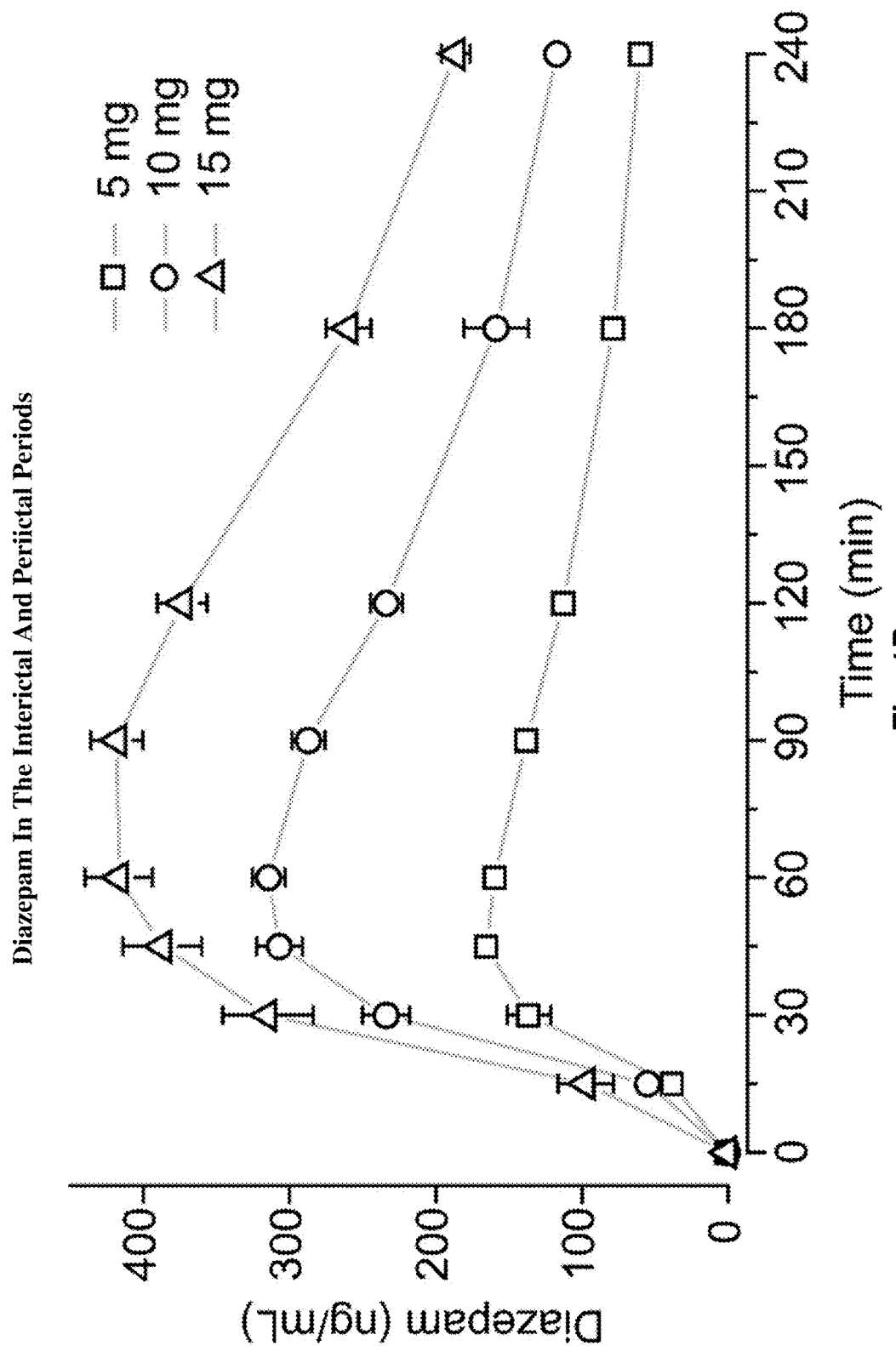
FIG. 1B shows the same study as FIG. 1A for plasma diazepam concentrations measured as a function of time.
Figure 1C:
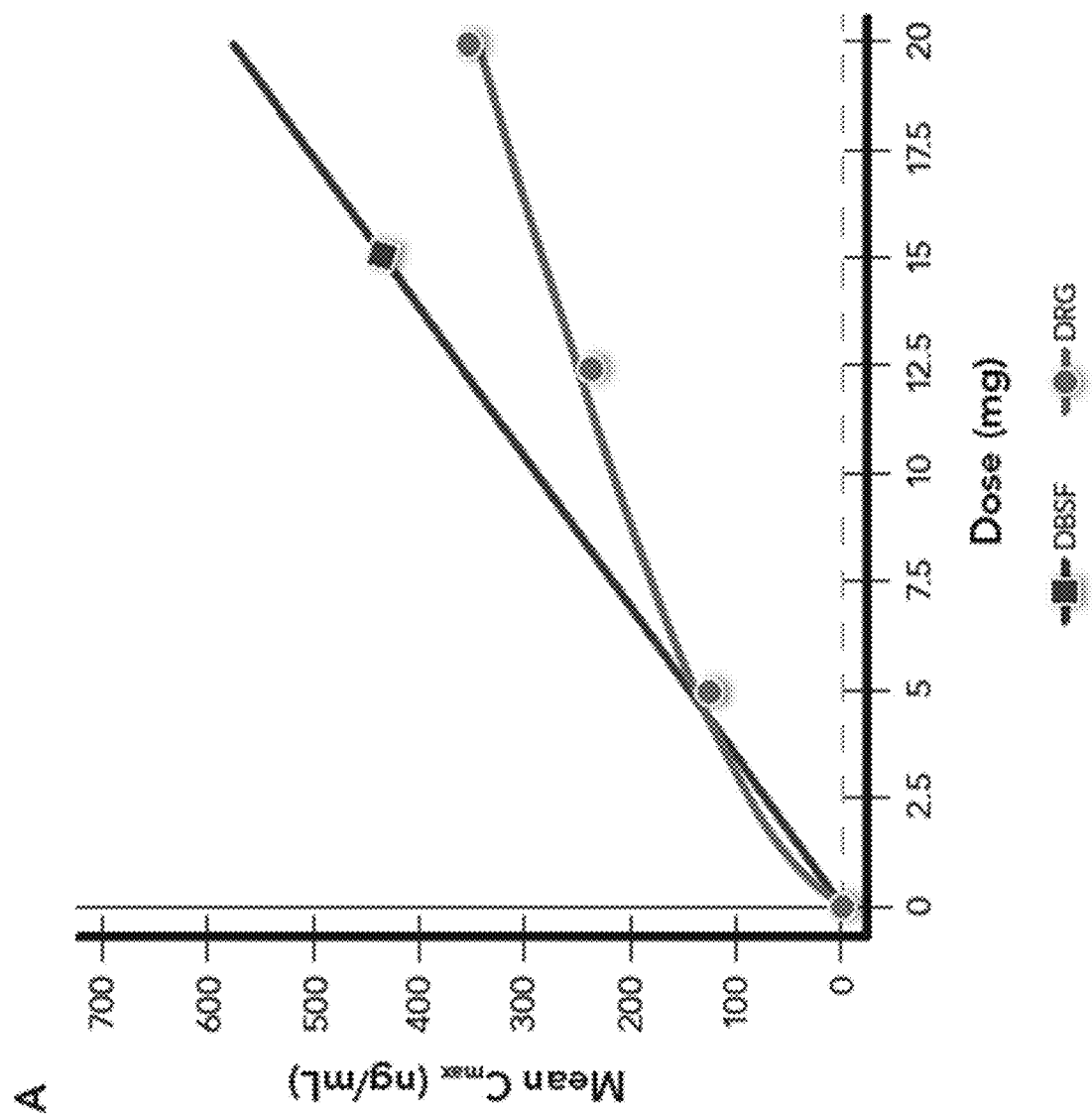
FIG. 1C shows a comparison of diazepam buccal film vs. diazepam rectal gel in Cmax as a function of nominal dose.
Figure 2:
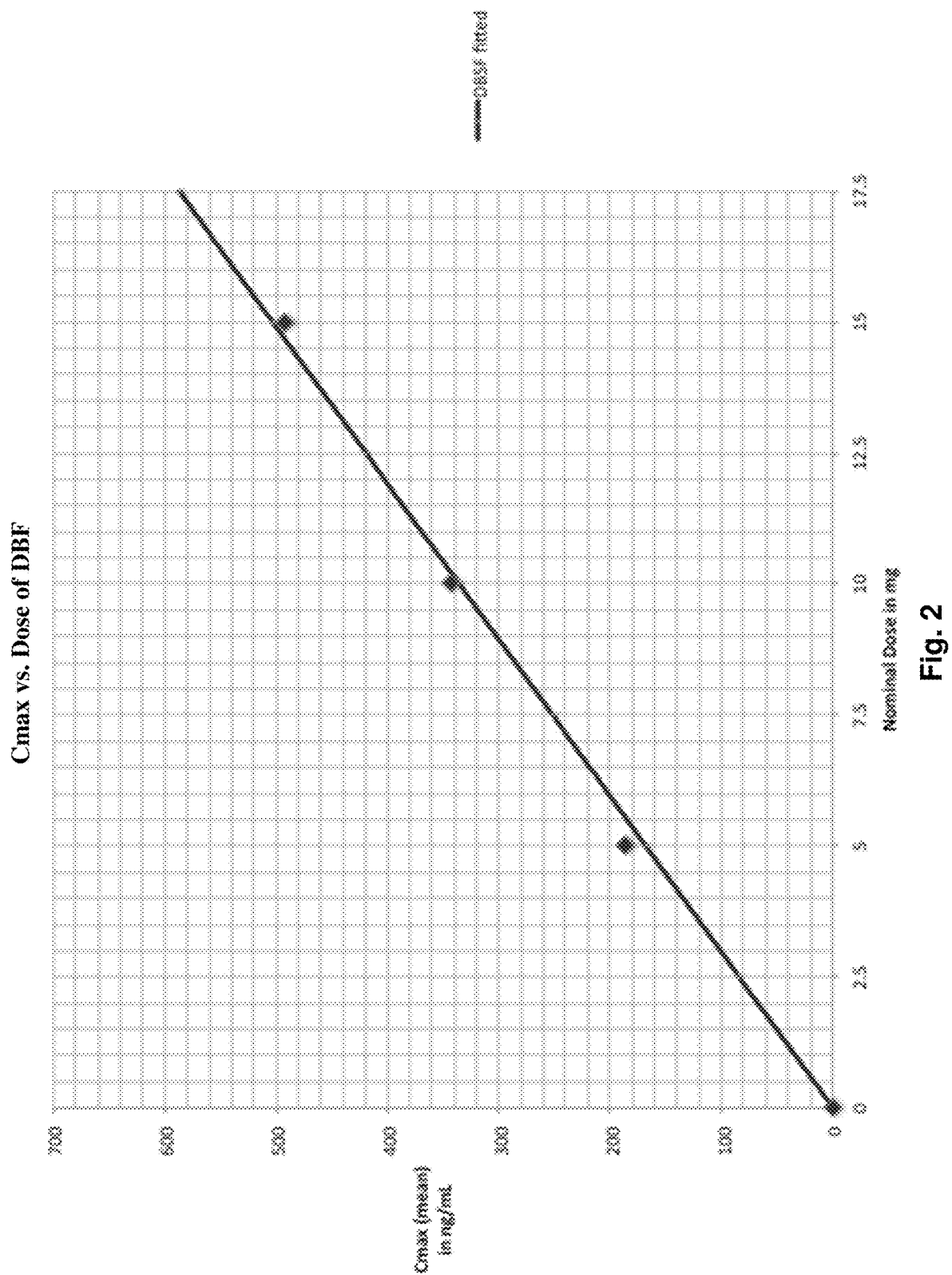
FIG. 2 shows a dose proportionality study that was performed across a 5 mg, 10 mg and 15 mg range for diazepam buccal film.

Referring to FIG. 1A and FIG. 1B (same study), plasma diazepam concentrations were measured in a single-dose, randomized, open-label, three-period, crossover study of diazepam buccal film (DBF) 5 mg, 10 mg, and 15 mg in 30 healthy adult male volunteers under fasting conditions. Data points represent mean±S.D. maximum plasma concentration (Cmax) and extrapolated area under the concentration-time curve from time zero to infinity (AUC0-inf). Best fit straight lines show that both values increase linearly with dose.

Referring to FIG. 1A, DBF doses of 5 mg to 15 mg exhibited rapid absorption and linear dose-proportional pharmacokinetics. By contrast, diazepam rectal gel showed sublinear dose-proportional pharmacokinetics for Cmax. Recent studies in animal models indicate that plasma diazepam concentrations in the range of 70 ng/ml are associated with an elevation in seizure threshold. See, e.g. Dhir A, Rogawski M A. Determination of minimal steady-state plasma level of diazepam causing seizure threshold elevation in rats. Epilepsia. 2018 May; 59(5):935-944. doi: 10.1111/epi.14069. Epub 2018 Apr. 6. PubMed PMID: 29682729; PubMed Central PMCID: PMC5934328, which is incorporated by reference in its entirety. At 15 min after application to the buccal mucosa, the mean plasma concentration following a 15 mg DBF dose exceeds this level (70 ng/ml).

Referring to FIG. 1B, Applicants found that there was no significant difference in the exposures to diazepam in the interictal and periictal periods, demonstrating adequate performance of DBF even when administered to the buccal mucosa in the period immediately after a seizure. Thirty healthy adult males ages 18-55, body weight 83.5±11.4 kg and BMI 26.7±2.2 kg/m2 (mean±S.D.), were administered single DBF doses containing 5 mg, 10 mg or 15 mg diazepam under fasting conditions in an open-label, 3-period, randomized sequence crossover study with 21 day washout between treatments. Referring to FIG. 1A, each subject received at least one DBF dose. Data points represent the mean±S.E.M. of 25 to 30 plasma concentration measurements during the 4-h period after dosing. Error bars are not shown when they are smaller than the size of the symbols.

The straight-line interpolated Cmax value for a 12.5 mg DBF dose in fasted healthy volunteers based on the data presented in FIG. 1A is 417 ng/mL, which is substantially greater than the geometric mean Cmax values obtained in the study with subjects with epilepsy. Diazepam is N-demethylated by CYP3A4 and CYP2C19 so that its clearance is increased by inducers of these isozymes. See, e.g., Riss J, Cloyd J, Gates J, Collins S. Benzodiazepines in epilepsy: pharmacology and pharmacokinetics. Acta Neurol Scand. 2008 August; 118(2):69-86. doi: 10.1111/j.1600-0404.2008.01004. x. Epub 2008 Mar. 31. Review. PubMed PMID: 18384456, which is incorporated by reference in its entirety. The lower than expected Cmax value obtained in subjects with epilepsy could be due in part to concomitant inducing antiseizure drugs taken by many of the subjects. There was also a reduced AUC0-inf consistent with CYP induction. Additional as yet undefined factors could also play a role in the reduced mean Cmax value in subjects with epilepsy, including an effect of food on the rate of drug absorption since subjects were not fasted.

The food effect observed after administration of DNS is significantly more pronounced than that expected. It is postulated that this is a result of the portion of the dose being absorbed through the buccal mucosa and a portion being absorbed orally. This portion of the dose is not subject to a food effect and therefore, in the fed state only a portion of the absorption profile is moved to longer times. The Cmax of the resulting profile which, under fasting conditions is a combination of both routes of absorption, is unexpectedly reduced because the portion orally absorbed is not only reduced due to the presence of the food, but the profile is decoupled from buccal absorption profile.

Permeation Enhancers

Solubility and permeability of the pharmaceutically active component in vivo, in particular, in the mouth of a subject, can vary tremendously. A particular class of permeation enhancer can improve the uptake and bioavailability of the pharmaceutically active component in vivo. In particular, when delivered to the mouth via a film, the permeation enhancer can improve the permeability of the pharmaceutically active component through the mucosa and into the blood stream of the subject. The permeation enhancer can improve absorption rate and amount of the pharmaceutically active component by more than 5%, more than 10%, more than 20%, more than 30%, more than 40%, more than 50%, more than 60%, more than 70%, more than 80%, more than 90%, more than 100%, more than 150%, about 200% or more, or less than 200%, less than 150%, less than 100%, less than 90%, less than 80%, less than 70%, less than 60%, less than 50%, less than 40%, less than 30%, less than 20%, less than 10%, or less than 5%, or a combination of these ranges, depending on the other components in the composition. Examples of suitable permeation enhancers are shown, for example, U.S. patent application Ser. No. 15/587,364 and U.S. patent application Ser. No. 15/791,249, each of which is incorporated by reference in its entirety.

In certain embodiments, a pharmaceutical composition has a suitable nontoxic, nonionic alkyl glycoside having a hydrophobic alkyl group joined by a linkage to a hydrophilic saccharide in combination with a mucosal delivery-enhancing agent selected from: (a) an aggregation inhibitory agent; (b) a charge-modifying agent; (c) a pH control agent; (d) a degradative enzyme inhibitory agent; (e) a mucolytic or mucus clearing agent; (f) a ciliostatic agent; (g) a membrane penetration-enhancing agent selected from: (i) a surfactant; (ii) a bile salt; (ii) a phospholipid additive, mixed micelle, liposome, or carrier; (iii) an alcohol; (iv) an enamine; (v) an NO donor compound; (vi) a long chain amphipathic molecule; (vii) a small hydrophobic penetration enhancer; (viii) sodium or a salicylic acid derivative; (ix) a glycerol ester of acetoacetic acid; (x) a cyclodextrin or beta-cyclodextrin derivative; (xi) a medium-chain fatty acid; (xii) a chelating agent; (xiii) an amino acid or salt thereof; (xiv) an N-acetylamino acid or salt thereof; (xv) an enzyme degradative to a selected membrane component; (ix) an inhibitor of fatty acid synthesis; (x) an inhibitor of cholesterol synthesis; and (xi) any combination of the membrane penetration enhancing agents recited in (i)-(x); (h) a modulatory agent of epithelial junction physiology; (i) a vasodilator agent; (j) a selective transport-enhancing agent; and (k) a stabilizing delivery vehicle, carrier, mucoadhesive, support or complex-forming species with which the compound is effectively combined, associated, contained, encapsulated or bound resulting in stabilization of the compound for enhanced transmucosal delivery, wherein the formulation of the compound with the transmucosal delivery-enhancing agents provides for increased bioavailability of the compound in blood plasma of a subject. Penetration enhancers have been described in J. Nicolazzo, et al., J. of Controlled Disease, 105 (2005) 1-15, which is incorporated by reference herein. An alkyl glycoside can be a dodecyl maltoside. The composition can include up to 1%, 0.5%, or 0.25% (w/v) of the alkyl glycoside.

Nasal Mucosa

Nasal drug administration has been used as an alternative route for the systemic availability of drugs due to the large surface area area, porous endothelial membrane, high total blood flow, the avoidance of first-pass metabolism, and ready accessibility. The drugs are cleared rapidly from the nasal cavity after intranasal administration, resulting in rapid, systemic drug absorption.

Conventionally, drugs delivered through the nasal cavity are expected to be absorbed through the nasal mucosa. However, the inventors discovered a way to deliver a benzodiazepine as a spray with a surprising food effect. For example, in certain embodiments, delivering the a benzodiazepine as a spray results in the effective dose of the benzodiazepine drug being at least 5% higher than a non-fed state effective dose for the patient. For example, the effective dose of the benzodiazepine drug is at least 8%, 10%, 20%, or 25% higher than a non-fed state effective dose for the patient. In other examples, the concentration of the benzodiazepine drug can be at least 50% higher than a non-fed state effective dose for the patient. In certain embodiments, the concentration of the benzodiazepine drug can be at least 60% higher than a non-fed state effective dose for the patient. In certain embodiments, the first dose contains the concentration of the benzodiazepine drug that is at least 40% higher than a non-fed state effective dose for the subject. In certain embodiments, the treatment achieves bioavailability that is from about 40 to 125% of that achieved with the same benzodiazepine administered intravenously.

Oral Mucosa

There are many reasons why the oral mucosa might be an attractive site for the delivery of therapeutic agents into the systemic circulation. Due to the direct drainage of blood from the buccal epithelium into the internal jugular vein first-pass metabolism in the liver and intestine may be avoided. First-pass effect can be a major reason for the poor bioavailability of some compounds when administered orally. Additionally, the mucosa lining in the oral cavity is easily accessible, which ensures that a dosage form can be applied to the required site and can be removed easily in the case of an emergency. However, like the skin, the buccal mucosa acts as a barrier to the absorption of xenobiotics, which can hinder the permeation of compounds across this tissue. The presence of no or little oral irritation is also a factor that is important when utilizing a transmucosal delivery system. Consequently, the identification of safe and effective penetration enhancers has become a major goal in the quest to improve oral mucosal drug delivery.

Permeation Enhancers

Chemical penetration enhancers are substances that control the permeation rate of a coadministered or sequentially administered drug through a biological membrane. While extensive research has focused on obtaining an improved understanding of how penetration enhancers might alter intestinal and transdermal permeability, far less is known about the mechanisms involved in mucosal penetration enhancement.

The buccal mucosa delineates the inside lining of the cheek as well as the area between the gums and upper and lower lips and it has an average surface area of 100 $cm^2$. The surface of the buccal mucosa consists of a stratified squamous epithelium which is separated from the underlying connective tissue (lamina propria and submucosa) by an undulating basement membrane (a continuous layer of extracellular material approximately 1-2 μm in thickness). This stratified squamous epithelium consists of differentiating layers of cells which change in size, shape, and content as they travel from the basal region to the superficial region, where the cells are shed. There are approximately 40-50 cell layers, resulting in a buccal mucosa which is 500-600 μm thick.

Structurally the sublingual mucosa is comparable to the buccal mucosa but the thickness of this epithelium is 100-200 μm. This membrane is also non-keratinised and being relatively thinner has been demonstrated to be more permeable than buccal mucosa. Blood flow to the sublingual mucosal is slower compared with the buccal mucosa and is of the order of 1.0 $ml/min^{-1}/cm^{-2}$. However, the salivary flow to the sublingual region is greater than the buccal mucosa thereby offering challenges that can prematurely cause dilution and subsequent swallowing of the drug before it can penetrate the sublingual mucosa.

The permeability of the buccal mucosa is greater than that of the skin, but less than that of the intestine. The differences in permeability are the result of structural differences between each of the tissues. The absence of organized lipid lamellae in the intercellular spaces of the buccal mucosa results in greater permeability of exogenous compounds, compared to keratinized epithelia of the skin; while the increased thickness and lack of tight junctions results in the buccal mucosa being less permeable than intestinal tissue.

The primary barrier properties of the buccal mucosa have been attributed to the upper one-third to one-quarter of the buccal epithelium. Researchers have learned that beyond the surface epithelium, the permeability barrier of nonkeratinized oral mucosa could also be attributed to contents extruded from the membrane-coating granules into the epithelial intercellular spaces.

The intercellular lipids of the nonkeratinized regions of the oral cavity are of a more polar nature than the lipids of the epidermis, palate, and gingiva, and this difference in the chemical nature of the lipids may contribute to the differences in permeability observed between these tissues. Consequently, it appears that it is not only the greater degree of intercellular lipid packing in the stratum corneum of keratinized epithelia that creates a more effective barrier, but also the chemical nature of the lipids present within that barrier.

Paracellular and Transcellular Transport

The existence of hydrophilic and lipophilic regions in the oral mucosa has led researchers to postulate the existence of two routes of drug transport through the buccal mucosa which are paracellular (between the cells) and transcellular (across the cells).

Since drug delivery through the buccal mucosa is limited by the barrier nature of the epithelium and the area available for absorption, various enhancement strategies are required in order to deliver therapeutically relevant amounts of drug to the systemic circulation. Various methods, including the use of chemical penetration enhancers, more permeable prodrugs, and physical methods, may be employed to overcome the barrier properties of the buccal mucosa.

A chemical penetration enhancer, or absorption promoter, is a substance added to a pharmaceutical formulation in order to increase the membrane permeation or absorption rate of the coadministered drug, without damaging the membrane and/or causing toxicity. There have been many studies investigating the effect of chemical penetration enhancers on the delivery of compounds across the skin, nasal mucosa, and intestine. In recent years, more attention has been given to the effect of these agents on the permeability of the buccal mucosa. Since permeability across the buccal mucosa is considered to be a passive diffusion process the steady state flux (Jss) should increase with increasing donor chamber concentration (CD) according to Fick's first law of diffusion.

Surfactants, Bile Salts and Other Permeation Enhancers

Surfactants and bile salts have been shown to enhance the permeability of various compounds across the oral mucosa, both in vitro and in vivo. Aromatic and aliphatic alcohols, for example, benzyl alcohol, can enhance the permeability of various compounds across the oral mucosa, both in vitro and in vivo. The data obtained from these studies strongly suggest that the enhancement in permeability is due to an effect of the surfactants on the mucosal intercellular lipids. The permeation enhancers can be applied in an oral mucosa, e.g. in buccal or sublingual administration. A permeation enhancer can be a synthetic compound. In certain embodiments, a permeation enhancer can be a biosynthetic compound. In certain embodiments, a permeation enhancer can be a natural compound. In other embodiments, a permeation enhancer can include a combination of compounds from one or more of these categories of compounds. A composition can include up to 40% (w/v), for example, 1% to 30% (w/v) benzyl alcohol.

Fatty acids have been shown to enhance the permeation of a number of drugs through the skin, and this has been shown by differential scanning calorimetry and Fourier transform infrared spectroscopy to be related to an increase in the fluidity of intercellular lipids.

Additionally, pretreatment with ethanol has been shown to enhance the permeability of tritiated water and albumin across ventral tongue mucosa, and to enhance caffeine permeability across porcine buccal mucosa. There are also several reports of the enhancing effect of Azone® on the permeability of compounds through oral mucosa. Further, chitosan, a biocompatible and biodegradable polymer, has been shown to enhance drug delivery through various tissues, including the intestine and nasal mucosa.

Oral transmucosal drug delivery (OTDD) is the administration of pharmaceutically active agents through the oral mucosa to achieve systemic effects. Permeation pathways and predictive models for OTDD are described, e.g. in M. Sattar, Oral transmucosal drug delivery—Current status and future prospects, *Int'l. Journal of Pharmaceutics*, 47(2014) 498-506, which is incorporated by reference herein. OTDD continues to attract the attention of academic and industrial scientists. Despite limited characterization of the permeation pathways in the oral cavity compared with skin and nasal routes of delivery, recent advances in our understanding of the extent to which ionized molecules permeate the buccal epithelium, as well as the emergence of new analytical techniques to study the oral cavity, and the progressing development of in silico models predictive of buccal and sublingual permeation, prospects are encouraging.

In order to deliver broader classes of drugs across the buccal mucosa, reversible methods of reducing the barrier potential of this tissue should be employed. This requisite has fostered the study of penetration enhancers that will safely alter the permeability restrictions of the buccal mucosa. It has been shown that buccal penetration can be improved by using various classes of transmucosal and transdermal penetration enhancers such as bile salts, surfactants, fatty acids and their derivatives, chelators, cyclodextrins and chitosan. Among these chemicals used for the drug permeation enhancement, bile salts are the most common.

In vitro studies on enhancing effect of bile salts on the buccal permeation of compounds is discussed in Sevda Senel, Drug permeation enhancement via buccal route: possibilities and limitations, *Journal of Controlled Release* 72 (2001) 133-144, which is incorporated by reference herein. That article also discusses recent studies on the effects of buccal epithelial permeability of dihydroxy bile salts, sodium glycodeoxycholate (SGDC) and sodium taurodeoxycholate (TDC) and tri-hydroxy bile salts, sodium glycocholate (GC) and sodium taurocholate (TC) at 100 mM concentration including permeability changes correlated with the histological effects. Fluorescein isothiocyanate (FITC), morphine sulfate were each used as the model compound. Chitosan has also been shown to promote absorption of small polar molecules and peptide/protein drugs through nasal mucosa in animal models and human volunteers. Other studies have shown an enhancing effect on penetration of compounds across the intestinal mucosa and cultured Caco-2 cells.

The permeation enhancer can be a phytoextract. A phytoextract can be an essential oil or composition including essential oils extracted by distillation of the plant material. In certain circumstances, the phytoextract can include synthetic analogues of the compounds extracted from the plant material (i.e., compounds made by organic synthesis). The phytoextract can include a phenylpropanoid, for example, phenyl alanine, eugenol, eugenol acetate, a cinnamic acid, a cinnamic acid ester, a cinnamic aldehyde, a hydrocinnamic acid, chavicol, or safrole, or a combination thereof. The phytoextract can be an essential oil extract of a clove plant, for example, from the leaf, stem or flower bud of a clove plant. The clove plant can be *Syzygium aromaticum*. The phytoextract can include 20-95% eugenol, including 40-95% eugenol, including 60-95% eugenol, and for example, 80-95% eugenol. The extract can also include 5% to 15% eugenol acetate. The extract can also include caryophyllene. The extract can also include up to 2.1% α-humulen. Other volatile compounds included in lower concentrations in clove essential oil can be β-pinene, limonene, farnesol, benzaldehyde, 2-heptanone and ethyl hexanoate. Other permeation enhancers may be added to the composition to improve absorption of the drug. Suitable permeation enhancers include natural or synthetic bile salts such as sodium fusidate; glycocholate or deoxycholate and their salts; fatty acids and derivatives such as sodium laurate, oleic acid, oleyl alcohol, monoolein, and palmitoylcarnitine; chelators such as disodium EDTA, sodium citrate and sodium lauryl sulfate, azone, sodium cholate, sodium 5-methoxysalicylate, sorbitan laurate, glyceryl monolaurate, octoxynonyl-9, laureth-9, polysorbates, sterols, or glycerides, such as caprylocaproyl polyoxylglycerides, e.g., Labrasol. The permeation enhancer can include phytoextract derivatives and/or monolignols. The permeation enhancer can also be a fungal extract.

Some natural products of plant origin have been known to have a vasodilatory effect. There are several mechanisms or modes by which plant-based products can evoke vasodilation. For review, see McNeill J. R. and Jurgens, T. M., Can. J. Physiol. Pharmacol. 84:803-821 (2006), which is incorporated by reference herein. Specifically, vasorelaxant effects of eugenol have been reported in a number of animal studies. See, e.g., Lahlou, S., et al., J. Cardiovasc. Pharmacol. 43:250-57 (2004), Damiani, C. E. N., et al., Vascular Pharmacol. 40:59-66 (2003), Nishijima, H., et al., Japanese J. Pharmacol. 79:327-334 (1998), and Hume W. R., J. Dent Res. 62(9):1013-15 (1983), each of which is incorporated by reference herein. Calcium channel blockade was suggested to be responsible for vascular relaxation induced by a plant essential oil, or its main constituent, eugenol. See, Interaminense L. R. L. et al., Fundamental & Clin. Pharmacol. 21: 497-506 (2007), which is incorporated by reference herein.

Fatty acids can be used as inactive ingredients in drug preparations or drug vehicles. Fatty acids can also be used as formulation ingredients due to their certain functional effects and their biocompatible nature. Fatty acid, both free and as part of complex lipids, are major metabolic fuel (storage and transport energy), essential components of all membranes and gene regulators. For review, see Rustan A. C. and Drevon, C. A., Fatty Acids: Structures and Properties, Encyclopedia of Life Sciences (2005), which is incorporated by reference herein. There are two families of essential fatty acids that are metabolized in the human body: ω-3 and ω-6 polyunsaturated fatty acids (PUFAs). If the first double bond is found between the third and the fourth carbon atom from the w carbon, they are called ω-3 fatty acids. If the first double bond is between the sixth and seventh carbon atom, they are called ω-6 fatty acids. PUFAs are further metabolized in the body by the addition of carbon atoms and by desaturation (extraction of hydrogen). Linoleic acid, which is a ω-6 fatty acid, is metabolized to γ-linolenic acid, dihomo-γ-linolinic acid, arachidonic acid, adrenic acid, tetracosatetraenoic acid, tetracosapentaenoic acid, docosapentaenoic acid, a-linolenic acid, which is a ω-3 fatty acid is metabolized to octadecatetraenoic acid, eicosatetraenoic acid, eicosapentaenoic acid (EPA), docosapentaenoic acid, tetracosapentaenoic acid, tetracosahexaenoic acid and docosahexaenoic acid (DHA).

It has been reported that fatty acids, such as palmitic acid, oleic acid, linoleic acid and eicosapentaenoic acid, induced relaxation and hyperpolarization of porcine coronary artery smooth muscle cells via a mechanism involving activation of the $Na^+K^+$-APTase pump and the fatty acids with increasing degrees of cis-unsaturation had higher potencies. See, Pomposiello, S. I. et al., Hypertension 31:615-20 (1998), which is incorporated by reference herein. Interestingly, the pulmonary vascular response to arachidonic acid, a metabolite of linoleic acid, can be either vasoconstrictive or vasodilative, depending on the dose, animal species, the mode of arachidonic acid administration, and the tones of the pulmonary circulation. For example, arachidonic acid has been reported to cause cyclooxygenase-dependent and -independent pulmonary vasodilation. See, Feddersen, C. O. et al., J. Appl. Physiol. 68(5):1799-808 (1990); and see, Spannhake, E. W., et al., J. Appl. Physiol. 44:397-495 (1978) and Wicks, T. C. et al., Circ. Res. 38:167-71 (1976), each of which is incorporated by reference herein.

Many studies have reported effects of EPA and DHA on vascular reactivity after being administered as ingestible forms. Some studies found that EPA-DHA or EPA alone suppressed the vasoconstrictive effect of norepinephrine or increased vasodilatory responses to acetylcholine in the forearm microcirculation. See, Chin, J. P. F, et al., Hypertension 21:22-8 (1993), and Tagawa, H. et al., J Cardiovasc Pharmacol 33:633-40 (1999), each of which is incorporated by reference herein. Another study found that both EPA and DHA increased systemic arterial compliance and tended to reduce pulse pressure and total vascular resistance. See, Nestel, P. et al., Am J. Clin. Nutr. 76:326-30 (2002), which is incorporated by reference herein. Meanwhile, a study found that DHA, but not EPA, enhanced vasodilator mechanisms and attenuates constrictor responses in forearm microcirculation in hyperlipidemic overweight men. See, Mori, T. A., et al., Circulation 102:1264-69 (2000), which is incorporated by reference herein. Another study found vasodilator effects of DHA on the rhythmic contractions of isolated human coronary arteries in vitro. See Wu, K.-T. et al., Chinese J. Physiol. 50(4):164-70 (2007), which is incorporated by reference herein.

Sequence of Permeation Enhancer(s) and Active Pharmaceutical Ingredient(s)

The arrangement, order, or sequence of penetration enhancer(s) and active pharmaceutical ingredient(s) (API(s)) delivered to the desired mucosal surface can vary in order to deliver a desired pharmacokinetic profile. For example, one can apply the permeation enhancer(s) first by a film, by swab, spray, gel, rinse or by a first layer of a film then apply the API(s) by single film, by swab, or by a second layer of a film. The sequence can be reversed or modified, for example, by applying the API(s) first by film, by swab, or by a first layer of a film, and then applying the permeation enhancer(s) by a film, by swab, spray, gel, rinse or by a second layer of a film. In another embodiment, one may apply a permeation enhancer(s) by a film, and a drug by a different film. For example, the permeation enhancer(s) film positioned under a film containing the API(s), or the film containing the API(s) positioned under a film containing the permeation enhancer(s), depending on the desired pharmacokinetic profile.

For example, the penetration enhancer(s) can be used as a pretreatment alone or in combination with at least one API to precondition the mucosa for further absorption of the API(s). The treatment can be followed by another treatment with neat penetration enhancer(s) to follow the at least one API mucosal application. The pretreatment can be applied as a separate treatment (film, gel, solution, swab etc.) or as a layer within a multilayered film construction of one or more layers. Similarly, the pretreatment may be contained within a distinct domain of a single film, designed to dissolve and release to the mucosa prior to release of the secondary domains with or without penetration enhancer(s) or API(s). The active ingredient may then be delivered from a second treatment, alone or in combination with additional penetration enhancer(s). There may also be a tertiary treatment or domain that delivers additional penetration enhancer(s) and/or at least one API(s) or prodrug(s), either at a different ratio relative to each other or relative to the overall loading of the other treatments. This allows a custom pharmacokinetic profile to be obtained. In this way, the product may have single or multiple domains, with penetration enhancer(s) and API(s) that can vary in mucosal application order, composition, concentration, or overall loading that leads to the desired absorption amounts and/or rates that achieve the intended pharmacokinetic profile and/or pharmacodynamic effect.

The film format can be oriented such that no distinct sides, or such that the film has at least one side of a multiple layer film where the edges are co-terminus (having or meeting at a shared border or limit).

The pharmaceutical composition can be a chewable or gelatin or lyophilized or inhalation based dosage form, spray, gum, gel, cream, tablet, capsule, liquid or film. The composition can include textures, for example, at the surface, such as microneedles or micro-protrusions. Recently, the use of micron-scale needles in increasing skin permeability has been shown to significantly increase transdermal delivery, including and especially for macromolecules. Most drug delivery studies have emphasized solid microneedles, which have been shown to increase skin permeability to a broad range of molecules and nanoparticles in vitro. In vivo studies have demonstrated delivery of oligonucleotides, reduction of blood glucose level by insulin, and induction of immune responses from protein and DNA vaccines. For such studies, needle arrays have been used to pierce holes into skin to increase transport by diffusion or iontophoresis or as drug carriers that release drug into the skin from a microneedle surface coating. Hollow microneedles have also been developed and shown to microinject insulin to diabetic rats. To address practical applications of microneedles, the ratio of microneedle fracture force to skin insertion force (i.e. margin of safety) was found to be optimal for needles with small tip radius and large wall thickness. Microneedles inserted into the skin of human subjects were reported as painless. Together, these results suggest that microneedles represent a promising technology to deliver therapeutic compounds into the skin for a range of possible applications. Using the tools of the microelectronics industry, microneedles have been fabricated with a range of sizes, shapes and materials. Microneedles can be, for example, polymeric, microscopic needles that deliver encapsulated drugs in a minimally invasive manner, but other suitable materials can be used.

Microneedles can be used to enhance the delivery of drugs through the oral mucosa, particularly with the claimed compositions. The microneedles create micron sized pores in the oral mucosa which can enhance the delivery of drugs across the mucosa. Solid, hollow or dissolving microneedles can be fabricated out of suitable materials including, but not limited to, metal, polymer, glass and ceramics. The microfabrication process can include photolithography, silicon etching, laser cutting, metal electroplating, metal electro polishing and molding. Microneedles could be solid which is used to pretreat the tissue and are removed before applying the film. The drug loaded polymer film described in this application can be used as the matrix material of the microneedles itself. These films can have microneedles or micro protrusions fabricated on their surface which will dissolve after forming microchannels in the mucosa through which drugs can permeate.

The term "film" can include films and sheets, in any shape, including rectangular, square, or other desired shape. A film can be any desired thickness and size. In preferred embodiments, a film can have a thickness and size such that it can be administered to a user, for example, placed into the oral cavity of the user. A film can have a relatively thin thickness of from about 0.0025 mm to about 0.250 mm, or a film can have a somewhat thicker thickness of from about 0.250 mm to about 1.0 mm. For some films, the thickness may be even larger, i.e., greater than about 1.0 mm or thinner, i.e., less than about 0.0025 mm. A film can be a single layer or a film can be multi-layered, including laminated or multiple cast films. A permeation enhancer and pharmaceutically active component can be combined in a single layer, each contained in separate layers, or can each be otherwise contained in discrete regions of the same dosage form. In certain embodiments, the pharmaceutically active component contained in the polymeric matrix can be dispersed in the matrix. In certain embodiments, the permeation enhancer being contained in the polymeric matrix can be dispersed in the matrix.

Oral dissolving films can fall into three main classes: fast dissolving, moderate dissolving and slow dissolving. Oral dissolving films can also include a combination of any of the above categories. Fast dissolving films can dissolve in about 1 second to about 30 seconds in the mouth, including more than 1 second, more than 5 seconds, more than 10 seconds, more than 20 seconds, or less than 30 seconds. Moderate dissolving films can dissolve in about 1 to about 30 minutes in the mouth including more than 1 minute, more than 5 minutes, more than 10 minutes, more than 20 minutes or less than 30 minutes, and slow dissolving films can dissolve in more than 30 minutes in the mouth. As a general trend, fast dissolving films can include (or consist of) low molecular weight hydrophilic polymers (e.g., polymers having a molecular weight between about 1,000 to 9,000 daltons, or polymers having a molecular weight up to 200,000 daltons). In contrast, slow dissolving films generally include high molecular weight polymers (e.g., having a molecular weight in millions). Moderate dissolving films can tend to fall in between the fast and slow dissolving films.

It can be preferable to use films that are moderate dissolving films. Moderate dissolving films can dissolve rather quickly, but also have a good level of mucoadhesion. Moderate dissolving films can also be flexible, quickly wettable, and are typically non-irritating to the user. Such moderate dissolving films can provide a quick enough dissolution rate, most desirably between about 1 minute and about 20 minutes, while providing an acceptable mucoadhesion level such that the film is not easily removable once it is placed in the oral cavity of the user. This can ensure delivery of a pharmaceutically active component to a user.

A pharmaceutical composition can include one or more pharmaceutically active components. The pharmaceutically active component can be a single pharmaceutical component or a combination of pharmaceutical components. The pharmaceutically active component can be an anti-inflammatory analgesic agent, a steroidal anti-inflammatory agent, an antihistamine, a local anesthetic, a bactericide, a disinfectant, a vasoconstrictor, a hemostatic, a chemotherapeutic drug, an antibiotic, a keratolytic, a cauterizing agent, an antiviral drug, an antirheumatic, an antihypertensive, a bronchodilator, an anticholinergic, an anti-anxiety drug, an anti-emetic compound, a hormone, a peptide, a protein or a vaccine. The pharmaceutically active component can be a pharmaceutically acceptable salt of a drug, a prodrug, a derivative, a drug complex or analog of a drug.

The term "prodrug" refers to a biologically inactive compound that can be metabolized in the body to produce a biologically active drug or the "prodrug" can be a biologically active compound where in addition to its inherent biological activity can be metabolized to another or even preferred biologically active drug. In certain embodiments, the prodrug can have its own biological activity that can be similar to or different from the active drug. For example, the prodrug can be an ester of epinephrine, for example, dipivefrin which is hydrolysed into epinephrine. See, e.g., J. Anderson, et al., Site of ocular hydrolysis of a prodrug, dipivefrin, and a comparison of its ocular metabolism with that of the parent compounds, epinephrine, *Invest., Ophthalmol. Vis. Sci.* July 1980. The prodrug can be a prodrug of benzodiazepines such as avizafone, which is a prodrug of diazepam. Another prodrug from the benzodiazepine chemical series, and within the scope of this invention, is ethyl loflazepate. Chemical derivatives, analogs or prodrugs of all benzodiazepines are all considered within the scope of this invention. In some embodiments, more than one pharmaceutically active component may be included in the film. The pharmaceutically active components can be ace-inhibitors, anti-anginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, amphetamines, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, uterine relaxants, anti-obesity drugs, erythropoietic drugs, anti-asthmatics, cough suppressants, mucolytics, DNA and genetic modifying drugs, diagnostic agents, imaging agents, dyes, or tracers, and combinations thereof. Suitable actives for use in the films herein include, but are not limited to, the following therapeutic classes: ace-inhibitor; adrenergic agent; adrenocortical steroid; adrenocortical suppressant; aldosterone antagonist; alkaloid; amino acid; anabolic; analeptic; analgesic; anesthetic; anorectic; anti-acne agent; anti-adrenergic; anti-allergic; anti-amebic; anti-anemic; anti-anginal; anti-anxiety; anti-arthritic; anti-arrythmia; anti-asthmatic; anti-atherosclerotic; anti-cholesterolemic; antibacterial; antibiotic; anticholinergic; anticoagulant; anticonvulsant; antidepressant; antidiabetic; antidiarrheal; antidiuretic; antidote; anti-emetic; anti-epileptic; antifibrinolytic; antifungal; antihemorrhagic; antihistamine; antihyperlipidemia; antihypertensive; antihypotensive; anti-infective (both systemic and non-systemic); anti-inflammatory; anti-lipid; antimanic; antimicrobial; antimigraine; antimitotic; antimycotic, antinauseant; antineoplastic; antineutropenic; antiobesity; antiparasitic; anti-parkinson; antiproliferative; antipsychotic; anti-pyretic; antirheumatic; antiseborrheic; antisecretory; antispasmodic; anti-stroke; antithrombotic; anti-thyroid; anti-tumor; anti-tussive; anti-ulcerative; antiuricemic; antiviral; appetite suppressant; appetite stimulant; biological response modifier; blood glucose regulator; blood modifier; blood metabolism regulator; bone resorption inhibitor; bronchodilator; cardiovascular agent; central nervous system stimulant; cerebral dilator; contraceptive; coronary dilator; cholinergic; cough suppressant; decongestant; depressant; diagnostic aid; dietary supplement; diuretic; dopaminergic agent; enzymes; estrogen receptor agonist; endometriosis management agent; expectorant; erectile dysfunction therapy; erythropoietic; ibrinolytic; fertility agent; fluorescent agent; free oxygen radical scavenger; gastric acid suppressant; gastrointestinal motility effector; genetic modifier; glucocorticoid; hair growth stimulant; hemostatic; histamine H2 receptor antagonists; homeopathic remedy; hormone; hypercalcemia management agent; hypocalcemia management agent; hypocholesterolemic; hypoglycemic; hypolipidemic; hypotensive; ion exchange resin; imaging agent; immunizing agent; immunomodulator; immunoregulator; immunostimulant; immunosuppressant; keratolytic; laxative; LHRH agonist; mood regulator; motion sickness preparation; mucolytic; muscle relaxant; mydriatic; nasal decongestant; neuromuscular blocking agent; neuroprotective; NMDA antagonist; non-hormonal sterol derivative; osteoporosis therapy; oxytocic; parasympatholytic; parasympathomimetic; plasminogen activator; platelet activating factor antagonist; platelet aggregation inhibitor; prostaglandin; psychotherapeutic; psychotropic; radioactive agent; respiratory agent; scabicide; sclerosing agent; sedative; sedative-hypnotic; selective adenosine Al antagonist; serotonin antagonist; serotonin inhibitor; serotonin receptor antagonist; smoking cessation therapy; steroid; stimulant; sympatholytic; terine relaxant; thyroid hormone; thyroid inhibitor; thyromimetic; tranquilizer; tremor therapy; amyotrophic lateral sclerosis agent; cerebral ischemia agent; Paget's disease agent; unstable angina agent; vasoconstrictor; vasodilator; weight management; wound healing agent; xanthine oxidase inhibitor; and combinations thereof.

Examples of actives suitable for use herein include antacids, H2-antagonists, and analgesics. For example, antacid dosages can be prepared using the ingredients calcium carbonate alone or in combination with magnesium hydroxide, and/or aluminum hydroxide. Moreover, antacids can be used in combination with H2-antagonists.

Analgesics include opiates and opiate derivatives, such as oxycodone (commercially available as Oxycontin®); ibuprofen (commercially available as Motrin®, Advil®, Motrin Children's®, Motrin IB®, Advil Children's®, Motrin Infants'®, Motrin Junior®, Ibu-2®, Proprinal®, Ibu-200®, Midol Cramp Formula®, Bufen®, Motrin Migraine Pain®, Addaprin® and Haltran®), aspirin (commercially available as Empirin®, Ecotrin®, Genuine Bayer®, and Halfprin®), acetaminophen (commercially available as Silapap Infant's®, Silapap Children's®, Tylenol®, Tylenol Children's®, Tylenol Extra Strength®, Tylenol Infants' Original®, Tylenol Infants'®, Tylenol Arthritis®, T-Painol®, Q-Pap®, Cetafen®, Dolono®, Tycolene®, APAP® and Aminofen®), and combinations thereof that may optionally include caffeine. Other pain relieving agents may be used in the present invention, including meperidine hydrochloride (commercially available as Demerol®), capsaicin (commercially available as Qutenza®), morphine sulfate and naltrexone hydrochloride (commercially available as Embeda®), hydromorphone hydrochloride (commercially available as Dilaudid®), propoxyphene napsylate and acetaminophen (commercially available as Darvocet-N®), Fentanyl (commercially available as Duragesic®, Onsolis®, and Fentora®), sodium hyaluronate (commercially available as Euflexxa®), adalimumab (commercially available as Humira®), sumatriptan succinate (commercially available as Imitrex®), fentanyl iontophoretic (commercially available as Ionsys®), orphenadrine citrate (commercially available as Norgesic®), magnesium salicylate tetrahydrate (commercially available as Novasal®), oxymorphone hydrochloride (commercially available as Opana ER®), methocarbamol (commercially available as Robaxin®), carisoprodol (commercially available as Soma®), tramadol hydrochloride (commercially available as Ultracet® and Ultram®), morphine sulfate (commercially available as MS Contin®), metaxalone (commercially available as Skelaxin®), oxycodone hydrochloride (commercially available as OxyContin®), acetaminophen/oxycodone hydrochloride (commercially available as Percocet®), oxycodone/aspirin (commercially available as Percodan®), hydrocodone bitartrate/acetaminophen (commercially available as Vicodin®), hydrocodone bitartrate/ibuprofen (commercially available as Vicoprofen®), nepafenac (commercially available as Nevanac®), and pregabalin (commercially available as Lyrica®).

The films disclosed herein may further include agents such as NSAIDs, including etodolac (commercially available as Lodine®), ketorolac tromethamine (commercially available as Acular® or Acuvail®), naproxen sodium (commercially available as Anaprox®, Naprosyn®), flurbiprofen (commercially available as Ansaid®), diclofenac sodium/misoprostol (commercially available as Arthrotec®), celecoxib (commercially available as Celebrex®), sulindac (commercially available as Clinoril®), oxaprozin (commercially available as Daypro®), piroxicam (commercially available as Feldene®), indomethacin (commercially available as Indocin®), meloxicam (commercially available as Mobic®), mefenamic acid (commercially available as Ponstel®), tolmetin sodium (commercially available as Tolectin®), choline magnesium trisalicylate (commercially available as Trilisate®), diclofenac sodium (commercially available as Voltaren®), diclofenac potassium (commercially available as Cambia® or Zipsor®), and misoprostol (commercially available as Cytotec®). Opiate agonists and antagonists, such as buprenorphine and naloxone are further examples of drugs for use in the present invention.

Other drugs for other actives for use herein include anti-diarrheals such as loperamide (commercially available as Imodium AD®, Imotil®, Kaodene®, Imperim®, Diamode®, QC Anti-Diarrheal®, Health Care America Anti-Diarrheal®, Leader A-D®, and Imogen®), nitazoxanide (commercially available as Alinia®) and diphenoxylate hydrochloride/atropine sulfate (commercially available as Lomotil®), anti-histamines, anti-tussives, decongestants, vitamins, and breath fresheners. Common drugs used alone or in combination for colds, pain, fever, cough, congestion, runny nose and allergies, such as acetaminophen, ibuprofen, chlorpheniramine maleate, dextromethorphan, dextromethorphan HBr, phenylephrine HCl, pseudoephedrine HCl, diphenhydramine and combinations thereof, such as dextromethophan HBr and phenylephrine HCl (available as Triaminic®) may be included in the film compositions of the present invention.

Other actives useful herein include, but are not limited to, alcohol dependence treatment, such as acamprosate calcium (commercially available as Campral®); Allergy treatment medications, such as promethazine hydrochloride (commercially available as Phenergan®), bepotastine besilate (commercially available as Bepreve®), hydrocodone polistirex/chlorpheniramine polistirex (commercially available as Tussionex®), cetirizine hydrochloride (commercially available as Zyrtec®), cetirizine hydrochloride/pseudoephedrine hydrochloride (commercially available as Zyrtec-D®), promethazine hydrochloride/codeine phosphate (commercially available as Phenergan® with Codeine), pemirolast (commercially available as Alamast®), fexofenadine hydrochloride (commercially available as Allegra®), meclizine hydrochloride (commercially available as Antivert®), azelastine hydrochloride (commercially available as Astelin®), nizatidine (commercially available as Axid®), desloratadine (commercially available as Clarinex®), cromolyn sodium (commercially available as Crolom®), epinastine hydrochloride (commercially available as Elestat®), azelastine hydrochloride (commercially available as Optivar®), prednisolone sodium phosphate (commercially available as Orapred ODT®), olopatadine hydrochloride (commercially available as Patanol®), ketotifen fumarate (commercially available as Zaditor®), and montelukast sodium (commercially available as Singulair®); and anti-histamines such as diphenhydramine HCl (available as Benadryl®), loratadine (available as Claritin®), astemizole (available as Hismanal®), nabumetone (available as Relafen®), diphenydramine HCL (available as TheraFlu®) and clemastine (available as Tavist®).

Films of the present disclosure may further include Alzheimer's treatment medications, such as tacrine hydrochloride (commercially available as Cognex®), galantamine (commercially available as Razadyne®), donepezil hydrochloride (commercially available as Aricept®), rivastigmine tartrate (commercially available as Exelon®), caprylidene (commercially available as Axona®), and memantine (commercially available as Namenda®); anemia medication, such as cyanocobalamin (commercially available as Nascobal®) and ferumoxytol (commercially available as Feraheme®); anesthetics, such as antipyrine with benzocaine (commercially available as Auralgan®, Aurodex® and Auroto®); angina medication, such as amlodipine besylate (commercially available as Norvasc®), nitroglycerin (commercially available as Nitro-Bid®, Nitro-Dur®, Nitrolingual®, Nitrostat®, Transderm-Nitro®), isosorbide mononitrate (commercially available as Imdur®), and isosorbide dinitrate (commercially available as Isordil®); anti-tussives such as guaifensin; anti-Alzheimer's agents, such as nicergoline; and $Ca^H$-antagonists such as nifedipine (commercially available as Procardia® and Adalat®).

Actives useful in the present disclosure may also include anti-asthmatics, such as albuterol sulfate (commercially available as Proventil®), ipratropium bromide (commercially available as Atrovent®), salmeterol xinafoate (commercially available as Serevent®), zafirlukast (commercially available as Accolate®), flunisolide (commercially available as AeroBid®), metaproterenol sulfate (commercially available as Alupent®), albuterol inhalation (commercially available as Ventolin®), terbutaline sulfate (commercially available as Brethine®), formoterol (commercially available as Foradil®), cromolyn sodium (commercially available as Intal®), levalbuterol hydrochloride (commercially available as Xopenex®), zileuton (commercially available as Zyflo®), fluticasone propionate/salmeterol (commercially available as Advair®), albuterol sulfate/triamcinolone acetonide (commercially available as Azmacort®), dimethylxanthine (commercially available as Theophylline®), and beclomethasone (commercially available as Beclovent®, Beconase®, Qvar®, Vancenase®, Vanceril®); angioedema medication, such as Cl esterase Inhibitor (human) (commercially available as Berinert®) and ecallantide (commercially available as Kalbitor®); and antibacterial medications, such as trimethoprim/sulfamethoxazole (commercially available as Bactrim®), mupirocin (commercially available as Bactroban®), metronidazole (commercially available as Flagyl®), sulfisoxazole acetyl (commercially available as Gantrisin®), bismuth subsalicylate and metronidazole/tetracycline hydrochloride (commercially available as Helidac Therapy®), nitrofurantoin (commercially available as Macrodantin®), norfloxacin (commercially available as Noroxin®), erythromycin ethylsuccinate/Sulfisoxazole acetyl (commercially available as Pediazole®), and levofloxacin (commercially available as Levaquin®).

The films of the present disclosure may further include one or more antibiotics, including amoxicillin (commercially available as Amoxil®), ampicillin (commercially available as Omnipen®, Polycillin® and Principen®), amoxicillin/clavulanate potassium (commercially available as Augmentin®), moxifloxacin hydrochloride (commercially available as Avelox®), besifloxacin (commercially available as Besivance®), clarithromycin (commercially available as Biaxin®), ceftibuten (commercially available as Cedax®), cefuroxime axetil (commercially available as Ceftin®), cefprozil (commercially available as Cefzil®), ciprofloxacin hydrochloride (commercially available as Ciloxan® and Cipro®), clindamycin phosphate (commercially available as Cleocin T®), doxycycline hyclate (commercially available as Doryx®), dirithromycin (commercially available as Dynabac®), erythromycin (commercially available as E.E.S.®, E-Mycin®, Eryc®, Ery-Tab®, Erythrocin®, and PCE®), erythromycin topical (commercially available as A/T/S®, Erycette®, T-Stat®), gemifloxacin (commercially available as Factive®), ofloxacin (commercially known as Ocuflox®, Floxin®), telithromycin (commercially available as Ketek®), lomefloxacin hydrochloride (commercially available as Maxaquin®), minocycline hydrochloride (commercially available as Minocin®), fosfomycin tromethamine (commercially available as Monurol®), penicillin with potassium (commercially available as Penicillin VK®, Veetids®), trimethoprim (commercially available as Primsol®), ciprofloxacin hydrochloride (commercially available as Proquin XR®), rifampin, isoniazid and pyrazinamide (commercially available as Rifater®), cefditoren (commercially available as Spectracef®), cefixime (commercially available as Suprax®), tetracycline (commercially available as Achromycin V® and Sumycin®), tobramycin (commercially available as Tobrex®), rifaximin (commercially available as Xifaxan®), azithromycin (commercially available as Zithromax®), azithromycin suspension (commercially available as Zmax®), linezolid (commercially available as Zyvox®), benzoyl peroxide and clindamycin (commercially available as BenzaClin®), erythromycin and benzoyl peroxide (commercially available as Benzamycin®), dexamethasone (commercially available as Ozurdex®), ciprofloxacin and dexamethasone (commercially available as Ciprodex®), polymyxin B sulfate/neomycin sulfate/hydrocortisone (commercially available as Cortisporin®), colistin sulfate/neomycin sulfate/hydrocortisone acetate/thonzonium bromide (commercially available as Cortisporin-TC Otic®), cephalexin hydrochloride (commercially available as Keflex®), cefdinir (commercially available as Omnicef®), and gatifloxacin (commercially available as Zymar®).

Other useful actives include cancer treatment medications, including cyclophosphamide (commercially available as Cytoxan®), methotrexate (commercially available as Rheumatrex® and Trexal®), tamoxifen citrate (commercially available as Nolvadex®), bevacizumab (commercially available as Avastin®), everolimus (commercially available as Afinitor®), pazopanib (commercially available as Votrient®), and anastrozole (commercially available as Arimidex®); leukemia treatment, such as ofatumumab (commercially available as Arzerra®); anti-thrombotic drugs, such as antithrombin recombinant lyophilized powder (commercially available as Atryn®), prasugrel (commercially available as Efient®); anti-coagulants, such as aspirin with extended-release dipyridamole (commercially available as Aggrenox®), warfarin sodium (commercially available as Coumadin®), dipyridamole (commercially available as Persantine®), dalteparin (commercially available as Fragmin®), danaparoid (commercially available as Orgaran®), enoxaparin (commercially available as Lovenox®), heparin (commercially available as Hep-Lock, Hep-Pak, Hep-Pak CVC, Heparin Lock Flush), tinzaparin (commercially available as Innohep®), and clopidogrel bisulfate (commercially available as Plavix®); antiemetics, such as granisetron hydrochloride (commercially available as Kytril®) and nabilone (commercially available as Cesamet®), trimethobenzamide hydrochloride (commercially available as Tigan®), and ondansetron hydrochloride (commercially available as Zofran®); anti-fungal treatment, such as ketoconazole (commercially available as Nizoral®), posaconazole (commercially available as Noxafil®), ciclopirox (commercially available as Penlac®), griseofulvin (commercially available as Gris-PEG®), oxiconazole nitrate (commercially available as Oxistat®), fluconazole (commercially available as Diflucan®), sertaconazole nitrate (commercially available as Ertaczo®), terbinafine hydrochloride (commercially available as Lamisil®), ciclopirox (commercially available as Loprox®), nystatin/triamcinolone acetonide (commercially available as Mycolog-II®), econazole nitrate (commercially available as Spectazole®), itraconazole (commercially available as Sporanox®), and terconazole (commercially available as Terazol®).

Actives may further include anti-inflammatory medications, such as hydroxychloroquine sulfate (commercially available as Plaquenil®), fluticasone propionate (commercially available as Cutivate®), canakinumab (commercially available as Llaris®), amcinonide (commercially available as Cyclocort®), methylprednisolone (commercially available as Medrol®), budesonide (commercially available as Entocort ECC)), anakinra (commercially available as Kineret®), diflorasone diacetate (commercially available as Psorcon®), and etanercept (commercially available as Enbrel®); antispasmodic medication, such as phenobarbital/hyoscyamine sulfate/atropine sulfate/scopolamine hydrobromide (commercially available as Donnatal®); antiviral treatment, such as oseltamivir phosphate (commercially available as Tamiflu®); anti-parasites medication, including tinidazole (commercially available as Tindamax®); appetite treatment mediations, such as megestrol acetate (commercially available as Megace ESC)), phentermine hydrochloride (commercially available as Adipex-P®), and diethylpropion hydrochloride (commercially available as Tenuate®); arthritis medications, including leflunomide (commercially available as Arava®), certolizumab pegol (commercially available as Cimzia®), diclofenac sodium (commercially available as Pennsaid®), golimumab (commercially available as Simponi®), and tocilizumab (commercially available as Actemra®); bladder control medication, such as trospium chloride (commercially available as Sanctura®), desmopressin acetate (commercially available as DDAVP®), tolterodine tartrate (commercially available as Detrol®), oxybutynin chloride (commercially available as Ditropan® or Gelnique®), darifenacin (commercially available as Enablex®), and solifenacin succinate (commercially available as VESIcare®); blood vessel constrictors, such as methylergonovine maleate (commercially available as Methergine®); plasma uric managers, such as rasburicase (commercially available as Elitek®); iron deficiency anemia medications, such as ferumoxytol (commercially available as Feraheme®); lymphoma medications, such as pralatrexate (commercially available as Folotyn®), romidepsin (commercially available as Isodax®); malaria medication, such as artemether/lumefantrine (commercially available as Coartem®); hyponatremia medication, such as tolvatpan (commercially available as Samsca®); medication for treatment of von Willebrand disease (commercially available as Wilate®); anti-hypertension medications, such as treprostinil (commercially available as Tyvaso®), tadalafil (commercially available as Adcirca®); cholesterol lowering medication, including paricalcitol (commercially available as Altocor®), pitavastatin (commercially available as Livalo®), lovastatin, niacin (commercially available as Advicor®), colestipol hydrochloride (commercially available as Colestid®), rosuvastatin calcium (commercially available as Crestor®), fluvastatin sodium (commercially available as Lescol®), atorvastatin calcium (commercially available as Lipitor®), lovastatin (commercially available as Mevacor®), niacin (commercially available as Niaspan®), pravastatin sodium (commercially available as Pravachol®), pavastatin sodium with buffered aspirin (commercially available as Pravigard PAC®), cholestyramine (commercially available as Questran®), simvastatin and niacin (commercially available as Simcor®), atenolol, chlorthalidone (commercially available as Tenoretic®), atenolol (commercially available as Tenormin®), fenofibrate (commercially available as Tricor®), fenofibrate (commercially available as Triglide®), ezetimibe/simvastatin (commercially available as Vytorin®), colesevelam (commercially available as WelChol®), bisoprolol fumarate (commercially available as Zebeta®), ezetimibe (commercially available as Zetia®), bisoprolol fumarate/hydrochlorothiazide (commercially available as Ziac®), and simvastatin (commercially available as Zocor®).

The actives included herein may also include chronic kidney disease medication, such as paricalcitol (commercially available as Zemplar®); contraceptive agents, including etonogestrel (commercially available as Implanon®), norethindrone acetate, ethinyl estradiol (commercially available as Loestrin 24 FE®)), ethinyl estradiol, norelgestromin (commercially available as Ortho Evra®), levonorgestrel (commercially available as Plan B®), levonorgestrel and ethinyl estradiol (commercially available as Preven®), levonorgestrel, ethinyl estradiol (commercially available as Seasonique®), and medroxyprogesterone acetate (commercially available as Depo-Provera®); COPD medication, such as arformoterol tartrate (commercially available as Brovana®) and ipratropium bromide, albuterol sulfate (commercially available as Combivent®); cough suppressants, including benzonatate (commercially available as Tessalon®), guaifenesin, codeine phosphate (commercially available as Tussi-Organidin NRC)), and acetaminophen, codeine phosphate (commercially available as Tylenol with Codeine®); medication for the treatment of diabetes, including pioglitazone hydrochloride, metformin hydrochloride (commercially available as ACTOplus Met®), bromocriptine mesylate (commercially available as Cycloset®), liraglutide (commercially available as Victoza®), saxagliptin (commercially available as Onglyza®), pioglitazone hydrochloride (commercially available as Actos®), glimepiride (commercially available as Amaryl®), rosiglitazone maleate, metformin hydrochloride (commercially available as Avandamet®), rosiglitazone maleate (commercially available as Avandaryl®), rosiglitazone maleate (commercially available as Avandia®), exenatide (commercially available as Byetta®), exenatide (commercially available as Bydureon®), chlorpropamide (commercially available as Diabinese®), pioglitazone hydrochloride, glimepiride (commercially available as Duetact®), metformin hydrochloride (commercially available as Glucophage®), glipizide (commercially available as Glucotrol®), glyburide, metformin (commercially available as Glucovance® and Fortamet®), metformin hydrochloride (commercially available as Glumetza®), sitagliptin (commercially available as Januvia®), detemir (commercially available as Levemir®), glipizide, metformin hydrochloride (commercially available as Metaglip®), glyburide (commercially available as Micronase®), repaglinide (commercially available as Prandin®), acarbose (commercially available as Precose®), nateglinide (commercially available as Starlix®), pramlintide acetate (commercially available as Symlin®), canagliflozin (commercially available as Invokana®), linagliptin (commercially available as Tradjenta®), dapagliflozin (commercially available as Farxiga®), insulin glargine (commercially available as Lantus® or Toujeo®), insulin aspart (commercially available as Novolog®), insulin lispro, empagliflozin (commercially available as Jardiance®), and tolazamide (commercially available as Tolinase®).

Other useful actives may include digestive agents, such as sulfasalazine (commercially available as Azulfidine®), rabeprazole sodium (commercially available as AcipHex®), lubiprostone (commercially available as Amitiza®), dicyclomine hydrochloride (commercially available as Bentyl®), sucralfate (commercially available as Carafate®), lactulose (commercially available as Chronulac®), docusate (commercially available as Colace®), balsalazide disodium (commercially available as Colazal®), losartan potassium (commercially available as Cozaar®), olsalazine sodium (commercially available as Dipentum®), chlordiazepoxide hydrochloride, clidinium bromide (commercially available as Librax®), esomeprazole magnesium (commercially available as Nexium®), famotidine (commercially available as Pepcid®), lansoprazole (commercially available as Prevacid®), lansoprazole and naproxen (commercially available as Prevacid NapraPAC®), amoxicillin/clarithromycin/lansoprazole (commercially available as Prevpac®), omeprazole (commercially available as Prilosec®), pantoprazole sodium (commercially available as Protonix®), metoclopramide hydrochloride (commercially available as Reglan® or Metozolv®), cimetidine (commercially available as Tagamet®), ranitidine hydrochloride (commercially available as Zantac®), and omeprazole, sodium bicarbonate (commercially available as Zegerid®); diuretics, including spironolactone, hydrochlorothiazide (commercially available as Aldactazide®), spironolactone (commercially available as Aldactone®), bumetanide (commercially available as Bumex®), torsemide (commercially available as Demadex®), chlorothiazide (commercially available as Diuril®), furosemide (commercially available as Lasix®), metolazone (commercially available as Zaroxolyn®), and hydrochlorothiazide, triamterene (commercially available as Dyazide®).

Actives useful herein may also include treatment for emphysema, such as tiotropium bromide (commercially available as Spiriva®); fibromyalgia medication, such as milnacipran hydrochloride (commercially available as Savella®); medication for the treatment of gout, such as colchicine (commercially available as Colcrys®), and febuxostat (commercially available as Uloric®); enema treatments, including aminosalicylic acid (commercially available as Mesalamine® and Rowasa®); epilepsy medications, including valproic acid (commercially available as Depakene®), felbamate (commercially available as Felbatol®), lamotrigine (commercially available as Lamictal®), primidone (commercially available as Mysoline®), oxcarbazepine (commercially available as Trileptal®), zonisamide(commercially available as Zonegran®), levetiracetam (commercially available as Keppra®), and phenytoin sodium (commercially available as Dilantin®).

Actives useful herein may further include eye medications and treatment, such as dipivefrin hydrochloride (commercially available as Propine®), valganciclovir (commercially available as Valcyte®), ganciclovir ophthalmic gel (commercially available as Zirgan®); bepotastine besilate (commercially available as Bepreve®), besifloxacin (commercially available as Besivance®), bromfenac (commercially available as Xibrom®), fluorometholone (commercially available as FML®), pilocarpine hydrochloride (commercially available as Pilocar®), cyclosporine (commercially available as Restasis®), brimonidine tartrate (commercially available as Alphagan P®), dorzolamide hydrochloride/timolol maleate (commercially available as Cosopt®), bimatoprost (commercially available as Lumigan®), timolol maleate (available as Timoptic®), travoprost (commercially available as Travatan®), latanoprost (commercially available as Xalatan®), echothiophate iodide (commercially available as Phospholine Iodide®), and ranibizumab (commercially available as Lucentis®); fluid controllers, such as acetazolamide (commercially available as Diamox®); gallstone medications, including ursodiol (commercially available as Actigall®); medication for the treatment of gingivitis, including chlorhexidine gluconate (commercially available as Peridex®); headache medications, including butalbital/codeine phosphate/aspirin/caffeine (commercially available as Fiornal® with Codeine), naratriptan hydrochloride (commercially available as Amerge®), almotriptan (commercially available as Axert®), ergotamine tartrate/caffeine (commercially available as Cafergot®), butalbital/acetaminophen/caffeine (commercially available as Fioricet®), butalbital/aspirin/caffeine (commercially available as Fiorinal®), frovatriptan succinate (commercially available as Frova®), rizatriptan benzoate (commercially available as Maxalt®), isometheptene mucate/dichloralphenazone/acetaminophen (commercially available as Midrin®), dihydroergotamine mesylate (commercially available as Migranal®), eletriptan hydrobromide (commercially available as Relpax®), and zolmitriptan (commercially available as Zomig®); influenza medication, such as haemophilus b conjugate vaccine; tetanus toxoid conjugate (commercially available as Hiberix®); and heart treatments, including quinidine sulfate, isosorbide dinitrate/hydralazine hydrochloride (commercially available as BiDil®), digoxin (commercially available as Lanoxin®), flecainide acetate (commercially available as Tambocor®), mexiletine hydrochloride (commercially available as Mexitil®), disopyramide phosphate (commercially available as Norpace®), procainamide hydrochloride (commercially available as Procanbid®), and propafenone (commercially available as Rythmol®).

Other useful actives include hepatitis treatments, including entecavir (commercially available as Baraclude®), hepatitis B immune globulin (commercially available as HepaGam B®), and copegus/rebetol/ribasphere/vilona/virazole (commercially available as Ribavirin®); herpes treatments, including valacyclovir hydrochloride (commercially available as Valtrex®), penciclovir (commercially available as Denavir®), acyclovir (commercially available as Zovirax®), and famciclovir (commercially available as Famvir®); treatment for high blood pressure, including enalaprilat (available as Vasotec®), captopril (available as Capoten®) and lisinopril (available as Zestril®), verapamil hydrochloride (available as Calan®), ramipril (commercially available as Altace®), olmesartan medoxomil (commercially available as Benicar®), amlodipine/atorvastatin (commercially available as Caduet®), nicardipine hydrochloride (commercially available as Cardene®), diltiazem hydrochloride (commercially available as Cardizem®), quinapril hydrochloride (commercially available as Accupril®), quinapril hydrochloride/hydrochlorothiazide (commercially available as Accuretic®), perindopril erbumine (commercially available as Aceon®), candesartan cilexetil (commercially available as Atacand®), candesartan cilexetil/hydrochlorothiazide (commercially available as Atacand HCT®), irbesartan/hydrochlorothiazide (commercially available as Avalide®), irbesartan (commercially available as Avapro®), amlodipine besylate/olmesartan medoxomil (commercially available as Azor®), levobunolol hydrochloride (commercially available as Betagan®), betaxolol hydrochloride (commercially available as Betoptic®), nebivolol (commercially available as Bystolic®), captopril/hydrochlorothiazide (commercially available as Capozide®), doxazosin mesylate (commercially available as Cardura®), clonidine hydrochloride (commercially available as Catapres®), carvedilol (commercially available as Coreg®), nadolol (commercially available as Corgard®), nadolol/bendroflumethiazide (commercially available as Corzide®), valsartan (commercially available as Diovan®), isradipine (commercially available as DynaCirc®), Guanabenz acetate. (commercially available as Wytensin C)), Guanfacine hydrochloride (commercially available as Tenex® or Intuniv®), losartan potassium/hydrochlorothiazide (commercially available as Hyzaar®), propranolol hydrochloride (commercially available as Indera®), propranolol hydrochloride/hydrochlorothiazide (commercially available as Inderide®), eplerenone (commercially available as Inspra®), ambrisentan (commercially available as Letairis®), enalapril maleate/felodipine (commercially available as Lexxel®), metoprolol tartrate (commercially available as Lopressor®), benazepril hydrochloride (commercially available as Lotensin®), benazepril hydrochloride/hydrochlorothiazide (commercially available as Lotensin HCT®), amlodipine/benazepril hydrochloride (commercially available as Lotrel®), indapamide (commercially available as Lozol®), trandolapril (commercially available as Mavik®), telmisartan (commercially available as Micardis®), telmisartan/hydrochlorothiazide (commercially available as Micardis HCT®), prazosin hydrochloride (commercially available as Minipress®), amiloride, hydrochlorothiazide (commercially available as Moduretic®), fosinopril sodium (commercially available as ZZXT Monopril®), fosinopril sodium/hydrochlorothiazide (commercially available as Monopril-HCT®), pindolol (commercially available as Visken®), felodipine (commercially available as Plendil®), sildenafil citrate (commercially available as Revatio®), Nisoldipine (commercially available as Sular®), trandolapril/verapamil hydrochloride (commercially available as Tarka®), aliskiren (commercially available as Tekturna®), eprosartan mesylate (commercially available as Teveten®), eprosartan mesylate/hydrochlorothiazide (commercially available as Teveten HCT®), moexipril hydrochloride/hydrochlorothiazide (commercially available as Uniretic®), moexipril hydrochloride (commercially available as Univasc®), enalapril maleate/hydrochlorothiazide (commercially available as Vaseretic®), and lisinopril/hydrochlorothiazide (commercially available as Zestoretic®).

The films of the present disclosure may include actives useful in the medication for the treatment of HIV/AIDS, such as amprenavir (commercially available as Agenerase®), tipranavir (commercially available as Aptivus®), efavirenz/emtricitabine/tenofovir (commercially available as Atripla®), lamivudine/zidovudine (commercially available as Combivir®), indinavir sulfate (commercially available as Crixivan®), lamivudine (commercially available as Epivir®), saquinavir (commercially available as Fortovase®), zalcitabine (commercially available as Hivid®), lopinavir/ritonavir (commercially available as Kaletra®), fosamprenavir calcium (commercially available as Lexiva®), ritonavir (commercially available as Norvir®), zidovudine (commercially available as Retrovir®), atazanavir sulfate (commercially available as Reyataz®), efavirenz (commercially available as Sustiva®), abacavir/lamivudine/zidovudine (commercially available as Trizivir®), didanosine (commercially available as Videx®), nelfinavir mesylate (commercially available as Viracept®), nevirapine (commercially available as Viramune®), tenofovir disoproxil fumarate (commercially available as Viread®), stavudine (commercially available as Zerit®), and abacavir sulfate (commercially available as Ziagen®); homocysteiene removers, including betaine anhydrous (commercially available as Cystadane®); medications, such as insulin (commercially available as Apidra®, Humalog®, Humulin®, Iletin®, Tresiba®, and Novolin®); and HPV treatment, such as Human papillomavirus vaccine (commercially available as Gardasil®) or human papillomavirus bivalent (commercially available as Cervarix®); immunosuppressants, including cyclosporine (commercially available as Gengraf®, Neoral®, Sandimmune®, and Apo-Cyclosporine®).

Actives useful in the present disclosure may further include prolactin inhibitors, such as bromocriptine mesylate (commercially available as Parlodel®); medications for aiding in stress tests, such as regadenoson (commercially available as Lexiscan®); baldness medication, including finasteride (commercially available as Propecia® and Proscar®); pancreatitis treatment, such as gemfibrozil (commercially available as Lopid®); hormone medications, such as norethindrone acetate/ethinyl estradiol (commercially available as femHRT®), goserelin acetate (commercially available as Zoladex®), progesterone gel (commercially available as Prochieve®), progesterone (commercially available as Prometrium®), calcitonin-salmon (commercially available as Miacalcin®), calcitriol (commercially available as Rocaltrol®), synthroid (commercially available as Levothroid®, Levoxyl®, Unithroid®), testosterone (commercially available as Testopel®, Androderm®, Testoderm®, and AndroGel®); menopause medication, such as estradiol/norethindrone acetate (commercially available as Activella®), drospirenone/estradiol (commercially available as Angeliq®), estradiol/levonorgestrel (commercially available as Climara Pro®), estradiol/norethindrone acetate (commercially available as CombiPatch®), estradiol (commercially available as Estrasorb®, Vagifem® and Estro-Gel®), esterified estrogens and methyltestosterone (commercially available as Estratest®), estrogen (commercially available as Alora®, Climara®, Esclim®, Estraderm®, Vivelle®, Vivelle-Dot®), estropipate (commercially available as Ogen®), conjugated estrogens (commercially available as Premarin®), and medroxyprogesterone acetate (commercially available as Provera®); menstrual medications, including leuprolide acetate (commercially available as Lupron Depot), tranexamic acid (commercially available as Lysteda®), and norethindrone acetate (commercially available as Aygestin®); and muscle relaxants, including cyclobenzaprine hydrochloride (commercially available as Flexeril®), tizanidine (commercially available as Zanaflex®), and hyoscyamine sulfate (commercially available as Levsin®).

Actives useful herein may also include osteoporosis medications, including ibrandronate sodium (commercially available as Boniva®), risedronate (commercially available as Actonel®), raloxifene hydrochloride (commercially available as Evista®, Fortical®), and alendronate sodium (commercially available as Fosamax®); ovulation enhancers, including clomiphene citrate (commercially available as Serophene®, Clomid®, Serophene®); Paget's disease treatment, such as etidronate disodium (commercially available as Didronel®); pancreatic enzyme deficiency medications, such as pancrelipase (commercially available as Pancrease® or Zenpep®); medication for the treatment of Parkinson's disease, such as pramipexole dihydrochloride (commercially available as Mirapex®), ropinirole hydrochloride (commercially available as Requip®), carbidopa/levodopa (commercially available as Sinemet CRC)), carbidopa/levodopa/entacapone (commercially available as Stalevo®), selegiline hydrochloride (commercially available as Zelapar®), rasagiline (commercially available as Azilect®), entacapone (commercially available as Comtan®), and selegiline hydrochloride (commercially available as Eldepryl®); multiple sclerosis medication, such as dalfampridine (commercially available as Ampyra®) and interferon beta-I b (commercially available as Extavia®); prostate medication, including flutamide (commercially available as Eulexin®), nilutamide (commercially available as Nilandron®), dutasteride (commercially available as Avodart®), tamsulosin hydrochloride (commercially available as Flomax®), terazosin hydrochloride (commercially available as Hytrin®), and alfuzosin hydrochloride (commercially available as UroXatral®).

Films of the present disclosure may further include psychiatric medications, including alprazolam (available as Niravam®, Xanax®), clozopin (available as Clozaril®), haloperidol (available as Haldol®), fluoxetine hydrochloride (available as Prozac®), sertraline hydrochloride (available as Zoloft®), asenapine (commercially available as Saphris®), iloperidone (commercially available as Fanapt®), paroxtine hydrochloride (available as Paxil®), aripiprazole (commercially available as Abilify®), guanfacine (commercially available as Intuniv®), Amphetamines and methamphetamines (commercially available as Adderall® and Desoxyn®), clomipramine hydrochloride (commercially available as Anafranil®), Buspirone hydrochloride (commercially available as BuSpar®), citalopram hydrobromide (commercially available as Celexa®), duloxetine hydrochloride (commercially available as Cymbalta®), methylphenidate (commercially available as Ritalin, Daytrana®), divalproex sodium (Valproic acid) (commercially available as Depakote®), dextroamphetamine sulfate (commercially available as Dexedrine®), venlafaxine hydrochloride (commercially available as Effexor®), selegiline (commercially available as Emsam®), carbamazepine (commercially available as Equetro®), lithium carbonate (commercially available as Eskalith®), fluvoxamine maleate/dexmethylphenidate hydrochloride (commercially available as Focalin®), ziprasidone hydrochloride (commercially available as Geodon®), ergoloid mesylates (commercially available as Hydergine®), escitalopram oxalate (commercially available as Lexapro®), chlordiazepoxide (commercially available as Librium®), molindone hydrochloride (commercially available as Moban®), phenelzine sulfate (commercially available as Nardil®), thiothixene (commercially available as Navane®), desipramine hydrochloride (commercially available as Norpramin®), benzodiazepines (such as those available as Oxazepam®), nortriptyline hydrochloride (commercially available as Pamelor®), tranylcypromine sulfate (commercially available as Parnate®), prochlorperazine, mirtazapine (commercially available as Remeron®), risperidone (commercially available as Risperdal®), quetiapine fumarate (commercially available as Seroquel®), doxepin hydrochloride (commercially available as Sinequan®), atomoxetine hydrochloride (commercially available as Strattera®), trimipramine maleate (commercially available as Surmontil®), olanzapine/fluoxetine hydrochloride (commercially available as Symbyax®), imipramine hydrochloride (commercially available as Tofranil®), protriptyline hydrochloride (commercially available as Vivactil®), bupropion hydrochloride (commercially available as Wellbutrin®, Wellbutrin SR®, and Wellbutrin XR®), and olanzapine (commercially available as Zyprexa®).

Actives useful herein may also include uric acid reduction treatment, including allopurinol (commercially available as Zyloprim®); seizure medications, including gabapentin (commercially available as Neurontin®), ethotoin (commercially available as Peganone®), vigabatrin (commercially available as Sabril®), and topiramate (commercially available as Topamax®); treatment for shingles, such as zoster vaccine live (commercially available as Zostavax®); skin care medications, including calcipotriene (commercially available as Dovonex®), ustekinumab (commercially available as Stelara®), televancin (commercially available as Vibativ®), isotretinoin (commercially available as Accutane®), hydrocortisone/iodoquinol (commercially available as Alcortin C), sulfacetamide sodium/sulfur (commercially available as Avar®), azelaic acid (commercially available as Azelex®, Finacea®), benzoyl peroxide (commercially available as Desquam-E®), adapalene (commercially available as Differin®), fluorouracil (commercially available as Efudex®), pimecrolimus (commercially available as Elidel®), topical erythromycin (commercially available as A/T/S®, Erycette®, T-Stat®), hydrocortisone (commercially available as Cetacort®, Hytone®, Nutracort®), metronidazole (commercially available as MetroGel®), doxycycline (commercially available as Oracea®), tretinoin (commercially available as Retin-A® and Renova®), mequinol/tretinoin (commercially available as Solage®), acitretin (commercially available as Soriatane®), calcipotriene hydrate/betamethasone dipropionate (commercially available as Taclonex®), tazarotene (commercially available as Tazorac®), fluocinonide (commercially available as Vanos®), desonide (commercially available as Verdeso®), miconazole nitrate/Zinc oxide (commercially available as Vusion®), ketoconazole (commercially available as Xolegel®), and efalizumab (commercially available as Raptiva®).

Other actives useful herein may include Sleep disorder medications, including zaleplon (available as Sonata®), eszopiclone (available as Lunesta®), zolpidem tartrate (commercially available as Ambien®, Ambien CR®, Edluar®), lorazepam (commercially available as Ativan®), flurazepam hydrochloride (commercially available as Dalmane®), triazolam (commercially available as Halcion®), clonazepam (commercially available as Klonopin®), barbituates, such as Phenobarbital®), Modafinil (commercially available as Provigil®), temazepam (commercially available as Restoril®), ramelteon (commercially available as Rozerem®), clorazepate dipotassium (commercially available as Tranxene®), diazepam (commercially available as Valium®), quazepam (commercially available as Doral®), and estazolam (commercially available as ProSom®); smoking cessation medications, such as varenicline (commercially available as Chantix®), nicotine, such as Nicotrol®, and bupropion hydrochloride (commercially available as Zyban®); and steroids, including alclometasone dipropionate (commercially available as Aclovate®), betamethasone dipropionate (commercially available as Diprolene®), mometasone furoate (commercially available as Elocon®), fluticasone (commercially available as Flonase®, Flovent®, Flovent Diskus®, Flovent Rotadisk®), fluocinonide (commercially available as Lidex®), mometasone furoate monohydrate (commercially available as Nasonex®), desoximetasone (commercially available as Topicort®), clotrimazole/betamethasone dipropionate (commercially available as Lotrisone®), prednisolone acetate (commercially available as Pred Forte®, Prednisone®, Budesonide Pulmicort®, Rhinocort Aqua®), prednisolone sodium phosphate (commercially available as Pediapred®), desonide (commercially available as Tridesilon®), and halobetasol propionate (commercially available as Ultravate®).

Films of the present invention may further include actives useful for thyroid disease treatment, such as hormones TC and TD (commercially available as Armour Thyroid®); potassium deficiency treatment, including potassium chloride (commercially available as Micro-KC)); triglycerides regulators, including omega-3-acid ethyl esters (commercially available as Omacor®); urinary medication, such as phenazopyridine hydrochloride (commercially available as Pyridium®) and methenamine, methylene blue/phenyl salicylate/benzoic acid/atropine sulfate/hyoscyamine (commercially available as Urised®); prenatal vitamins (commercially available as Advanced Natalcare®, Materna®, Natalins®, Prenate Advance®); weight control medication, including orlistat (commercially available as Xenical®) and sibutramine hydrochloride (commercially available as Meridia®).

The popular $H_2$-antagonists which are contemplated for use herein include cimetidine, ranitidine hydrochloride, famotidine, nizatidien, ebrotidine, mifentidine, roxatidine, pisatidine and aceroxatidine.

Active antacid ingredients include, but are not limited to, the following: aluminum hydroxide, dihydroxyaluminum aminoacetate, aminoacetic acid, aluminum phosphate, dihydroxyaluminum sodium carbonate, bicarbonate, bismuth aluminate, bismuth carbonate, bismuth subcarbonate, bismuth subgallate, bismuth subnitrate, bismuth subsilysilate, calcium carbonate, calcium phosphate, citrate ion (acid or salt), amino acetic acid, hydrate magnesium aluminate sulfate, magaldrate, magnesium aluminosilicate, magnesium carbonate, magnesium glycinate, magnesium hydroxide, magnesium oxide, magnesium trisilicate, milk solids, aluminum mono-ordibasic calcium phosphate, tricalcium phosphate, potassium bicarbonate, sodium tartrate, sodium bicarbonate, magnesium aluminosilicates, tartaric acids and salts.

The active agents employed in the present invention may include allergens or antigens, such as, but not limited to, plant pollens from grasses, trees, or ragweed; animal danders, which are tiny scales shed from the skin and hair of cats and other furred animals; insects, such as house dust mites, bees, and wasps; and drugs, such as penicillin.

Examples of specific actives include but are not limited to 16-alpha fluorocstradiol, 16-alpha-gitoxin, 16-epiestriol, 17 alpha dihydroequilenin, 17 alpha estradiol, 17 beta estradiol, 17 hydroxy progesterone, lalpha-hydroxyvitamin D2,1-dodecpyrrolidinone, 20-epi-1,25 dihydroxyvitamin D3, 22-oxacalcitriol, 2CVV, 2'-nor-cGMP, 3-isobutyl GABA, 5-ethynyluracil, 6-FUDCA, 7-methoxytacrine, Abamectin, abanoquil, abecarnil, abiraterone, Ablukast, Ablukast Sodium, Acadesine, acamprosate, Acarbose, Acebutolol, Acecainide Hydrochloride, Aceclidine, aceclofenae, Acedapsone, Aceglutamide Aluminum, Acemannan, Acetaminophen, Acetazolamide, Acetohexamide, Acetohydroxamic Acid, acetomepregenol, Acetophenazine Maleate, Acetosulfone Sodium, Acetylcholine Chloride, Acetylcysteine, acetyl-L-carnitine, acetylmethadol, Acifran, acipimox, acitemate, Acitretin, Acivicin, Aclarubicin, aclatonium, Acodazole Hydrochloride, aconiazide, Acrisorcin, Acrivastine, Acronine, Actisomide, Actodigin, Acyclovir, acylfulvene, adafenoxate, adapalene, Adapalene, adatanserin, Adatanserin Hydrochloride, adecypenol, adecypenol, Adefovir, adelmidrol, ademetionine, Adenosine, Adinazolam, Adipheinine Hydrochloride, adiposin, Adozelesin, adrafinil, Adrenalone, airbutamine, alacepril, Alamecin, Alanine, Alaproclate, alaptide, Albendazole, albolabrin, Albuterol, Albutoin, Alclofenae, Alclometasone Dipropionate, Alcloxa, aldecalmycin, Aldesleukin, Aldioxa, Alendronate Sodium, alendronic acid, alentemol, Alentemol Hydrobromide, Aletamine Hydrochloride, Aleuronium Chloride, Alexidine, alfacalcidol, Alfentanil Hydrochloride, alfuzosin, Algestone Acetonide, alglucerase, Aliflurane, alinastine, Alipamide, Allantoin, Allobarbital, Allopurinol, ALL-TK antagonists, Alogliptin, Alonimid, alosetron, Alosetron Hydrochloride, Alovudine, Alpertine, Alpha Amylase, alpha idosone, Alpidem, Alprazolam, Alprenolol Hydrochloride, Alprenoxime Hydrochloride, Alprostadil, Alrestatin Sodium, Altanserin Tartrate, Alteplase, Althiazide, Altretamine, altromycin B, Alverinc Citrate, Alvircept Sudotox, Amadinone Acetate, Amantadine Hydrochloride, ambamustine, Ambomycin, Ambruticin, Ambuphylline, Ambuside, Amcinafal, Amcinonide, Amdinocillin, Amdinocillin Pivoxil, Amedalin Hydrochloride, amelometasone, Ameltolide, Amesergide, Ametantrone Acetate, amezinium metilsulfate, amfebutamone, Amfenac Sodium, Amflutizole, Amicycline, Amidephrine Mesylate, amidox, Amifloxacin, amifostine, Amikacin, Amiloride Hydrochloride, Aminacrine Hydrochloride, Aminobenzoate Potassium, Aminobenzoate Sodium, Aminocaproic Acid, Aminoglutethimide, Aminohippurate Sodium, aminolevulinic acid, Aminophylline, A minorex, Aminosalicylate sodium, Aminosalicylic acid, Amiodarone, Amiprilose Hydrochloride, Amiquinsin Hydrochloride, amisulpride, Amitraz, Amitriptyline Hydrochloride, Amlexanox, amlodipine, Amobarbital Sodium, Amodiaquine, Amodiaquine Hydrochloride, Amorolfine, Amoxapine, Amoxicillin, Amphecloral, Amphetamine Sulfate, Amphomycin, Amphotericin B, Ampicillin, ampiroxicam, Ampyzine Sulfate, Amquinate, Amrinone, amrinone, amrubicin, Amsacrine, amylin, amythiamicin, Anagestone Acetate, anagrelide, Anakinra, ananain, anaritide, Anaritide Acetate, Anastrozole, Anazolene Sodium, Ancrod, andrographolide, Androstenedione, angiogenesis inhibitors, Angiotensin Amide, Anidoxime, Anileridine, Anilopam Hydrochloride, Aniracetam, Anirolac, Anisotropine Methylbromide, Anistreplase, Anitrazafen, anordrin, antagonist D, antagonist G, antarelix, Antazoline Phosphate, Anthelmycin, Anthralin, Anthramycin, antiandrogen, Acedapsone, Felbamate, antiestrogen, antineoplaston, Antipyrine, antisense oligonucleotides, apadoline, apafant, Apalcillin Sodium, apaxifylline, Apazone, aphidicolin glycinate, Apixifylline, Apomorphine Hydrochloride, apraclonidine, Apraclonidine Hydrochloride, Apramycin, Aprindine, Aprindine Hydrochloride, aprosulate sodium, Aprotinin, Aptazapine Maleate, aptiganel, apurinic acid, apurinic acid, aranidipine, Aranotin, Arbaprostil, arbekicin, arbidol, Arbutamine Hydrochloride, Arclofenin, Ardeparin Sodium, argatroban, Arginine, Argipressin Tannate, Arildone, aripiprazol, arotinolol, Arpinocid, Arteflene, Artilide Fumarate, asimadoline, aspalatone, Asparaginase, Asparic Acid, Aspartocin, asperfuran, Aspirin, aspoxicillin, Asprelin, Astemizole, Astromicin Sulfate, asulacrine, atamestane, Atenolol, atevirdine, Atipamezole, Atiprosin Maleate, Atolide, Atorvastatin Calcium, Atosiban, Atovaquone, atpenin B, Atracurium Besylate, atrimustine, atrinositol, Atropine, Auranofin, aureobasidin A, Aurothioglucose, Avilamycin, Avoparcin, Avridine, Axid, axinastatin 1, axinastatin 2, axinastatin 3, Azabon, Azacitidinie, Azaclorzine Hydrochloride, Azaconazole, azadirachtine, Azalanstat Dihydrochloride, Azaloxan Fumarate, Azanator Maleate, Azanidazole, Azaperone, Azaribine, Azaserine, azasetron, Azatadine Maleate, Azathioprine, Azathioprine Sodium, azatoxin, azatyrosine, azelaic acid, azelastine, azelnidipine, Azepindole, Azetepa, azimilide, Azithromycin, Azlocillin, Azolimine, Azosemide, Azotomycin, Aztreonam, Azumolene Sodium, Bacampicillin Hydrochloride, baccatin III, Bacitracin, Baclofen, bacoside A, bacoside B, bactobolamine, balanol, balazipone, balhimycin, balofloxacin, balsalazide, Bambermycins, bambuterol, Bamethan Sulfate, Bamifylline Hydrochloride, Bamidazole, baohuoside 1, Barmastine, barnidipine, Basifungin, Batanopride Hydrochloride, batebulast, Batelapine Maleate, Batimastat, beauvericin, Becanthone Hydrochloride, becaplermin, becliconazole, Beclomethasone Dipropionate, befloxatone, Beinserazide, Belfosdil, Belladonna, Beloxamide, Bemesetron, Bemitradine, Bemoradan, Benapryzine Hydrochloride, Benazepril Hydrochloride, Benazeprilat, Bendacalol Mesylate, Bendazac, Bendroflumethiazide, benflumetol, benidipine, Benorterone, Benoxaprofen, Benoxaprofen, Benoxinate Hydrochloride, Benperidol, Bentazepam, Bentiromide, Benurestat, Benzbromarone, Benzethonium Chloride, Benzetimide Hydrochloride, Benzilonium Bromide, Benzindopyrine Hydrochloride, benzisoxazole, Benzocaine, benzochlorins, Benzoctamine Hydrochloride, Benzodepa, benzoidazoxan, Benzonatate, Benzoyl Peroxide, Benzoylpas Calcium, benzoylstaurosporine, Benzquinamide, Benzthiazide, benztropine, Benztropine Mesylate, Benzydamine Hydrochloride, Benzylpenicilloyl Polylysine, bepridil, Bepridil Hydrochloride, Beractant, Beraprost, Berefrine, berlafenone, bertosamil, Berythromycin, besipirdine, betaalethine, betaclamycin B, Betamethasone, betamipron, betaxolol, Betaxolol Hydrochloride, Bethanechol Chloride, Bethanidine Sulfate, betulinic acid, bevantolol, Bevantolol Hydrochloride, Bezafibrate, bFGF inhibitor, Bialamicol Hydrochloride, Biapenem, Bicalutamide, Bicifadine Hydrochloride, Biclodil Hydrochloride, Bidisomide, bifemelane, Bifonazole, bimakalim, bimithil, Bindarit, Biniramycin, binospirone, bioxalomycin alpha2, Bipenamol Hydrochloride, Biperiden, Biphenamine Hydrochloride, biriperone, bisantrene, bisaramil, bisaziridinylspermine, bis-benzimidazole A, bis-benzimidazole B, bisnafide, Bisobrin Lactate, Bisoprolol, Bispyrithione Magsulfex, bistramide D, bistramide K, bistratene A, Bithionolate Sodium, Bitolterol Mesylate, Bivalirudin, Bizelesin, Bleomycin Sulfate, Bolandiol Dipropionate, Bolasterone, Boldenone Undecylenate, boldine, Bolenol, Bolmantalate, bopindolol, Bosentan, Boxidine, brefeldin, breflate, Brequinar Sodium, Bretazenil, Bretylium Tosylate, Brifentanil Hydrochloride, brimonidine, Brinolase, Brocresine, Brocrinat, Brofoxine, Bromadoline Maleate, Bromazepam, Bromchlorenone, Bromelains, bromfenac, Brominidione, Bromocriptine, Bromodiphenhydramine Hydrochloride, Bromoxamide, Bromperidol, Bromperidol Decanoate, Brompheniramine Maleate, Broperamole, Bropirimine, Brotizolam, Bucainide Maleate, bucindolol, Buclizine Hydrochloride, Bucromarone, Budesonide, budipine, budotitane, Buformin, Bumetamide, Bunaprolast, bunazosin, Bunolol Hydrochloride, Bupicomide, Bupivacaine Hydrochloride, Buprenorphine Hydrochloride, Bupropion Hydrochloride, Buramate, Buserelin Acetate, Buspirone Hydrochloride, Busulfan, Butabarbital, Butacetin, Butaclamol Hydrochloride, Butalbital, Butamben, Butamirate Citrate, Butaperazine, Butaprost, Butedronate Tetrasodium, butenafine, Buterizine, buthionine sulfoximine, Butikacin, Butilfenin, Butirosin Sulfate, Butixirate, butixocort propionate, Butoconazole Nitrate, Butonate, Butopamine, Butoprozine Hydrochloride, Butorphanol, Butoxamine Hydrochloride, Butriptyline Hydrochloride, Cactinomycin, Cadexomer Iodine, Caffeine, calanolide A, Calcifediol, Calcipotriene, calcipotriol, Calcitonin, Calcitriol, Calcium Undecylenate, calphostin C, Calusterone, Cambendazole, camonagrel, camptothecin derivatives, canagliflozin, canarypox IL-2, candesartan, Candicidin, candoxatril, candoxatrilat, Caniglibose, Canrenoate Potassium, Canrenone, capecitabine, Capobenate Sodium, Capobenic Acid, Capreomycin Sulfate, capromab, capsaicin, Captopril, Capuride, Caracemide, Carbachol, Carbadox, Carbamazepine, Carbamide Peroxide, Carbantel Lauryl Sulfate, Carbaspirin Calcium, Carbazeran, carbazomycin C, Carbenicillin Potassium, Carbenoxolone Sodium, Carbetimer, carbetocin, Carbidopa, Carbidopa-Levodopa, Carbinoxamine Maleate, Carbiphene Hydrochloride, Carbocloral, Carbocysteine, Carbol-Fuchsin, Carboplatin, Carboprost, carbovir, carboxamide-amino-triazo-le, carboxyamidotriazole, carboxymethylated beta-1,3-glucan, Carbuterol Hydrochloride, CaRest M3, Carfentanil Citrate, Carisoprodol, Carmantadine, Carmustine, CARN 700, Camidazole, Caroxazone, carperitide, Carphenazine Maleate, Carprofen, Carsatrin Succinate, Cartazolate, carteolol, Carteolol Hydrochloride, cartilage derived inhibitor, Carubicin Hydrochloride, Carumonam Sodium, carvedilol, carvotroline, Carvotroline Hydrochloride, carzelesin, casein kinase inhibitors (ICOS), castanospermine, caurumonam, cebaracetam, cecropin B, Cedefingol, Cefaclor, Cefadroxil, Cefamandole, Cefaparole, Cefatrizine, Cefazaflur Sodium, Cefazolin, Cefbuperazone, cefcapene pivoxil, cefdaloxime pentexil tosilate, Cefdinir, cefditoren pivoxil, Cefepime, cefetamet, Cefetecol, cefixime, cefluprenam, Cefinenoxime Hydrochloride, Cefinetazole, cefminlox, cefodizime, Cefonicid Sodium, Cefoperazone Sodium, Ceforamide, cefoselis, Cefotaxime Sodium, Cefotetan, cefotiam, Cefoxitin, cefozopran, cefpimizole, Cefpiramide, cefpirome, cefpodoxime proxetil, cefprozil, Cefroxadine, cefsulodin, Ceftazidime, cefteram, ceftibuten, Ceftizoxime Sodium, ceftriaxone, Cefuroxime, celastrol, celikalim, celiprolol, cepacidiine A, Cephacetrile Sodium, Cephalexin, Cephaloglycin, Cephaloridine, Cephalothin Sodium, Cephapirin Sodium, Cephradine, cericlamine, cerivastatin, Ceronapril, certoparin sodium, Ceruletide, Cetaben Sodium, Cetalkonium Chloride, Cetamolol Hydrochloride, cetiedil, cetirizine, Cetophenicol, Cetraxate Hydrochloride, cetrorelix, Cetylpyridinium Chloride, Chenodiol, Chlophedianol Hydrochloride, Chloral Betaine, Chlorambucil, Chloramphenicol, Chlordantoin, Chlordiazepoxide, Chlorhexidine Gluconate, chlorins, Chlormadinone Acetate, chloroorienticin A, Chloroprocaine Hydrochloride, Chloropropamide, Chloroquine, chloroquinoxaline sulfonamide, Chlorothiazide, Chlorotrianisene, Chloroxine, Chloroxylenol, Chlorphenesin Carbamate, Chlorpheniramine Maleate, Chlorpromazine, Chlorpropamide, Chlorprothixene, Chlortetracycline Bisulfate, Chlorthalidone, Chlorzoxazone, Cholestyramine Resin, Chromonar Hydrochloride, cibenzoline, cicaprost, Ciclafrine Hydrochloride, Ciclazindol, ciclesonide, cicletanine, Ciclopirox, Cicloprofen, cicloprolol, Cidofovir, Cidoxepin Hydrochloride, Cifenline, Ciglitazone, Ciladopa Hydrochloride, cilansetron, Cilastatin Sodium, Cilazapril, cilnidipine, Cilobamine Mesylate, cilobradine, Cilofungin, cilostazol, Cimaterol, Cimetidine, cimetropium bromide, Cinalukast, Cinanserin Hydrochloride, Cinepazet Maleate, Cinflumide, Cingestol, cinitapride, Cinnamedrine, Cinnarizine, cinolazepam, Cinoxacin, Cinperene, Cinromide, Cintazone, Cintriamide, Cioteronel, Cipamfylline, Ciprefadol Succinate, Ciprocinonide, Ciprofibrate, Ciprofloxacin, ciprostene, Ciramadol, Cirolemycin, cisapride, cisatracurium besilate, Cisconazole, Cisplatin, cis-porphyrin, cistinexine, citalopram, Citenamide, citicoline, citreamicin alpha, cladribine, Clamoxyquin Hydrochloride, Clarithromycin, clausenamide, Clavulanate Potassium, Clazolam, Clazolimine, clebopride, Clemastine, Clentiazem Maleate, Clidinium Bromide, clinafloxacin, Clindamycin, Clioquinol, Clioxamide, Cliprofen, clobazam, Clobetasol Propionate, Clobetasone Butyrate, Clocortolone Acetate, Clodanolene, Clodazon Hydrochloride, clodronic acid, Clofazimine, Clofibrate, Clofilium Phosphate, Clogestone Acetate, Clomacran Phosphate, Clomegestone Acetate, Clometherone, clomethiazole, clomifene analogues, Clominorex, Clomiphene, Clomipramine Hydrochloride, Clonazepam, Clonidine, Clonitrate, Clonixeril, Clonixin, Clopamide, Clopenthixol, Cloperidone Hydrochloride, clopidogrel, Clopimozide, Clopipazan Mesylate, Clopirac, Cloprednol, Cloprostenol Sodium, Clorazepate Dipotassium, Clorethate, Clorexolone, Cloroperone Hydrochloride, Clorprenaline Hydrochloride, Clorsulon, Clortermine Hydrochloride, Closantel, Closiramine Aceturate, Clothiapine, Clothixamide Maleate Cloticasone Propionate, Clotrimazole, Cloxacillin Benzathine, Cloxyquin, Clozapine, Cocaine, Coccidioidin, Codeine, Codoxime, Colchicine, colestimide, Colestipol Hydrochloride, Colestolone, Colforsin, Colfosceril Palmitate, Colistimethate Sodium, Colistin Sulfate, collismycin A, collismycin B, Colterol Mesylate, combretastatin A4, combretastatin analogue, complestatin, conagenin, Conorphone Hydrochloride, contignasterol, contortrostatin, Cormethasone Acetate, Corticorelin Ovine Triflutate, Corticotropin, Cortisone Acetate, Cortivazol, Cortodoxone, cosalane, costatolide, Cosyntropin, cotinine, Coumadin, Coumermycin, crambescidin 816, Crilvastatin, crisnatol, Cromitrile Sodium, Cromolyn Sodium, Crotamiton, cryptophycin 8, cucumariosid, Cuprimyxin, curacin A, curdlan sulfate, curiosin, Cyclacillin, Cyclazocine, cyclazosin, cyclic HPMPC, Cyclindole, Cycliramine Maleate, Cyclizine, Cyclobendazole, cyclobenzaprine, cyclobut A, cyclobut G, cyclocapron, Cycloguanil Pamoate, Cycloheximide, cyclopentanthraquinones, Cyclopenthiazide, Cyclopentolate Hydrochloride, Cyclophenazine Hydrochloride, Cyclophosphamide, cycloplatam, Cyclopropane, Cycloserine, cyclosin, Cyclosporine, cyclothialidine, Cyclothiazide, cyclothiazomycin, Cyheptamide, cypemycin, Cypenamine Hydrochloride, Cyprazepam, Cyproheptadine Hydrochloride, Cyprolidol Hydrochloride, cyproterone, Cyproximide, Cysteamine, Cysteine Hydrochloride, Cystine, Cytarabine, Cytarabine Hydrochloride, cytarabine ocfosfate, cytochalasin B, cytolytic factor, cytostatin, Dacarbazine, dacliximab, dactimicin, Dactinomycin, daidzein, Daledalin Tosylate, dalfopristin, Dalteparin Sodium, Daltroban, Dalvastatin, danaparoid, Danazol, Dantrolene, dapagliflozin, daphlnodorin A, dapiprazole, dapitant, Dapoxetine Hydrochloride, Dapsone, Daptomycin, Darglitazone Sodium, darifenacin, darlucin A, Darodipine, darsidomine, Daunorubicin Hydrochloride, Dazadrol Maleate, Dazepinil Hydrochloride, Dazmegrel, Dazopride Fumarate, Dazoxiben Hydrochloride, Debrisoquin Sulfate, Decitabine, deferiprone, deflazacort, Dehydrocholic Acid, dehydrodidemnin B, Dehydroepiandrosterone, delapril, Delapril Hydrochloride, Delavirdine Mesylate, delequamine, delfaprazine, Delmadinone Acetate, delmopinol, delphinidin, Demecarium Bromide, Demeclocycline, Demecycline, Demoxepam, Denofungin, deoxypyridinoline, Depakote, deprodone, Deprostil, depsidomycin, deramciclane, dermatan sulfate, Desciclovir, Descinolone Acetonide, Desflurane, Desipramine Hydrochloride, desirudin, Deslanoside, deslorelin, desmopressin, desogestrel, Desonide, Desoximetasone, desoxoamiodarone, Desoxycorticosterone Acetate, detajmium bitartrate, Deterenol Hydrochloride, Detirelix Acetate, Devazepide, Dexamethasone, Dexamisole, Dexbrompheniramine Maleate, Dexchlorpheniramine Maleate, Dexclamol Hydrochloride, Dexetimide, Dexfenfluramine Hydrochloride, dexifosfamide, Deximafen, Dexivacaine, dexketoprofen, dexloxiglumide, Dexmedetomidine, Dexormaplatin, Dexoxadrol Hydrochloride, Dexpanthenol, Dexpemedolac, Dexpropranolol Hydrochloride, Dexrazoxane, dexsotalol, dextrin 2-sulphate, Dextroamphetamine, Dextromethorphan, Dextrorphan Hydrochloride, Dextrothyroxine Sodium, dexverapamil, Dezaguanine, dezinamide, dezocine, Diacetolol Hydrochloride, Diamocaine Cyclamate, Diapamide, Diatrizoate Meglumine, Diatrizoic Acid, Diaveridine, Diazepam, Diaziquone, Diazoxide, Dibenzepin Hydrochloride, Dibenzothiophene, Dibucaine, Dichliorvos, Dichloralphenazone, Dichlorphenamide, Dicirenone, Diclofenac Sodium, Dicloxacillin, dicranin, Dicumarol, Dicyclomine Hydrochloride, Didanosine, didemnin B, didox, Dienestrol, dienogest, Diethylcarbamazine Citrate, diethylhomospermine, diethylnorspermine, Diethylpropion Hydrochloride, Diethylstilbestrol, Difenoximide Hydrochloride, Difenoxin, Diflorasone Diacetate, Difloxacin Hydrochloride, Difluanine Hydrochloride, Diflucortolone, Diflumidone Sodium, Diflunisal, Difluprednate, Diftalone, Digitalis, Digitoxin, Digoxin, Dihexyverine Hydrochloride, dihydrexidine, dihydro-5-azacytidine, Dihydrocodeine Bitartrate, Dihydroergotamine Mesylate, Dihydroestosterone, Dihydrostreptomycin Sulfate, Dihydrotachysterol, dihydrotaxol, 9-, Dilantin, Dilevalol Hydrochloride, Diltiazem Hydrochloride, Dimefadane, Dimefline Hydrochloride, Dimenhydrinate, Dimercaprol, Dimethadione, Dimethindene Maleate, Dimethisterone, dimethyl prostaglandin Al, Dimethyl Sulfoxide, dimethylhomospermine, dimiracetam, Dimoxamine Hydrochloride, Dinoprost, Dinoprostone, Dioxadrol Hydrochloride, dioxamycin, Diphenhydramine Citrate, Diphenidol, Diphenoxylate Hydrochloride, diphenyl spiromustine, Dipivefin Hydrochloride, Dipivefrin, dipliencyprone, diprafenone, dipropylnorspermine, Dipyridamole, Dipyrithione, Dipyrone, dirithromycin, discodermolide, Disobutamide, Disofenin, Disopyramide, Disoxaril, disulfiram, Ditekiren, Divalproex Sodium, Dizocilpine Maleate, Dobutamine, docarpamine, Docebenone, Docetaxel, Doconazole, docosanol, dofetilide, dolasetron, Ebastine, ebiratide, ebrotidine, ebselen, ecabapide, ecabet, ecadotril, ecdisteron, echicetin, echistatin, Echothiophate Iodide, Eclanamine Maleate, Eclazolast, ecomustine, Econazole, ecteinascidin 722, edaravone, Edatrexate, edelfosine, Edifolone Acetate, edobacomab, Edoxudine, edrecolomab, Edrophonium Chloride, edroxyprogesteone Acetate, efegatran, eflornithine, efonidipine, egualcen, Elantrine, eleatonin, elemene, eletriptan, elgodipine, eliprodil, Elsamitrucin, eltenae, Elucaine, emalkalim, emedastine, Emetine Hydrochloride, emiglitate, Emilium Tosylate, emitefur, emoctakin, empagliflozin, Enadoline Hydrochloride, enalapril, Enalaprilat, Enalkiren, enazadrem, Encyprate, Endralazine Mesylate, Endrysone, Enflurane, englitazone, Enilconazole, Enisoprost, Enlimomab, Enloplatin, Enofelast, Enolicam Sodium, Enoxacin, enoxacin, enoxaparin sodium, Enoxaparin Sodium, Enoximone, Enpiroline Phosphate, Enprofylline, Enpromate, entacapone, enterostatin, Enviradene, Enviroxime, Ephedrine, Epicillin, Epimestrol, Epinephrine, Epinephryl Borate, Epipropidine, Epirizole, epirubicin, Epitetracycline Hydrochloride, Epithiazide, Epoetin Alfa, Epoetin Beta, Epoprostenol, Epoprostenol Sodium, epoxymexrenone, episteride, Eprosartan, eptastigmine, equilenin, Equilin, Erbulozole, erdosteine, Ergoloid Mesylates, Ergonovine Maleate, Ergotamine Tartrate, ersentilide, Ersofermin, erythritol, Erythrityl Tetranitrate, Erythromycin, Esmolol Hydrochloride, Esorubicin Hydrochloride, Esproquin Hydrochloride, Estazolam, Estradiol, Estramustine, estramustine analogue, Estrazinol Hydrobromide, Estriol, Estrofurate, estrogen agonists, estrogen antagonists, Estrogens, Conjugated Estrogens, Esterified Estrone, Estropipate, esuprone, Etafedrine Hydrochloride, Etanidazole, etanterol, Etarotene, Etazolate Hydrochloride, Eterobarb, ethacizin, Ethacrynate Sodium, Ethacrynic Acid, Ethambutol Hydrochloride, Ethamivan, Ethanolamine Oleate, Ethehlorvynol, Ether, Ethinyl estradiol, Ethiodized Oil, Ethionamide, Ethonam Nitrate, Ethopropazine Hydrochloride, Ethosuximide, Ethotoin, Ethoxazene Hydrochloride, Ethybenztropine, Ethyl Chloride, Ethyl Dibunate, Ethylestrenol, Ethyndiol, Ethynerone, Ethynodiol Diacetate, Etibendazole, Etidocaine, Etidronate Disodium, Etidronic Acid, Etifenin, Etintidine Hydrochloride, etizolam, Etodolac, Etofenamate, Etoformin Hydrochloride, Etomidate, Etonogestrel, Etoperidone Hydrochloride, Etoposide, Etoprine, Etoxadrol Hydrochloride, Etozolin, etrabamine, Etretinate, Etryptamine Acetate, Eucatropine Hydrochloride, Eugenol, Euprocin Hydrochloride, eveminomicin, Exametazime, examorelin, Exaprolol Hydrochloride, exemestane, fadrozole, faeriefungin, Famciclovir, Famotidine, Fampridine, fantofarone, Fantridone Hydrochloride, faropenem, fasidotril, fasudil, fazarabine, fedotozine, felbamate, Felbinac, Felodipine, Felypres sin, Fenalamide, Fenamole, Fenbendazole, Fenbufen, Fencibutirol, Fenclofenac, Fenclonine, Fenclorac, Fendosal, Fenestrel, Fenethylline Hydrochloride, Fenfluramine Hydrochloride, Fengabine, Fenimide, Fenisorex, Fenmetozole Hydrochloride, Fenmetramide, Fenobam, Fenoctimine Sulfate, fenofibrate, fenoldopam, Fenoprofen, Fenoterol, Fenpipalone, Fenprinast Hydrochloride, Fenprostalene, Fenquizone, fenretinide, fenspiride, Fentanyl Citrate, Fentiazac, Fenticlor, fenticonazole, Fenyripol Hydrochloride, fepradinol, ferpifosate sodium, ferristene, ferrixan, Ferrous Sulfate, Dried, Ferumoxides, ferumoxsil, Fetoxylate Hydrochloride, fexofenadine, Fezolamine Fumarate, Fiacitabine, Fialuridine, Fibrinogen 1 125, filgrastim, Filipin, finasteride, Flavodilol Maleate, flavopiridol, Flavoxate Hydrochloride, Flazalone, flecainide, flerobuterol, Fleroxacin, flesinoxan, Flestolol Sulfate, Fletazepam, flezelastine, flobufen, Floctafenine, flomoxef, Flordipine, florfenicol, florifenine, flosatidil, Flosequinan, Floxacillin, Floxuridine, fluasterone, Fluazacort, Flubanilate Hydrochloride, Flubendazole, Flucindole, Flucloronide, Fluconazole, Flucytosine, Fludalanine, Fludarabine Phosphate, Fludazonium Chloride, Fludeoxyglucose F 18, Fludorex, Fludrocortisone Acetate, Flufenamic Acid, Flufenisal, Flumazenil, flumecinol, Flumequine, Flumeridone, Flumethasone, Flumetramide, Flumezapine, Fluminorex, Flumizole, Flumoxonide, flunarizine, Flunidazole, Flunisolide, Flunitrazepam, Flunixin, fluocalcitriol, Fluocinolone Acetonide, Fluocinonide, Fluocortin Butyl, Fluocortolone, Fluorescein, fluorodaunorunicin hydrochloride, Fluorodopa F 18, Fluorometholone, Fluorouracil, Fluotracen Hydrochloride, Fluoxetine, Fluoxymesterone, fluparoxan, Fluperamide, Fluperolone Acetate, Fluphenazine Decanoate, flupirtine, Fluprednisolone, Fluproquazone, Fluprostenol Sodium, Fluquazone, Fluradoline Hydrochloride, Flurandrenolide, Flurazepam Hydrochloride, Flurbiprofen, Fluretofen, flurithromycin, Flurocitabine, Flurofamide, Flurogestone Acetate, Flurothyl, Fluroxene, Fluspiperone, Fluspirilene, Fluticasone Propionate, flutrimazole, Flutroline, fluvastatin, Fluvastatin Sodium, fluvoxamine, Fluzinamide, Folic Acid, Follicle regulatory protein, Folliculostatin, Fomepizole, Fonazine Mesylate, forasartan, forfenimex, forfenirmex, formestane, Formocortal, formoterol, Fosarilate, Fosazepam, Foscarnet Sodium, fosfomycin, Fosfonet Sodium, fosinopril, Fosinoprilat, fosphenyloin, Fosquidone, Fostedil, fostriecin, fotemustine, Fuchsin, Basic, Fumoxicillin, Fungimycin, Furaprofen, Furazolidone, Furazolium Chloride, Furegrelate Sodium, Furobufen, Furodazole, Furosemide, Fusidate Sodium, Fusidic Acid, gabapentin, Gadobenate Dimeglumine, gadobenic acid, gadobutrol, Gadodiamide, gadolinium texaphyrin, Gadopentetate Dimegiumine, gadoteric acid, Gadoteridol, Gadoversetamide, galantamine, galdansetron, Galdansetron Hydrochloride, Gallamine Triethiodide, gallium nitrate, gallopamil, galocitabine, Gamfexine, gamolenic acid, Ganciclovir, ganirelix, gelatinase inhibitors, Gemcadiol, Gemcitabine, Gemeprost, Gemfibrozil, Gentamicin Sulfate, Gentian Violet, gepirone, Gestaclone, Gestodene, Gestonorone Caproate, Gestrinone, Gevotroline Hydrochloride, girisopam, glaspimod, glaucocalyxin A, Glemanserin, Gliamilide, Glibornuride, Glicetanile Sodium, Gliflumide, Glimepiride, Glipizide, Gloximonam, Glucagon, glutapyrone, glutathione inhibitors, Glutethimide, Glyburide, glycopine, glycopril, Glycopyrrolate, Glyhexamide, Glymidine Sodium, Glyoctamide, Glyparamide, Gold Au 198, Gonadoctrinins, Gonadorelin, Gonadotropins, Goserelin, Gramicidin, Granisetron, grepafloxacin, Griseofulvin, Guaiapate, Guaithylline, Guanabenz, Guanabenz Acetate, Guanadrel Sulfate, Guancydine, Guanethidine Monosulfate, Guanfacine Hydrochloride, Guanisoquin Sulfate, Guanoclor Sulfate, Guanoctine Hydrochloride, Guanoxabenz, Guanoxan Sulfate, Guanoxyfen Sulfate, Gusperimus Trihydrochloride, Halazepam, Halcinonide, halichondrin B, Halobetasol Propionate, halofantrine, Halofantrine Hydrochloride, Halofenate, Halofuginone Hydrobromide, halomon, Halopemide, Haloperidol, halopredone, Haloprogesterone, Haloprogin, Halothane, Halquinols, Hamycin, Han memopausal gonadotropins, hatomamicin, hatomarubigin A, hatomarubigin B, hatomarubigin C, hatomarubigin D, Heparin Sodium, hepsulfam, heregulin, Hetacillin, Heteronium Bromide, Hexachlorophene: Hydrogen Peroxide, Hexafluorenium Bromide, hexamethylene bisacetamide, Hexedine, Hexobendine, Hexoprenaline Sulfate, Hexylresorcinol, Histamine Phosphate, Histidine, Histoplasmin, Histrelin, Homatropine Hydrobromide, Hoquizil Hydrochloride, Human chorionic gonadotropin, Hycanthone, Hydralazine Hydrochloride, Hydralazine Polistirex, Hydrochlorothiazide, Hydrocodone Bitartrate, Hydrocortisone, Hydroflumethiazide, Hydromorphone Hydrochloride, Hydroxyamphetamine Hydrobromide, Hydroxychloroquine Sulfate, Hydroxyphenamate, Hydroxyprogesterone Caproate, Hydroxyurca, Hydroxyzine Hydrochloride, Hymecromone, Hyoscyamine, hypericin, Ibafloxacin, ibandronic acid, ibogaine, Ibopamine, ibudilast, Ibufenac, Ibuprofen, Ibutilide Fumarate, Icatibant Acetate, Ichthammol, Icotidine, idarubicin, idoxifene, Idoxuridine, idramantone, lemefloxacin, lesopitron, Ifetroban, Ifosfamide, Ilepeimide, illimaquinone, ilmofosine, ilomastat, Ilonidap, iloperidone, iloprost, Imafen Hydrochloride, Imazodan Hydrochloride, imidapril, imidazenil, imidazoacridones, Imidecyl Iodine, Imidocarb Hydrochloride, Imidoline Hydrochloride, Imidurea, Imiloxan Hydrochloride, Imipenem, Imipramine Hydrochloride, imiquimod, immunostimulant peptides, Impromidine Hydrochloride, Indacrinone, Indapamide, Indecainide Hydrochloride, Indeloxazine Hydrochloride, Indigotindisulfonate Sodium, indinavir, Indocyanine Green, Indolapril Hydrochloride, Indolidan, indometacin, Indomethacin Sodium, Indoprofen, indoramin, Indorenate Hydrochloride, Indoxole, Indriline Hydrochloride, inocoterone, inogatran, inolimomab, Inositol Niacinate, Insulin, interferons, interleukins, Intrazole, Intriptyline Hydrochloride, iobenguane, Iobenzamic Acid, iobitridol, locarmate Meglumine, locarmic Acid, locetamic Acid, Iodamide, Iodine, Iodipamide Meglumine, Iodixanol, iodoamiloride, Iodoantipyrine I 131, Iodocholesterol I 131, iodo-doxorubicin, Iodohippurate Sodium I 131, Iodopyracet I 125, Iodoquinol, lodoxamate Meglumine, lodoxamie Acid, loglicic Acid, lofetamine Hydrochloride I 123, iofratol, Ioglucol, Ioglucomide, Ioglycamic Acid, Iogulamide, Iohexol, iomeprol, lomethin I 125, Iopamidol, lopanoic Acid, iopentol, Iophendylate, loprocemic Acid, iopromide, Iopronic Acid, lopydol, lopydone, iopyrol, losefamic Acid, loseric Acid, Iosulamide Meglumine, Iosumetic Acid, Iotasul, Iotetric Acid, Iothalamate Sodium, Iothalamic Acid, iotriside, Iotrolan, Iotroxic Acid, Iotyrosine I 131, Ioversol, Ioxagiate Sodium, Ioxaglate Meglumine, loxaglic Acid, ioxilan, loxotrizoic Acid, ipazilide, ipenoxazone, ipidacrine, Ipodate Calcium, ipomeanol, 4-, Ipratropium Bromide, ipriflavone, Iprindole, Iprofenin, Ipronidazole, Iproplatin, Iproxamine Hydrochloride, ipsapirone, irbesartan, irinotecan, irloxacin, iroplact, irsogladine, Irtemazole, isalsteine, Isamoxole, isbogrel, Isepamicin, isobengazole, Isobutamben, Isocarboxazid, Isoconazole, Isoetharine, isofloxythepin, Isofluredone Acetate, Isoflurane, Isoflurophate, isohomohalicondrin B, Isoleucine, Isomazole Hydrochloride, Isomylamine Hydrochloride, Isoniazid, Isopropamide Iodide, Isopropyl Alcohol, isopropyl unoprostone, Isoproterenol Hydrochloride, Isosorbide, Isosorbide Mononitrate, Isotiquimide, Isotretinoin, Isoxepac, Isoxicam, Isoxsuprine Hydrochloride, isradipine, itameline, itasetron, Itazigrel, itopride, Itraconazole, Ivermectin, jasplakinolide, Josamycin, kahalalide F, Kalafungin, Kanamycin Sulfate, Ketamine Hydrochloride, Ketanserin, Ketazocine, Ketazolam, Kethoxal, Ketipramine Fumarate, Ketoconazole, Ketoprofen, Ketorfanol, ketorolac, Ketotifen Fumarate, Kitasamycin, Labetalol Hydrochloride, Lacidipine, lacidipine, lactitol, lactivicin, lacosamide, laennec, lafutidine, lamellarin-N triacetate, lamifiban, Lamivudine, Lamotrigine, lanoconazole, Lanoxin, lanperisone, lanreotide, Lansoprazole, latanoprost, lateritin, laurocapram, Lauryl Isoquinolinium Bromide, Lavoltidine Succinate, lazabemide, Lecimibide, leinamycin, lemildipine, leminoprazole, lenercept, Leniquinsin, lenograstim, Lenperone, lentinan sulfate, leptin, leptolstatin, lercanidipine, Lergotrile, lerisetron, Letimide Hydrochloride, letrazuril, letrozole, Leucine, leucomyzin, Leuprolide Acetate, leuprolide+estrogen+progesterone, leuprorelin, Levamfetamine Succinate, levamisole, Levdobutamine Lactobionate, Leveromakalim, levetiracetam, Leveycloserine, levobetaxolol, levobunolol, levobupivacaine, levocabastine, levocarnitine, Levodopa, levodropropizine, levofloxacin, Levofuraltadone, Levoleucovorin Calcium, Levomethadyl Acetate, Levomethadyl Acetate Hydrochloride, levomoprolol, Levonantradol Hydrochloride, Levonordefrin, Levonorgestrel, Levopropoxyphene Napsylate, Levopropylcillin Potassium, levormeloxifene, Levorphanol Tartrate, levosimendan, levosulpiride, Levothyroxine Sodium, Levoxadrol Hydrochloride, Lexipafant, Lexithromycin, liarozole, Libenzapril, Lidamidine Hydrochloride, Lidocaine, Lidofenin, Lidoflazine, Lifarizine, Lifibrate, Lifibrol, Linarotene, Lincomycin, linear polyamine analogue, Linogliride, Linopirdine, linotroban, linsidomine, lintitript, lintopride, Liothyronine I 125, liothyronine sodium, Liotrix, lirexapride, lisinopril, lissoclinamide 7, Lixazinone Sulfate, lobaplatin, Lobenzarit Sodium, Lobucavir, Lodelaben, lodoxamide, Lofemizole Hydrochloride, Lofentanil Oxalate, Lofepramine Hydrochloride, Lofexidine Hydrochloride, lombricine, Lomefloxacin, lomerizine, Lometraline Hydrochloride, lometrexol, Lomofungin, Lomoxicam, Lomustine, Lonapalene, lonazolac, lonidamine, Loperamide Hydrochloride, loracarbef, Lorajmine Hydrochloride, loratadine, Lorazepam, Lorbamate, Lorcainide Hydrochloride, Loreclezole, Loreinadol, lorglumide, Lormetazepam, Lornoxicam, lornoxicam, Lortalamine, Lorzafone, losartan, losigamone, losoxantrone, Losulazine Hydrochloride, loteprednol, lovastatin, loviride, Loxapine, Loxoribine, lubeluzole, Lucanthone Hydrochloride, Lufironil, Lurosetron Mesylate, lurtotecan, luteinizing hormone, lurasidone, lutetium, Lutrelin Acetate, luzindole, Lyapolate Sodium, Lycetamine, lydicamycin, Lydimycin, Lynestrenol, Lypressin, Lysine, lysofylline, lysostaphin, lytic peptides, Maduramicin, Mafenide, magainin 2 amide, Magnesium Salicylate, Magnesium Sulfate, magnolol, maitansine, Malethamer, mallotochromene, mallotojaponin, Malotilate, malotilate, mangafodipir, manidipine, maniwamycin A, Mannitol, mannostatin A, manumycin E, manumycin F, mapinastine, Maprotiline, marimastat, Martek 8708, Martek 92211, Masoprocol, maspin, massetolide, matrilysin inhibitors, Maytansine, Mazapertine Succiniate, Mazindol, Mebendazole, Mebeverine Hydrochloride, Mebrofenin, Mebutamate, Mecamylamine Hydrochloride, Mechlorethamine Hydrochloride, Meclocycline, Meclofenamate Sodium, Mecloqualone, Meclorisone Dibutyrate, Medazepam Hydrochloride, Medorinone, Medrogestone, Medroxalol, Medroxyprogesterone, Medrysone, Meelizine Hydrochloride, Mefenamic Acid, Mefenidil, Mefenorex Hydrochloride, Mefexamide, Mefloquine Hydrochloride, Mefruside, Megalomicin Potassium Phosphate, Megestrol Acetate, Meglumine, Meglutol, Melengestrol Acetate, Melitracen Hydrochloride, Melphalan, Memotine Hydrochloride, Menabitan Hydrochloride, Menoctone, menogaril, Menotropins, Meobentine Sulfate, Mepartricin, Mepenzolate Bromide, Meperidine Hydrochloride, Mephentermine Sulfate, Mephenyloin, Mephobarbital, Mepivacaine Hydrochloride, Meprobamate, Meptazinol Hydrochloride, Mequidox, Meralein Sodium, merbarone, Mercaptopurine, Mercufenol Chloride, Mercury, Ammoniated, Merisoprol Hg 197, Meropenem, Mesalamine, Meseclazone, Mesoridazine, Mesterolone, Mestranol, Mesuprine Hydrochloride, Metalol Hydrochloride, Metaproterenol Polistirex, Metaraminol Bitartrate, Metaxalone, Meteneprost, meterelin, Metformin, Methacholine Chloride, Methacycline, Methadone Hydrochloride, Methadyl Acetate, Methalthiazide, Methamphetamine Hydrochloride, Methaqualone, Methazolamide, Methdilazine, Methenamine, Methenolone Acetate, Methetoin, Methicillin Sodium, Methimazole, methioninase, Methionine, Methisazone, Methixene Hydrochloride, Methocarbamol, Methohexital Sodium, Methopholine, Methotrexate, Methotrimeprazine, methoxatone, Methoxyflurane, Methsuximide, Methyclothiazide, Methyl Palmoxirate, Methylatropine Nitrate, Methylbenzethonium Chloride, Methyldopa, Methyldopate Hydrochloride, Methylene Blue, Methylergonovine Maleate, methylhistamine, R-alpha, methylinosine monophosphate, Methylphenidate Hydrochloride, Methylprednisolone, Methyltestosterone, Methynodiol Diacelate, Methysergide, Methysergide Maleate, Metiamide, Metiapine, Metioprim, metipamide, Metipranolol, Metizoline Hydrochloride, Metkephamid Acetate, metoclopramide, Metocurine Iodide, Metogest, Metolazone, Metopimazine, Metoprine, Metoprolol, Metoquizine, metrifonate, Metrizamide, Metrizoate Sodium, Metronidazole, Meturedepa, Metyrapone, Metyrosine, Mexiletine Hydrochloride, Mexrenoate Potassium, Mezlocillin, mfonelic Acid, Mianserin Hydrochloride, mibefradil, Mibefradil Dihydrochloride, Mibolerone, michellamine B, Miconazole, microcolin A, Midaflur, Midazolam Hydrochloride, midodrine, mifepristone, Mifobate, miglitol, milacemide, milameline, mildronate, Milenperone, Milipertine, milnacipran, Milrinone, miltefosine, Mimbane Hydrochloride, minaprine, Minaxolone, Minocromil, Minocycline, Minoxidil, Mioflazine Hydrochloride, miokamycin, mipragoside, mirfentanil, mirimostim, Mirincamycin Hydrochloride, Mirisetron Maleate, Mirtazapine, mismatched double stranded RNA, Misonidazole, Misoprostol, Mitindomide, Mitocarcin, Mitocromin, Mitogillin, mitoguazone, mitolactol, Mitomalcin, Mitomycin, mitonafide, Mitosper, Mitotane, mitoxantrone, mivacurium chloride, mivazerol, mixanpril, Mixidine, mizolastine, mizoribine, Moclobemide, modafinil, Modaline Sulfate, Modecainide, moexipril, mofarotene, Mofegiline Hydrochloride, mofezolac, molgramostim, Molinazone, Molindone Hydrochloride, Molsidomine, mometasone, Monatepil Maleate, Monensin, Monoctanoin, Montelukast Sodium, montirelin, mopidamol, moracizine, Morantel Tartrate, Moricizine, Morniflumate, Morphine Sulfate, Morrhuate Sodium, mosapramine, mosapride, motilide, Motretinide, Moxalactam Disodium, Moxazocine, moxiraprine, Moxnidazole, moxonidine, Mumps Skin Test Antigen, mustard anticancer agent, Muzolimine, mycaperoxide B, Mycophenolic Acid, myriaporone, Nabazenil, Nabilone, Nabitan Hydrochloride, Naboctate Hydrochloride, Nabumetone, N-acetyldinaline, Nadide, nadifloxacin, Nadolol, nadroparin calcium, nafadotride, nafamostat, nafarelin, Nafcillin Sodium, Nafenopin, Nafimidone Hydrochloride, Naflocort, Nafomine Malate, Nafoxidine Hydrochloride, Nafronyl Oxalate, Naftifine Hydrochloride, naftopidil, naglivan, nagrestip, Nalbuphine Hydrochloride, Naldemedine, Nalidixate Sodium, Nalidixic Acid, nalmefene, Nalmexone Hydrochloride, naloxone+pentazocine, Naltrexone, Namoxyrate, Nandrolone Phenpropionate, Nantradol Hydrochloride, Napactadine Hydrochloride, napadisilate, Napamezole Hydrochloride, napaviin, Naphazoline Hydrochloride, naphterpin, Naproxen, Naproxol, napsagatran, Naranol Hydrochloride, Narasin, naratriptan, nartograstim, nasaruplase, Natamycin, nateplase, Naxagolide Hydrochloride, Nebivolol, Nebramycin, nedaplatin, Nedocromil, Nefazodone Hydrochloride, Neflumozide Hydrochloride, Nefopam Hydrochloride, Nelezaprine Maleate, Nemazoline Hydrochloride, nemorubicin, Neomycin Palmitate, Neostigmine Bromide, neridronic acid, Netilmicin Sulfate, neutral endopeptidase, Neutramycin, Nevirapine, Nexeridine Hydrochloride, Niacin, Nibroxane, Nicardipine Hydrochloride, Nicergoline, Niclosamide, Nicorandil, Nicotinyl Alcohol, Nifedipine, Nifirmerone, Nifluridide, Nifuradene, Nifuraldezone, Nifuratel, Nifuratrone, Nifurdazil, Nifurimide, Nifurpirinol, Nifurquinazol, Nifurthiazole, nilutamide, Nilvadipine, Nimazone, Nimodipine, niperotidine, niravoline, Niridazole, nisamycin, Nisbuterol Mesylate, nisin, Nisobamate, Nisoldipine, Nisoxetine, Nisterime Acetate, Nitarsone, nitazoxamide, nitecapone, Nitrafudam Hydrochloride, Nitralamine Hydrochloride, Nitramisole Hydrochloride, Nitrazepam, Nitrendipine, Nitrocycline, Nitrodan, Nitrofurantoin, Nitrofurazone, Nitroglycerin, Nitromersol, Nitromide, Nitromifene Citrate, Nitrous Oxide, nitroxide antioxidant, nitrullyn, Nivazol, Nivimedone Sodium, Nizatidine, Noberastine, Nocodazole, Nogalamycin, Nolinium Bromide, Nomifensine Maleate, Noracymethadol Hydrochloride, Norbolethone, Norepinephrine Bitartrate, Norethindrone, Norethynodrel, Norfloxacin, Norflurane, Norgestimate, Norgestomet, Norgestrel, Nortriptyline Hydrochloride, Noscapine, Novobiocin Sodium, N-substituted benzaimides, Nufenoxole, Nylestriol, Nystatin, O6-benzylguanine, Obidoxime Chloride, Ocaperidone, Ocfentanil Hydrochloride, Ocinaplon, Octanoic Acid, Octazamide, Octenidine Hydrochloride, Octodrine, Octreotide, Octriptyline Phosphate, Ofloxacin, Oformine, okicenone, Olanzapine, oligonucleotides, olopatadine, olprinone, olsalazine, Olsalazine Sodium, Olvanil, omeprazole, onapristone, ondansetron, Ontazolast, Oocyte maturation inhibitor, Opipramol Hydrochloride, oracin, Orconazole Nitrate, Orgotein, Orlislat, Ormaplatin, Ormetoprim, Ornidazole, Orpanoxin, Orphenadrine Citrate, osaterone, otenzepad, Oxacillin Sodium, Oxagrelate, oxaliplatin, Oxamarin Hydrochloride, oxamisole, Oxamniquine, oxandrolone, Oxantel Pamoate, Oxaprotiline Hydrochloride, Oxaprozin, Oxarbazole, Oxatomide, oxaunomycin, Oxazepam, oxcarbazepine, Oxendolone, Oxethazaine, Oxetorone Fumarate, Oxfendazole, Oxfenicine, Oxibendazole, oxiconazole, Oxidopamine, Oxidronic Acid, Oxifungin Hydrochloride, Oxilorphan, Oximonam, Oximonam Sodium, Oxiperomide, oxiracetam, Oxiramide, Oxisuran, Oxmetidine Hydrochloride, oxodipine, Oxogestone Phenpropionate, Oxolinic Acid, Oxprenolol Hydrochloride, Oxtriphylline, Oxybutynin Chloride, Oxychlorosene, Oxycodone, Oxymetazoline Hydrochloride, Oxymetholone, Oxymorphone Hydrochloride, Oxypertine, Oxyphenbutazone, Oxypurinol, Oxytetracycline, Oxytocin, ozagrel, Ozolinone, Paclitaxel, palauamine, Paldimycin, palinavir, palmitoylrhizoxin, Palmoxirate Sodium, pamaqueside, Pamatolol Sulfate, pamicogrel, Pamidronate Disodium, pamidronic acid, Panadiplon, panamesine, panaxytriol, Pancopride, Pancuronium Bromide, panipenem, pannorin, panomifene, pantethine, pantoprazole, Papaverine Hydrochloride, parabactin, Parachlorophenol, Paraldehyde, Paramethasone Acetate, Paranyline Hydrochloride, Parapenzolate Bromide, Pararosaniline Pamoate, Parbendazole, Parconazole Hydrochloride, Paregoric, Pareptide Sulfate, Pargyline Hydrochloride, parnaparin sodium, Paromomycin Sulfate, Paroxetine, parthenolide, Partricin, Paulomycin, pazelliptine, Pazinaclone, Pazoxide, pazufloxacin, pefloxacin, pegaspargase, Pegorgotein, Pelanserin Hydrochloride, peldesine, Peliomycin, Pelretin, Pelrinone Hydrochloride, Pemedolac, Pemerid Nitrate, pemirolast, Pemoline, Penamecillin, Penbutolol Sulfate, Penciclovir, Penfluridol, Penicillin G Benzathine, Penicillin G Potassium, Penicillin G Procaine, Penicillin G Sodium, Penicillin V, Penicillin V Benzathine, Penicillin V Hydrabamine, Penicillin V Potassium, Pentabamate, Pentaerythritol Tetranitrate, pentafuside, pentamidine, pentamorphone, Pentamustine, Pentapiperium Methylsulfate, Pentazocine, Pentetic Acid, Pentiapine Maleate, pentigetide, Pentisomicin, Pentizidone Sodium, Pentobarbital, Pentomone, Pentopril, pentosan, pentostatin, Pentoxifylline, Pentrinitrol, pentrozole, Peplomycin Sulfate, Pepstatin, perflubron, perfofamide, Perfosfamide, pergolide, Perhexiline Maleate, perillyl alcohol, Perindopril, perindoprilat, Perlapine, Permethrin, perospirone, Perphenazine, Phenacemide, phenaridine, phenazinomycin, Phenazopyridine Hydrochloride, Phenbutazone Sodium Glycerate, Phencarbamide, Phencyclidine Hydrochloride, Phendimetrazine Tartrate, Phenelzine Sulfate, Phenmetrazine Hydrochloride, Phenobarbital, Phenoxybenzamine Hydrochloride, Phenprocoumon, phenserine, phensuccinal, Phensuximide, Phentermine, Phentermine Hydrochloride, phentolamine mesilate, Phentoxifylline, Phenyl Aminosalicylate, phenylacetate, Phenylalanine, phenylalanyl ketoconazole, Phenylbutazone, Phenylephrine Hydrochloride, Phenylpropanolamine Hydrochloride, Phenylpropanolamine Polistirex, Phenyramidol Hydrochloride, Phenyloin, phosphatase inhibitors, Physostigmine, picenadol, picibanil, Picotrin Diolamine, picroliv, picumeterol, pidotimod, Pifamine, Pilocarpine, pilsicainide, pimagedine, Pimetine Hydrochloride, pimilprost, Pimobendan, Pimozide, Pinacidil, Pinadoline, Pindolol, pinnenol, pinocebrin, Pinoxepin Hydrochloride, pioglitazone, Pipamperone, Pipazethate, pipecuronium bromide, Piperacetazine, Piperacillin Sodium, Piperamide Maleate, piperazine, Pipobroman, Piposulfan, Pipotiazine Palmitate, Pipoxolan Hydrochloride, Piprozolin, Piquindone Hydrochloride, Piquizil Hydrochloride, Piracetam, Pirandamine Hydrochloride, pirarubicin, Pirazmonam Sodium, Pirazolac, Pirbenicillin Sodium, Pirbuterol Acetate, Pirenperone, Pirenzepine Hydrochloride, piretamide, Pirfenidone, Piridicillin Sodium, Piridronate Sodium, Piriprost, piritrexim, Pirlimycin Hydrochloride, pirlindole, pirmagrel, Pirmenol Hydrochloride, Pirnabine, Piroctone, Pirodavir, pirodomast, Pirogliride Tartrate, Pirolate, Pirolazamide, Piroxantrone Hydrochloride, Piroxicam, Piroximone, Pirprofen, Pirquinozol, Pirsidomine, Prenylamine, Pituitary, Posterior, Pivampicillin Hydrochloride, Pivopril, Pizotyline, placetin A, platinum compounds, platinum-triamine complex, Plicamycin, Plomestane, Pobilukast Edamine, Podofilox, Poisonoak Extract, Poldine Methylsulfate, Poliglusam, Polignate Sodium, Polymyxin B Sulfate, Polythiazide, Ponalrestat, Porfimer Sodium, Porfiromycin, Potassium Chloride, Potassium Iodide, Potassium Permanganate, Povidone-Iodine, Practolol, Pralidoxime Chloride, Pramiracetam Hydrochloride, Pramoxine Hydrochloride, Pranolium Chloride, Pravadoline Maleate, Pravastatin (Pravachol), Prazepam, Prazo sin, Prazosin Hydrochloride, Prednazate, Prednicarbate, Prednimustine, Prednisolone, Prednisone, Prednival, Pregnenolone Succiniate, Prenalterol Hydrochloride, Pridefine Hydrochloride, Prifelone, Prilocalne Hydrochloride, Prilosec, Primaquine Phosphate, Primidolol, Primidone, Prinivil, Prinomide Tromethamine, Prinoxodan, Prizidilol Hydrochloride, Proadifen Hydrochloride, Probenecid, Probicromil Calcium, Probucol, Procainamide Hydrochloride, Procaine Hydrochloride, Procarbazine Hydrochloride, Procaterol Hydrochloride, Prochlorperazine, Procinonide, Proclonol, Procyclidine Hydrochloride, Prodilidine Hydrochloride, Prodolic Acid, Profadol Hydrochloride, Progabide, Progesterone, Proglumide, Proinsulin Human, Proline, Prolintane Hydrochloride, Promazine Hydrochloride, Promethazine Hydrochloride, Propafenone Hydrochloride, propagermanium, Propanidid, Propantheline Bromide, Proparacaine Hydrochloride, Propatyl Nitrate, propentofylline, Propenzolate Hydrochloride, Propikacin, Propiomazine, Propionic Acid, propionylcarnitine, L-, propiram, propiram+paracetamol, propiverine, Propofol, Propoxycaine Hydrochloride, Propoxyphene Hydrochloride, Propranolol Hydrochloride, Propulsid, propyl bis-acridone, Propylhexedrine, Propyliodone, Propylthiouracil, Proquazone, Prorenoate Potassium, Proroxan Hydrochloride, Proscillaridin, Prostalene, prostratin, Protamine Sulfate, protegrin, Protirelin, protosufloxacin, Protriptyline Hydrochloride, Proxazole, Proxazole Citrate, Proxicromil, Proxorphan Tartrate, prulifloxacin, Pseudoephedrine Hydrochloride, Puromycin, purpurins, Pyrabrom, Pyrantel Pamoate, Pyrazinamide, Pyrazofurin, pyrazoloacridine, Pyridostigmine Bromide, Pyrilamine Maleate, Pyrimethamine, Pyrinoline, Pyrithione Sodium, Pyrithione Zinc, Pyrovalerone Hydrochloride, Pyroxamine Maleate, Pyrrocaine, Pyrroliphene Hydrochloride, Pyrrolnitrin, Pyrvinium Pamoate, Quadazocine Mesylate, Quazepam, Quazinone, Quazodine, Quazolast, quetiapine, quiflapon, quinagolide, Quinaldine Blue, quinapril, Quinaprilat, Quinazosin Hydrochloride, Quinbolone, Quinctolate, Quindecamine Acetate, Quindonium Bromide, Quinelorane Hydrochloride, Quinestrol, Quinfamide, Quingestanol Acetate, Quingestrone, Quinidine Gluconate, Quinielorane Hydrochloride, Quinine Sulfate, Quinpirole Hydrochloride, Quinterenol Sulfate, Quinuclium Bromide, Quinupristin, Quipazine Maleate, Rabeprazole Sodium, Racephenicol, Racepinephrine, raf antagonists, Rafoxamide, Ralitoline, raloxifene, raltitrexed, ramatroban, Ramipril, Ramoplanin, ramosetron, ranelic acid, Ranimycin, Ranitidine, ranolazine, Rauwolfia Serpentina, recainam, Recainam Hydrochloride, Reclazepam, regavirumab, Regramostim, Relaxin, Relomycin, Remacemide Hydrochloride, Remifentanil Hydrochloride, Remiprostol, Remoxipride, Repirinast, Repromicin, Reproterol Hydrochloride, Reserpine, resinferatoxin, Resorcinol, retelliptine demethylated, reticulon, reviparin sodium, revizinone, rhenium Re 186 etidronate, rhizoxin, Ribaminol, Ribavirin, Riboprine, ribozymes, ricasetron, Ridogrel, Rifabutin, Rifametane, Rifamexil, Rifamide, Rifampin, Rifapentine, Rifaximin, RH retinamide, rilopirox, Riluzole, rimantadine, Rimcazole Hydrochloride, Rimexolone, Rimiterol Hydrobromide, rimoprogin, riodipine, Rioprostil, Ripazepam, ripisartan, Risedronate Sodium, risedronic acid, Risocaine, Risotilide Hydrochloride, rispenzepine, Risperdal, Risperidone, Ritanserin, ritipenem, Ritodrine, Ritolukast, ritonavir, rizatriptan benzoate, Rocastine Hydrochloride, Rocuronium Bromide, Rodocaine, Roflurane, Rogletimide, rohitukine, rokitamycin, Roletamicide, Rolgamidine, Rolicyprine, Rolipram, Rolitetracycline, Rolodine, Romazarit, romurtide, Ronidazole, ropinirole, Ropitoin Hydrochloride, ropivacaine, Ropizine, roquinimex, Rosaramicin, rosiglitazone, Rosoxacin, Rotoxamine, roxaitidine, Roxarsone, roxindole, roxithromycin, rubiginone B 1, ruboxyl, rufloxacin, rupatidine, Rutamycin, ruzadolane, Sabeluzole, safingol, safironil, saintopin, salbutamol, R-Salcolex, Salethamide Maleate, Salicyl Alcohol, Salicylamide, Salicylate Meglumine, Salicylic Acid, Salmeterol, Salnacediin, Salsalate, sameridine, sampatrilat, Sancycline, sanfetrinem, Sanguinarium Chloride, Saperconazole, saprisartan, sapropterin, saquinavir, Sarafloxacin Hydrochloride, Saralasin Acetate, SarCNU, sarcophytol A, sargramostim, Sarmoxicillin, Sarpicillin, sarpogrelate, saruplase, saterinone, satigrel, satumomab pendetide, Schick Test Control, Scopafungin, Scopolamine Hydrobromide, Scrazaipine Hydrochloride, Sdi 1 mimetics, Secalciferol, Secobarbital, Seelzone, Seglitide Acetate, seleigiline, Selegiline Hydrochloride, Selenium Sulfide, Selenomethionine Se 75, Selfotel, sematilide, semduramicin, semotiadil, semustine, sense oligonucleotides, Sepazonium Chloride, Seperidol Hydrochloride, Seprilose, Seproxetine Hydrochloride, Seractide Acetate, Sergolexole Maleate, Serine, Sermetacin, Sermorelin Acetate, sertaconazole, sertindole, sertraline, setiptiline, Setoperone, sevirumab, sevoflurane, sezolamide, Sibopirdine, Sibutramine Hydrochloride, signal transduction inhibitors, Silandrone, silipide, silteplase, Silver Nitrate, simendan, Simtrazene, Simvastatin, Sincalide, Sinefungin, sinitrodil, sinnabidol, sipatrigine, sirolimus, Sisomicin, Sitogluside, sizofiran, sobuzoxane, Sodium Amylosulfate, Sodium Iodide I 123, Sodium Nitroprusside, Sodium Oxybate, sodium phenylacetate, Sodium Salicylate, solverol, Solypertine Tartrate, Somalapor, Somantadine Hydrochloride, somatomedin B, somatomedin C, somatrem, somatropin, Somenopor, Somidobove, sonermin, Sorbinil, Sorivudine, sotalol, Soterenol Hydrochloride, Sparfloxacin, Sparfosate Sodium, sparfosic acid, Sparsomycin, Sparteine Sulfate, Spectinomycin Hydrochloride, spicamycin D, Spiperone, Spiradoline Mesylate, Spiramycin, Spirapril Hydrochloride, Spiraprilat, Spirogermanium Hydrochloride, Spiromustine, Spironolactone, Spiroplatin, Spiroxasone, splenopentin, spongistatin 1, Sprodiamide, squalamine, Stallimycin Hydrochloride, Stannous Pyrophosphate, Stannous Sulfur Colloid, Stanozolol, Statolon, staurosporine, stavudine, Steffimycin, Stenbolone Acetate, stepronin, Stilbazium Iodide, Stilonium Iodide, stipiamide, Stiripentol, stobadine, Streptomycin Sulfate, Streptonicozid, Streptonigrin, Streptozocin, stromelysin inhibitors, Strontium Chloride Sr 89, succibun, Succimer, Succinylcholine Chloride, Sucralfate, Sucrosofate Potassium, Sudoxicam, Sufentanil, Sufotidine, Sulazepam, Sulbactam Pivoxil, Sulconazole Nitrate, Sulfabenz, Sulfabenzamide, Sulfacetamide, Sulfacytine, Sulfadiazine, Sulfadoxine, Sulfalene, Sulfamerazine, Sulfameter, Sulfamethazine, Sulfamethizole, Sulfamethoxazole, Sulfamonomethoxine, Sulfamoxole, Sulfanilate Zinc, Sulfanitran, sulfasalazine, Sulfasomizole, Sulfazamet, Sulfinalol Hydrochloride, sulfinosine, Sulfinpyrazone, Sulfisoxazole, Sulfomyxin, Sulfonterol Hydrochloride, sulfoxamine, Sulinlldac, Sulmarin, Sulnidazole, Suloctidil, Sulofenur, sulopenem, Suloxifen Oxalate, Sulpiride, Sulprostone, sultamicillin, Sulthiame, sultopride, sulukast, Sumarotene, sumatriptan, Suncillin Sodium, Suproclone, Suprofen, suradista, suramin, Surfomer, Suricainide Maleate, Suritozole, Suronacrine Maleate, Suxemerid Sulfate, swainsonine, symakalim, Symclosene, Symetine Hydrochloride, synthetic glycosaminoglycans, Taciamine Hydrochloride, Tacrine Hydrochloride, Tacrolimus, Talampicillin Hydrochloride, Taleranol, Talisomycin, tallimustine, Talmetacin, Talniflumate, Talopram Hydrochloride, Talosalate, Tametraline Hydrochloride, Tamoxifen, Tampramine Fumarate, Tamsulosin Hydrochloride, Tandamine Hydrochloride, tandospirone, tapgen, taprostene, Tasosartan, tauromustine, Taxane, Taxoid, Tazadolene Succinate, tazanolast, tazarotene, Tazifylline Hydrochloride, Tazobactam, Tazofelone, Tazolol Hydrochloride, Tebufelone, Tebuquine, Technetium Tc 99 m Bicisate, Teclozan, Tecogalan Sodium, Teecleukin, Teflurane, Tegafur, Tegretol, Teicoplanin, telenzepine, tellurapyrylium, telmesteine, telmisartan, telomerase inhibitors, Teloxantrone Hydrochloride, Teludipine Hydrochloride, Temafloxacin Hydrochloride, Tematropium Methyl sulfate, Temazepam, Temelastine, temocapril, Temocillin, temoporfin, temozolomide, Tenidap, Teniposide, tenosal, tenoxicam, tepirindole, Tepoxalin, Teprotide, terazosin, Terbinafine, Terbutaline Sulfate, Terconazole, terfenadine, terflavoxate, terguride, Teriparatide Acetate, terlakiren, terlipressin, terodiline, Teroxalene Hydrochloride, Teroxirone, tertatolol, Tesicam, Tesimide, Testolactone, Testosterone, Tetracaine, tetrachlorodecaoxide, Tetracycline, Tetrahydrozoline Hydrochloride, Tetramisole Hydrochloride, Tetrazolast Meglumine, tetrazomine, Tetrofosmin, Tetroquinone, Tetroxoprim, Tetrydamine, thaliblastine, Thalidomide, Theofibrate, Theophylline, Thiabendazole, Thiamiprine, Thiamphenicol, Thiamylal, Thiazesim Hydrochloride, Thiazinamium Chloride, Thiethylperazine, Thimerfonate Sodium, Thimerosal, thiocoraline, thiofedrine, Thioguanine, thiomarinol, Thiopental Sodium, thioperamide, Thioridazine, Thiotepa, Thiothixene, Thiphenamil Hydrochloride, Thiphencillin Potassium, Thiram, Thozalinone, Threonine, Thrombin, thrombopoietin, thrombopoietin mimetic, thymalfasin, thymopoietin receptor agonist, thymotrinan, Thyromedan Hydrochloride, Thyroxine 1 125, Thyroxine 1 131, Tiacrilast, Tiacrilast Sodium, tiagabine, Tiamenidine, tianeptine, tiapafant, Tiapamil Hydrochloride, Tiaramide Hydrochloride, Tiazofurin, Tibenelast Sodium, Tibolone, Tibric Acid, Ticabesone Propionate, Ticarbodine, Ticarcillin Cresyl Sodium, Ticlatone, ticlopidine, Ticrynafen, tienoxolol, Tifurac Sodium, Tigemonam Dicholine, Tigestol, Tiletamine Hydrochloride, Tilidine Hydrochloride, tilisolol, tilnoprofen arbamel, Tilorone Hydrochloride, Tiludronate Disodium, tiludronic acid, Timefurone, Timobesone Acetate, Timolol, tin ethyl etiopurpurin, Tinabinol, Timidazole, Tinzaparin Sodium, Tioconazole, Tiodazosin, Tiodonium Chloride, Tioperidone Hydrochloride, Tiopinac, Tiospirone Hydrochloride, Tiotidine, tiotropium bromide, Tioxidazole, Tipentosin Hydrochloride, Tipredane, Tiprenolol Hydrochloride, Tiprinast Meglumine, Tipropidil Hydrochloride, Tiqueside, Tiquinamide Hydrochloride, tirandalydigin, Tirapazamine, tirilazad, tirofiban, tiropramide, titanocene dichloride, Tixanox, Tixocortol Pivalate, Tizanidine Hydrochloride, Tobramycin, Tocainide, Tocamphyl, Tofenacin Hydrochloride, Tolamolol, Tolazamide, Tolazoline Hydrochloride, Tolbutamide, Tolcapone, Tolciclate, Tolfamide, Tolgabide, lamotrigine, Tolimidone, Tolindate, Tolmetin, Tolnaftate, Tolpovidone 1 131, Tolpyrramide, Tolrestat, Tomelukast, Tomoxetine Hydrochloride, Tonazocine Mesylate, Topiramate, topotecan, Topotecan Hydrochloride, topsentin, Topterone, Toquizine, torasemide, toremifene, Torsemide, Tosifen, Tosufloxacin, totipotent stem cell factor, Tracazolate, trafermin, Tralonide, Tramadol Hydrochloride, Tramazoline Hydrochloride, trandolapril, Tranexamic Acid, Tranilast, Transcainide, translation inhibitors, traxanox, Trazodone Hydrochloride, Trazodone-HCL, Trebenzomine Hydrochloride, Trefentanil Hydrochloride, Treloxinate, Trepipam Maleate, Trestolone Acetate, tretinoin, Triacetin, triacetyluridine, Triafungin, Triamcinolone, Triampyzine Sulfate, Triamterene, Triazolam, Tribenoside, tricaprilin, Tricetamide, Trichlormethiazide, trichohyalin, triciribine, Tricitrates, Triclofenol piperazine, Triclofos Sodium, Triclonide, trientine, Trifenagrel, triflavin, Triflocin, Triflubazam, Triflumidate, Trifluoperazine Hydrochloride, Trifluperidol, Triflupromazine, Triflupromazine Hydrochloride, Trifluridine, Trihexyphenidyl Hydrochloride, Trilostane, Trimazosin Hydrochloride, trimegestone, Trimeprazine Tartrate, Trimethadione, Trimethaphan Camsylate, Trimethobenzamide Hydrochloride, Trimethoprim, Trimetozine, Trimetrexate, Trimipramine, Trimoprostil, Trimoxamine Hydrochloride, Triolein 1 125, Triolein 1 131, Trioxifene Mesylate, Tripamide, Tripelennamine Hydrochloride, Triprolidine Hydrochloride, Triptorelin, Trisulfapyrimidines, Troclosene Potassium, troglitazone, Trolamine, Troleandomycin, trombodipine, trometamol, Tropanserin Hydrochloride, Tropicamide, tropine ester, tropisetron, trospectomycin, trovafloxacin, trovirdine, Tryptophan, Tuberculin, Tubocurarine Chloride, Tubulozole Hydrochloride, tucarcsol, tulobuterol, turosteride, Tybamate, tylogenin, Tyropanoate Sodium, Tyrosine, Tyrothricin, tyrphostins, ubenimex, Uldazepam, Undecylenic Acid, Uracil Mustard, urapidil, Urea, Uredepa, uridine triphosphate, Urofollitropin, Urokinase, Ursodiol, valaciclovir, Valine, Valnoctamide, Valproate Sodium, Valproic Acid, valsartan, vamicamide, vanadeine, Vancomycin, vaninolol, Vapiprost Hydrochloride, Vapreotide, variolin B, Vasopressin, Vecuronium Bromide, velaresol, Velnacrine Maleate, venlafaxine, Veradoline Hydrochloride, veramine, Verapamil Hydrochloride, verdins, Verilopam Hydrochloride, Verlukast, Verofylline, veroxan, verteporfin, Vesnarinone, vexibinol, Vidarabine, vigabatrin, Viloxazine Hydrochloride, Vinblastine Sulfate, vinburnine citrate, Vincofos, vinconate, Vincristine Sulfate, Vindesine, Vindesine Sulfate, Vinepidine Sulfate, Vinglycinate Sulfate, Vinleurosine Sulfate, vinorelbine, vinpocetine, vintoperol, vinxaltine, Vinzolidine Sulfate, Viprostol, Virginiamycin, Viridofulvin, Viroxime, vitaxin, Volazocine, voriconazole, vorozole, voxergolide, Warfarin Sodium, Xamoterol, Xanomeline, Xanoxate Sodium, Xanthinol Niacinate, xemilofiban, Xenalipin, Xenbucin, Xilobam, ximoprofen, Xipamide, Xorphanol Mesylate, Xylamidine Tosylate, Xylazine Hydrochloride, Xylometazoline Hydrochloride, Xylose, yangambin, zabicipril, zacopride, zafirlukast, Zalcitabine, zaleplon, zalospirone, Zaltidine Hydrochloride, zaltoprofen, zanamivir, zankiren, zanoterone, Zantac, Zarirlukast, zatebradine, zatosetron, Zatosetron Maleate, zenarestat, Zenazocine Mesylate, Zeniplatin, Zeranol, Zidometacin, Zidovudine, zifrosilone, Zilantel, zilascorb, zileuton, Zimeldine Hydrochloride, Zinc Undecylenate, Zindotrine, Zinoconazole Hydrochloride, Zinostatin, Zinterol Hydrochloride, Zinviroxime, ziprasidone, Zobolt, Zofenopril Calcium, Zofenoprilat, Zolamine Hydrochloride, Zolazepam Hydrochloride, zoledronie acid, Zolertine Hydrochloride, zolmitriptan, zolpidem, Zomepirac Sodium, Zometapine, Zoniclezole Hydrochloride, Zonisamide, zopiclone, Zopolrestat, Zorbamyciin, Zorubicin Hydrochloride, zotepine, Zucapsaicin.

Another pharmaceutical active acceptable for use herein is lumateperone, as disclosed in U.S. Pat. Nos. 9,745,300, 9,708,322, 7,183,282, 7,071,186, 6,552,017, 8,648,077, 8,598,119, 9,751,883, 9,371,324, 9,315,504, 9,428,506, 8,993,572, 8,309,722, 6,713,471, 8,779,139, 9,168,258, RE039680E1, 9,616,061, 9,586,960, and in U.S. Patent Publication Nos. 2017114037, 2017183350, 2015072964, 2004034015, 2017189398, 2016310502, 2015080404, the aforementioned contents of which are incorporated by reference herein in their entirety.

Further examples of antidiabetic actives include but not limited to JTT-501 (PNU-182716) (Reglitazar), AR-H039242, MCC-555 (Netoglitazone), AR-H049020 Tesaglitazar), CS-011 (CI-1037), GW-409544x, KRP-297, RG-12525, BM-15.2054, CLX-0940, CLX-0921, DRF-2189, GW-1929, GW-9820, LR-90, LY-510929, NIP-221, NIP-223, JTP-20993, LY 29311 Na, FK 614, BMS 298585, R 483, TAK 559, DRF 2725 (Ragaglitazar), L-686398, L-168049, L-805645, L-054852, Demethyl asteriquinone BI (L-783281), L-363586, KRP-297, P32/98, CRE-16336 and EML-16257.

Erectile dysfunction therapies useful herein include, but are not limited to, agents for facilitating blood flow to the penis, and for effecting autonomic nervous activities, such as increasing parasympathetic (cholinergic) and decreasing sympathetic (adrenersic) activities. Useful actives for treatment of erectile dysfunction include, for example, but are not limited to, alprostadil, tadalafil, vardenafil, apomorphine, yohimbine hydrochloride, sildenafil citrate, and any combination thereof. In an embodiment, the active is tadalafil.

Actives or medications for the treatment of headaches and/or migraines may also be used herein. Examples of specific actives include, but are not limited to, triptans, such as eletriptan, naratriptan, rizatriptan (rizatriptan benzoate), sumatriptan, and zolmitriptan. In an embodiment, the active is rizatriptan, optionally in combination with an NSAID.

In certain embodiments, the pharmaceutically active component can be a benzodiazepine such as diazepam, lorazepam, midazolam, clorazepate, temazepam, triazolam, clonazepam, flurazepam, oxazepam, chlordiazepoxide, estazolam, quazepam, or alprazolam.

Polymeric Matrix

The composition can include a polymeric matrix. Any desired polymeric matrix may be used, provided that it is orally dissolvable or erodible. The dosage should have enough bioadhesion to not be easily removed and it should form a gel like structure when administered. They can be moderate-dissolving in the oral cavity and particularly suitable for delivery of pharmaceutically active components, although both fast release, delayed release, controlled release and sustained release compositions are also among the various embodiments contemplated.

The pharmaceutical composition film can include dendritic polymers which can include highly branched macromolecules with various structural architectures. The dendritic polymers can include dendrimers, dendronised polymers (dendrigrafted polymers), linear dendritic hybrids, multi-arm star polymers, or hyperbranched polymers.

Hyperbranched polymers are highly branched polymers with imperfections in their structure. However, they can be synthesized in a single step reaction which can be an advantage over other dendritic structures and are therefore suitable for bulk volume applications. The properties of these polymers apart from their globular structure are the abundant functional groups, intramolecular cavities, low viscosity and high solubility. Dendritic polymers have been used in several drug delivery applications. See, e.g., Dendrimers as Drug Carriers: Applications in Different Routes of Drug Administration. J Pharm Sci, VOL. 97, 2008, 123-143, which is incorporated by reference herein.

The dendritic polymers can have internal cavities which can encapsulate drugs. The steric hindrance caused by the highly dense polymer chains might prevent the crystallization of the drugs. Thus, branched polymers can provide additional advantages in formulating crystallizable drugs in a polymer matrix.

Examples of suitable dendritic polymers include poly (ether) based dendrons, dendrimers and hyperbranched polymers, poly(ester) based dendrons, dendrimers and hyperbranched polymers, poly(thioether) based dendrons, dendrimers and hyperbranched polymers, poly(amino acid) based dendrons dendrimers and hyperbranched polymers, poly(arylalkylene ether) based dendrons, dendrimers and hyperbranched polymers, poly(alkyleneimine) based dendrons, dendrimers and hyperbranched polymers, poly(amidoamine) based dendrons, dendrimers or hyperbranched polymers.

Other examples of hyperbranched polymers include poly (amines)s, polycarbonates, poly(ether ketone)s, polyurethanes, polycarbosilanes, polysiloxanes, poly(ester amine)s, poly(sulfone amine)s, poly(urea urethane)s and polyether polyols such as polyglycerols.

A film can be produced by a combination of at least one polymer and a solvent, optionally including other components. The solvent may be water, a polar organic solvent including, but not limited to, ethanol, isopropanol, acetone, or any combination thereof. In some embodiments, the solvent may be a non-polar organic solvent, such as methylene chloride. The film may be prepared by utilizing a selected casting or deposition method and a controlled drying process. For example, the film may be prepared through a controlled drying processes, which include application of heat and/or radiation energy to the wet film matrix to form a visco-elastic structure, thereby controlling the uniformity of content of the film. The controlled drying processes can include air alone, heat alone or heat and air together contacting the top of the film or bottom of the film or the substrate supporting the cast or deposited or extruded film or contacting more than one surface at the same time or at different times during the drying process. Some of such processes are described in more detail in U.S. Pat. Nos. 8,765,167 and 8,652,378, which are incorporated by reference herein. Alternatively, the films may be extruded as described in U.S. Patent Publication No. 2005/0037055 A1, which is incorporated by reference herein.

A polymer included in the films may be water-soluble, water-swellable, water-insoluble, or a combination of one or more either water-soluble, water-swellable or water-insoluble polymers. The polymer may include cellulose, cellulose derivatives or gums. Specific examples of useful water-soluble polymers include, but are not limited to, polyethylene oxide, pullulan, hydroxypropylmethyl cellulose, hydroxyethyl cellulose, hydroxypropyl cellulose, polyvinyl pyrrolidone, carboxymethyl cellulose, polyvinyl alcohol, sodium alginate, polyethylene glycol, xanthan gum, tragancanth gum, guar gum, acacia gum, arabic gum, polyacrylic acid, methylmethacrylate copolymer, carboxyvinyl copolymers, starch, gelatin, and combinations thereof. Specific examples of useful water-insoluble polymers include, but are not limited to, ethyl cellulose, hydroxypropyl ethyl cellulose, cellulose acetate phthalate, hydroxypropyl methyl cellulose phthalate and combinations thereof. For higher dosages, it may be desirable to incorporate a polymer that provides a high level of viscosity as compared to lower dosages.

As used herein the phrase "water-soluble polymer" and variants thereof refer to a polymer that is at least partially soluble in water, and desirably fully or predominantly soluble in water, or absorbs water. Polymers that absorb water are often referred to as being water-swellable polymers. The materials useful with the present invention may be water-soluble or water-swellable at room temperature and other temperatures, such as temperatures exceeding room temperature. Moreover, the materials may be water-soluble or water-swellable at pressures less than atmospheric pressure. In some embodiments, films formed from such water-soluble polymers may be sufficiently water-soluble to be dissolvable upon contact with bodily fluids.

Other polymers useful for incorporation into the films include biodegradable polymers, copolymers, block polymers or combinations thereof. It is understood that the term "biodegradable" is intended to include materials that chemically degrade, as opposed to materials that physically break apart (i.e., bioerodable materials). The polymers incorporated in the films can also include a combination of biodegradable or bioerodable materials. Among the known useful polymers or polymer classes which meet the above criteria are: poly(glycolic acid) (PGA), poly(lactic acid) (PLA), polydioxanes, polyoxalates, poly(alpha-esters), polyanhydrides, polyacetates, polycaprolactones, poly(orthoesters), polyamino acids, polyaminocarbonates, polyurethanes, polycarbonates, polyamides, poly(alkyl cyanoacrylates), and mixtures and copolymers thereof. Additional useful polymers include, stereopolymers of L- and D-lactic acid, copolymers of bis(p-carboxyphenoxy)propane acid and sebacic acid, sebacic acid copolymers, copolymers of caprolactone, poly(lactic acid)/poly(glycolic acid)/polyethyleneglycol copolymers, copolymers of polyurethane and (poly(lactic acid), copolymers of alpha-amino acids, copolymers of alpha-amino acids and caproic acid, copolymers of alpha-benzyl glutamate and polyethylene glycol, copolymers of succinate and poly(glycols), polyphosphazene, polyhydroxy-alkanoates or mixtures thereof. The polymer matrix can include one, two, three, four or more components.

Although a variety of different polymers may be used, it is desired to select polymers that provide mucoadhesive properties to the film, as well as a desired dissolution and/or disintegration rate. In particular, the time period for which it is desired to maintain the film in contact with the mucosal tissue depends on the type of pharmaceutically active component contained in the composition. Some pharmaceutically active components may only require a few minutes for delivery through the mucosal tissue, whereas other pharmaceutically active components may require up to several hours or even longer. Accordingly, in some embodiments, one or more water-soluble polymers, as described above, may be used to form the film. In other embodiments, however, it may be desirable to use combinations of water-soluble polymers and polymers that are water-swellable, water-insoluble and/or biodegradable, as provided above. The inclusion of one or more polymers that are water-swellable, water-insoluble and/or biodegradable may provide films with slower dissolution or disintegration rates than films formed from water-soluble polymers alone. As such, the film may adhere to the mucosal tissue for longer periods of time, such as up to several hours, which may be desirable for delivery of certain pharmaceutically active components.

Film Properties

Desirably, an individual film dosage of the pharmaceutical film can have a suitable thickness, and small size, which is between about 0.0625-3 inch by about 0.0625-3 inch. The film size can also be greater than 0.0625 inch, greater than 0.5 inch, greater than 1 inch, greater than 2 inches, about 3 inches, and greater than 3 inches, less than 3 inches, less than 2 inches, less than 1 inch, less than 0.5 inch, less than 0.0625 inch in at least one aspect, or greater than 0.0625 inch, greater than 0.5 inch, greater than 1 inch, greater than 2 inches, or greater than 3 inches, about 3 inches, less than 3 inches, less than 2 inches, less than 1 inch, less than 0.5 inch, less than 0.0625 inch in another aspect. The aspect ratio, including thickness, length, and width can be optimized by a person of ordinary skill in the art based on the chemical and physical properties of the polymeric matrix, the active pharmaceutical ingredient, dosage, enhancer, and other additives involved as well as the dimensions of the desired dispensing unit. The film dosage should have good adhesion when placed in the buccal cavity or in the sublingual region of the user. Further, the film dosage should disperse and dissolve at a moderate rate, most desirably dispersing within about 1 minute and dissolving within about 3 minutes. In some embodiments, the film dosage may be capable of dispersing and dissolving at a rate of between about 1 to about 30 minutes, for example, about 1 to about 20 minutes, or more than 1 minute, more than 5 minutes, more than 7 minutes, more than 10 minutes, more than 12 minutes, more than 15 minutes, more than 20 minutes, more than 30 minutes, about 30 minutes, or less than 30 minutes, less than 20 minutes, less than 15 minutes, less than 12 minutes, less than 10 minutes, less than 7 minutes, less than 5 minutes, or less than 1 minute. Sublingual dispersion rates may be shorter than buccal dispersion rates.

For instance, in some embodiments, the films may include polyethylene oxide alone or in combination with a second polymer component. The second polymer may be another water-soluble polymer, a water-swellable polymer, a water-insoluble polymer, a biodegradable polymer or any combination thereof. Suitable water-soluble polymers include, without limitation, any of those provided above. In some embodiments, the water-soluble polymer may include hydrophilic cellulosic polymers, such as hydroxypropyl cellulose and/or hydroxypropylmethyl cellulose. In some embodiments, one or more water-swellable, water-insoluble and/or biodegradable polymers also may be included in the polyethylene oxide-based film. Any of the water-swellable, water-insoluble or biodegradable polymers provided above may be employed. The second polymer component may be employed in amounts of about 0% to about 80% by weight in the polymer component, more specifically about 30% to about 70% by weight, and even more specifically about 40% to about 60% by weight, including greater than 5%, greater than 10%, greater than 15%, greater than 20%, greater than 30%, greater than 40%, greater than 50%, greater than 60%, and greater than 70%, about 70%, less than 70%, less than 60%, less than 50%, less than 40%, less than 30%, less than 20%, less than 10% or less than 5% by weight.

Additives

Additives may be included in the films. Examples of classes of additives include preservatives, antimicrobials, excipients, lubricants, buffering agents, stabilizers, blowing agents, pigments, coloring agents, fillers, bulking agents, sweetening agents, flavoring agents, fragrances, release modifiers, adjuvants, plasticizers, flow accelerators, mold release agents, polyols, granulating agents, diluents, binders, buffers, absorbents, glidants, adhesives, anti-adherents, acidulants, softeners, resins, demulcents, solvents, surfactants, emulsifiers, elastomers, anti-tacking agents, anti-static agents and mixtures thereof. These additives may be added with the pharmaceutically active component(s). As used herein, the term "stabilizer" means an excipient capable of preventing aggregation or other physical degradation, as well as chemical degradation, of the active pharmaceutical ingredient, another excipient, or the combination thereof.

Stabilizers may also be classified as antioxidants, sequestrants, pH modifiers, emulsifiers and/or surfactants, or UV stabilizers.

Antioxidants (i.e., pharmaceutically compatible compound(s) or composition(s) that decelerates, inhibits, interrupts and/or stops oxidation processes) include, in particular, the following substances: tocopherols and the esters thereof, sesamol of sesame oil, coniferyl benzoate of benzoin resin, nordihydroguaietic resin and nordihydroguaiaretic acid (NDGA), gallates (among others, methyl, ethyl, propyl, amyl, butyl, lauryl gallates), butylated hydroxyanisole (BHA/BHT, also butyl-p-cresol); ascorbic acid and salts and esters thereof (for example, acorbyl palmitate), erythorbinic acid (isoascorbinic acid) and salts and esters thereof, monothioglycerol, sodium formaldehyde sulfoxylate, sodium metabisulfite, sodium bisulfite, sodium sulfite, potassium metabisulfite, butylated hydroxyanisole, butylated hydroxytoluene (BHT), propionic acid. Typical antioxidants are tocopherol such as, for example, α-tocopherol and the esters thereof, butylated hydroxytoluene and butylated hydroxyanisole. The terms "tocopherol" also includes esters of tocopherol. A known tocopherol is α-tocopherol. The term "α-tocopherol" includes esters of α-tocopherol (for example, α-tocopherol acetate). A natural or synthetic tocopherol or tocotrienol can include alpha-tocopherol, beta-tocopherol, gamma-tocopherol, delta-tocopherol, alpha-tocotrienol, beta-tocotrienol, gamma-tocotrienol, delta-tocotrienol, tocophersolan, any isomers thereof, any esters thereof, any analogs or derivatives thereof, and any combinations thereof. The composition can include up to 85% (w/w) tocopherol or tocotrienol, for example, 45% to 75% (w/w).

Sequestrants (i.e., any compounds which can engage in host-guest complex formation with another compound, such as the active ingredient or another excipient; also referred to as a sequestering agent) include calcium chloride, calcium disodium ethylene diamine tetra-acetate, glucono delta-lactone, sodium gluconate, potassium gluconate, sodium tripolyphosphate, sodium hexametaphosphate, and combinations thereof. Sequestrants also include cyclic oligosaccharides, such as cyclodextrins, cyclomannins (5 or more α-D-mannopyranose units linked at the 1,4 positions by a linkages), cyclogalactins (5 or more β-D-galactopyranose units linked at the 1,4 positions by β linkages), cycloaltrins (5 or more α-D-altropyranose units linked at the 1,4 positions by a linkages), and combinations thereof.

pH modifiers or stabilizers include acids (e.g., tartaric acid, citric acid, lactic acid, fumaric acid, phosphoric acid, ascorbic acid, acetic acid, succinic acid, adipic acid and maleic acid), acidic amino acids (e.g., glutamic acid, aspartic acid, etc.), inorganic salts (alkali metal salt, alkaline earth metal salt, ammonium salt, etc.) of such acidic substances, a salt of such acidic substance with an organic base (e.g., basic amino acid such as lysine, arginine and the like, meglumine and the like), and a solvate (e.g., hydrate) thereof. Other examples of pH modifiers include silicified microcrystalline cellulose, magnesium aluminometasilicate, calcium salts of phosphoric acid (e.g., calcium hydrogen phosphate anhydrous or hydrate, calcium, sodium or potassium carbonate or hydrogencarbonate and calcium lactate or mixtures thereof), sodium and/or calcium salts of carboxymethyl cellulose, cross-linked carboxymethylcellulose (e.g., croscarmellose sodium and/or calcium), polacrilin potassium, sodium and or/calcium alginate, docusate sodium, magnesium calcium, aluminium or zinc stearate, magnesium palmitate and magnesium oleate, sodium stearyl fumarate, and combinations thereof.

Examples of emulsifiers and/or surfactants include poloxamers or pluronics, polyethylene glycols, polyethylene glycol monostearate, polysorbates, sodium lauryl sulfate, polyethoxylated and hydrogenated castor oil, alkyl polyoside, a grafted water soluble protein on a hydrophobic backbone, lecithin, glyceryl monostearate, glyceryl monostearate/polyoxyethylene stearate, ketostearyl alcohol/sodium lauryl sulfate, carbomer, phospholipids, ($C_{10}$-$C_{20}$-alkyl and alkylene carboxylates, alkyl ether carboxylates, fatty alcohol sulfates, fatty alcohol ether sulfates, alkylamide sulfates and sulfonates, fatty acid alkylamide polyglycol ether sulfates, alkanesulfonates and hydroxyalkanesulfonates, olefinsulfonates, acyl esters of isethionates, a-sulfo fatty acid esters, alkylbenzenesulfonates, alkylphenol glycol ether sulfonates, sulfosuccinates, sulfosuccinic monoesters and diesters, fatty alcohol ether phosphates, protein/fatty acid condensation products, alkyl monoglyceride sulfates and sulfonates, alkylglyceride ether sulfonates, fatty acid methyltaurides, fatty acid sarcosinates, sulforicinoleates, and acylglutamates, quaternary ammonium salts (e.g., di-($C_{10}$-$C_{24}$)-alkyl-dimethylammonium chloride or bromide), ($C_{10}$-$C_{24}$)-alkyl-dimethylethylammonium chloride or bromide, ($C_{10}$-$C_{24}$)-alkyl-trimethylammonium chloride or bromide (e.g., cetyltrimethylammonium chloride or bromide), ($C_{10}$-$C_{24}$)-alkyl-dimethylbenzylammonium chloride or bromide (e.g., ($C_{12}$-$C_{18}$)-alkyl-dimethylbenzylammonium chloride), N—($C_{10}$-$C_{18}$)-alkyl-pyridinium chloride or bromide (e.g., N—($C_{12}$-$C_{16}$)-alkyl-pyridinium chloride or bromide), N—($C_{10}$-$C_{18}$)-alkyl-isoquinolinium chloride, bromide or monoalkyl sulfate, N—($C_{12}$-$C_{18}$)-alkyl-polyoylaminoformylmethylpyridinium chloride, N—($C_{12}$-$C_{18}$)-alkyl-N-methylmorpholinium chloride, bromide or monoalkyl sulfate, N—($C_{12}$-$C_{18}$)-alkyl-N-ethylmorpholinium chloride, bromide or monoalkyl sulfate, ($C_{16}$-$C_{18}$)-alkyl-pentaoxethylammonium chloride, diisobutylphenoxyethoxyethyldimethylbenzylammonium chloride, salts of N,N-diethylaminoethylstearylamide and -oleylamide with hydrochloric acid, acetic acid, lactic acid, citric acid, phosphoric acid, N-acylaminoethyl-N,N-diethyl-N-methylammonium chloride, bromide or monoalkyl sulfate, and N-acylaminoethyl-N,N-diethyl-N-benzylammonium chloride, bromide or monoalkyl sulfate (in the foregoing, "acyl" standing for, e.g., stearyl or oleyl), and combinations thereof.

Examples of UV stabilizers include UV absorbers (e.g., benzophenones), UV quenchers (i.e., any compound that dissipates UV energy as heat, rather than allowing the energy to have a degradation effect), scavengers (i.e., any compound that eliminates free radicals resulting from exposure to UV radiation), and combinations thereof.

In other embodiments, stabilizers include ascorbyl palmitate, ascorbic acid, alpha tocopherol, butylated hydroxytoluene, buthylated hydroxyanisole, cysteine HCl, citric acid, ethylenediamine tetra acetic acid (EDTA), methionine, sodium citrate, sodium ascorbate, sodium thiosulfate, sodium metabi sulfite, sodium bisulfite, propyl gallate, glutathione, thioglycerol, singlet oxygen quenchers, hydroxyl radical scavengers, hydroperoxide removing agents, reducing agents, metal chelators, detergents, chaotropes, and combinations thereof. "Singlet oxygen quenchers" include, but are not limited to, alkyl imidazoles (e.g., histidine, L-carnosine, histamine, imidazole 4-acetic acid), indoles (e.g., tryptophan and derivatives thereof, such as N-acetyl-5-methoxytryptamine, N-acetylserotonin, 6-methoxy-1,2,3, 4-tetrahydro-beta-carboline), sulfur-containing amino acids (e.g., methionine, ethionine, djenkolic acid, lanthionine, N-formyl methionine, felinine, S-allyl cysteine, S-aminoethyl-L-cysteine), phenolic compounds (e.g., tyrosine and derivatives thereof), aromatic acids (e.g., ascorbate, salicylic acid, and derivatives thereof), azide (e.g., sodium azide), tocopherol and related vitamin E derivatives, and carotene and related vitamin A derivatives. "Hydroxyl radical scavengers" include, but are not limited to azide, dimethyl sulfoxide, histidine, mannitol, sucrose, glucose, salicylate, and L-cysteine. "Hydroperoxide removing agents" include, but are not limited to catalase, pyruvate, glutathione, and glutathione peroxidases. "Reducing agents" include, but are not limited to, cysteine and mercaptoethylene. "Metal chelators" include, but are not limited to, EDTA, EGTA, o-phenanthroline, and citrate. "Detergents" include, but are not limited to, SDS and sodium lauroyl sarcosyl. "Chaotropes" include, but are not limited to guandinium hydrochloride, isothiocyanate, urea, and formamide. As discussed herein, stabilizers can be present in 0.0001%-50% by weight, including greater than 0.0001%, greater than 0.001%, greater than 0.01%, greater than 0.1%, greater than 1%, greater than 5%, greater than 10%, greater than 20%, greater than 30%, greater than 40%, greater than 50%, less than 50%, less than 40%, less than 30%, less than 20%, less than 10%, less than 1%, less than 0.1%, less than 0.01%, less than 0.001%, or less than 0.0001% by weight.

Useful additives can include, for example, gelatin, gelatin hydrosylates, recombinant gelatin, vegetable proteins such as sunflower protein, soybean proteins, cotton seed proteins, peanut proteins, grape seed proteins, whey proteins, whey protein isolates, blood proteins, egg proteins, acrylated proteins, water-soluble polysaccharides such as alginates, carrageenans, guar gum, agar-agar, xanthan gum, gellan gum, gum arabic and related gums (gum ghatti, gum karaya, gum tragancanth), pectin, water-soluble derivatives of cellulose: alkylcelluloses hydroxyalkylcelluloses and hydroxyalkylalkylcelluloses, such as methylcellulose, hydroxymethylcellulose, hydroxyethylcellulose, hydroxypropylcellulose, hydroxyethylmethylcellulose, hydroxypropylmethylcellulose, hydroxybutylmethylcellulose, cellulose esters and hydroxyalkylcellulose esters such as cellulose acetate phthalate (CAP), hydroxypropylmethylcellulose (HPMC); carboxyalkylcelluloses, carboxyalkylalkylcelluloses, carboxyalkylcellulose esters such as carboxymethylcellulose and their alkali metal salts; water-soluble synthetic polymers such as polyacrylic acids and polyacrylic acid esters, polymethacrylic acids and polymethacrylic acid esters, polyvinylacetates, polyvinylalcohols, polyvinylacetatephthalates (PVAP), polyvinylpyrrolidone (PVP), PVA/vinyl acetate copolymer, and polycrotonic acids; also suitable are phthalated gelatin, gelatin succinate, crosslinked gelatin, shellac, water-soluble chemical derivatives of starch, cationically modified acrylates and methacrylates possessing, for example, a tertiary or quaternary amino group, such as the diethylaminoethyl group, which may be quaternized if desired; or other similar polymers.

Stabilizers can include nanoparticulate stabilizers, such as a dispersant layer around a nanoparticulate surface. See, e.g., Langmuir 2007, (23)3, 1081-1090, Dec. 20, 2006, doi.org/10.1021/la062042s. Stabilizers can include stabilizer ligands, e.g., monomers bearing functional groups that can get chemisorbed on nanoparticles to form polymerizable monolayers. See, e.g., Jadhav et al doi.org/10.1002/ppsc.201400074. Stabilizers can include surface stabilizers. See, e.g., U.S. Pat. No. 6428814 and Japanese Pat. JP 4598399B2. Surface stabilizers can include tyloxapol (U.S. Pat. No. 5,429,824), polyalkylene block copolymers (U.S. Pat. No. 5,565,188), sulfated non-ionic block copolymers (U.S. Pat. No. 5,569,448), high molecular weight, linear, poly(ethylene oxide) polymers (U.S. Pat. No. 5,580,579), butylene oxide-ethylene oxide block copolymers (U.S. Pat. No. 5,587,143), hydroxypropyl cellulose (U.S. Pat. No. 5,591,456), and sugar based surface stabilizers (U.S. Pat. No. 5,622,938). Stabilizers can include peptide stabilizers. See, e.g., WO2006097748A2. Stabilizers can include for example, L-cysteine hydrochloride, glycine hydrochloride, malic acid, sodium metabisulfite, citric acid, tartaric acid, and L-cystine dihydrochloride. See, e.g., U.S. Pat. No. 6,153,223. Stabilizers can include natural compounds. Stabilizers can include synthetic compounds. Stabilizers can include a blend of one of more compounds or categories of compounds described above. Stabilizers can be function to protect the metabolism of a prodrug until a desired time or until it reaches a specific target, tissue or environment.

The additional components can range up to about 80%, desirably about 0.005% to 50% and more desirably within the range of 1% to 20% based on the weight of all composition components, including greater than 1%, greater than 5%, greater than 10%, greater than 20%, greater than 30%, greater than 40%, greater than 50%, greater than 60%, greater than 70%, about 80%, greater than 80%, less than 80%, less than 70%, less than 60%, less than 50%, less than 40%, less than 30%, less than 20%, less than 10%, less than 5%, about 3%, or less than 1%. Other additives can include anti-tacking, flow agents and opacifiers, such as the oxides of magnesium aluminum, silicon, titanium, etc. desirably in a concentration range of about 0.005% to about 5% by weight and desirably about 0.02% to about 2% based on the weight of all film components, including greater than 0.02%, greater than 0.2%, greater than 0.5%, greater than 1%, greater than 1.5%, greater than 2%, greater than 4%, about 5%, greater than 5%, less than 4%, less than 2%, less than 1%, less than 0.5%, less than 0.2%, or less than 0.02%.

In certain embodiments, the composition can include plasticizers, which can include polyalkylene oxides, such as polyethylene glycols, polypropylene glycols, polyethylenepropylene glycols, organic plasticizers with low molecular weights, such as glycerol, glycerol monoacetate, diacetate or triacetate, triacetin, polysorbate, cetyl alcohol, propylene glycol, sugar alcohols sorbitol, sodium diethylsulfosuccinate, triethyl citrate, tributyl citrate, phytoextracts, fatty acid esters, fatty acids, oils and the like, added in concentrations ranging from about 0.1% to about 40%, and desirably ranging from about 0.5% to about 20% based on the weight of the composition including greater than 0.5%, greater than 1%, greater than 1.5%, greater than 2%, greater than 4%, greater than 5%, greater than 10%, greater than 15%, about 20%, greater than 20%, less than 20%, less than 15%, less than 10%, less than 5%, less than 4%, less than 2%, less than 1%, or less than 0.5%. There may further be added compounds to improve the texture properties of the film material such as animal or vegetable fats, desirably in their hydrogenated form. The composition can also include compounds to improve the textural properties of the product. Other ingredients can include binders which contribute to the ease of formation and general quality of the films. Non-limiting examples of binders include starches, natural gums, pregelatinized starches, gelatin, polyvinylpyrrolidone, methylcellulose, sodium carboxymethylcellulose, ethylcellulose, polyacrylamides, polyvinyloxoazolidone, or polyvinylalcohols.

Further potential additives include solubility enhancing agents, such as substances that form inclusion compounds with active components. Such agents may be useful in improving the properties of very insoluble and/or unstable actives. In general, these substances are doughnut-shaped molecules with hydrophobic internal cavities and hydrophilic exteriors. Insoluble and/or instable pharmaceutically active components may fit within the hydrophobic cavity, thereby producing an inclusion complex, which is soluble in water. Accordingly, the formation of the inclusion complex permits very insoluble and/or unstable pharmaceutically active components to be dissolved in water. A particularly desirable example of such agents are cyclodextrins, which are cyclic carbohydrates derived from starch. Other similar substances, however, are considered well within the scope of the present invention.

Suitable coloring agents include food, drug and cosmetic colors (FD&C), drug and cosmetic colors (D&C), or external drug and cosmetic colors (Ext. D&C). These colors are dyes, their corresponding lakes, and certain natural and derived colorants. Lakes are dyes absorbed on aluminum hydroxide. Other examples of coloring agents include known azo dyes, organic or inorganic pigments, or coloring agents of natural origin. Inorganic pigments are preferred, such as the oxides or iron or titanium, these oxides, being added in concentrations ranging from about 0.001 to about 10%, and preferably about 0.5 to about 3%, including greater than 0.001%, greater than 0.01%, greater than 0.1%, greater than 0.5%, greater than 1%, greater than 2%, greater than 5%, about 10%, greater than 10%, less than 10%, less than 5%, less than 2%, less than 1%, less than 0.5%, less than 0.1%, less than 0.01%, or less than 0.001%, based on the weight of all the components.

Flavors may be chosen from natural and synthetic flavoring liquids. An illustrative list of such agents includes volatile oils, synthetic flavor oils, flavoring aromatics, oils, liquids, oleoresins or extracts derived from plants, leaves, flowers, fruits, stems and combinations thereof. A non-limiting representative list of examples includes mint oils, cocoa, and citrus oils such as lemon, orange, lime and grapefruit and fruit essences including apple, pear, peach, grape, strawberry, raspberry, cherry, plum, pineapple, apricot or other fruit flavors. Other useful flavorings include aldehydes and esters such as benzaldehyde (cherry, almond), citral i.e., alphacitral (lemon, lime), neral, i.e., beta-citral (lemon, lime), decanal (orange, lemon), aldehyde C-8 (citrus fruits), aldehyde C-9 (citrus fruits), aldehyde C-12 (citrus fruits), tolyl aldehyde (cherry, almond), 2,6-dimethyloctanol (green fruit), or 2-dodecenal (citrus, mandarin), combinations thereof and the like.

The sweeteners may be chosen from the following non-limiting list: saccharides, glucose (corn syrup), dextrose, invert sugar, fructose, and combinations thereof, saccharin and its various salts such as the sodium salt; dipeptide based sweeteners such as aspartame, neotame, advantame; dihydrochalcone compounds, glycyrrhizin; Stevia Rebaudiana (Stevioside); chloro derivatives of sucrose such as sucralose; sugar alcohols such as sorbitol, mannitol, xylitol, and the like. Also contemplated are hydrogenated starch hydrolysates and the synthetic sweetener 3,6-dihydro-6-methyl-1-1-1,2,3-oxathiazin-4-one-2,2-dioxide, particularly the potassium salt (acesulfame-K), and sodium and calcium salts thereof, and natural intensive sweeteners, such as Lo Han Kuo. Other sweeteners may also be used.

Anti-foaming and/or de-foaming components may also be used with the films. These components aid in the removal of air, such as entrapped air, from the film-forming compositions. Such entrapped air may lead to non-uniform films. Simethicone is one particularly useful anti-foaming and/or de-foaming agent. The present invention, however, is not so limited and other suitable anti-foam and/or de-foaming agents may be used. Simethicone and related agents may be employed for densification purposes. More specifically, such agents may facilitate the removal of voids, air, moisture, and similar undesired components, thereby providing denser and thus more uniform films. Agents or components which perform this function can be referred to as densification or densifying agents. As described above, entrapped air or undesired components may lead to non-uniform films.

Any other optional components described in commonly assigned U.S. Pat. Nos. 7,425,292 and 8,765,167, referred to above, also may be included in the films described herein.

The film compositions further desirably contain a buffer so as to control the pH of the film composition. Any desired level of buffer may be incorporated into the film composition so as to provide the desired pH level encountered as the pharmaceutically active component is released from the composition. The buffer is preferably provided in an amount sufficient to control the release from the film and/or the absorption into the body of the pharmaceutically active component. In some embodiments, the buffer may include sodium citrate, citric acid, bitartrate salt and combinations thereof.

The pharmaceutical films described herein may be formed via any desired process. Suitable processes are set forth in U.S. Pat. Nos. 8,652,378, 7,425,292 and 7,357,891, which are incorporated by reference herein. In one embodiment, the film dosage composition is formed by first preparing a wet composition, the wet composition including a polymeric carrier matrix and a therapeutically effective amount of a pharmaceutically active component. The wet composition is cast into a film and then sufficiently dried to form a self-supporting film composition. The wet composition may be cast into individual dosages, or it may be cast into a sheet, where the sheet is then cut into individual dosages.

The pharmaceutical composition can adhere to a mucosal surface. The present invention finds particular use in the localized treatment of body tissues, diseases, or wounds which may have moist surfaces and which are susceptible to bodily fluids, such as the mouth, the vagina, organs, or other types of mucosal surfaces. The composition carries a pharmaceutical, and upon application and adherence to the mucosal surface, offers a layer of protection and delivers the pharmaceutical to the treatment site, the surrounding tissues, and other bodily fluids. The composition provides an appropriate residence time for effective drug delivery at the treatment site, given the control of erosion in aqueous solution or bodily fluids such as saliva, and the slow, natural erosion of the film concomitant or subsequent to the delivery.

The residence time of the composition depends on the erosion rate of the water erodible polymers used in the formulation and their respective concentrations. The erosion rate may be adjusted, for example, by mixing together components with different solubility characteristics or chemically different polymers, such as hydroxyethyl cellulose and hydroxypropyl cellulose; by using different molecular weight grades of the same polymer, such as mixing low and medium molecular weight hydroxyethyl cellulose; by using excipients or plasticizers of various lipophilic values or water solubility characteristics (including essentially insoluble components); by using water soluble organic and inorganic salts; by using crosslinking agents such as glyoxal with polymers such as hydroxyethyl cellulose for partial crosslinking; or by post-treatment irradiation or curing, which may alter the physical state of the film, including its crystallinity or phase transition, once obtained. These strategies might be employed alone or in combination in order to modify the erosion kinetics of the film. Upon application, the pharmaceutical composition film adheres to the mucosal surface and is held in place. Water absorption softens the composition, thereby diminishing the foreign body sensation. As the composition rests on the mucosal surface, delivery of the drug occurs. Residence times may be adjusted over a wide range depending upon the desired timing of the delivery of the chosen pharmaceutical and the desired lifespan of the carrier. Generally, however, the residence time is modulated between about a few seconds to about a few days. Preferably, the residence time for most pharmaceuticals is adjusted from about 5 seconds to about 24 hours. More preferably, the residence time is adjusted from about 5 seconds to about 30 minutes. In addition to providing drug delivery, once the composition adheres to the mucosal surface, it also provides protection to the treatment site, acting as an erodible bandage. Lipophilic agents can be designed to slow down erodibility to decrease disintegration and dissolution.

It is also possible to adjust the kinetics of erodability of the composition by adding excipients which are sensitive to enzymes such as amylase, very soluble in water such as water soluble organic and inorganic salts. Suitable excipients may include the sodium and potassium salts of chloride, carbonate, bicarbonate, citrate, trifluoroacetate, benzoate, phosphate, fluoride, sulfate, or tartrate. The amount added can vary depending upon how much the erosion kinetics is to be altered as well as the amount and nature of the other components in the composition.

Emulsifiers typically used in the water-based emulsions described above are, preferably, either obtained in situ if selected from the linoleic, palmitic, myristoleic, lauric, stearic, cetoleic or oleic acids and sodium or potassium hydroxide, or selected from the laurate, palmitate, stearate, or oleate esters of sorbitol and sorbitol anhydrides, polyoxyethylene derivatives including monooleate, monostearate, monopalmitate, monolaurate, fatty alcohols, alkyl phenols, allyl ethers, alkyl aryl ethers, sorbitan monostearate, sorbitan monooleate and/or sorbitan monopalmitate.

The amount of pharmaceutically active component to be used depends on the desired treatment strength and the composition of the layers, although preferably, the pharmaceutical component comprises from about 0.001% to about 99%, more preferably from about 0.003 to about 75%, and most preferably from about 0.005% to about 50% by weight of the composition, including, more than 0.005%, more than 0.05%, more than 0.5%, more than 1%, more than 5%, more than 10%, more than 15%, more than 20%, more than 30%, about 50%, more than 50%, less than 50%, less than 30%, less than 20%, less than 15%, less than 10%, less than 5%, less than 1%, less than 0.5%, less than 0.05%, or less than 0.005%. The amounts of other components may vary depending on the drug or other components but typically these components comprise no more than 50%, preferably no more than 30%, and most preferably no more than 15% by total weight of the composition.

The thickness of the film may vary, depending on the thickness of each of the layers and the number of layers. As stated above, both the thickness and amount of layers may be adjusted in order to vary the erosion kinetics. Preferably, if the composition has only two layers, the thickness ranges from 0.005 mm to 2 mm, preferably from 0.01 to 1 mm, and more preferably from 0.1 to 0.5 mm, including greater than 0.1 mm, greater than 0.2 mm, about 0.5 mm, greater than 0.5 mm, less than 0.5 mm, less than 0.2 mm, or less than 0.1 mm. The thickness of each layer may vary from 10 to 90% of the overall thickness of the layered composition, and preferably varies from 30 to 60%, including greater than 10%, greater than 20%, greater than 30%, greater than 40%, greater than 50%, greater than 70%, greater than 90%, about 90%, less than 90%, less than 70%, less than 50%, less than 40%, less than 30%, less than 20%, or less than 10%. Thus, the preferred thickness of each layer may vary from 0.01 mm to 0.9 mm, or from 0.03 to 0.5 mm.

As one skilled in the art will appreciate, when systemic delivery, e.g., transmucosal or transdermal delivery is desired, the treatment site may include any area in which the film is capable of delivery and/or maintaining a desired level of pharmaceutical in the blood, lymph, or other bodily fluid. Typically, such treatment sites include the oral, esophageal, aural, ocular, anal, nasal, or vaginal mucosal tissue, as well as, the skin. If the skin is to be employed as the treatment site, then usually larger areas of the skin wherein movement will not disrupt the adhesion of the film, such as the upper arm or thigh, are preferred.

The pharmaceutical composition can also be used as a wound dressing. By offering a physical, compatible, oxygen and moisture permeable, flexible barrier which can be washed away, the film can not only protect a wound but also deliver a pharmaceutical in order to promote healing, aseptic, scarification, to ease the pain or to improve globally the condition of the sufferer. Some of the: examples given below are well suited for an application to the skin or a wound. As one skilled in the art will appreciate, the formulation might require incorporating a specific hydrophilic/hygroscopic excipient which would help in maintaining good adhesion on dry skin over an extended period of time. Another advantage of the present invention when utilized in this manner is that if one does not wish that the film be noticeable on the skin, then no dyes or colored substances need be used. If, on the other hand, one desires that the film be noticeable, a dye or colored substance may be employed.

While the pharmaceutical composition can adhere to mucosal tissues, which are wet tissues by nature, it can also be used on other surfaces such as skin or wounds. The pharmaceutical film can adhere to the skin if prior to application the skin is wet with an aqueous-based fluid such as water, saliva, wound drainage or perspiration. The film can adhere to the skin until it erodes due to contact with water by, for example, rinsing, showering, bathing or washing. The film may also be readily removed by peeling without significant damage to tissue.

EXAMPLES

The proposed dosing regimen for diazepam buccal film (DBF) was designed to provide diazepam exposure in patients equivalent to the exposure achieved when the reference drug, Diastat® Rectal Gel (DRG), which is administered according to its approved product label (Table 1 below). The Diastat® rectal gel label provides a weight-adjusted dosing regimen that categorizes patients first according to three age groups: 2-5 years, 6-11 years, and 12+ years. The recommended dose on mg/kg basis is approximately 0.5 mg/kg, 0.3 mg/kg, and 0.2 mg/kg for the three age groups, respectively. Within each age group, the recommended dose for an individual patient is determined based on 7 weight categories.

TABLE 1

Dosing Regimen for Diastat Rectal Gel (DRG) According to Label

| 2-5 Years 0.5 mg/kg | | 6-11 years 0.3 mg/kg | | 12+ Years 0.2 mg/kg | |
| --- | --- | --- | --- | --- | --- |
| Weight (kg) | Dose (mg) | Weight (kg) | Dose (mg) | Weight (kg) | Dose (mg) |
| 6 to 10 | 5 | 10 to 16 | 5 | 14 to 25 | 3 |
| 11 to 15 | 7.5 | 17 to 25 | 7.5 | 26 to 37 | 7.5 |
| 16 to 20 | 10 | 26 to 33 | 10 | 38 to 50 | 10 |
| 21 to 25 | 12.5 | 34 to 41 | 12.5 | 51 to 62 | 12.5 |
| 26 to 30 | 15 | 42 to 50 | 15 | 63 to 75 | 13 |
| 31 to 35 | 17.5 | 51 to 58 | 17.5 | 76 to 87 | 17.5 |
| 36 to 44 | 20 | 59 to 74 | 20 | 88 to 111 | 20 |

Invention of an appropriate dosing regimen for DBF or DNS was equivalent to creating a mapping such that an appropriate DBF or DNS dose in mg could be specified for any patient based on age group and weight category in the Diastat® rectal gel label. The appropriate dose of DBF or DNS would be that dose expected to provide equivalent exposure to diazepam as the exposure provided by labeled dose of Diastat® rectal gel. The initial emphasis of this effort was to create this mapping for adult age group (patients age 12 and older). This effort was complicated by two observations that differentiated DBF from DRG: (1) The pharmacokinetics of DBF were linear. For DBF, both Cmax and AUC were proportional to the dose, whereas for DRG the Cmax was less than proportional to the dose. (2) DBF exhibited a food effect. Cmax for DBF was reduced on average by approximately 33% following a moderate fat meal, and on average approximately 45% following a high-fat meal with no effect on AUC. It was assumed that DRG, because of its rectal administration, was not subject to a significant food effect. The approved label for DRG (Diastat® rectal gel) does not report a food effect study and no information pertinent to any effect of food is provided in the Diastat® rectal gel label.

Example 1—Two Pilot Studies in Healthy Volunteers

As shown in FIG. 1A, to span the dosage range indicated in Table 1, two formulations were initially developed. The lower dose formulation utilized dose proportionality via size to produce the 5 mg, 7.5 mg and 10 mg strengths. The higher dose formulation also used dose proportionality via size to produce the 12.5 mg, 15 mg, 17.5 mg, and 20 mg strengths. The high and low dose formulations were tested in two pilot clinical crossover studies against Diastat® rectal gel at at doses of 5 mg and 20 mg.

The results showed excellent agreement for the PK parameters Cmax and AUC between the 5 mg DBF and the 5 mg rectal gel. The data also supported dose proportionality for DRG over the dose range 5 to 20 mg), but suggested that DRG was not dose-proportional. For DRG, the increase in the Cmax between the 5 mg and the 20 mg dose was less than dose-proportional. Results for these pilot studies are summarized in Table 2.

TABLE 2

Reported Mean PK Parameters

|  | 5 mg buccal | 20 mg buccal | 5 mg rectal | 20 mg rectal |
| --- | --- | --- | --- | --- |
| Tmax (h) | 0.6937 | 1.2083 | 0.3497 | 1.0059 |
| half life (h) | 84.6575 | 81.9649 | 71.4004 | 81.0029 |
| Auct (ng · h/mL) | 3409.4558 | 16104.518 | 3475.1045 | 15358.5481 |
| auc inf | 4415.2048 | 18338.9617 | 4160.7298 | 17713.9903 |
| Cmax (ng/mL) | 178.0456 | 673.5343 | 166.352 | 424.3443 |

Comparison: Ratio of the Parameters as indicated

|  | 20 vs 5 buccal | 20 vs 5 rectal | 5b vs 5r | 20b vs 20r |
| --- | --- | --- | --- | --- |
| Tmax | 1.742 | 2.876 | 1.984 | 1.201 |
| half life | 0.968 | 1.134 | 1.186 | 1.012 |
| Auct | 4.723 | 4.420 | 0.981 | 1.049 |
| auc inf | 4.154 | 4.257 | 1.061 | 1.035 |
| Cmax | 3.783 | 2.551 | 1.070 | 1.587 |

Based on the results of these pilot studies (the observation that mean Cmax following 20 mg DBF was approximately 58.7% higher than Cmax following 20 mg DRG) the formulation development plan was revised as shown in Table 3 below. The available data suggested that a DBF dose of approximately 12.5 mg would produce approximately equal to the Cmax from DRG dose of 20 mg (the highest marked dose). Therefore, the high dose formulation not necessary. In this revised formulation development plan, all dosages are produced from a single formulation (formerly the low dose formulation).

TABLE 3

Revised Formulation Development Plan
Description of DBSF Doses

| DBSF Strength (mg) | Film Dimension (mm) | Nominal Film Weight (mg) |
| --- | --- | --- |
| 5 | 12.8 × 22.0 | 45.0 |
| 6 | 15.4 × 22.0 | 54.0 |
| 7 | 17.9 × 22.0 | 62.9 |
| 8 | 20.5 × 22.0 | 71.9 |
| 9 | 23.0 × 22.0 | 80.9 |
| 10 | 25.6 × 22.0 | 90.0 |
| 12.5 | 32 × 22.0 | 112.5 |

The dose proportionality of DBF was formally investigated in a crossover study in healthy volunteers at doses of 5 mg, 10 mg and 15 mg. A 15 mg dose was included as the top dose in the proportionality study to establish linearity and provide flexibility as a potential titration dose. This study demonstrated dose-proportionality for both Cmax and AUC as shown in FIG. 1A and FIG. 1B.

In view of these results, the next study was a crossover to provide a direct comparison of the pharmacokinetics of DBF and DRG. This four-treatment, four-period crossover compared one DBF dose (15 mg) against three doses (5 mg, 12.5 mg, and 20 mg) of the rectal gel. Because DBF had been shown to be dose-proportional, one dose level for DBF was sufficient. The purpose of this pivotal comparison was to investgate the relationship between DBF and DRG exposures (both Cmax and AUC) over the DRG dosing range (5-20 mg). The study design also allowed for formal investigation of dose-proportionality for DRG.

Figure 3:
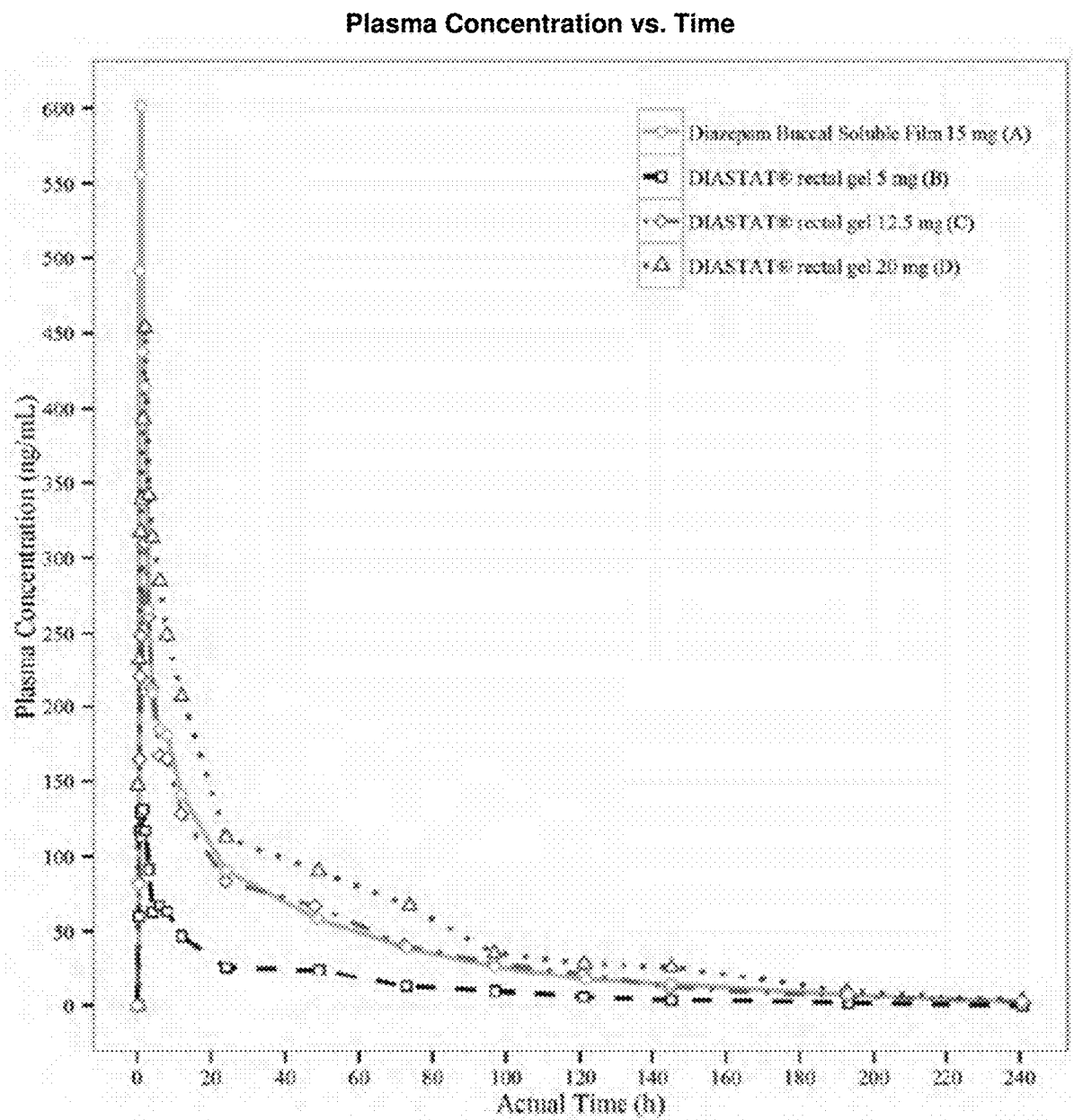
FIG. 3 shows a pivotal study comparing one DBF dose (15 mg) against three doses (5 mg, 12.5 mg, and 20 mg) of the rectal gel.
Figure 4A:
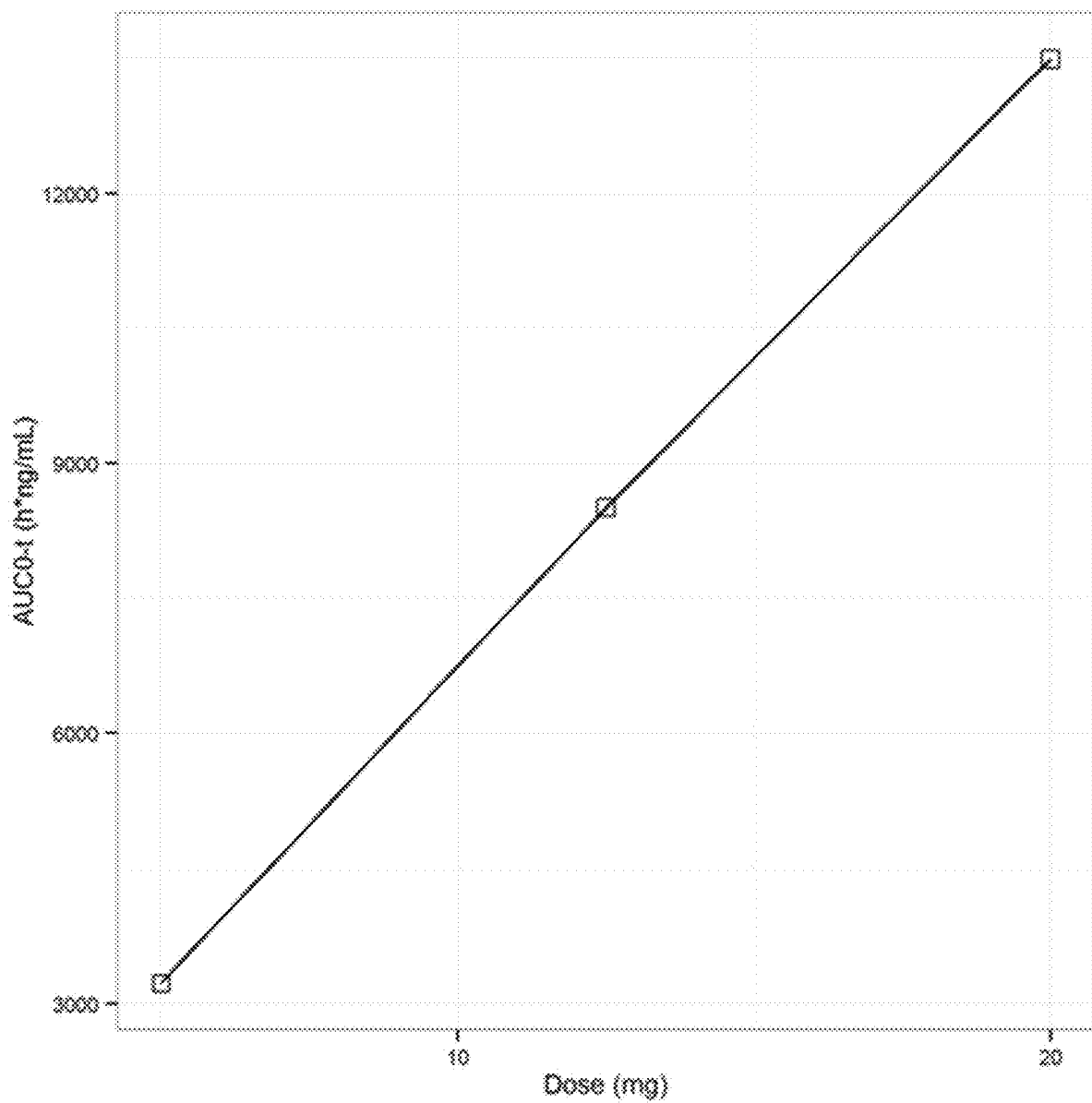
FIG. 4A shows a study measuring AUC as a function of dose of Diastat® rectal gel.
Figure 4B:
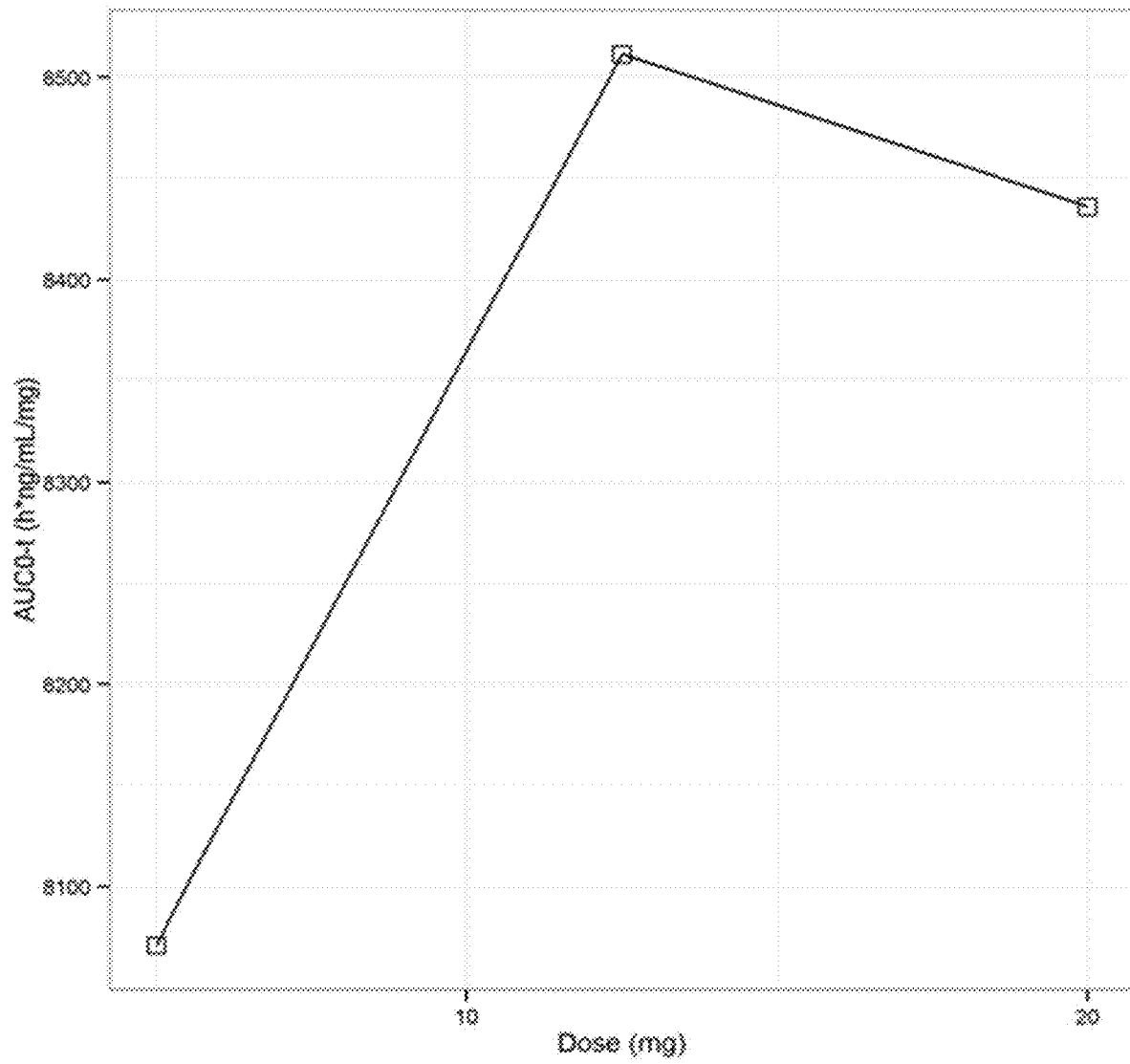
FIG. 4B shows a study measuring AUC (dose normalized) as a function of dose of Diastat® rectal gel.

Results of this study for Cmax are shown in FIG. 1C. Plasma concentration-time curves for all treatments for a typical subject subject are shown in FIG. 3. This study demsonstrated formally that Cmax following DRG was less than dose-proportional (FIG. 4B), demonstrated the AUC following DRG was approximately dose-proportional (FIG. 4A), and demonstrated that the relative bioavailability of DBF was approximately 118% compared to DRG. The study also permitted estimation of the ratios of PK parameters Cmax and AUC between the formulations comparing these parameters for the studied doses of DRG (5 mg, 12.5, 20 mg) with any dose of DBF. These comparisons for the studied doses of DRG were immmediately feasible because DBF was demonstrated to be dose-proportional. Comparisons across all possible doses of DRG with all possible doses of DBF were subsequently facilitated by population PK methods as described in other sections of this document.

Food Effect Studies

The applicants conducted two food effect studies with DBF: a two arm crossover to investigate the effect of a standard high fat meal, and a four-arm crossover to investigate the effect of position (upright or reclining) under fasting conditions and the effect of a standard moderate fat meal and a standard high fat meal under reclining conditions. The two-arm food effect study showed that a high fat meal taken within 30 minutes of administration reduced Cmax on average by approximately 45% with no effect on AUC. The four-arm study showed that position (whether upright or reclining) had no effect on diazepam PK. The effect of a high fat meal (reclining condition) in the four-arm study was in close agreement with the effect observed in the two-arm study. The moderate fat meal taken within 30 minutes of administration reduced Cmax on average by approximately 33% with no effect on AUC. Food was also associated with a delay in Tmax. Median Tmax fasted was approximately 1 hour whereas median Tmax under fed conditions was 2-3 h. (By comparison Tmax following administration of Diastat® rectal gel as reported in the Diastat® rectal gel label is 1.5 h.).

Figure 5:
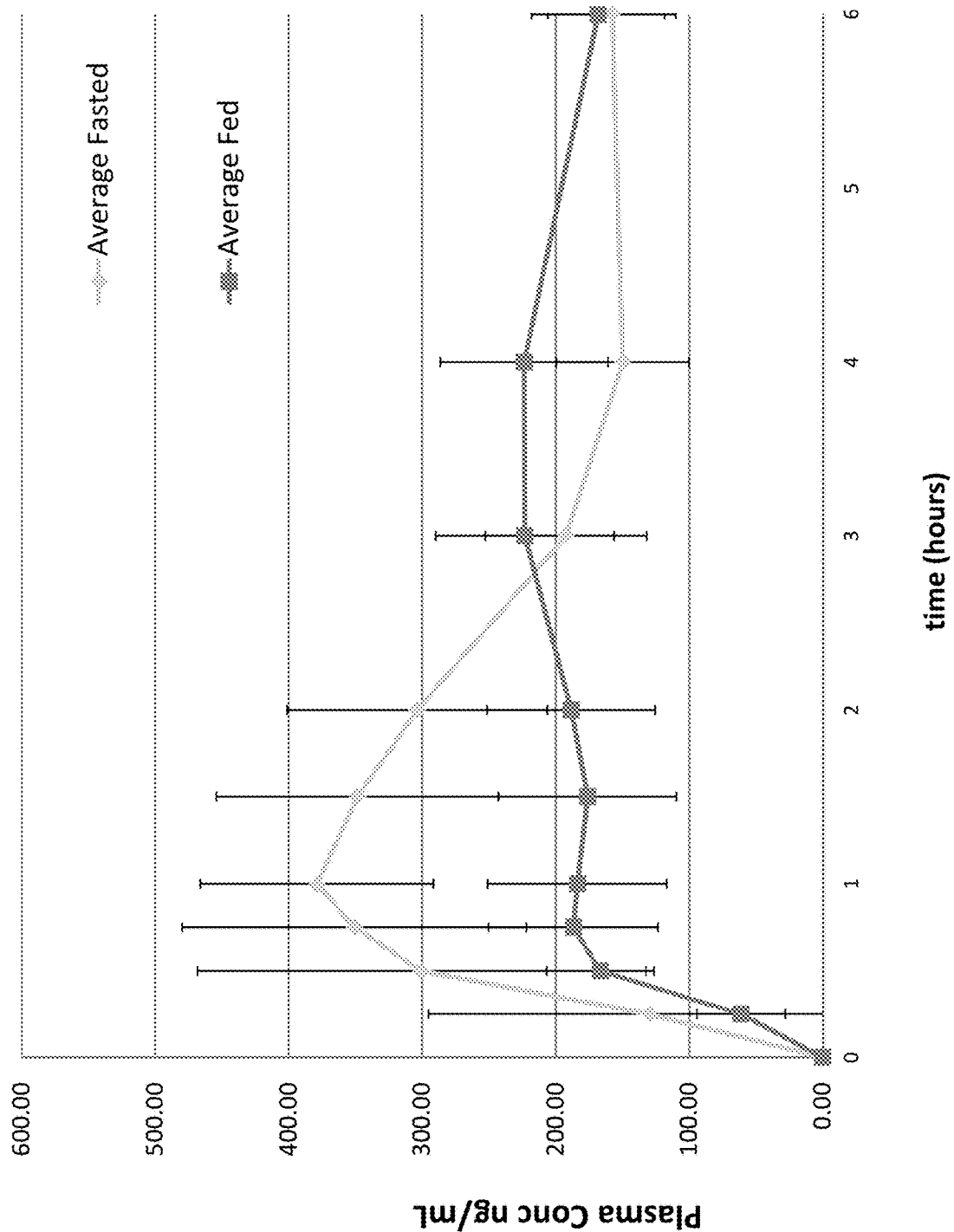
FIG. 5 shows a food effect study that was performed under fed and fasted conditions.

FIG. 5 displays mean plasma concentration-time curves from the two-arm crossover (N=18). Per the Valium label, Diazepam, taken orally has a reduction in exposure following a moderate fat meal. A 20% reduction in Cmax, and a 27% reduction in AUC was reported along with an up to 2.5 hr shift in Tmax. Accordingly, when conducting the food effect study for DBF, it was anticipated that the portion of the drug swallowed, would then be subject to a food effect as well. However, surprisingly, the study showed that the unique attributes of the formulation resulted in a different food effect when compared to oral Valium. Following the administration of a high fat meal, DBF demonstrated a food effect that had a 47% reduction in Cmax, but no reduction in AUC. This was clearly unexpected and significantly greater than what was reported in the literature for Cmax associated with oral Valium, while differing from what was reported in the literature for AUC for oral Valium.

Figure 6:
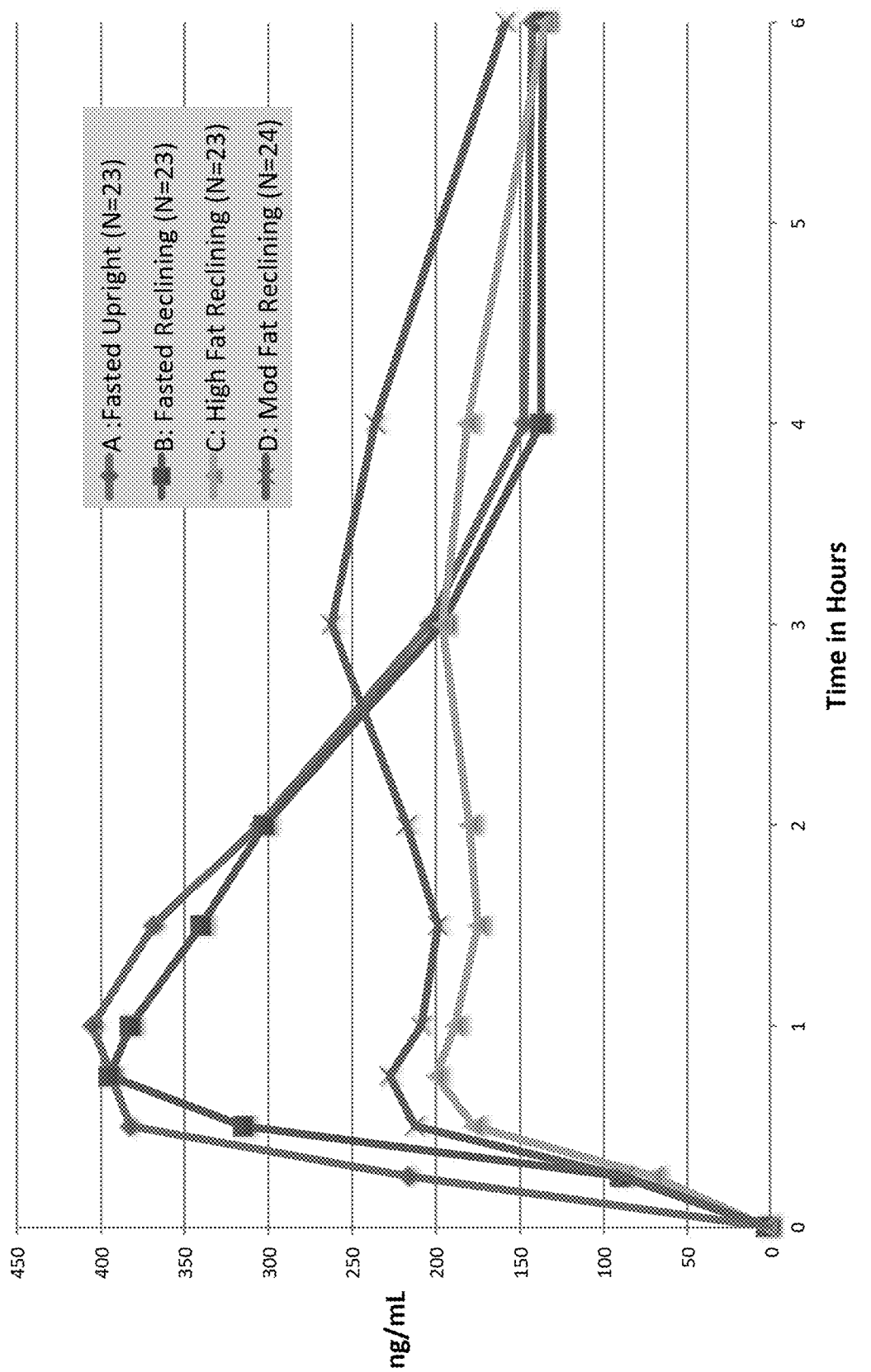
FIG. 6 shows mean plasma diazepam concentrations in a food effect study comparing fasted upright, fasted reclining, high fat reclining, and moderate fat reclining subjects.

FIG. 6 displays mean plasma concentration-time curves from the four-arm crossover (N=24). This study sought to determine the effect of moderate fat meal on DBF absorption. Another objective of this study was to determine if the administration procedure could be altered to drive more transmucosal absorption. An increase in the early (transmucosal) portion of the profile might then be sufficient to reduce the Tmax. To achieve this a second fasting arm was added.

In prior studies with DBF, DBF was administered with the subjects sitting upright with the film applied to the buccal mucosa for a period of 5 min. At this time, they swallowed any remaining drug product. To drive further absorption, DBF was administered with the subject reclining on his or her side with the film placed the film on the lower buccal mucosa (such that all saliva pooled to the sight of administration). With subjects in this reclining position, DBF was administered in crossover fashion under conditions of fasting, a moderate fat meal, and high fat meal. The time that subjects were requested to swallow was increased from 5 min to 15 min to increase residence time. (A fourth treatment—administration fasting in an upright position was added as a control.) Residence time is routinely reported as one of three key drivers for transmucosal absorption (the others being surface area and permeation kinetics). As shown in FIG. 6, position (upright vs. reclining) had no impact under the fasting condition. The effect of the high fat meal in this study was nearly identical to the effect of a high fat meal observed in the two-arm study where DBF was administered so subjects in an upright position. Thus, the changes in the mode of administration aimed at increasing residence time had no apparent effect in either the fasting or the fed condition. The moderate fat meal served only to increase the height of the second portion of the bimodal profile compared with the high fat meal. This provided further evidence that a separation in time between the transbuccal absorption and absorption from the GI tract after food provided an explanation for the later Tmax observed under fed conditions.. It should be noted that following the moderate fat meal, the Cmax was reduced by ~33%, significantly less than the ~45% reduction observed following a high fat meal.

Population Pharmacokinetic Modeling

Pharmacokinetic (PK) studies in healthy volunteers demonstrated that DBF was not bioequivalent to DRG. DBF differed from DRG in the following respects (1) DBF exhibited higher bioavailability than DRG; (2) The PK behavior of DBF was linear. Specifically, for DBF both Cmax and AUC increased in proportion to the dose. In contrast, the PK behavior of DRG was not linear. Specifically, for DRG, Cmax increased with dose to a degree that was less than dose-proportional, whereas AUC increased in proportion to the dose. (3) DBF exhibited a food effect (~45% reduction on average in Cmax after a high fat meal and ~33% reduction on average after a moderate fat meal with no change in AUC). In contrast, it is assumed that DRG, because of its rectal route of administration, is not affected by food.

Accordingly, Aquestive used population PK modeling to select a dosing regimen to compensate for the differences in PK between DBF and DRG (Table 4). In brief, the recommended DBF dose corresponding to each adult weight class as defined in the Diastat® rectal gel label was selected (1) to provide a dose sufficiently high to ensure that the predicted median of the resulting diazepam Cmax following a moderate fat meal was similar to the median Cmax following the labeled dose of Diastat® rectal gel, and (2) to provide a dose for which the predicted median of the resulting diazepam Cmax under fasting conditions would not exceed the median Cmax values observed and demonstrated as safe in Phase 1 healthy volunteer studies with DBF. Simulations based on population PK modeling demonstrated that under conditions of a moderate fat meal, the proposed DBF dosing regimen produced for each weight class a Cmax similar to the Cmax expected following the labeled dose of Diastat® rectal gel.

TABLE 4

DBF Dosing Algorithm

| Weight (Kg) | DRG (mg)* | DBF Weight-Adjusted (mg)** |
|---|---|---|
| 14 to 25 | 5 | 5 |
| 26 to 37 | 7.5 | 7.5 |
| 38 to 50 | 10 | 10* |
| 51 to 62 | 12.5 | 12.5* |
| 63 to 75 | 15 | 15* |
| 76 to 87 | 17.5 | 15* |
| 88 to 111 | 20 | 17.5* |

*The performance of this dosing regimen was evaluated in a clinical study (DBF Crossover with Diastat (DRG) in Patients with Epilepsy) reported below EMU Study A study was conducted in patients with epilepsy to determine whether the pharmacokinetics of diazepam administered as DBF were changed when DBF was given to patients in the interical state (not having seizures) vs. the ictal/periictal state (during or within 5 minutes of cessation of a seizure). This study was conducted with a fixed dose of DBF (12.5 mg to all patients) independent of weight. This study did not use the weight-adjusted dose regimen shown in Table 5.

Applicants measured pharmacokinetic parameters from a single-dose, crossover study in which plasma samples for determination of diazepam concentrations. The following Cmax, AUC and Tmax values were obtained following administration of 12.5 mg DBF in adults with epilepsy.

TABLE 5

| Parameter | Interictal (A) | Periictal (B) | Ratio B/A (%) | 90% CI (%) |
|---|---|---|---|---|
| $C_{max}$ (ng/mL) | 190.3 | 180.0 | 95.5 | 73.3-121.9 |
| $AUC_{0-4\,h}$ (h · ng/mL) | 483.8 | 433.3 | 89.6 | 69.2-115.9 |
| $T_{max}$ (h) | 0.77 | 0.53 | | |

As shown from the above data, pharmacokinetic parameters were derived from a single-dose, crossover study in which plasma samples for determination of diazepam concentrations were drawn at various times up to 4 h after administration of 12.5 mg DBF either when no seizure activity had been observed in the preceding 3 h (interictal) or within 5 min of a seizure (periictal). The study subjects were 35 adult men and women ages 17-65 with poorly controlled tonic-clonic seizures or focal seizures with impaired awareness. Patients were excluded from analysis if both treatments were not completed (4 subjects), critical time points were missing (6 subjects), pre-dose diazepam concentrations were >5% of the subsequent $C_{max}$ (2 subjects), or DBF was administered in a manner contrary to instructions (5 subjects). $C_{max}$ and $AUC_{0-4h}$ values are geometric means; $T_{max}$ values are median values. 90% geometric confidence interval (CI) values were determined using ln-transformed data. Difference in $T_{max}$ is not significant, p=0.5708 (Wilcoxon signed-rank test). Values shown represent data from 18 evaluable subjects. $AUC_{0-4h}$, area under the plasma concentration-time curve from 0 to 4 h after dosing; $C_{max}$, maximum plasma drug concentration; $T_{max}$, time to reach maximum plasma concentration. From Rogawski et al. See, e.g., Rogawski M A, Gong H, Liow K, Aboumatar S, Klein P, Gelfand M A, Jung C, Wargacki S, Mehta R, Heller A H. Pharmacokinetics of diazepam buccal soluble film in adult patients with epilepsy: comparison of bioavailability with periictal and interictal administration, Abstract 2.453, American Epilepsy Society Annual Meeting, www.aesnet.org, 2018, which is incorporated by reference in its entirety.

Usability Study

A usability evaluation was conducted within the EMU study. The following outcome was measured.

TABLE 6

| Outcome | Interictal (A) | Periictal (B) |
| --- | --- | --- |
| Successful placement of film | 33 (100%) | 33 (100%) |
| Required more than 1 film placement attempt | 0 (0%) | 2 (6.1%) |
| Spit or blew out film | 0 (0%) | 3 (9.1%) |
| Swallowed film | 2 (6.1%) | 1 (3.0%) |

Results of usability evaluation from interictal-perictal crossover study described above. Values indicate number of subjects out of 33; percentages are given in parentheses. From Jung et al. Jung C, Dubow J, Gong H, Liow K, Klein P, Gelfand M A, Wargacki S, Mehta R, Rogawski M A, Heller A H. The usability of diazepam buccal soluble film as an oral treatment in adult patients with epilepsy, Abstract 3.468, American Epilepsy Society Annual Meeting, www.aesnet.org, 2018.

This study showed that exposure to diazepam after DBF in patients was consistent independent of whether patients were dosed at the time of a seizure. Subjects in this study (patients with epilepsy) exhibited lower plasma concentrations than healthy volunteers after adjustment for dose received. Lower plasma concentrations in patients with epilepsy associated with higher clearance of diazepam is well known from the literature, fully expected, and attributed to the effect of heaptic enzyme induction from concomitant antiseizure drugs taken by the patients (reference Dhillon and Richens, 1981, which is incorporated by reference in its entirety). A subsequent study in patients (described below) confirmed that same effect of the same magnitude was observed in patients given DRG.

DBF Crossover with Diastat® (DRG) in Patients with Epilepsy

Applicants tested the performance of the proposed DBF dosing regimen (Table 7-8) in a head to head two-period crossover comparison with Diastat® rectal gel in patients. The primary objective was to compare the PK performance of DBF administered after a moderate fat meal with Diastat® rectal gel (DRG) administered after a moderate fat meal. DBF was administered according to the proposed weight-adjusted dosing regimen in Table 4 and Diastat® rectal gel (DRG) was administered according to the dosing regimen for Diastat® rectal gel in the FDA-approved label. In addition, patients could enroll in an optional third period to receive DBF after a high-fat meal. A secondary objective of the study was to compare the PK performance of DBF administered after a high fat meal with Diastat® rectal gel (DRG) administered after a moderate fat meal. Results of the primary comparison are shown in the Table 7, below.

The ratio [DBF/DRG] of the Cmax values in this head-to-head study (geometric means) was 96.70% with 90% CI 70.53-132.58% (Table 7 demonstrating successfully that the diazepam Cmax following a moderate fat meal was similar to the Cmax following the labeled dose of DRG (an outcome consistent with predictions from population PK modeling). This result serves to validate the proposed DBF dosing algorithm. Note also that the AUC values (ratio [DBF/DRG] of geometric means for AUC(0-inf) was greater than 100%, despite equal or lower mg doses for DBF, are also consistent with the results of population PK modelling indicating that DBF exhibits higher bioavailability than DRG.

TABLE 7

Pharmacokinetic Parameters Following DBF and DRG Administered to Adults with Epilepsy According to Body Weight Following a Moderate-Fat Meal

| | DBF (moderate fat) Geometric Mean | DRG (moderate fat) Geometric Mean | Ratio of Geometric Means DBF/DRG (%)[1] | 90% CI (%)[2] |
| --- | --- | --- | --- | --- |
| Overall (N = 28) | | | | |
| $C_{max}$ (ng/mL) | 204.26 | 211.22 | 96.70 | 70.53-132.58 |
| $AUC_{(0-T)}$ (ng · h/mL)* | 7290.40 | 5682.09 | 128.31 | 95.93-171.61 |
| $AUC_{(0-INF)}$ (ng · h/mL)* | 8672.09 | 6880.96 | 126.03 | 103.67-153.21 |
| | Median | Median | | |
| $T_{max}$ (h) | 1.0 | 0.517 | * | |
| Range | 0.483-4.00 | 0.483-2.983 | | |

*N = 27

$C_{max}$ By Weight Group

TABLE 7-continued

Pharmacokinetic Parameters Following DBF and DRG Administered to Adults with Epilepsy According to Body Weight Following a Moderate-Fat Meal

|  | DBF (moderate fat) Geometric Mean | DRG (moderate fat) Geometric Mean | Ratio of Geometric Means DBF/DRG (%)[1] | 90% CI (%)[2] |
|---|---|---|---|---|
| Wt 51-62 kg (n = 6) | | | | |
| $C_{max}$ (ng/mL) | 258.38 | 358.06 | 72.16 | 51.17-101.76 |
| Dose (mg) | 12.5 | 12.5 | | |
| Wt 63-75 kg (n = 4) | | | | |
| $C_{max}$ (ng/mL) | 234.45 | 258.88 | 90.56 | 27.89-295.09 |
| Dose (mg) | 15.0 | 15.0 | | |
| Wt 76-87 kg (n = 7) | | | | |
| $C_{max}$ (ng/mL) | 201.39 | 293.00 | 68.74 | 46.77-101.01 |
| Dose (mg) | 15.0 | 17.5 | | |
| Wt 88-111 kg (n = 11)** | | | | |
| $C_{max}$ (ng/mL) | 175.56 | 115.82 | 151.58 | 71.59-320.94 |
| Dose (mg) | 17.5 | 20 | | |

[1]Calculated using least-square means according to the formula $e^{(Difference)} \times 100$.
[2]90% geometric confidence interval using ln-transformed data.
*Statistically significant, P < 0.05.
**The highest weight category included 4 individuals with body weight 112-124.5 kg.

The proposed DBF dose regimen also performed well within each weight category and yielded Cmax values more consistent across the weight categories than those following administration of Diastat® rectal gel.

Results of the secondary comparison (the comparison of DBF following a high fat meal with DRG) are shown in Table 8. The ratio [DBF (high-fat)/DRG] of the Cmax values (geometric means) was 82.67% with 90% CI 55.61-122.91%. This ratio (~82.5%) was consistent with the value predicted by population PK modelling and also serves to validate the proposed DBF dosing algorithm.

TABLE 8

Pharmacokinetic Parameters Following DBF and DRG Administered to Adults with Epilepsy According to Body Weight Following a High-Fat Meal (DBF) and a Moderate Fat Meal (DRG)

|  | DBF (high fat) Geometric Mean | DRG (moderate fat) Geometric Mean | Ratio of Geometric Means DBF/DRG (%)[1] | 90% CI (%)[2] |
|---|---|---|---|---|
| Overall (N = 9) | | | | |
| $C_{max}$ (ng/mL) | 181.61 | 219.67 | 82.67 | 55.61-122.91 |
| $AUC_{(0-T)}$ (ng · h/mL) | 8288.14 | 7663.19 | 108.16 | 81.15-142.92 |
| $AUC_{(0-INF)}$ (ng · h/mL) | 9497.63 | 8430.60 | 112.66 | 86.19-147.24 |
|  | Median | Median | | |
| $T_{max}$ (h) | 1.517 | 0.50 | * | |
| Range | 0.5-4.0 | 0.5-1.0 | | |

[1]Calculated using least-square means according to the formula $e^{(Difference)} \times 100$.
[2]90% geometric confidence interval using ln-transformed data.
*Statistically significant, P < 0.05.
**The highest weight category included 4 individuals with body weight 112-124.5 kg.

The observed concentration profiles from studies with DBF show that the onset of the absorption profile does not significantly change with food but a clear bimodal absorption profile is seen. As the larger of the two absorption profiles appears to come from the oral portion of the profile, Tmax is also shifted out more significantly than would be predicted if the entire dose were oral and a higher concentration was present to drive absorption. To verify this hypothesis and to attempt to quantify the amount of transmucosal delivery achieved during the administration of DBF, mathematical peak deconvolution was utilized to describe each of the modes of absorption in the observed profiles. The profiles can then be analyzed individually and because of the high bioavailability resulting from either route of absorption, an estimate of the contribution from each route can be achieved.

Peak Deconvolution

Several profiles were chosen for peak deconvolution using the procedure described below. The resulting profiles were then analyzed for AUC0-t using Prism software. The ratio of the AUC0-t from each profile against the combined profile is then used to assign a percentage to the transmucosal and oral routes of absorption. The profiles chosen were the average profiles obtained from the four-arm crossover using 15 mg DBF fasted upright, 15 mg DBF after a moderate fat meal, 15 mg DBF after a high fat meal, and lastly, 5 mg DBF from the dose proportionality study. The Plasma levels observed for the four average profiles are listed in Table 9 below.

trations were >5% of $C_{max}$ (n=1). Diazepam mean (SD) dose was 15.4±1.9 mg and 17.1±3.0 mg for DBF and DRG, respectively. The Table 7 shows geometric means for PK

TABLE 9

Diazepam plasma concentrations after administration of DBF under various conditions.

| | Time (hrs) | | | | | | | | | |
|---|---|---|---|---|---|---|---|---|---|---|
| | 0 | 0.25 | 0.5 | 0.75 | 1 | 1.5 | 2 | 3 | 4 | 6 |
| 5 mg Fasted | 0.00 | 56.49 | 218.25 | 299.65 | 309.47 | 271.64 | 217.89 | 145.01 | 105.68 | 103.61 |
| 15 mg Fasted | 2.27 | 216.03 | 382.65 | 393.67 | 404.78 | 368.19 | 304.46 | 203.59 | 147.63 | 142.53 |
| 15 mg Moderate Fat (MF) | 1.46 | 87.64 | 211.59 | 226.76 | 208.52 | 198.84 | 217.64 | 261.8 | 235.73 | 157.79 |
| 15 mg High Fat (HF) | 2.24 | 69.36 | 177.45 | 199.04 | 188.78 | 174.89 | 179.18 | 196.22 | 181.08 | 134.2 |

| | Time (hrs) | | | | | | | | |
|---|---|---|---|---|---|---|---|---|---|
| | 9 | 12 | 24 | 48 | 72 | 96 | 120 | 144 | 192 | 240 |
| 5 mg Fasted | 103.47 | 85.64 | 52.36 | 24.45 | 20.23 | 32.48 | 26.05 | 21.50 | 15.69 | 10.17 |
| 15 mg Fasted | 128.82 | 113.64 | 75.72 | 67.65 | 53.99 | 44.02 | 36.25 | 31.41 | 20.7 | 15.82 |
| 15 mg Moderate Fat (MF) | 125.16 | 116.64 | 80.81 | 65.98 | 53.36 | 41.07 | 36.43 | 28.5 | 19.69 | 14.25 |
| 15 mg High Fat (HF) | 118.62 | 119.15 | 80.09 | 68.17 | 53.08 | 41.3 | 35.35 | 27.5 | 19.05 | 12.7 |

In summary of some of the experiments described herein:

Rationale: Diazepam buccal film (DBF) is a novel dosage form of diazepam under development for the management of patients with refractory epilepsy requiring intermittent use of diazepam to control increased seizure activity. We assessed the pharmacokinetic (PK) performance of DBF administered to adults with epilepsy according to a weight-based regimen (dose range 12.5-17.5 mg) compared to diazepam rectal gel (DRG) administered according to the weight-based regimen recommended in the FDA-approved label (dose range 12.5-20 mg).

Methods: Adult men and women ages 18-65 years with epilepsy on a stable regimen of ≥1 antiseizure drug (no change in the 30 days prior to receiving study drug and no change anticipated over the course of the study) were enrolled in a 2-period crossover study (NCT03953820) to receive a single dose of either DBF or DRG in randomized sequence and separated by a 28-day washout. Doses were administered within 30 min of a standardized moderate-fat meal. Subjects were confined to the clinic until 24 h after dosing. Diazepam plasma samples were obtained pre-dose and at intervals until 10 d after dosing to enable analysis of maximal plasma concentration ($C_{max}$), time to $C_{max}$ ($T_{max}$), area under the curve to the last measurable concentration ($AUC_{0-T}$), and AUC extrapolated to infinity ($AUC_{0-INF}$). Subjects were monitored for adverse events (AE) throughout the study.

Results: Among 31 subjects enrolled, PK profiles valid for analysis for both DBF and DRG were available for 28 subjects (13 males, 15 females; mean [SD] weight 84.6±20.6 kg). Subjects were excluded from analysis if both treatments were not completed (n=2), or if predose diazepam concentrations were >5% of $C_{max}$ (n=1). Diazepam mean (SD) dose was 15.4±1.9 mg and 17.1±3.0 mg for DBF and DRG, respectively. The Table 7 shows geometric means for PK parameters with ratio of geometric means (DBF/DRG) for the study population overall (N=28), and geometric means for $C_{max}$ and corresponding ratios within each weight category. For the study population overall, geometric mean $C_{max}$ values for DBF and DRG were 204.26 ng/mL (geometric SD [GSD] 136.12-306.49) and 211.22 ng/mL (GSD 87.71-508.63), respectively (see FIG. 7), indicating that Cmax values following DBF were comparable but significantly less variable than $C_{max}$ values following DRG (P<0.0001). Values for AUC were higher for DBF than for DRG, and median $T_{max}$ values for DBF and DRG were 1.0 and 0.52 h, respectively (P<0.05).Three of 28 subjects following DRG dosing failed to achieve a plasma concentration ≥70 ng/mL. There were no serious AEs related to study drug.

Conclusions: These results demonstrate that a single dose of DBF administered to adults with epilepsy following a moderate-fat meal according to a weight-based regimen provides exposure to diazepam similar to DRG dosed as recommended with significantly less variability. The geometric mean values for $C_{max}$ following DBF were consistently >150 ng/mL for each of the weight categories.

Another summary follows:

Patients with refractory epilepsy may experience seizure exacerbations referred to as "acute repetitive seizures" (ARS), which represent a series of seizures grouped consecutively, typically with short (or shorter than usual) interictal periods.

ARS are commonly referred to as "seizure clusters" or "seizure flurries".

ARS raise concerns for seizure-associated risks, including postictal psychosis, physical injury, negative social and economic impact from frequent emergency department visits, hospitalizations, or missed school or work days, and for status epilepticus that may lead to persistent neurological impairment or death (Refs. 1-7).

Despite these increased risks, many patients with epilepsy who experience ARS do not have a rescue medication prescribed and/or a seizure action plan for when cluster seizures occur (Refs. 1, 8-10).

Diazepam buccal film (DBF) is a novel dosage form of diazepam under development for the management of patients with refractory epilepsy requiring intermittent use of diazepam to control increased seizure activity (Refs. 11, 12).

DBF consists of a rectangular of film smaller than the size of a postage stamp, which is affixed to the buccal mucosa inside the cheek.

Diazepam carried within the dissolving polymer matrix of the film is absorbed transmucosally and is also swallowed.

Currently, diazepam rectal gel (DRG; Diastat® rectal gel, AcuDial™ rectal gel, Valeant Pharmaceuticals, Bridgewater, NJ, USA) and midazolam nasal spray (Nayzilam® nasal spray, UCB Biopharma, Smyrna, GA, USA) are the only FDA-approved treatments for breakthrough or cluster seizures (refs. 2, 13-16); these current treatments have certain limitations.

Rectal administration can be difficult and time consuming, and is otherwise problematic for many patients and caregivers due to concerns regarding embarrassment and social acceptability (Refs. 13,17,18)

Intranasal administration is often poorly accepted by patients, which can negatively impact compliance Pharmacokinetic (PK) data from a phase 1 study in healthy adults showed DBF to exhibit greater overall consistency in diazepam exposure (area under the concentration-time curve [AUC], maximal plasma concentration [Cmax]) than DRG (Ref. 12).

This study was conducted to compare the PK performance in people with epilepsy of DBF in relation to DRG, the only currently FDA-approved diazepam formulation for treatment of ARS.

Randomized, multicenter, single-dose, open-label, two-treatment, two-sequence crossover study (NCT03953820).

Adult patients with epilepsy receiving a stable regimen of antiseizure drugs were randomized to receive a single administration of DBF and a single administration of DRG in crossover fashion.

There was a 28-day washout phase between doses of study drug.

DRG was dosed according to the weight-based regimen in the FDA-approved label (dose range 10-20 mg) and DBF was dosed according to a weight-based regimen (dose range 10-17.5 mg) predicted to approximate the PK performance of DRG with respect to Cmax (Table 10)

The treatments were administered following a moderate-fat meal.

TABLE 10

Study Drug Dosing by Patient Weight Category

| Weight Category (kg) | DBF Dose | DRG Dose[a] |
|---|---|---|
| 38-50 | 10 mg | 10 mg (2 mL) |
| 51-62 | 12.5 mg | 12.5 mg (2.5 mL) |
| 63-75 | 15 mg | 15 mg (3 mL) |
| 76-87 | 15 mg | 17.5 mg (3.5 mL) |
| ≥88 | 17.5 mg | 20 mg (4 mL) |

[a]DRG was administered according to the weight-based regimen recommended in the FDA-approved label (ref. 16).

For each dose of study drug, patients were confined to the clinic from approximately 14 hours before dosing until after the 24-hour post-dose blood draw.

For blood draws after 24 hours post-dose, patients could return to the clinical site or have a sample collected by a home-care nurse.

While confined in the clinic, patients fasted overnight for at least 10 hours before being served a standardized moderate-fat meal.

In each period, blood samples for PK analyses were obtained pre-dose and 0.5, 0.75, 1, 1.5, 2, 3, 4, 6, 9, 12, 24, 48, 72, 96, 120, 144, 192, and 240 hours post-dose to enable PK assessments.

A window of ±1 minute was allowed for blood samples obtained within the first 8 hours post-dose, ±3 minutes for samples obtained within 8 to 24 hours post-dose, and ±60 minutes for all subsequent blood samples.

Key PK parameters of interest included Cmax, time to Cmax (Tmax), AUC from time zero to the last non-zero concentration (AUC0-T), and AUC from time zero extrapolated to infinity (AUC0-INF).

Adverse events (AEs) were monitored throughout the study.

The safety population included all patients who received at least one dose of study drug; the PK population included all patients who completed period 1 and period 2, had no significant violations of the study protocol, and for whom the PK profile could be adequately characterized.

PK data were summarized overall and for each weight category using descriptive statistics.

ANOVA was performed on log-transformed AUC0-T, AUC0-INF, and Cmax at alpha 0.05. Factors in the model were sequence, subject within sequence, period, and treatment. Tmax was analyzed using the non-parametric Wilcoxon signed-rank test.

The ratios of geometric means with 90% confidence intervals based on least-squares means from ANOVA of log-transformed data were calculated for Cmax, AUC0-T, and AUC0-INF for DBF versus DRG values for all subjects irrespective of weight category, and for subjects within each weight category.

Among 31 patients enrolled, PK profiles valid for analysis for both DBF and DRG were available for 28 subjects (13 males, 15 females; mean [SD] weight: 84.6 [20.6 kg]).

Patients were excluded from PK analyses if both DBF and DRG treatments were not completed (n=2), or if pre-dose diazepam concentrations were >5% of Cmax (n=1).

Diazepam mean (SD) doses were 15.4 (1.9) mg and 17.1 (3.0) mg for DBF and DRG, respectively.

Geometric means for PK parameters with ratios of the geometric means (DBF/DRG) for the overall study population (N=28 for Cmax and Tmax; N=27 for AUC0-T and AUC0-INF) are shown in Table 11.

AUC0-T and AUC0-INF values were higher for DBF than for DRG

Overall, Tmax was significantly shorter for DRG versus DBF (P<0.05)

Three of 28 subjects following DRG dosing failed to achieve a plasma concentration ≥70 ng/mL (70 ng/mL is the estimated threshold plasma concentration of diazepam associated with seizure threshold elevation as determined by a pharmacodynamic-PK study in rats) (ref. 19).

TABLE 11

PHARMACOKINETIC PARAMETERS FOLLOWING DBF AND DRG ADMINISTERED TO ADULTS WITH EPILEPSY FOLLOWING A MODERATE-FAT MEAL IN THE OVERALL STUDY POPULATION (N = 28)

| Parameter | DBF | DRG | Ratio of Geometric Means, DBF/DBG (%)[a] | 90% CI (%) for Ratio[b] |
|---|---|---|---|---|
| Cmax (ng/mL), geometric mean | 204.26 | 211.22 | 96.70 | 70.53, 132.58 |
| AUC(0-T) (ng · h/mL), Geometric mean[c] | 7290.40 | 5682.09 | 128.31 | 95.93, 171.61 |
| AUC(0-INF) (ng · h/mL), Geometric mean[c] | 8672.09 | 6880.96 | 126.03 | 103.67, 153.21 |
| Tmax (h), median | 1.0 | 0.517[d] | NA | |

[a]Calculated using least-square means according to the formula e(Difference) × 100.
[b]90% geometric confidence interval using log-transformed data.
[c]N = 27.
[d]P < 0.05 vs DBF.

Figure 7:
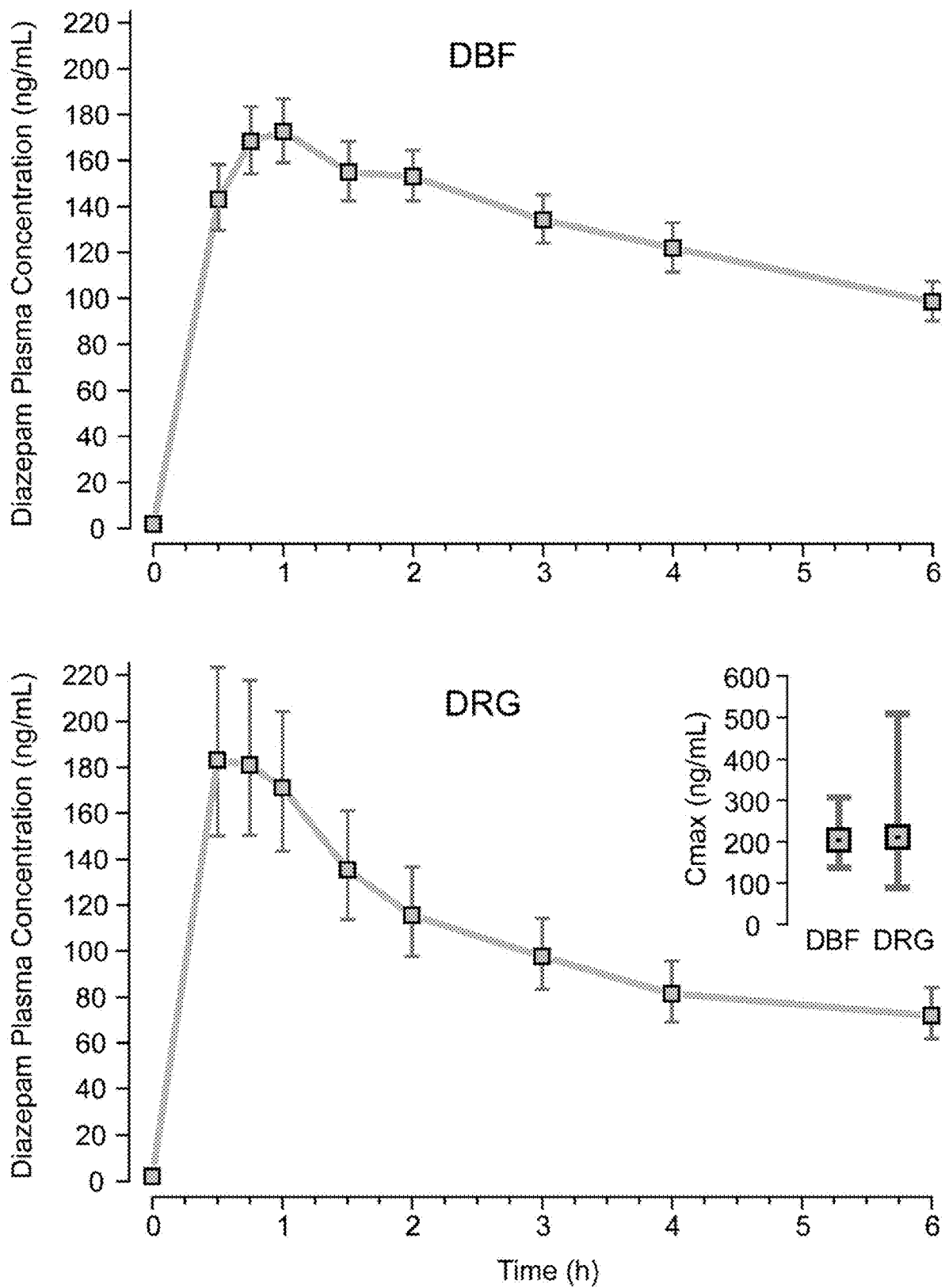
FIG. 7 shows geometric mean dazepam plasma concentration following administration of DBF and DRG to adults with epilepsy according to body weight following a moderate-fat meal (N=28).

Geometric mean diazepam plasma concentrations over time in the overall study population following DBF and DRG are illustrated in FIG. 7. Geometric mean plasma concentrations from 28 subjects with valid profiles for both DBF and DRG are shown following administration of DBF and DRG to adults with epilepsy according to body weight following a moderate-fat Meal (N=28). Error bars are the geometric standard error. Inset shows geometric mean values for Cmax for DBF and DRG with geometric standard deviation.

For the study population overall, geometric mean Cmax values following DBF and DRG administration were 204.26 ng/mL (geometric SD [GSD]: 136.12-306.49) and 211.22 ng/mL (GSD 87.71-508.63), respectively, indicating that Cmax values following DBF were comparable but significantly less variable than Cmax values following DRG (P<0.0001) (Table 11 and FIG. 7 inset).

Values graphed are geometric mean (geometric SE) plasma concentrations. Inset shows geometric mean (geometric SD) Cmax values. Cmax, maximum observed plasma drug concentration; DBF, diazepam buccal film; DRG, diazepam rectal gel; SD, standard deviation; SE, standard error.

Geometric means for Cmax and corresponding ratios within each weight category are shown in Table 12.

Figure 8:
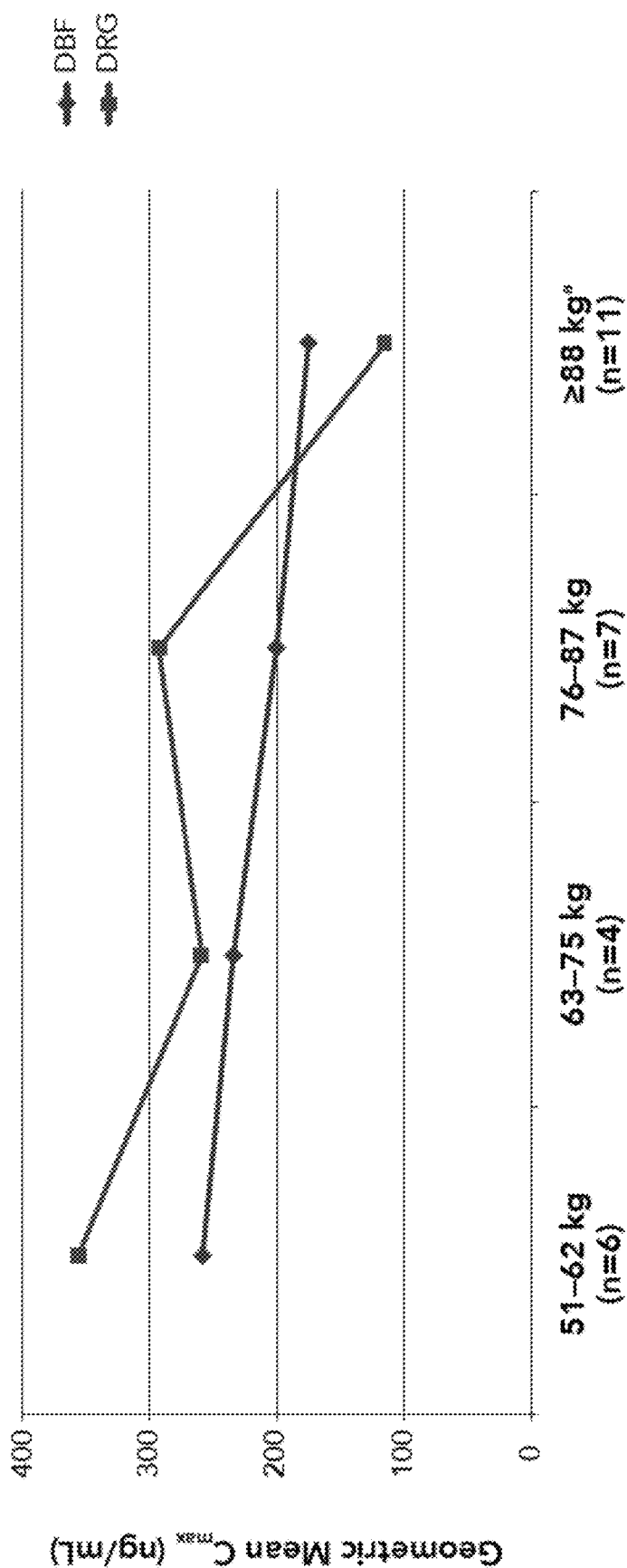
FIG. 8 shows Cmax (Geometric Mean) by Weight Group (N=28).

Cmax values were less variable with DBF versus DRG (FIG. 8).

TABLE 12

DBF AND DRG MAXIMAL PLASMA CONCENTRATIONS (CMAX) ACCORDING TO WEIGHT CATEGORY (N = 28)

| Cmax Geometric Mean by Weight Group | DBF | DRG | Ratio of Cmax Geometric Means DBF/DRG (%)[a] | 90% CI (%) for Ratio[b] |
|---|---|---|---|---|
| 51-62 kg (n = 6) | | | | |
| Cmax (ng/mL) | 258.38 | 358.06 | 72.16 | 51.17, 101.76 |
| Dose (mg) | 15.0 | 15.0 | — | — |
| 76-87 kg (n = 7) | | | | |
| Cmax (ng/mL) | 201.39 | 293.00 | 68.74 | 46.77, 101.01 |
| Dose (mg) | 15.0 | 17.5 | — | — |
| ≥88c (n = 11) | | | | |
| Cmax (ng/mL) | 175.56 | 115.82 | 151.58 | 71.59, 320.94 |
| Dose (mg) | 17.5 | 20.0 | — | — |

[a]Calculated using least-square means according to the formula e(Difference) × 100.
[b]90% geometric confidence interval using log-transformed data.
cThe highest weight category included 4 individuals with body weight 112-124.5 kg.
CI, confidence interval;
Cmax, maximum observed plasma drug concentration;
DBF, diazepam buccal film;
DRG, diazepam rectal gel.

There were no serious AEs related to study drug reported.

These results demonstrate that a single dose of DBF provides similar exposure to diazepam as DRG with significantly less variability when administered to adults with epilepsy according to weight-based regimens following a moderate-fat meal.

The geometric mean values for Cmax following DBF were consistently ≥150 ng/mL for each of the weight categories.

These results support further development of DBF as an easily administered alternative to DRG for patients with epilepsy who experience breakthrough or cluster seizures despite treatment with antiseizure medications.

DNS Delivery in Fasted or Fed Subjects

Figure 9:
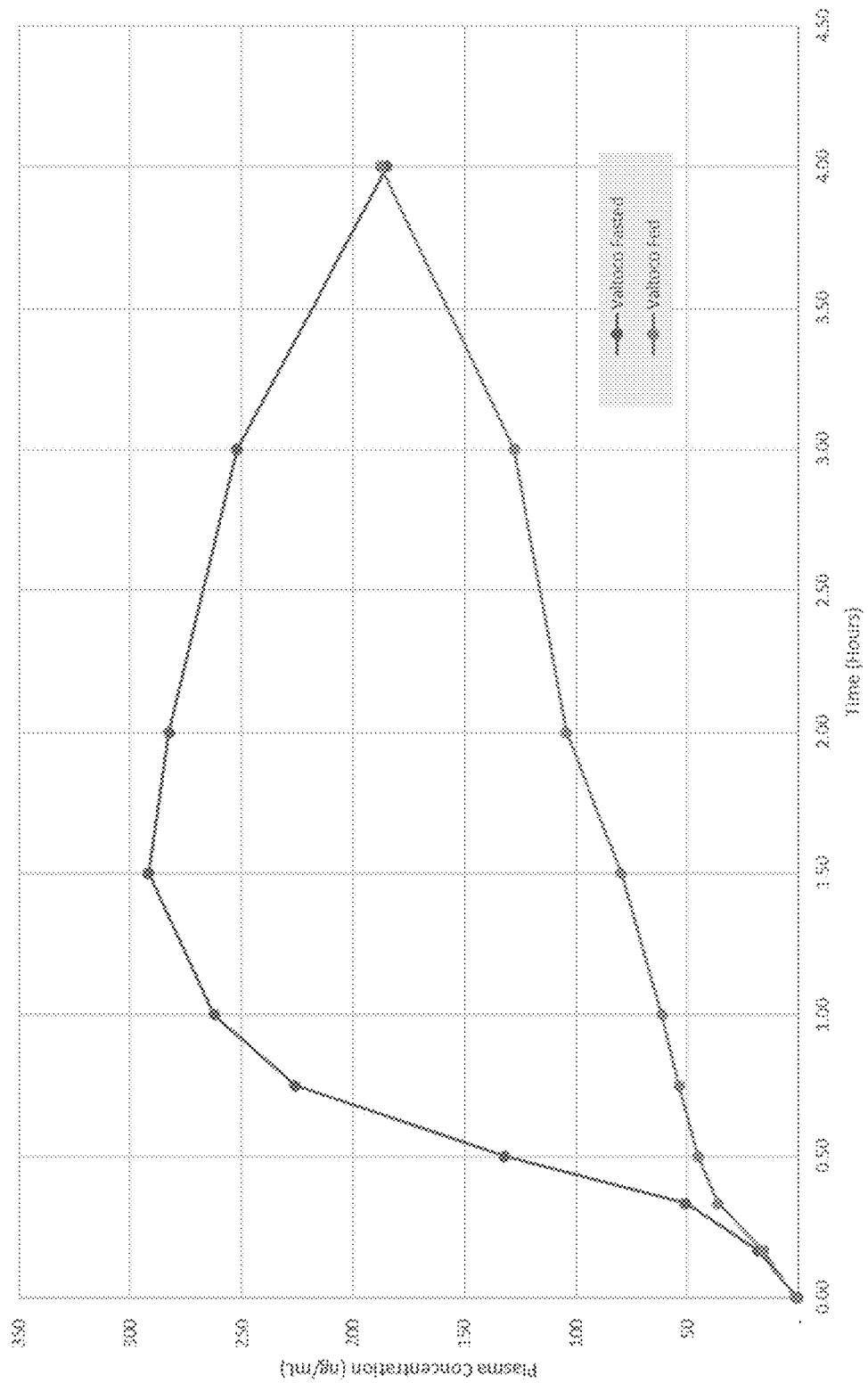
FIG. 9 shows a food effect study that was performed under fed and fasted conditions for a spray delivery of diazepam.

Referring to FIG. 9, average pharmacokinetic profiles of diazepam following administration of diazepam spray (Valtoco® nasal spray) (15 or 20 mg) in healthy volunteers in either fasted or following a high fat meal is shown. Specifically, an open label, single dose, randomized, 2 treatment, 2 period, 2 sequence pharmacokinetic (PK) crossover study was conducted comparing equal doses of Valtoco® nasal spray in healthy subjects under fasting and fed conditions. Healthy volunteers were recruited and dosed in random sequence within a clinical setting according to the Prescribing Information and Instructions For Use (IFU) for Valtoco® nasal spray. Previously, Valtoco® nasal spray has not been characterized for the impact of food as one would expect that intranasal dosing and delivery would provide for complete and predictable dosing regardless of food intake. The study utilized a high-fat meal composed of 2 eggs fried in butter, 2 strips of bacon, 8 oz/200 mL of whole milk, 2 slices of toast with butter, and 4 oz/2 hash brown potatoes. Among 12 subjects, the VALTOCO® nasal spray PK food effect crossover study consistently demonstrated a significant effect of a high fat meal on blood levels of diazepam following Valtoco® nasal spray by both (1) reducing the maximum diazepam plasma concentration by an average of 41% lower than that observed in the same subjects under fasting conditions and (2) consistently and substantially delaying the median time to maximum diazepam concentration from 2.5 hours under fasting conditions to 4 hours under fed conditions. Importantly, under fed conditions, 75% of the subjects failed to achieve a diazepam concentration of at least 150 ng/mL at 2 hours after dosing and 50% of subjects failed to even reach 100 ng/ml at 2 hours after dosing. FIG. 9 and Table 13 provide comparisons of Valtoco® nasal spray PK under fasted and fed conditions. As a result, a diazepam nasal spray delivery system when used after consuming a meal has to be adjusted to deliver a higher dose of active material to attain sufficient and timely drug exposure and efficacy in order to stop seizures or seizure clusters or acute repetitive seizures.

TABLE 13

A Comparison of Valtoco ® nasal spray Pharmacokinetics in Healthy Volunteers Dosed in a Fasted State and After a High Fat Meal

| Line Item | Fasted | Fed | Fed/Fasted |
|---|---|---|---|
| CMax (geometric mean) (ng/mL | 359 | 213 | 0.59 |
| TMax (median) (hrs) | 1.5 | 4.0 | |
| AUC0-24 (hr*ng/mL) | 3236 | 3186 | 0.98 |

The existence of a food effect can be managed by adjusting the dosing regimen of a product to ensure that, under all fed or fasted conditions, patients receive sufficient plasma concentrations of drug within an acceptable timeframe and safety profile.

REFERENCES (EACH OF WHICH IS INCORPORATED BY REFERENCE IN ITS ENTIRETY)

1. Penovich P E, et al. *Neurologist.* 2017; 22:207-14.
2. Haut S R. *Curr Opin Neurol.* 2015; 28:143-50.
3. Kanner A M, et al. *Arch Neurol.* 1996; 53:258-63.
4. Pellock J M. *J Child Neurol.* 2007; 22:9S-13S.
5. Sillanpaa M, Schmidt D. *Brain.* 2008; 131:938-44.
6. Bergen D C. *Epilepsy Curr.* 2006; 6:117-8.
7. Haut S R, et al. *Epilepsia.* 1999; 40:1832-4.
8. Detyniecki K, et al. *Epilepsy Behav.* 2018; 88:349-56.
9. Gainza-Lein M, et al. *Seizure.* 2017; 52:188-94.
10. Vigevano F, et al. *Eur J Paediatr Neurol.* 2018; 22:56-63.
11. Heller A H, et al. *Neurology.* 2018; 90(15 suppl):P4.272.
12. Heller A H, et al. *Neurology.* 2018; 90(15 suppl):P4.273.
13. Cereghino J J. *Curr Treat Options Neurol.* 2007; 9:249-55.
14. Jafarpour S, et al. *Seizure.* 2019; 68:9-15.
15. Nayzilam [package insert]. Smyrna, GA: UCB, Inc.; 2019.
16. Diastat® rectal gel. C-IV (diazepam rectal gel) [package insert]. San Antonio, TX: DPT Laboratories; 2016.
17. Fisgin T, et al. *J Child Neurol.* 2002; 17:123-6.
18. Tatum I W. *Epilepsy Behav.* 2002; 3:535-8.
19. Dhir A, Rogawski M A. *Epilepsia.* 2018; 59:935-44.

Other embodiments are within the scope of the following claims.

What is claimed is:

1. A method of administering diazepam to a subject in a fed state in need thereof for treating a seizure disorder comprising:
   providing a nasal pharmaceutical formulation comprising diazepam, dehydrated alcohol, n-dodecyl beta-D-maltoside, benzyl alcohol and vitamin E;
   adjusting a dose of the diazepam formulation to compensate for a food effect;
   administering the adjusted dose as a first spray and a subsequent spray to a nasal cavity of the subject in the fed state in need thereof for treating a seizure disorder; and
   achieving a therapeutic effect in the treatment of a seizure disorder in the subject equivalent to the therapeutic effect in a subject in a non-fed state,
   wherein the first spray and the subsequent spray together contain a total dose of the diazepam that is higher than a recommended effective dose for the subject in a non-fed state.

2. The method of claim 1, wherein administering the first spray to the nasal cavity of the subject includes spraying the first spray in one or more nostrils of the subject.

3. The method of claim 1, wherein administering the subsequent spray to a nasal cavity includes spraying the subsequent spray in one or more nostrils of the subject.

4. The method of claim 1, wherein administering the first spray to a nasal cavity includes spraying the first spray in a nostril of the subject and administering the subsequent spray to a nasal cavity includes spraying the second spray in the nostril of the subject.

5. The method of claim 1, wherein administering the first spray to a nasal cavity includes spraying the first spray in a first nostril of the subject and administering the subsequent spray to a nasal cavity includes spraying the subsequent spray in a second nostril of the subject.

6. The method of claim 1, wherein administering the diazepam formulation achieves a therapeutic threshold of 45 minutes or less.

7. The method of claim 1, wherein administering the diazepam formulation achieves a therapeutic threshold of 15 minutes or less.

8. The method of claim 1, wherein the subsequent spray is administered within 2 hours or less of the first spray.

9. The method of claim 1, wherein the subsequent spray is administered within 4 hours or less of the first spray.

10. The method of claim 1, wherein the subsequent spray is administered within 30 minutes or less of the first spray.

11. The method of claim 1, wherein the subsequent spray is administered within 10 minutes or less of the first spray.

12. The method of claim 1, wherein a portion of the diazepam is also delivered via at least an esophageal, pharyngeal or gastrointestinal route.

13. The method of claim 1, wherein each spray of the diazepam formulation is administered according to a weight-based regimen.

14. The method of claim 1, wherein the diazepam formulation is administered as a rescue medication.

15. The method of claim 1, wherein the diazepam formulation is administered to treat acute repetitive seizures, or generalized seizures or other seizure disorders.

16. The method of claim 1, wherein the therapeutic effect includes a reduction in the severity of the seizure, a reduction in seizure-induced anxiety experienced by the subject, a reduction in the duration of the seizure, and reduction in the probability that the subject will experience a repeat seizure, an increase in the interval between the current seizure and the next seizure, or a lack of recurrent seizures in the subject.

17. The method of claim 1, wherein if the therapeutic effect is not experienced by the subject within 4 hours or less of spray dosing, administering a further subsequent spray of the pharmaceutical formulation to the nasal cavity of the subject.

* * * * *